US008255277B1

(12) United States Patent
Corts et al.

(10) Patent No.: US 8,255,277 B1
(45) Date of Patent: Aug. 28, 2012

(54) SYSTEM AND METHOD FOR GENERATING MULTIMEDIA ACCOMPANIMENTS TO BROADCAST DATA

(75) Inventors: David Corts, Nashville, TN (US); Bryce Wells, Nashville, TN (US); Paul Signorelli, Ridgefield, CT (US); Lee Hunter, Darien, CT (US); Terrance Snyder, Washingtonville, NY (US)

(73) Assignee: Impulse Radio, Inc., Larchmont, NY (US)

( * ) Notice: Subject to any disclaimer, the term of this patent is extended or adjusted under 35 U.S.C. 154(b) by 0 days.

(21) Appl. No.: 13/048,493

(22) Filed: Mar. 15, 2011

Related U.S. Application Data

(60) Division of application No. 09/839,451, filed on Apr. 20, 2001, now Pat. No. 7,908,172, which is a continuation-in-part of application No. 09/802,469, filed on Mar. 9, 2001, now abandoned.

(60) Provisional application No. 60/188,050, filed on Mar. 9, 2000.

(51) Int. Cl.
*G06Q 30/00* (2012.01)
(52) U.S. Cl. ..................... 705/14.55; 705/26.8
(58) Field of Classification Search ............... 705/14.55, 705/26.8
See application file for complete search history.

(56) References Cited

U.S. PATENT DOCUMENTS

| | | | |
|---|---|---|---|
| 5,278,826 A | 1/1994 | Murphy et al. | |
| 5,278,844 A | 1/1994 | Murphy et al. | |
| 5,303,393 A | 4/1994 | Noreen et al. | |
| 5,315,583 A | 5/1994 | Murphy et al. | |
| 5,465,396 A | 11/1995 | Hunsinger et al. | |
| 5,507,024 A | 4/1996 | Richards, Jr. | |
| 5,583,873 A | 12/1996 | Miyake et al. | |
| 5,615,227 A | 3/1997 | Schumacher, Jr. et al. | |

(Continued)

FOREIGN PATENT DOCUMENTS

WO 00/19647 4/2000

(Continued)

OTHER PUBLICATIONS

"IBOC Digital Radio Broadcasting for AM and FM Radio Broadcast Stations", FCC Encyclopedia, downloaded Apr. 15, 2012 from http://www.fcc.gov/encyclopedia/iboc-digital-radio-broadcasting-am-and-fm-radio-broadcast-stations.*

(Continued)

*Primary Examiner* — Donald L. Champagne
(74) *Attorney, Agent, or Firm* — Withrow & Terranova, P.L.L.C.

(57) ABSTRACT

A method and system is presented for coordinating the transmission of supplemental digital data to accompany broadcast data, and in particular, analog radio broadcasts, among a plurality of broadcasters. The supplemental digital data may provide information about the particular broadcast data being transmitted (i.e. cut data) or may be supplemental to such data (i.e. news, weather and traffic data). The supplemental digital data to be presented is sorted based on particular algorithms which may take into account broadcaster-specified criteria such as target audience, time of day, type of broadcast data presented, and the like. The supplemental digital data may be audio data, visual data, or audio-visual data for presentation with the broadcast data. The supplemental digital data may further be advertisement data. The advertisement data may be sold by the broadcasters or the party coordinating the IBOC transmission of the supplemental digital data. The supplemental digital data may play simultaneously with muted broadcast data or at a user-specified time.

16 Claims, 121 Drawing Sheets

U.S. PATENT DOCUMENTS

| | | | |
|---|---|---|---|
| 5,633,896 A | 5/1997 | Carlin et al. | |
| 5,692,058 A | 11/1997 | Eggers et al. | |
| 5,703,795 A | 12/1997 | Mankovitz | |
| 5,703,954 A | 12/1997 | Dapper et al. | |
| 5,708,662 A | 1/1998 | Takashima | |
| 5,745,525 A | 4/1998 | Hunsinger et al. | |
| 5,757,854 A * | 5/1998 | Hunsinger et al. | 375/260 |
| 5,764,706 A | 6/1998 | Carlin et al. | |
| 5,802,066 A | 9/1998 | Miyake et al. | |
| 5,809,065 A | 9/1998 | Dapper et al. | |
| 5,815,671 A | 9/1998 | Morrison | |
| 5,819,160 A | 10/1998 | Foladare et al. | |
| 5,850,415 A | 12/1998 | Hunsinger et al. | |
| 5,857,156 A * | 1/1999 | Anderson | 455/517 |
| 5,878,089 A | 3/1999 | Dapper et al. | |
| 5,898,680 A | 4/1999 | Johnstone et al. | |
| 5,898,732 A | 4/1999 | Dapper et al. | |
| 5,903,598 A | 5/1999 | Hunsinger et al. | |
| 5,930,687 A | 7/1999 | Dapper et al. | |
| 5,946,326 A | 8/1999 | Rinne | |
| 5,949,796 A | 9/1999 | Kumar | |
| 5,949,813 A | 9/1999 | Hunsinger et al. | |
| 5,956,373 A | 9/1999 | Goldston et al. | |
| 5,956,624 A | 9/1999 | Hunsinger et al. | |
| 5,991,601 A | 11/1999 | Anderson | |
| 6,005,886 A | 12/1999 | Short | |
| 6,005,894 A | 12/1999 | Kumar | |
| 6,081,780 A | 6/2000 | Lumelsky | |
| 6,108,810 A | 8/2000 | Kroeger et al. | |
| 6,128,334 A | 10/2000 | Dapper et al. | |
| 6,128,350 A | 10/2000 | Shastri et al. | |
| 6,148,007 A | 11/2000 | Kroeger | |
| 6,192,340 B1 | 2/2001 | Abecassis | |
| 6,286,063 B1 * | 9/2001 | Bolleman et al. | 710/62 |
| 6,463,469 B1 | 10/2002 | Yavitz | |
| 6,590,944 B1 | 7/2003 | Kroeger | |
| 6,721,337 B1 * | 4/2004 | Kroeger et al. | 370/477 |
| 7,415,430 B2 * | 8/2008 | Christensen et al. | 705/26.2 |
| 7,908,172 B2 * | 3/2011 | Corts et al. | 705/14.66 |
| 2002/0049717 A1 * | 4/2002 | Routtenberg et al. | 707/1 |
| 2002/0141491 A1 | 10/2002 | Corts et al. | |

FOREIGN PATENT DOCUMENTS

| | | |
|---|---|---|
| WO | 00/58860 | 10/2000 |

OTHER PUBLICATIONS

"In band on channel" article on downloaded Feb. 14, 2009 from http://en.wikipedia.org/wiki/In-band_on-channel.

NYTimes reference definition of "waveform", downloaded Feb. 14, 2009 from http://query.nytimes.com/search/query=waveform&srchst=ref&submit.x=26&submit.y=9.

"Law.com-Morgan and Finnegan Files for Bankruptcy", downloaded Aug. 22, 2009.

Skegg, Martin and Oliviera-Salac, "Digital gadgets: We're about to be bombarded with sharp new sound and vision—but is the hardware any good? Martin Skegg and Michael Olivera-Salac find the best", Independent, Saturday, Oct. 17, 1998, Features section p. 75.

Final Office Action for U.S. Appl. No. 09/839,451 (now US patent 7,908,172), Jul. 3, 2007, 9 pages.

Final Office Action for U.S. Appl. No. 09/839,451 (now US patent 7,908,172), Feb. 26, 2008, 12 pages.

Final Office Action for U.S. Appl. No. 09/839,451 (now US patent 7,908,172), Jun. 29, 2006, 10 pages.

Final Office Action for U.S. Appl. No. 09/839,451 (now US patent 7,908,172), Mar. 27, 2009, 31 pages.

Final Office Action for U.S. Appl. No. 09/839,451 (now US patent 7,908,172), Oct. 17, 2007, 9 pages.

Final-Office Action for U.S. Appl. No. 091839,451 (now US patent 7,908,172), Feb. 20, 2009, 18 pages.

Non-final Office Action for U.S. Appl. No. 09/839,451 (now US patent 7,908,172), Apr. 8, 2005, 6 pages.

Non-final Office Action for U.S. Appl. No. 09/839,451 (now US patent 7,908,172), Aug. 20, 2008, 8 pages.

Non-final Office Action for U.S. Appl. No. 09/839,451 (now US patent 7,908,172), Aug. 24, 2010, 19 pages.

Non-final Office Action for U.S. Appl. No. 09/839,451 (now US patent 7,908,172), Dec. 14, 2006, 9 pages.

Non-final Office Action for U.S. Appl. No. 09/839,451 (now US patent 7,908,172), May 26, 2010, 8 pages.

Non-final Office Action for U.S. Appl. No. 09/839,451 (now US patent 7,908,172), Oct. 18, 2005, 7 pages.

Notice of Allowance for U.S. Appl. No. 09/839,451 (now US patent 7,908,172), Nov. 3, 2010, 19 pages.

Notice of Allowance mailed Apr. 26, 2012, for U.S. Appl. No. 13/022,068, 21 pages.

* cited by examiner

FIGURE 1
rCommerce Overview

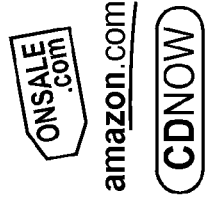

4 Digital Signal, complete with IR Data (SKU, price, description, etc.), is now combined with traditional analog signal and broadcast across the airwaves.

5 Consumer, with latest DAB car stereo receiver, listens to broadcast and is able to receive IR data.

6 With click of a button, tells IR, that they want to purchase the song, product, or service being broadcast

7 IR confirms transaction for the user.

IR Vendors continuously feed updated inventory data to rCommerce™ engine *

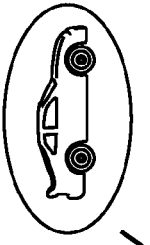

IR Application, running on DAB Server, combines IR Data with Digital Audio Signal

2 IR Data Constantly Fed to IR rCommerce™ Application via Internet

3

1 The Impulse Radio rCommerce™ site manages all customer and vendor data

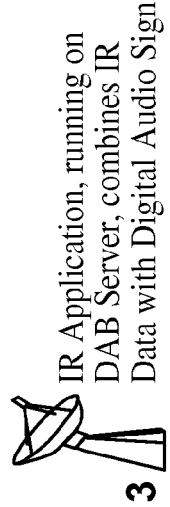

impulse radio

IR customer registers and creates an account, complete with credit card and demographic information

*Vendor logos for illustration purposes only.

```
<!ELEMENT AudioSpace ( DigitalCopySet+ ) >

<!ELEMENT DigitalCopy ( Display | DisplayCode | bg | layout | timeLength )* >
<!ATTLIST DigitalCopy id ( 100097 | 100099 | 100101 ) #REQUIRED >
<!ATTLIST DigitalCopy name ( adline0 | adline1 | adline2 | adline3 ) #REQUIRED >

<!ELEMENT DigitalCopySet ( name, DigitalCopy+ ) >
<!ATTLIST DigitalCopySet frame NMTOKEN #REQUIRED >

<!ELEMENT Display ( img | text )* >

<!ELEMENT DisplayCode ( #PCDATA ) >
<!ATTLIST DisplayCode type CDATA #FIXED "text/html" >

<!ELEMENT bg EMPTY >
<!ATTLIST bg color ( 000069 | 000099 ) #REQUIRED >

<!ELEMENT img ( src ) >

<!ELEMENT layout EMPTY >
<!ATTLIST layout halign NMTOKEN #FIXED "center" >
<!ATTLIST layout valign ( center | top ) #REQUIRED >

<!ELEMENT name ( #PCDATA ) >

<!ELEMENT src ( #PCDATA ) >

<!ELEMENT text ( #PCDATA ) >
<!ATTLIST text color NMTOKEN #REQUIRED >
<!ATTLIST text font NMTOKEN #FIXED "SansSerif" >
<!ATTLIST text size NMTOKEN #REQUIRED >

<!ELEMENT timeLength ( #PCDATA ) >
```

FIGURE 3

| 1161 | 1162 | 1163 | 1164 | 1165 | 1166 |
|---|---|---|---|---|---|
| AudioCopyPool_id | Order_Detail_ID | AudCopyPool_StartMillis | AudCopyPool_Endmillis | StationCodeMap_StationCutID | AudioFrame_id |
| 142784 | 144310 | 9.89993E+11 | 9.90058E+11 | | 5 |
| 142783 | 144309 | 9.90079E+11 | 9.90144E+11 | | 5 |
| 142782 | 144308 | 9.90166E+11 | 9.9023E+11 | | 5 |
| 142781 | 144307 | 9.90252E+11 | 9.90317E+11 | | 5 |
| 142780 | 144306 | 9.90338E+11 | 9.90403E+11 | | 5 |
| 142779 | 144305 | 9.90425E+11 | 9.9049E+11 | | 5 |
| 142778 | 144304 | 9.90598E+11 | 9.90662E+11 | | 5 |
| 142777 | 144303 | 9.90684E+11 | 9.90749E+11 | | 5 |
| 142776 | 144302 | 9.9077E+11 | 9.90835E+11 | | 5 |
| 142775 | 144301 | 9.90857E+11 | 9.90922E+11 | | 5 |
| 142774 | 144300 | 9.90943E+11 | 9.91008E+11 | | 5 |
| 142773 | 144299 | 9.9103E+11 | 9.91094E+11 | | 5 |
| 142772 | 144298 | 9.91116E+11 | 9.91181E+11 | | 5 |
| 142771 | 144297 | 9.91202E+11 | 9.91267E+11 | | 5 |

FIG. 11E1

| 1167 AudioCopyPool_weight | 1167A DC_Set_id | 1168 AudCopyPool_QtyDue | AudCopyPool_MinSpacing | 1169 AudCopyPool_MinSpacing | AudCopyPool_CompFlags | 1170 | AudCopyPool_ComSpacing | 1171 |
|---|---|---|---|---|---|---|---|---|
| 1 | 100337 | 400 | 60000 | | 7 | | 60000 | |
| 1 | 100337 | 400 | 60000 | | 7 | | 60000 | |
| 1 | 100337 | 400 | 60000 | | 7 | | 60000 | |
| 1 | 100337 | 400 | 60000 | | 7 | | 60000 | |
| 1 | 100337 | 400 | 60000 | | 7 | | 60000 | |
| 1 | 100337 | 400 | 60000 | | 7 | | 60000 | |
| 1 | 100337 | 400 | 60000 | | 7 | | 60000 | |
| 1 | 100337 | 400 | 60000 | | 7 | | 60000 | |
| 1 | 100337 | 400 | 60000 | | 7 | | 60000 | |
| 1 | 100337 | 400 | 60000 | | 7 | | 60000 | |
| 1 | 100337 | 400 | 60000 | | 7 | | 60000 | |
| 1 | 100337 | 400 | 60000 | | 7 | | 60000 | |
| 1 | 100337 | 400 | 60000 | | | | | |

```
<!ELEMENT DigitalCopySet ( id | name | ttl | cut | DigitalCopy+ )*>
<!ATTLIST DigitalCopySet frame NMTOKEN #IMPLIED>
<!ELEMENT id ( #PCDATA )>
<!ELEMENT name ( #PCDATA )>
<!ELEMENT ttle ( #PCDATA )>
<!ELEMENT cut (#PCDATA )>

<!ENTITY % DigitalCopy.dtd SYSTEM "getResource://DigitalCopy.dtd">
  %DigitalCopy.dtd;
```

FIG. 12K

```
<!ELEMENT DigitalCopy ( DisplayData | minTimeLength | optimalTimeLength )* >
<!ATTLIST DigitalCopy name CDATA #REQUIRED >
<!ATTLIST DigitalCopy id NMTOKEN #IMPLIED>

<!ELEMENT DisplayData ( #PCDATA ) >
<!ATTLIST DisplayData type CDATA #REQUIRED >

<!ELEMENT minTimeLength ( #PCDATA ) >
<!ELEMENT optimalTimeLength ( #PCDATA ) >
```

FIG. 12L

```xml
<?xml version="1.0" encoding="UTF-8"?>
<!DOCTYPE DigitalCopySet PUBLIC "-//Impulse Radio, Inc.//DTD DigitalCopySet//EN"
            "getResource://DigitalCopySet.dtd">
<DigitalCopySet frame="right">
  <name>Big_Als</name>
  <ttl>98765320000</ttl>
  <DigitalCopy id="0" name="Big Al's - open">
    <DisplayData type="text/html"><body leftmargin="0"
      topmargin="0"> <table> <tr>
      <td>    <img
      src="http://www.impulseradio.com/images/big_als.gif">
      </td> </tr> </table> </body></DisplayData>
    <optimalTimeLength>5000</optimalTimeLength>
  </DigitalCopy>
  <DigitalCopy id="0" name="Big Al's - copy1">
    <DisplayData type="text/html"><body leftmargin="0"
      topmargin="0"> <table> <tr>
      <td>    <img
      src="http://www.impulseradio.com/images/big_als_bg.gif">
      </td> </tr> </table> </body></DisplayData>
    <optimalTimeLength>15000</optimalTimeLength>
  </DigitalCopy>
  <DigitalCopy id="0" name="Big Al's - close">
    <DisplayData type="text/html"><body leftmargin="0"
      topmargin="0"> <table> <tr>
      <td>    <img
      src="http://www.impulseradio.com/images/big_als.gif">
      </td> </tr> </table> </body></DisplayData>
    <optimalTimeLength>10000</optimalTimeLength>
  </DigitalCopy>
</DigitalCopySet>
```

| 1293A | 1293B | 1293C | 1293D | 1293E | 1293F |
|---|---|---|---|---|---|
| DigitalCopyPool_id | Order_Detail_ID | DigCopyPool_StartMillis | DigCopyPool_Endmillis | AudioCodePool_Order_Detail_ID | DigitalFrame_id |
| 137421 | 139438 | 9.86086E+11 | 9.86086E+11 | 301 | 1 |
| 137420 | 139437 | 9.85997E+11 | 9.85997E+11 | 301 | 1 |
| 137419 | 139436 | 9.86515E+11 | 9.86515E+11 | 301 | 1 |
| 137510 | 139527 | 9.86515E+11 | 9.86515E+11 | 300 | 1 |
| 137418 | 139435 | 9.86429E+11 | 9.86429E+11 | 301 | 1 |
| 137509 | 139526 | 9.85997E+11 | 9.85997E+11 | 300 | 1 |
| 137417 | 139434 | 9.86342E+11 | 9.86342E+11 | 301 | 1 |
| 137508 | 139525 | 9.86083E+11 | 9.86083E+11 | 300 | 1 |
| 137416 | 139433 | 9.86256E+11 | 9.86256E+11 | 301 | 1 |
| 137479 | 139496 | 9.8617E+11 | 9.8617E+11 | 300 | 1 |
| 137478 | 139495 | 9.86256E+11 | 9.86256E+11 | 300 | 1 |
| 137477 | 139494 | 9.86342E+11 | 9.86342E+11 | 300 | 1 |
| 137454 | 139471 | 9.8617E+11 | 9.8617E+11 | 301 | 1 |
| 137476 | 139493 | 9.86429E+11 | 9.86429E+11 | 300 | 1 |

| 1293G | 1293H | 1293I | 1293J | 1293K | 1293L |
|---|---|---|---|---|---|
| DigCopyPool_weight | DC_Set_Id | DigCopyPool_QtyDue | DigCopyPool_MinSpacing | Comp_Codes | AudCopyPool_ComSpacing |
| 1 | 100268 | 1 | 60000 | 10.19 | 60000 |
| 1 | 100268 | 1 | 60000 | 10.19 | 60000 |
| 1 | 100268 | 1 | 60000 | 10.19 | 60000 |
| 1 | 100263 | 1 | 60000 | 2.15 | 60000 |
| 1 | 100268 | 1 | 60000 | 10.19 | 60000 |
| 1 | 100298 | 1 | 60000 | 2.15 | 60000 |
| 1 | 100263 | 1 | 60000 | 2.15 | 60000 |
| 1 | 100268 | 1 | 60000 | 10.19 | 60000 |
| 1 | 100263 | 1 | 60000 | 2.15 | 60000 |
| 1 | 100263 | 1 | 60000 | 2.15 | 60000 |
| 1 | 100263 | 1 | 60000 | 2.15 | 60000 |
| 1 | 100268 | 1 | 60000 | 10.19 | 60000 |
| 1 | 100263 | 1 | 60000 | 2.15 | 60000 |

| 1294A | 1294B | 1294C | 1294D |
|---|---|---|---|
| DC_SET_ID | DC_SET_NAME | DC_SET_FRAME | DC_LASTUPDATE |
| 100259 | Santana | left | 9.86999E+11 |
| 100260 | Shania | left | 9.86999E+11 |
| 100261 | Hertz | right | 9.87003E+11 |
| 100262 | Budweiser | right | 9.87003E+11 |
| 100263 | Nextel_15second_A | bottom | 9.87004E+11 |
| 100264 | Nextel_15second_B | bottom | 9.87004E+11 |
| 100265 | Nextel_15second_B | bottom | 9.87004E+11 |
| 100266 | Nextel_15second | bottom | 9.87004E+11 |
| 100267 | Dunkin_30second_A | bottom | 9.87005E+11 |
| 100268 | Dunkin_15second | bottom | 9.87005E+11 |
| 100269 | Dunkin_30second_A | bottom | 9.87006E+11 |
| 100270 | Dunkin_30second_B | bottom | 9.87006E+11 |
| 100271 | DiscountFurnitureDirect | right | 9.87006E+11 |
| 100272 | Sleepers | right | 9.87006E+11 |
| 100223 | Nextel Data Traffic | | 9.86746E+11 |
| 100224 | Nextel Morning Drive | | 9.86751E+11 |
| 100225 | Nextel By Time | | 9.86751E+11 |
| 100273 | Big_Als | right | 9.87006E+11 |
| 100274 | Sunrise | right | 9.87006E+11 |
| 100275 | Zieglers | right | 9.87006E+11 |
| 100276 | BMW | right | 9.87006E+11 |
| 100230 | Ichi-Bahn PAD Morning Drive | | 9.86752E+11 |
| 100277 | BMW_second | bottom | 9.87006E+11 |
| 100278 | BMW | right | 9.87006E+11 |
| 100279 | Hertz | right | 9.87006E+11 |
| 100280 | Hertz_second | bottom | 9.87006E+11 |
| 100281 | Hertz_second | bottom | 9.87006E+11 |
| 100297 | Budweiser | right | 9.87273E+11 |
| 100298 | DiscountFurnitureDirect | right | 9.87273E+11 |

| DIGITALCOPY_ID | DIGITALCOPY_ID_TAG | DIGITALCOPY_MIN_LENGTH | DIGITALCOPY_OPT_LENGTH | DIGITALCOPY_ACTION_CODE |
|---|---|---|---|---|
| 1295A | 1295B | 1295C | 1295D | 1295E |
| 100754 | Gray-fact2 | 0 | 10000 | |
| 100755 | Gray-fact2 | 0 | 10000 | |
| 100756 | Knopfler-open | 0 | 15000 | |
| 100757 | Knopfler-fact1 | 0 | 10000 | |
| 100758 | Knopfler-fact2 | 0 | 10000 | |
| 100759 | Knopfler-fact3 | 0 | 10000 | |
| 100760 | Santana-open | 0 | 15000 | |
| 100761 | Santana-fact1 | 0 | 10000 | |
| 100762 | Santana-fact2 | 0 | 10000 | |
| 100763 | Santana-fact3 | 0 | 10000 | |
| 100764 | Shania-open | 0 | 15000 | |
| 100765 | Shania-fact1 | 0 | 10000 | |
| 100766 | Shania-fact2 | 0 | 10000 | |
| 100767 | Shania-fact3 | 0 | 10000 | |
| 100768 | Hertz-opening | 0 | 2500 | |
| 100769 | Hertz-special1 | 0 | 1000 | |
| 100770 | Hertz-special2 | 0 | 1000 | |
| 100771 | Hertz-special3 | 0 | 1000 | |
| 100772 | Hertz-special4 | 0 | 1000 | |
| 100773 | Hertz-closing1 | 0 | 1500 | |
| 100774 | Hertz-closing2 | 0 | 1000 | |
| 100775 | Hertz-closing3 | 0 | 6000 | |
| 100776 | Bud-open | 0 | 5000 | |
| 100777 | Bud-copy1 | 0 | 7500 | |

| 1295A | 1295B | 1295C | 1295D | 1295E |
|---|---|---|---|---|
| DIGITALCOPY_ID | DIGITALCOPY_ID_TAG | DIGITALCOPY_MIN_LENGTH | DIGITALCOPY_OPT_LENGTH | DIGITALCOPY_ACTION_CODE |
| 100778 | Bud-copy2 | 0 | 7500 | |
| 100779 | Bud-copy3 | 0 | 7500 | |
| 100780 | Bud-close | 0 | 2500 | |
| 100781 | Nextel-open | 0 | 5000 | |
| 100782 | Nextel-body1 | 0 | 3000 | |
| 100783 | Nextel-body2 | 0 | 3000 | |
| 100784 | Nextel-body3 | 0 | 3000 | |
| 100785 | Nextel-close | 0 | 1000 | |

| 1296A | 1296B | 1296C | 1296D |
|---|---|---|---|
| DC_SET_DETAILS_ID | DC_SET_ID | DC_SET_DETAILS_SEQ | DIGITALCOPY_ID |
| 985 | 100257 | 3 | 100754 |
| 986 | 100257 | 4 | 100755 |
| 987 | 100258 | 1 | 100756 |
| 988 | 100258 | 2 | 100757 |
| 989 | 100258 | 3 | 100758 |
| 990 | 100258 | 4 | 100759 |
| 991 | 100259 | 1 | 100760 |
| 992 | 100259 | 2 | 100761 |
| 993 | 100259 | 3 | 100762 |
| 994 | 100259 | 4 | 100763 |
| 995 | 100260 | 1 | 100764 |
| 996 | 100260 | 2 | 100765 |
| 997 | 100260 | 3 | 100766 |
| 998 | 100260 | 4 | 100767 |
| 999 | 100261 | 1 | 100768 |
| 1000 | 100261 | 2 | 100769 |
| 1001 | 100261 | 3 | 100770 |
| 1002 | 100261 | 4 | 100771 |
| 1003 | 100261 | 5 | 100772 |

| 1298A | 1298B | 1298C | 1298D |
|---|---|---|---|
| DC_DISPLAY_ID | DIGITALCOPY_ID | DISPLAY_TYPE | CDDATA |
| 10001 | 754 | text/html | <html>...</html> |
| 10002 | 755 | text/html | <html>...</html> |
| 10003 | 756 | text/html | <html>...</html> |

```
<!ELEMENT DataPackage ( SchemaDef | data ) >         1425
<!ATTLIST DataPackage index NMTOKEN #IMPLIED>

<!ELEMENT SchemaDef ( table | layout ) #REQUIRED >

<!ELEMENT table ( #PCDATA ) #REQUIRED >
<!ELEMENT layout ( #PCDATA ) #REQUIRED  >

<!ELEMENT data ( #PCDATA ) #REQUIRED >
<!ATTLIST data bytesize NMTOKEN #IMPLIED>
```

FIG. 13N

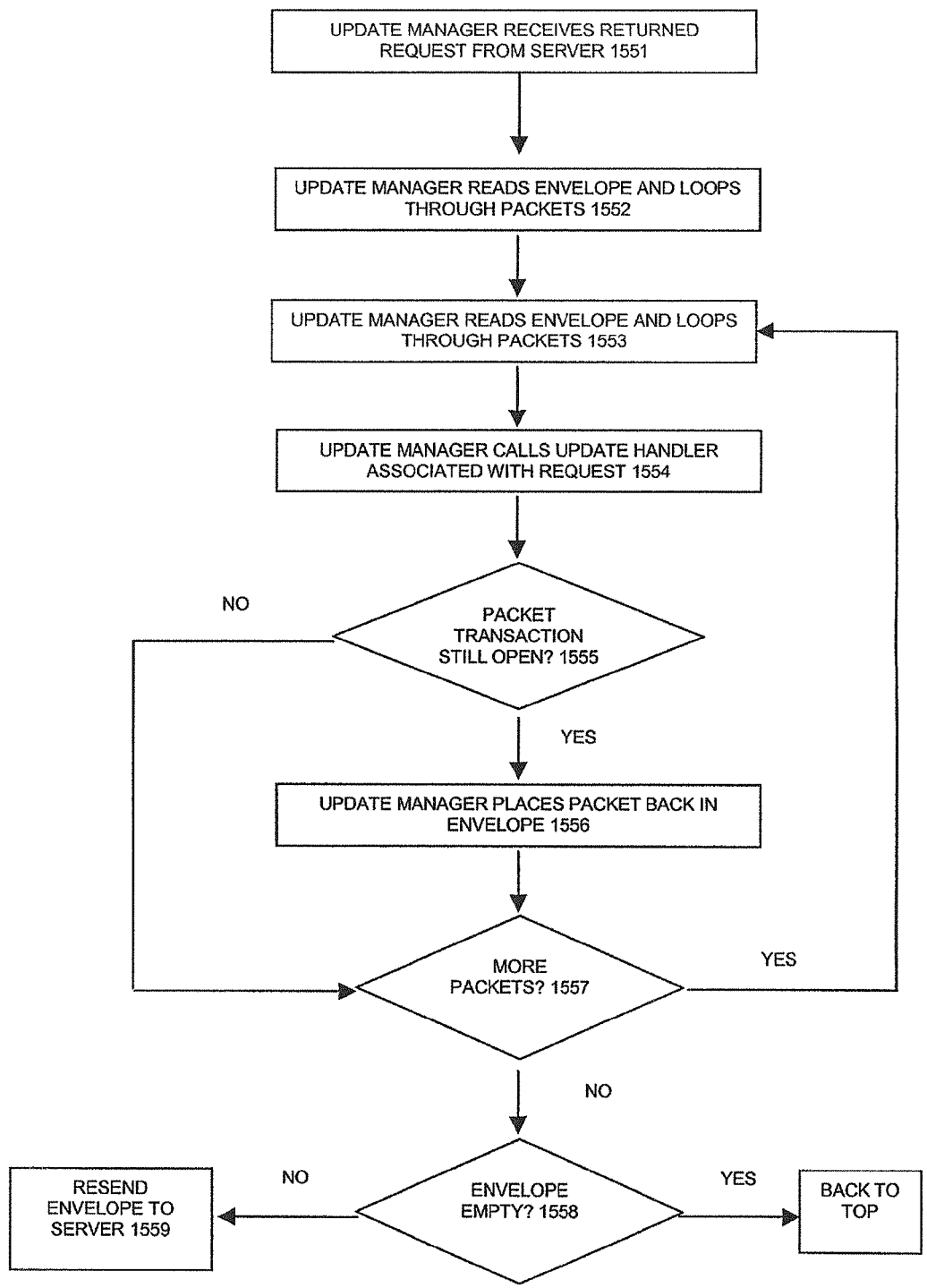
FIG. 14J1

1570

<!ELEMENT Envelope ( AddressInfo | Packet* ) >

<!ELEMENT AddressInfo ( Sender | credential | recipient ) #REQUIRED>

<!ELEMENT Sender ( #PCDATA ) #REQUIRED >
<!ELEMENT credential ( #PCDATA ) #REQUIRED >
<!ELEMENT recipient ( #PCDATA ) #REQUIRED >

<!ELEMENT Packet ( PacketInfo | payload ) #REQUIRED >

<!ELEMENT PacketInfo ( packetTransID | manifest | type ) #REQUIRED >

<!ELEMENT packetTransID ( #PCDATA ) #REQUIRED >
<!ELEMENT manifest ( #PCDATA ) #REQUIRED >
<!ELEMENT type ( #PCDATA ) #REQUIRED >

<!ELEMENT payload ( #PCDATA ) #REQUIRED >

FIG. 14L

```
<?xml version="1.0" encoding="UTF-8"?>                    1571
<Envelope>
        <AddressInfo>
                <Sender>2</Sender>
                <credential>qazxsw23edcvfr45tgbnhy67ujmki890ed21</credential>
                <Recipient>192.168.0.1/servlets/BBserver</Recipient>
        </AddressInfo>
        <Packet>
                <PacketInfo>
                        <packetTransID>985971169074</packetTransID>
                        <manifest>DIGITALCOPYPACKAGE</manifest>
                        <type>1</type>
                </PacketInfo>
                <payload><?xml
version="1.0"
encoding="UTF-8"?>
<Request>DIGITALCOPYPACKAGE</Request>
                </payload>
        </Packet>
</Envelope>
```

FIG. 14M

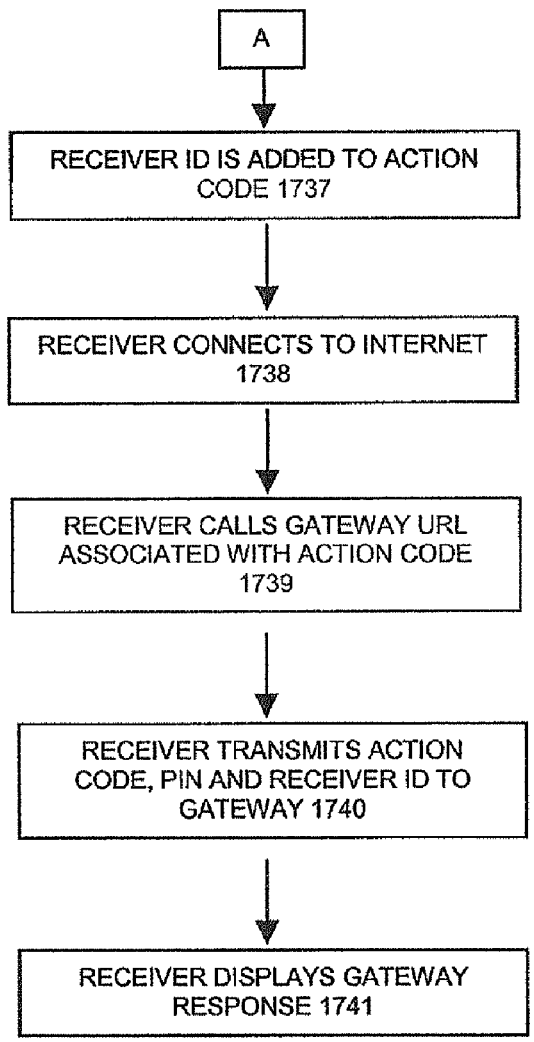
FIG. 16E1

SYSTEM AND METHOD FOR GENERATING MULTIMEDIA ACCOMPANIMENTS TO BROADCAST DATA

CROSS-REFERENCE TO RELATED APPLICATIONS

This application is a divisional of U.S. patent application Ser. No. 09/839,451, filed Apr. 20, 2001, issued as U.S. Pat. No. 7,908,172, which is a continuation-in-part of U.S. Ser. No. 09/802,469, filed on Mar. 9, 2001, (now abandoned) which claims priority to U.S. Provisional Application Ser. No. 60/188,050, filed on Mar. 9, 2000. Each of the identified applications is incorporated by reference in its entirety.

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is directed generally to multiplex communications, and more particularly to communicating messages over free space (i.e. a radio frequency sideband or frequency mask) for reception at multiple destinations.

BACKGROUND OF THE INVENTION

In-Band On-Channel (IBOC) is an emerging Digital Audio Broadcasting (DAB) technology, developed by IBIQUITY DIGITAL, INC., that enables radio broadcasters to transmit digital data ("the data") over their current analog transmission frequencies—which are typically used for the transmission of audio broadcasts. IBOC technology has the ability to create a "hybrid" signal that can simultaneously send analog ("audio") and digital data. The digital data can be digitally compressed analog ("audio") data, instructions for rendering visual components ("visual data") on an IBOC DAB receiver, or information for other data-specific services. For example, digital data could potentially render visual components such as text and images describing artist/song title information, news headlines, digital audio traffic reports or other information that could be valuable to a radio listener. U.S. Pat. No. 5,757,854 discusses these capabilities in greater detail.

The present invention addresses advertising and the companies that serve the advertising industry in the capacity of creating advertisements for a specific medium as well as the development of intelligent tools to efficiently and strategically place advertisements. Previously, with regards to advertising on the Internet or World Wide Web, multiple companies have developed creative tools for the production of "web banners" and web pages where those banners are typically found. DOUBLECLICK, INC., for example, has developed and patented a process for intelligently distributing these banners across a network of web sites for maximum reach and efficiency.

The present invention also relates to the aggregation of content from multiple providers and the redistribution and re-packaging of that content for heretofore uncontemplated media applications. INFOSPACE is perhaps the clearest example of a company whose core business is to aggregate content from multiple providers into a central space that is repackaged and licensed to other entities wishing to utilize that content—such as other web sites and wireless network providers. INFOSPACE collects content on a multitude of subjects and then licenses that content (or selected "chunks" of that content) to a company such as VERIZON WIRELESS, a wireless communications company, for the purposes of supplying their wireless access protocol (WAP) enabled users content to their mobile phones.

Prior technologies concerning digital radio are described in the following patents: U.S. Pat. Nos. 6,148,007, 6,128,350, 6,128,334, 6,108,810, 6,005,886, 5,956,624, 5,956,373, 5,949,813, 5,930,687, 5,903,598, 5,898,732, 5,878,089, 5,850,415, 5,815,671, 5,809,065, 5,764,706, 5,745,525, 5,703,954, 5,633,896, 5,465,396, 5,315,583, 5,278,844, 5,278,826, the disclosures of which are hereby incorporated herein by reference.

SUMMARY OF THE INVENTION

The present application is directed to particular systems and methods for generating multimedia accompaniments to broadcast data.

In particular, one aspect of the invention includes a method for coordinating supplemental data transmissions with broadcast data transmitted by a plurality of broadcasters. The method includes receiving schedule information for each of a plurality of broadcasters. The schedule information may be a schedule of broadcast data to be transmitted by each broadcaster at predetermined times. Next, broadcast data that is to be transmitted by a first broadcaster at a predetermined time is identified. Supplemental digital data to be presented to listeners of the broadcast data is then determined and at least a portion of the supplemental digital data is transmitted to the first broadcaster prior to the predetermined time.

A second method and apparatus for providing supplemental digital data for presentation to a listener of broadcast data includes receiving schedule information from a plurality of broadcasters, the schedule information including a schedule of broadcast data to be transmitted by each broadcaster at predetermined times. An identification of particular broadcast data to be transmitted at a predetermined time is received from a first broadcaster. A copy order for a digital copy to be transmitted to listeners of the particular broadcast data at the predetermined time is also received. In response, supplemental digital data corresponding to the digital copy is generated and transmitted to the first broadcaster for presentation to a listener of the broadcast data.

A method and apparatus for selling advertising presented as supplemental digital data to listeners of broadcast data is further disclosed. The method includes providing hardware and/or software to a broadcaster which allows the broadcaster to receive supplemental digital data to be presented to listeners. In return, the broadcaster may provide advertising space for supplemental digital data to the supplier. The supplier in turn may sell the advertising space to an advertiser.

A method and apparatus for receiving supplemental digital data from a supplemental digital data is further provided. The method includes transmitting, to a supplemental digital data provider, schedule information including a time when particular broadcast data is to be transmitted to a group of listeners by a broadcaster. The supplemental digital data provider then transmits to the broadcaster supplemental digital data to be presented to listeners of the broadcast data on a digital data receiver. Alternatively, the supplemental digital data may be broadcast by the provider to the listeners.

A method and apparatus for coordinating supplemental digital data transmissions with broadcast data transmitted by a plurality of broadcasters is also disclosed. The method comprises receiving schedule information from a plurality of broadcaster traffic management systems or automation systems. The schedule information may include a schedule of broadcast data to be transmitted by a plurality of broadcasters at predetermined times. Broadcast data for transmission by a first broadcaster at a predetermined time is identified from the schedule information. Supplemental digital data to be presented to listeners of the broadcast data is then selected and at least a portion of the supplemental digital data is transmitted to a traffic management system corresponding to the first broadcaster prior to the predetermined time.

A method and apparatus for selecting supplemental digital data for transmission with broadcast data is further disclosed. The method includes: identifying a priority for a plurality of frames corresponding to broadcast schedule information; assigning each of a group of supplemental digital data to at least one frame, based on a type of the supplemental data; assigning each of the group of supplemental digital data a weight value; and selecting each of the supplemental digital data for presentation with broadcast data in an order based on the priority of the assigned frame and based further on the assigned weight value.

A method and apparatus for presenting audial supplemental data with broadcast data is further disclosed. The method includes selecting audial supplemental digital data for presentation on a digital data receiver at a time selected by a listener and providing an instruction with the audial supplemental data to maintain a lower volume of broadcast data upon selection of the audial supplemental data by the listener.

A second method and apparatus for presenting audial supplemental data with broadcast data includes transmitting audial supplemental data for presentation on a digital data receiver upon selection by a listener, and transmitting an instruction with the audial supplemental data to maintain a lower volume of broadcast data upon selection of the audial supplemental data by the listener.

A method and apparatus for entering into a commercial transaction using a digital data receiver presenting supplemental data is also disclosed. The method includes receiving broadcast data over a radio frequency on a digital data receiver; receiving, with the broadcast data, supplemental digital data including advertising data; and transmitting, through the digital data receiver, an indication to purchase an item corresponding to the advertising data.

A further method and apparatus for providing information to a broadcaster using a digital data receiver presenting supplemental digital data is disclosed. The method includes receiving broadcast data over a radio frequency on a digital data receiver; receiving, with the broadcast data, supplemental digital data including an invitation to a listener to submit a response; and transmitting, through the digital data receiver, an indication of the response requested in the supplemental digital data.

A method and apparatus for accomplishing a commercial transaction using a digital data receiver presenting supplemental digital data is additionally disclosed. The method includes: providing supplemental digital data including advertising data to be presented to a listener of broadcast data over a radio frequency on a digital data receiver; and receiving, from the listener, a wireless signal including an identification of the listener and an indication to purchase an item corresponding to the advertising data.

BRIEF DESCRIPTION OF THE DRAWINGS

Further aspects of the instant invention will be more readily appreciated upon review of the detailed description of the preferred embodiments included below when taken in conjunction with the accompanying drawings, of which:

FIGS. 1-7 provide a conceptual overview of the implementation of the present invention including the relationship between parties which cooperate to achieve broadcasting of supplemental digital data, as well as the equipment, exemplary transmission schema and processes used to accomplish such broadcasting;

FIGS. 11A-11E illustrate the exemplary processes used for creation and distribution of schedule information in conjunction with the present invention;

FIGS. 14A-14M illustrate the exemplary hardware and processes used for handling content received from third party content providers in conjunction with the present invention;

DETAILED DESCRIPTION OF THE INVENTION

Figure 2:
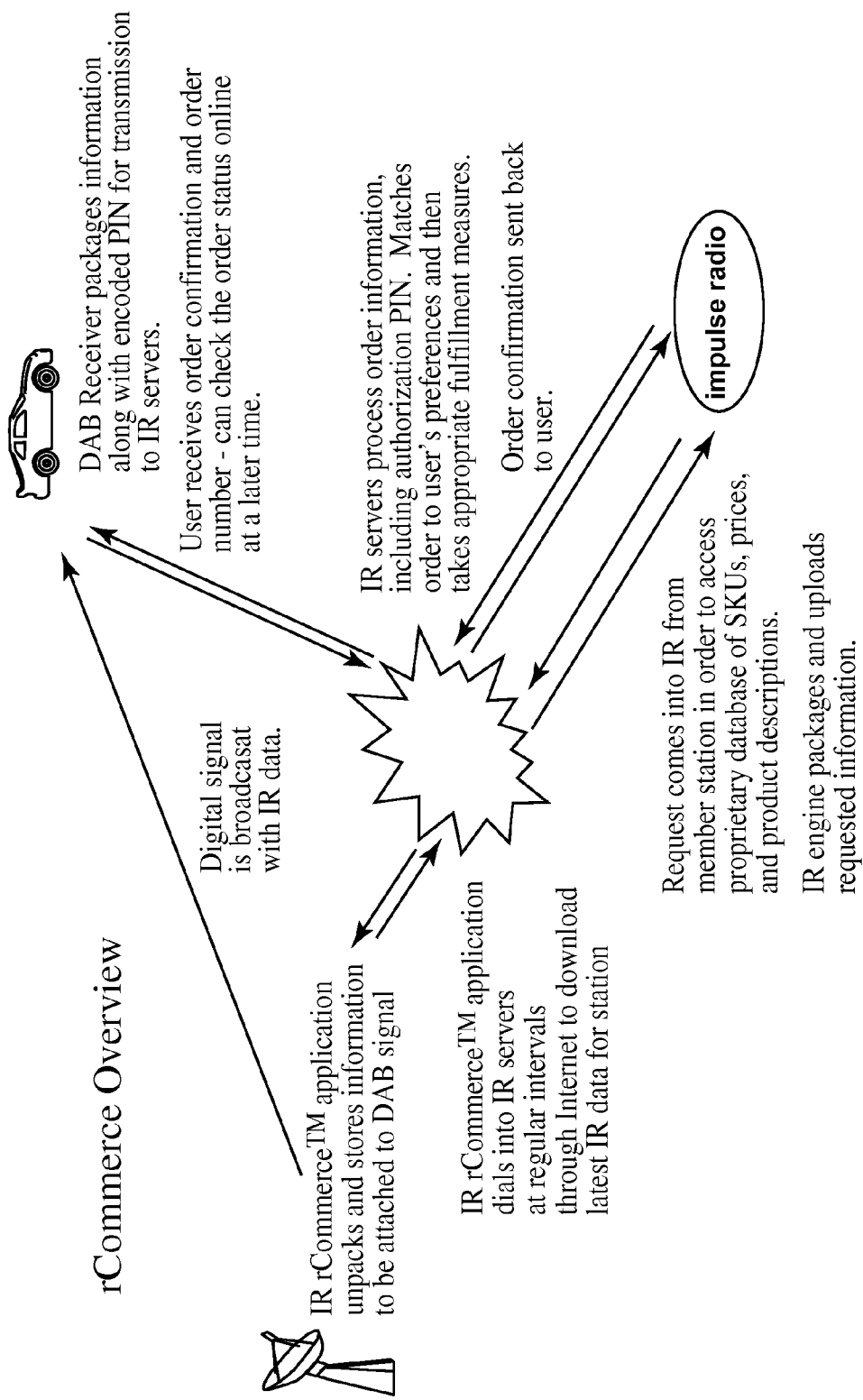

Referring now to FIGS. 1-20, wherein similar components of the present invention are referenced in like manner, preferred embodiments of a method and system for generating multimedia accompaniments to broadcast data are disclosed.

As exemplified in FIGS. 1-6, the present invention embodies a series of sub-systems which interact to allow broadcasters to distribute an entertaining and interactive flow of multimedia data to accompany standard broadcast data for a multitude of purposes. The supplemental digital data may be transmitted on a side-band of a radio frequency or on a frequency mask for an amplitude-modulated or frequency modulated signal. Supplemental digital data moves from a variety of sources through a central point where it is formatted for broadcast and assigned certain instructions that trigger its broadcast with, for example, standard analog signal broadcasts. In certain embodiments, multimedia information, such as visual, audial or audio-visual presentations, accompany such broadcasts. The multimedia information may be supplied to facilitate a purchase, other interactive transactions, by the listener. The multimedia information can range from static information, such as the name of an artist and a song that has been broadcast for enabling the identification of a song that a listener may want to purchase, to interactive information where the listener conducts a transaction based upon the multimedia information transmitted with the broadcast data. The data is transferred to a radio station or other broadcast facility from a central supplemental digital data provider where it is combined with the audio data (e.g. broadcast data) to form a data-cast.

A digital data receiver that is capable of receiving the data-cast and interpreting the IBOC signals therein then renders the supplemental digital data based upon the presentation characteristics assigned to it. Additionally, information from the data-cast can be transmitted to digital data receiver that can facilitate a transaction on the listeners' behalf.

The systems which interact to accomplish the present invention will be described in detail in the following. Where appropriate, embodiments of the present invention are described with reference to one or more figures that illustrates its activity.

Supplemental Digital Data

Certain embodiments of the current invention provide a schematic ("schema") for defining the transmitted supplemental digital data. An example of such a schema in extensible markup language (XML) is given in FIG. 3. The schema divides the supplemental digital data into multimedia information that is to be rendered on a display of the digital data receiver and format data that provides instructions for such presentation and associated actions.

The supplemental digital data can be related to broadcast data ("analog audio") or independent of the broadcast data. The concepts of related and independent do not signify a physical relationship between the analog audio broadcast and the supplemental digital data element, but rather, they describe the nature of the content of the supplemental digital data in relation to the analog audio broadcast. Related portions of the supplemental digital data generally contain content that further describes or enhances the analog audio, although they need not. Related data-cast elements are triggered, and thus data-cast, based upon criteria of the audio. For instance, data may be triggered because of the audio "cut" identifier (i.d.) that identifies the audio cut in the broadcasters' library. In this case, a cut refers to a single element from a radio station library such as a song, commercial, weather report, etc., having a predetermined length. In another instance the data may be triggered because the cut belongs to a classification of cuts, such as music, or news.

Independent supplemental digital data provide a complete set of information in and of themselves and do not have to be directly associated to a cut. The association of independent data can be much broader and may be based upon any current radio programming parameter such as time, day part, program, competitive content spacing, etc. These associations may also be based upon new radio programming parameters as certain embodiments of the invention may define. For example, these parameters can include the location on an LCD display connected to a digital data receiver device, or instructions that require users to interact with the receiver device before the data is rendered or presented.

Certain embodiments of the present invention define characteristics of the rendered portion of the data. For example, these characteristics can include competitive separation of different data-cast elements, color, layout, font, size, location and other physical indications. Other embodiments define characteristics for the data to identify the actions associated with a piece of data that would enable a listener to engage in a commerce activity. These characteristics can include information that identifies the object described by the data, the nature of the transaction, and the identity of the listener.

Further embodiments related to a data-cast provide a methodology and a system for packaging the data and the audio for broadcast on an IBOC signal. This provides a physical relationship between supplemental digital data and analog audio. This relationship can be described by characteristics such as the length of time a piece of data should play for and the time in relation to the audio when a piece of supplemental digital data should play. They can also describe the length of time a piece of supplemental digital data should be stored by the receiver device before it is removed.

Data Repository

Figure 4:
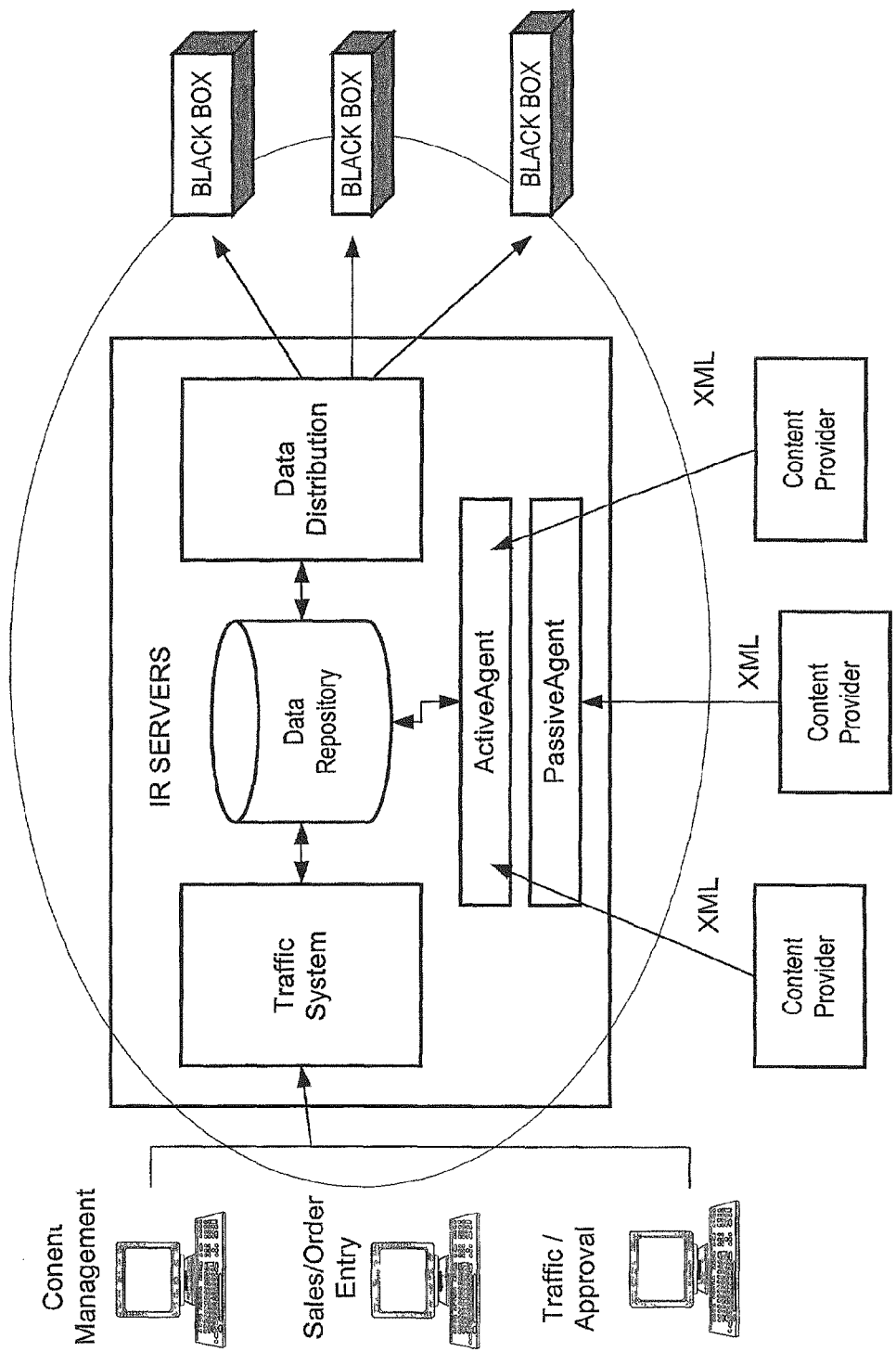
Figure 5:
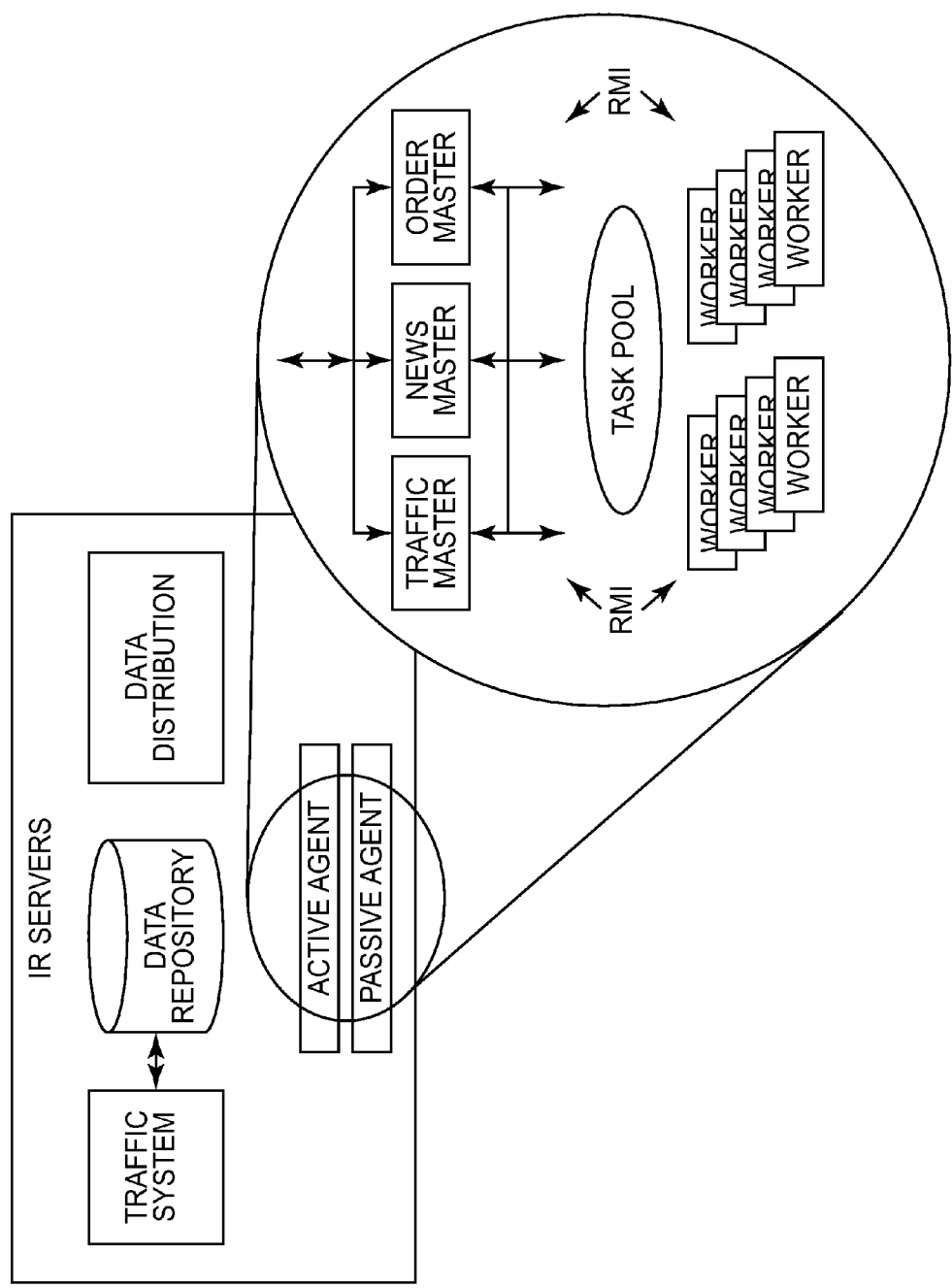
Figure 6:
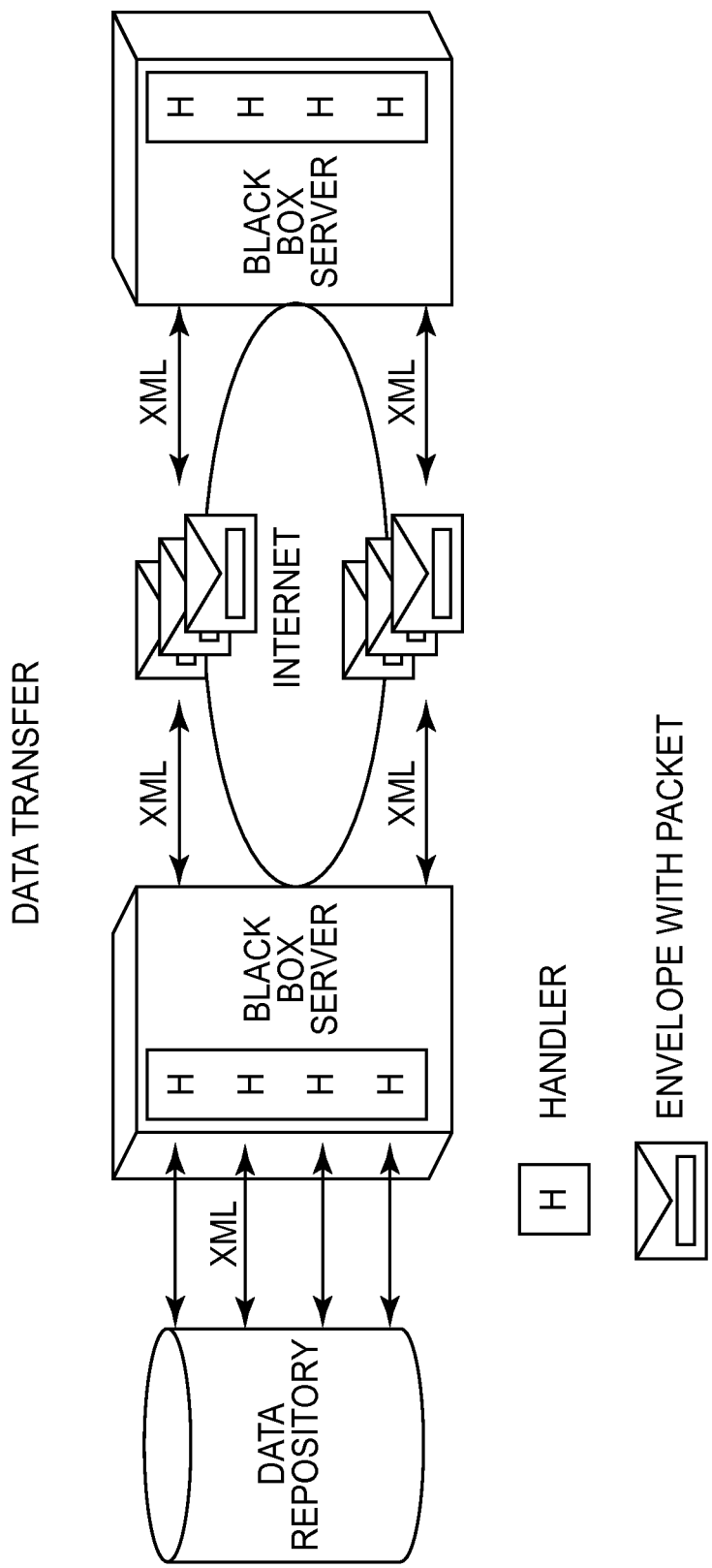
Figure 7:
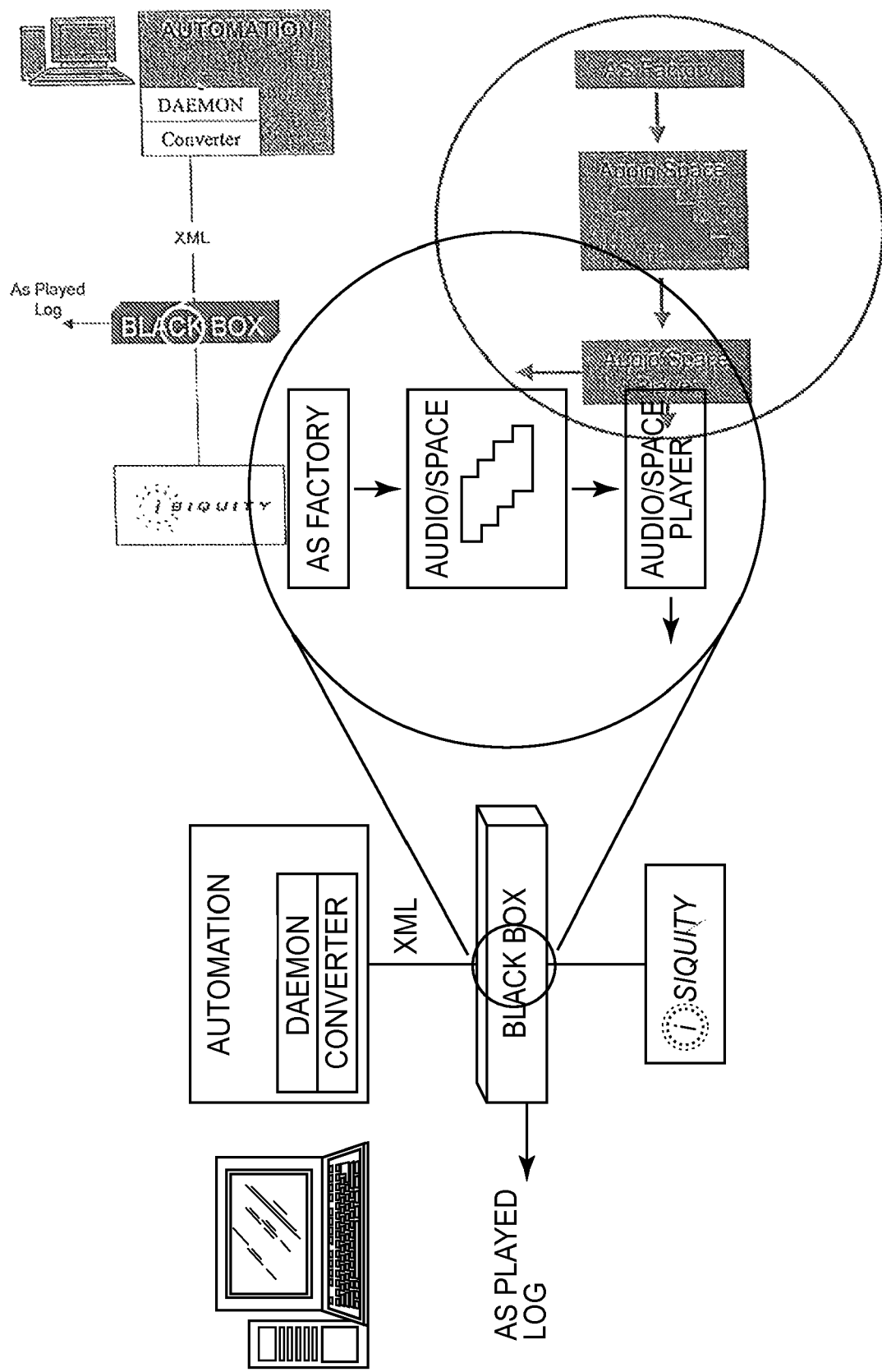

Certain embodiments of the present invention include a data repository where all data is stored such that it can be accessed by any broadcaster in the network. The repository is any hardware used for storage for all types of data as well as a system bus for moving data in and out of the repository. Accordingly, the repository may include a hard drive or other memory device sufficient to store such data for access by a computer. FIG. 4 provides an exemplary illustration of a data repository.

Content Management

An embodiment of the invention provides a system that allows a broadcaster to establish a set of broadcast rules for various groups of data and store them in the repository. These rules can include such elements as the timing, flow and occurrence of the data during the broadcast, as well as the identity of the broadcast facility that will perform the broadcast. For example, a broadcaster might desire to schedule constantly updated traffic reports to be data-cast at regular intervals during particular times of the broadcast day. These parameters of schedule information can include the time at which the data should be broadcast, the length of time it should be broadcast for, and the frequency with which it should be broadcast. Other parameters can make associations with the audio such as whether or not it will be broadcast in conjunction with a specific audio cut. The data can also be characterized to signal instructions to the digital data receiver that renders the data as to proper formatting and presentation elements.

Ad Placement

Another embodiment of the present invention provides a methodology and a system that enables the broadcaster to schedule data that is intended as an advertisement and insert it into the repository. These embodiments provide a means for broadcasters to schedule the data, as well as audit the broadcasting of the supplemental digital data. They can also track the financial aspects of the data, such as the price and number of times the data is broadcast. This information may be stored in a central data repository.

This embodiment also provides a means for a broadcaster to have a single piece of content and its associated parameters apply to a multitude of broadcast facilities. Schedule parameters include but are not limited to the starting and ending dates for the advertisement to be broadcast, the frequency with which the advertisement will be broadcast, and the time at which the advertisement will be broadcast. Other parameters can make associations with the audio such as whether or not it will be broadcast in conjunction with a specific audio cut. The data can be characterized to signal instructions to the device that renders the data with proper formatting and presentation elements.

Traffic Management

The invention embodies a methodology and a system for coordinating advertisements and content within a data-cast using the information in the data repository. This can be used to ensure the continuity of the broadcast by providing a process by which broadcasters can control the flow of data through the network, from its source to the devices responsible for the data-cast. The embodiment performs functions such as preventing data, be it content or advertisement, from being scheduled beyond the capacity of the broadcast day. It also provides information to broadcasters regarding the level of data already scheduled for a particular broadcast day. Additional information supplied by the embodiment includes production information for data. For example, an ad may have been scheduled but no supplemental digital data has been produced for it yet. Such data can be prevented from being broadcast until it has all of the information required to properly include the required data and the broadcaster signifies as such.

Data Aggregation

The invention embodies a methodology and a system for aggregating content from a multitude of sources and inserting them in the data repository for use in a data-cast. An illustration of this is given in FIG. 5. The embodiment defines a standard architecture for data aggregators, referred to as "agents," designed to perform the function of collaborating with third party content vendors to collect content, format it, and store it in the data repository. The embodiment defines a unique agent for each content supplier that follows the standard architecture of the agent definition. Additionally, the embodiment provides a way to classify and identify the data. This gives broadcasters the ability to associate data with schedule information. For example, supplemental digital data can be classified as traffic data and be identified as a particular provider of traffic data for a particular geographical region and can thus be associated with data schedules for all broadcast facilities broadcasting that traffic data for that region. In another example, data can be classified as an ad and allow broadcasters to associate it with an ad placement schedule.

Data Transfer

Certain embodiments of the invention provide a methodology and a system for moving data throughout the network. The embodiment defines and implements a transaction framework for all communication within the network that is capable of conducting multiple transactions over a single request via a wide area network. An illustration of this is given in FIG. 6. Typically the communication is between devices that control the data-cast from inside a broadcast facility and the data repository. The embodiment is used to move all of the appropriate data for a particular broadcast facility from the repository to the facility on a continual basis as it is needed for broadcast, while ensuring its proper delivery and recovery from error.

Data-Casting

The invention embodies a methodology and a system as well as a configuration for a multipurpose device (e.g. a blackbox) that interfaces with the broadcast systems within a broadcast facility to perform data-casting functions. An illustration of this is given in FIG. 7. Activities of this device include performing algorithms to calculate commercial availabilities and non-commercial availabilities for the packaging and insertion of data and audio for the data-cast. Opportunistic commercial or non-commercial availabilities ("avails") occur when it is determined, through monitoring the activity of broadcast facility's audio broadcast, that an opportunity to insert supplemental digital data along with the audio occurs. The device that houses the embodiment is able to communicate with systems inside a broadcast facility, including IBOC transmission devices and broadcast automation or live assist systems, as well as have access to the data repository. Accordingly, the blackbox may include a permanent storage device, a central processing unit (CPU), one or more of a communication port and an Internet connection, and a display that indicates the status of the device.

Certain aspects of the embodiments monitor activity regarding the available bandwidth for data within the IBOC system. This information is used to make determinations such as the quantity of data that can be added to the audio in order to achieve an acceptable level of service. For example, the data may consist of images and text; however, the current bandwidth available for sending data would only allow text to be transmitted to the receiver in time for display. The system could choose to send only the text and omit the image rather than have no data transmitted.

Data Creation

Another embodiment of the invention provides a method and a system for creating supplemental digital data. It provides a way to create the data that is to be transmitted in concert with the analog audio, whether it is dependent or independent. Data creation requires collecting objects such as images, text, audio, and other media and organizing them in terms of order, positioning, and timing. It also deals with the assignment of formatting parameters such as colors and size. Furthermore, it can correlate an object's behavior with the behavior of the audio.

Strategic Ad Placement

Certain embodiments of the invention provide a methodology and a system for defining and matching audience criteria of broadcast facilities in the network against desired audience criteria of an advertiser. This matching process can produce a suggestive list as to the broadcast facilities that are optimal for broadcasting the data. The system can use this information to automate the scheduling process. For example, a national advertiser may want to reach all males between the ages of 25-34 with a household income of $35,000 or more. The embodiment can indicate the broadcast facilities within the network whose audience has the greatest population or concentration of the desired target by using available demographic information.

Radio Commerce ("rCommerce")

The invention embodies a method and a system that facilitates the receipt of transaction data via a Wide Area Network, such as the Internet or a wireless network, in order to perform an action (or transaction) desired by a listener. This transaction data transmission could also be provided by devices such as a WAP device or a personal computer (PC).

The embodiment defines the required data for the transaction. This can include information that identifies the listener, information that identifies the broadcaster, information about the data that was being rendered that led to the action, information regarding the action that the listener desired to be performed, as well as network routing information. The listener may be identified based on an identifier associated with the listener's digital data receiver.

rCommerce Gateway

Certain embodiments of the invention provide a methodology for receiving data that was originated from a broadcast in order to conduct a transaction. The embodiment performs such functions as listening for transaction requests from digital data receive devices or devices communicating with such IBOC-enabled devices, performing validation on the data received, performing or initiating the action indicated by the data, and responding to the device sending the request.

As illustrated in the FIGS. 1-7, the key components of the system thus include: Central Servers, Datacast Applications, Content Management Applications, Sales/Order Entry Applications, Traffic/Approval Applications, Content Creation, Data Aggregation, Data Transfer, and the multipurpose Internet appliance or "black box" device. Software for implementing the methods of the present invention may take any form available to the programmer having ordinary skill in the art. The methods having been described herein may be implemented via any number of software solutions.

Central Servers

The Central Servers act as the back end of the sales order entry, traffic, and content aggregation systems. The Central Servers are able to perform content aggregation from multiple broadcasters, which can be customized for individual radio stations for purposes of a datacast. Additionally, they provide the communication architecture for the nationwide network of black boxes housed, for example, in radio stations while supplying the storage facility (herein referenced as "the data repository") for all digital data and datacast elements.

Content Management Applications

Central to the technology's Datacast Applications is the Content Management system, which is web-based software that allows a user to select from customizable content packages stored in the data repository. The software functionality allows the provider to control timing, flow and occurrence of supplemental digital data elements such as weather reports, news headlines, traffic alerts, etc. For example, a Program Director could schedule constantly updated traffic reports to visually appear every 15 minutes during morning and evening drive time. Via the application a provider defines the datacast element and stores scheduling parameters for it on the system of the present invention's Central Servers. These parameters include but are not limited to the following:

(1) the time at which the datacast element will be broadcast (datacast);

(2) the length of time it will be broadcast (datacast);

(3) the frequency with which it will be broadcast (datacast);

(4) whether or not it will be broadcast (datacast) in conjunction with a specific audio component of the analog broadcast;

(5) the position or location on an IBOC signal receiving device where the datacast element is to be placed;

(6) the specific station(s) from which it will be broadcast (datacast); and (7) the starting and ending dates for the above parameters (if applicable)

Sales Order Applications

Another Datacast Application component is the Sales Order Entry System (herein referenced as the "Datacast SOES"). It allows a user to enter and manage detailed orders for the sale of advertising space during the datacast using an intuitive web based interface. By entering an order in the system, a user defines specific parameters on the system of the present invention's Central Servers pertaining to how the order will "fit" into the datacast. These parameters include but are not limited to the following:

(1) The starting and ending dates for the advertisement to be datacast;

(2) The frequency with which the advertisement will be datacast;

(3) The time(s) at which the advertisement will be datacast;

(4) Whether or not the advertisement will occur during the datacast in conjunction with a specific audio cut of the analog broadcast;

(5) The unit price or otherwise defined cost for advertisement;

(6) The stations from which the advertisement will be datacast;

(7) The length of time for which the advertisement will be datacast; and (8) The location or position of the advertisement in an IBOC signal receiving device.

Data Creation Applications

A step towards the procurement of advertising revenue from advertisements inserted in the datacast is the creation of those advertisements. To that end, the present invention provides software for the creation of datacast advertisements—regardless of whether the advertisement is delivered via adjunct digital audio or through visual components that are meant to be either related to or independent of the audio component of the analog broadcast. The Data Creation Application works in concert with other applications, specifically the Datacast SOES where procedures exist for salespeople to enter instructions in the sales order for the procurement or production of the datacast advertisements used in that order. These instructions (part of the entire sales order) are stored in the data repository on the system of the present invention's Central Servers. The Data Creation Application enables a user, typically an advertising professional or one skilled in the development of advertising media, to log into the Central Servers and:

(1) View the datacast advertisement instructions mentioned above (saved via the sales order application.), which may include one or more of the following guidelines:

a. Size of the datacast advertisement b. Length of the datacast advertisement c. Position and Location in an IBOC signal receiving device intended for the datacast advertisement d. Location or description of acceptable images for the conveyance of the proper message e. Location or description of acceptable copy for the conveyance of the proper message f. Location of audio clip for which this datacast advertisement is meant to accompany, if applicable g. Due date for the datacast advertisement h. Uploading instructions (2) Create the datacast advertisement in compliance with digital data IBOC broadcast standards, including the following tools:

a. Text editor, for the purposes of creating new text elements or editing existing ones b. Image editor, for the purposes of creating new image elements or editing existing ones c. Audio editor and renderer, for the purposes of synchronizing visual components to an audio clip, creating new digital audio elements, or editing existing ones d. Library of Formatting Instructions for text, images and digital audio elements e. Library of Formatting Instructions for layout and presentation of the datacast advertisement (3) Upload the completed datacast advertisement to the data repository so that the sales order can be completed and the datacast advertisement is sent to the appropriate black boxes for datacast.

Traffic Management Application

The coordination of datacast advertisements with other datacast advertisements, audio advertisements and programming on the analog broadcast, and the entire datacast itself (which is often coordinated with the entire analog broadcast) demands an enormous amount of information management. Thus the present invention provides a Traffic Management Application (herein referenced as the "Datacast TMA") for this purpose. This application allows users to track datacast advertisement sales orders saved on the central servers, track datacast advertisement production progress, utilize permissions-based editing of the aforementioned sales order parameters and approve sales orders for datacast.

Data Aggregation

Providing content, aggregated from third party sources, to broadcasters for the purpose of developing a datacast is an element of the invention. Therefore, the invention produced standard architecture for data aggregation "agents," or software applications designed to perform the grunt work of collaborating with third party content vendors to collect their content and store it in the data repository of the invention's Central Servers. There are unique agents for each content type and vendor, though all agents follow the standard architecture.

Data Transfer

The system of the present invention's technology also provides standardized architecture for digital data packaging. Additionally it provides a transaction framework for all Black Box communication with the invention's Central Servers, using HTTP/secure socket layer (SSL) communication, that is capable of conducting multiple transactions for a single request.

Multipurpose Internet Appliance (or "Black Box" Device)

The system of the present invention further comprises a multipurpose Internet appliance (or "black box" as shown in the Figures), which resides within each individual radio station to perform a multitude of actions necessary for a successful datacast. The primary function of the black box is to prepare datacast elements in a manner that constitutes a datacast and then interface with an IBOC encoding device to dispense that datacast. Specifically the black box performs the following tasks:

(1) Communicates with central servers to request datacast elements necessary to build the datacast;

(2) Performs algorithms on an analog audio broadcast, when applicable, to calculate commercial availabilities and non-commercial availabilities for the insertion of datacast elements into the datacast;

(3) Packages appropriate datacast element for inclusion in the datacast based on parameters saved on central servers and passed along to the black box;

(4) Interfaces with and delivers datacast to an IBOC transmission device.

Supplemental Digital Data

The primary aspect of the invention is to enable radio broadcasters to transmit supplemental digital data, be they visual, audial, or audio-visual, that can be both related to the current analog broadcast or independent of the analog broadcast. The concepts of related and independent do not signify a physical relationship between the analog audio broadcast and the datacast element, but rather, they describe the nature of the content of the datacast element in relation to the analog audio broadcast. Related portions of the datacast element generally contain content that further describes or enhances the analog audio, although they need not. Related datacast elements are triggered, and thus datacast, with the identification of the analog audio "cut". In this case, a cut refers to a single element from a radio station library such as a song, commercial, weather report, and the like.

Independent datacast elements provide a complete set of information in and of themselves and do not have to be directly associated to a cut. The association of independent data can be much broader and may be based upon any current radio programming parameter such as time, day part, program, cut, competitive content spacing, etc. These associations are defined by users of the Datacast SOES and Datacast TMA when they enter the sales order for the datacast element, but are also defined by specific information being culled by the black box from the analog audio broadcast such as the length of the current cut, the time of day, and other such broadcast information.

Some datacast elements may be rendered visually, in concert with the analog audio broadcast ("visual datacast elements"). Other datacast elements are rendered audibly and are available to be played by the user on the IBOC signal receiving device for a period of time or at certain intervals as defined by the rules of the Datacast SOES and Datacast TMA on request ("audio datacast elements"). These datacast elements can be used, by themselves or in conjunction with each other, to create an entirely new radio experience for the consumer—one that can be complementary to the analog broadcast or completely independent to the analog broadcast—or in lieu of the analog broadcast altogether.

Thus, one embodiment of the current invention provides a "schema" for datacast elements. An exemplary rendition of such a schema is given in FIG. 3, as described previously. The schema organizes the datacast element to meet the varying needs of the system. The datacast element can be divided into what is termed "rendered data" and "meta-data". The rendered data are data that are either viewed or heard by the user. This would be the title of a song, the artist singing the song, an audio weather report, etc. The meta-data are considered to be "data about the data" and are used to indicate formatting and timing directives.

Formatting and timing directives are used by the IBOC encoding device and the IBOC signal receiver to render the data in a fashion that meets the goal of producing the desired datacast effect, enable user interaction and ultimately, commerce transactions. These directives include the length a portion of a datacast element should play for, separation of different datacast elements, order of appearance, color, layout, and other physical indications as well as codes to identify the datacast's consumer as well as the item described by the datacast element—pieces of data useful for conducting radio commerce transactions as outlined in the section entitled "Radio Commerce."

Sales Orders & Traffic Management

In a typical revenue-generating analog radio station, revenue is derived from the placement of advertisements in the audio broadcast or sponsorships of specific times or events during the broadcast.

For those advertisements to exist, radio stations employ the services of salespeople to proactively seek and sell new clients as well as handle the processing of sales orders from existing clients and other known entities that place advertising media (i.e., media buying services, ad agencies, etc.). Salespeople enter advertisements into the radio station's broadcast through a Sales Order Entry System ("SOES"), which often specifies the client, billing address, advertisement to be broadcast, as well as other necessary information for the fulfillment of the advertisement, where fulfillment is defined as the successful broadcast of the client's advertisement during the time the client requested. When the advertisement to be broadcast is not "in-hand" meaning that it either does not currently exist or is in another location, instructions are gathered for the procurement or production of the advertisement.

Accordingly, the people responsible for the running of that radio station (herein "station manager"), set parameters to effectively distribute all advertisements throughout the station's broadcast. A station's content is typically music that correlates to a specific format, but can also be talk radio shows (i.e., "MIKE AND THE MAD DOG"), syndicated programs (i.e., "THE HOWARD STERN SHOW," "DR. LAURA," etc.), or live entertainment (i.e., concerts, sporting events, etc.). These parameters are typically stored in software that is often referred to as a Traffic System (herein referenced as "TS")—Marketron and CBSI are recognized brands of this type of software. Parameters can and do include industry accepted factors such as competitive codes, rates, make-good instructions, production notes (if the advertisement is to be produced by "in-house" talent or production staff), and other known factors.

A Traffic Manager is the person at a station who is responsible for the management of these advertisement parameters, as well as the approval of sales orders entered into the system and the affidavits that advertisements were in fact broadcast at the appropriate times. The affidavits are used for accounting purposes so the station can charge for the "air time" (the specific avail when the advertisement was broadcast) during which the ad ran. In the event an advertisement was not broadcast when it was scheduled to, due to time constraints or other reasons, a make-good is performed. A make-good usually consists of the station deferring payment for the advertisement until that advertisement has run appropriately, or performing some other agreed upon act (like additional free advertisement placements, etc.) to make up for the missed advertisement.

Affidavits can only be created after the Traffic Manager has received a log of the most recent broadcast, commonly referred to as an As Played Log ("APL"). The APL details every piece of station content and advertisement actually broadcast over the air-waves. The APL is then compared to the schedule of what was supposed to play, thereby identifying which advertisements and pieces of station content WERE NOT broadcast, initiating a possible make-good situation.

Advertisements are produced in a variety of manners, but all have an audio component that is supposed to relay some message to the intended consumer. Typically, these advertisements incorporate jingles or music to add as a background supplement to the actor's voice. Other times, sound effects are added to emphasize the action in the advertisement or the message that is trying to be conveyed. The advertisements are typically produced by professionals at an Advertising Agency or by production teams at a radio station. These advertisements are then delivered to the radio station by means of audio tapes, carts, or digital transmission over satellite. Once received by the radio station, the advertisements are stored for broadcast at a later time—and they can be stored on a data storage device, such as a hard drive, or left on the medium in which they arrived.

Transmission Manager

The automation process of the blackbox selects data for broadcast and the digital copy set defines the relationship between the multimedia objects that comprise the "digital data" and the audio. Prior technologies provide a way to encode audio and data and transmit audio and data on an AM/FM signal. However, they provide no mechanism that allows for the delivery of digital data and audio so that they would appear synchronized to the listener of a radio broadcast. They do provide information that would allow someone to build a synchronization algorithm but they do nothing to aid in the actual synchronization, that is up to the application developer or the broadcaster.

The European Eureka 147 standard provides for data and audio synchronization because data and audio are sent in the same packets so that they are physically delivered together. Due to limitations in bandwidth, prior technologies do not pack data and audio together for transmission. Data is transmitted on a separate stream using a separate protocol. They provide two possible opportunities for synchronization but do not enable this synchronization with their technology.

Method #1—The first method is based upon the assumption that the difference in the time it takes for data and audio to travel from their point of origin in a radio station to the device in a receiver that renders the data and audio can be determined. Their system provides a formula for calculating this at any given moment. Suppose you had a 2 k file that intended to be displayed when a particular audio cut started playing. If you know that the cut will start being broadcast from its point of origin at time t, and the transmission system determines that it will take the 2 k file s milliseconds less time to reach the receiver and be rendered, then the 2 k file should be broadcast at t+s.

Method #2—This method expands on method 1 by allowing the audio and data to be stamped with the same id and the receiver could use this id to synchronize the audio with the data. In this way data could be sent ahead of time and cached on the receiver until the audio is received.

The transmission manager focuses upon making use of Method #1 to synchronize a broadcast. The blackbox builds an audio space consisting of one or more digital copy sets. A digital copy set is essentially a collection of multimedia objects that have a display order and display times associated with them. The information in a digital copy set does not take into account the time it takes various multimedia objects to be transmitted. It assumes perfect and simultaneous delivery of all objects. The role of the transmission manager would be to take the audio space, analyze its objects, load them, determine their size and insert the objects into the broadcast stream at various times, so that they were delivered to the receiver in time to be displayed as they were intended to be in the digital copy set. It would also repeat this process for the length of the cut associated with the broadcast so that people tuning into the station in the middle of a cut would get the data as if they had been listening from the beginning.

There are several ways to implement this:
1. The transmission manager interprets the digital copy set
2. The receiver interprets the digital copy set The first implementation method assumes all the receiver knows how to do is render a multimedia object as soon as it gets it. This multimedia object may be wrapped in a markup language that is provided by the receiver manufacturer. The markup language could carry header information about the multimedia object such as screen position or other display characteristics such as "on-demand," where supplemental digital data is stored by a receiver and is able to be recalled as desired by a listener. In a digital copy set, multimedia objects are stored in the display nodes. Suppose the transmission manager gets a digital copy set that consists of three digital copy elements: An image that appears at time 0 of the audio cut, an image that appears 15 seconds into the audio cut, and an image that appears at time 30 of the audio cut. The transmission manager would load the images from each display node, determine their size, and ask the transmission system for the difference in transmission time between each object and the audio. Call the time differentials for each object $t.sub.1$, $t.sub.2$, and $t.sub.3$, respectively. If the audio cut starts at time T, then the transmission manager will send each object to the transmission system at times $T+t.sub.1$, $T+15+t.sub.2$, and $T+30+t.sub.3$ respectively. Furthermore, if the length of the audio cut is greater than the digital copy set, then the transmission manager will repeat the transmission of the objects. The transmission manager will do this for all digital copy sets in an audio space.

The second implementation assumes the receiver can interpret the ordering and timing information in the digital copy set. In this method the transmission manager would calculate a time differential for the entire digital copy set. Call this time differential $t_0$. Then the transmission manager would send all of the data to the transmission system at time $T+t_0$. The receiver would wait for the whole file to be received before rendering.

Frame Definition

Currently in the system a provider or broadcasters can schedule ads to run based upon an audio cut, a data cut, a specific time range, a day part—which equates to a predefined time range, or a program, which equates to either an audio cut, data cut, or specific time range. The former two programs are considered sponsorship buys and the later is a regular program buy.

When the black box picks ads and content to run in the broadcast it organizes the data into what are called frames. Frames are groupings of ads or content based upon the characteristics of their schedule, and may be selected as follows:

Frame 1 has related advertisement content that is to be played in conjunction with a specific cut.

Frame 2 has content other than advertisements that must be run at a given time or along with a given cut.

Frame 3 has advertising content that must be played at a specific time.

Frame 4 has advertising content that must be played for a specific program.

Frame 5 has advertising content that must be played for a specific day part.

There may be a second group of frames for ads that play with content. Currently there is only one such frame contemplated:

Frame 1 has ads that are played when specific content is played. The frames are searched in order when the automation system makes its selections (first it looks in frame 1, then frame 2, etc). When it chooses an item from frame 2 of the first group, it looks in frame 1 of the second group for ads to play with the content.

The content may further be assigned a weight value within each frame. The weight value may be assigned in any desired manner and may include a hierarchy of numerical values. For example, a broadcaster may assign a particular weight value to a particular piece of content based on any criteria, such as the value of the advertiser related to the content, the price paid for the content, the number of plays that the content requires, etc. The weight may further be assigned based on the available bandwidth for transmitting content, the amount of digital data available for broadcast, and the like. The weight value assigned for advertisements sold by a broadcaster may be of a higher weight than for those sold by the supplemental digital data provider. Once assigned to a frame, the content may be selected based on the priority of the frame and then the weight value of the content within the frame.

In this manner, the assignment of frames and weight values is meant to ensure that supplemental digital data is selected and transmitted in an efficient manner. It is also meant to insure the maximiziation of the collection of advertising revenues by allowing important content to be transmitted over less important content at any particular time in the broadcaster's schedule.

Station Content

In an effort to entertain and inform their audience, as well as maximize the effectiveness of their clients' advertisements, a radio station provides programming content ("Station Content") for the station's listeners, which can range from regular traffic and weather updates to various news reports throughout the day. Stations typically pay third party providers (i.e., Shadow Traffic, AccuWeather, Associated Press, etc.) for this station content and must develop procedures for aggregating and managing it themselves. Besides providing informative or entertaining content, these station content snippets provide opportunities for the placement of advertisements immediately before or after (and sometimes during) they are broadcast. This is commonly referred to in the radio industry as "adjacencies." Advertisers are attracted to adjacency Avails because they are, by definition, next to the valuable content being broadcast.

Accordingly, some datacast elements, such as those packaged from aggregated third party content providers, will serve a similar role in the datacast as Station Content does in the analog audio broadcast. These datacast elements include weather data, traffic data, news data, sports data, etc. and are provided to the broadcaster by a supplemental digital data provider through the system of the invention. Other examples include datacast elements that visually represent artist information, album cover pictures pictures of station personalities, address information, and other informative or entertaining content. And like their analog broadcast counterparts, these informative or entertaining datacast elements also produce avails to deliver advertising immediately before, after and in some cases during the datacast element. The Datacast SOES and Datacast TMA are cognizant of these avails and a broadcaster or provider can create sales orders for a client that attempt to take advantage of them.

In addition to these datacast elements, the invention also provides a Data Creation Application for the development of datacast elements that serve as advertisements in the datacast (in this specific instance of a datacast element as an advertisement, it is referred to as a "datacast advertisement"). Datacast advertisements can be visual—as simple as a line of text displaying a company's tagline or as complex as an animated video clip, much like a commercial one might see on television. As explained earlier, these new visual datacast advertisements must have the capability to relate to the audio that is being broadcast ("Related Datacast Advertisement" or "RDAs"), thereby enhancing the analog audio broadcast with a visual component, or be independent of the audio that is being broadcast ("Independent Datacast Advertisements" or "IDAs"), thus delivering an entirely new and different message from the one being broadcast.

In the traditional broadcast environment, a radio station might wish to make money from the broadcast a mattress company's advertisement. The sales order calls for a 30 second advertisement that incorporates background music and a professional actor's voice to deliver the message of their high quality, low-cost beds. That advertisement can only be broadcast when the Traffic Manager uses Trafficking Software to schedule it in an Avail in the programming schedule. The Trafficking Software makes the decision as to where to place the ad based on analysis of competitive codes and other parameters—the Traffic Manager tacitly or explicitly approves this decision. The radio station only makes money when this advertisement is played. By the linear nature of analog audio broadcasts and the rules that regulate programming content, stations obviously cannot generate revenue when advertisements are not playing.

However, the ability to transmit digital data alongside the analog audio broadcast and the system of the present invention's system changes that limitation. Through the use of the present invention's system, a broadcaster could schedule advertising for each minute of every broadcast hour by creating datacast advertisements (audio or visual) to be datacast throughout the entire analog audio broadcast. Whether the broadcaster does in fact fill every minute of every broadcast hour with advertising is determined by the limits of the procedures and decisions that govern their business.

Going back to our example, a broadcaster might allow a client, such as a mattress company, to sponsor a related or independent supplemental digital data for datacast. In fact, a single datacast advertisement can serve both roles (as an IDA or RDA) depending on when the datacast advertisement is scheduled to play. For example, a datacast advertisement is created for the mattress company that is 30 seconds in length. It incorporates many of the same messages heard in an analog audio ad, but now the copy spoken by the professional actor is in the form of text, formatted by font or color for better brand association. The datacast advertisement also has a picture of the mattress company's top three selling mattresses, as well as a picture of the company's President. Finally, the phone number and address may be presented near the end of the 30-second datacast advertisement. For a variety of reasons, the mattress company wants to display this datacast advertisement whenever their analog audio advertisement is NOT playing over the airwaves.

In this scenario, the datacast advertisement is an Independent Datacast Advertisement (IDA), since theoretically the disc jockey (DJ) could be announcing the latest weather report while the mattress company's datacast advertisement is being displayed. However, the mattress company may have designed this datacast advertisement specifically for the purpose of enhancing the analog audio ad mentioned above and wants it to play ONLY when that audio advertisement IS broadcast, thus making that same datacast advertisement a Related Datacast Advertisement (RDA). Of course, the mattress company may develop separate and multiple datacast advertisements for each purpose. The key for the IBOC broadcaster is that, with datacast advertisements, he is able to generate revenue even while non-commercial programming is being played on the analog broadcast.

Opportunistic Commercial and Non-Commercial Avails

Opportunistic Commercial Avails ("OCAs") occur when the black box has determined, through the constant monitoring of the station's analog audio broadcast, there is an opportunity to insert specific datacast elements into the datacast. There is a visual component to the radio broadcast brought about from the data that is transmitted over IBOC technology.

Datacast Advertisement Strategic Placement Application

Advantageously, the system of the invention also allows national advertisers to target specific demographic audiences throughout the integrated network of IBOC broadcasters for the efficient and intelligent placement of their datacast advertisements. For example, a national advertiser may want to reach all males between the ages of 25-34 with a household income of more than $75,000. Using our Strategic Placement Application, the advertiser can target those stations within our network that deliver that demographic audience and place their datacast advertisements ONLY in those stations.

Data Creation Application

The invention embodies a Data Creation Application ("DCA"). This tool helps an advertising professional ("AP"), or other person skilled in the practice of developing advertising media, develop engaging datacast advertisements in accordance with the most popular concepts for advertising creation tools already in practice. These concepts include the use of images for backgrounds and key visuals, text which can be formatted appropriately for proper brand identification according to font size, style and color, as well as various visual effects such as animation, wipes, fades, etc., as are known in the broadcasting arts. The DCA also contains an audio editing mechanism that enables the AP to load audio clips into the creation software and then playback that audio when necessary. It also enables the AP to create datacast advertisements that are entirely auditory in nature. The DCA allows the AP to create images with the software or import pre-existing images or images made with other imaging software products. The DCA was designed with the intention to allow users to create Related Datacast Advertisements as well as Independent Datacast Advertisements.

With IDAs, the AP decides (within a pre-defined set of allowable lengths) the length that the new datacast advertisement is supposed to be. The DCA then creates a "timeline" where 0 is the starting point and the end unit of the specified length is the ending point. If the datacast advertisement is visual in nature, all the visual components (that are meant to be viewed) must take place between these two points. Using the DCA, the AP is then able to insert whatever text, image, or combinations thereof are to be displayed for that particular datacast advertisement inside the timeline. When the AP has reached a stopping point, the datacast advertisement can be saved and stored for later editing. If the AP achieves the desired effect, the datacast advertisement is finalized.

With RDAs, the datacast advertisement is designed to coincide or enhance the audio that is simultaneously being broadcast on the analog side. Accordingly, the AP is able to load the particular analog audio clip meant for this datacast advertisement into the DCA using the audio editor. Once loaded, the DCA calculates the ending point of the datacast advertisement based on the length of the audio clip. Then, as with IDAs, the AP is able to create a series of text, images, adjunct digital audio and/or combinations in an attempt to deliver a compelling enhancement to the audio clip that will be broadcast. These datacast advertisements can also be saved and stored for additional editing at a later time or finalized.

Once finalized, the DCA converts the datacast advertisement into a format that is understood by the system of the present invention. When appropriate, the AP can upload datacast advertisements to the present invention's data repository so that they can be associated with waiting sales orders or placed in a separate staging area where they can wait until selected by a Sales Rep or Traffic Manager when placing a Sales Order.

In order for any of these datacast advertisements to be displayed on IBOC receivers, sales orders must be entered into the system of the present invention system using the Datacast SOES. This follows the same model as found with audio advertisements in a traditional radio station.

Each station's sales force is not responsible for the full inventory of their station's datacast Avails. Per its agreement with the an outside agency (e.g., Impulse Radio or another supplemental digital data provider) using the system of the present invention, each radio station may barter a percentage of that inventory in exchange for the full suite of the system of the present invention's services, including the Datacast SOES, the Datacast TS, the DCA, and all datacast content packages. Bartering may involve the provision of bandwidth, content or audio airtime in exchange for such hardware and software. That inventory bartered to Impulse Radio thus becomes part of the network of radio stations throughout the country where it is able to insert datacast advertisements for its client base of national advertisers. The network has been designed to offer the system of the present invention and its advertising clients maximize flexibility and reach, while eliminating unnecessary competition with member radio stations and their sales efforts. The radio station focuses on its existing local client base while the system of the present invention taps a heretofore unrealized national advertising base. The network and this process are described in greater detail in the section entitled "Datacast Advertisement Strategic Placement Application."

The Datacast SOES is designed to help each station's sales force identify their datacast avail inventory (after excluding the system of the present invention's percentage) and provide a seamless method to enter sales orders for those avails in an effort to maximize the sales process. The salesperson enters into a sales contract with a new or existing client and enters all appropriate information into the Datacast SOES, including the client's name and billing address, the specific product being promoted, the number of times the datacast advertisement is to be displayed, the point in the datacast when the datacast advertisement should be displayed, whether the datacast advertisement is Independent or Related to a new or existing analog audio advertisement, and where or how to locate the datacast advertisement for this order (or instructions to the AP on how to create the datacast advertisement if it does not yet exist).

The sales person will also negotiate a fee for the datacast advertisement and will enter the agreed upon rate into the Datacast SOES as well. Similar to sales systems for the analog audio side of the station's broadcast, the Datacast SOES enables the salesperson to save the order for later viewing or editing, as well as the ability to finalize the order and enter it into the system of the present invention system, where it will be processed accordingly.

Datacast Advertisement Placement

Datacast advertisement placement is an important concept to the system of the present invention as it is a remarkable innovation to the familiar concept of advertisement placement in traditional analog audio broadcasts. With DAB, more placement opportunities exist, including, but not limited to, the ability to display a visual or audio datacast advertisement during a song, which has never been possible over the same broadcast signal until now. Additionally, datacast advertisements could be displayed during audio advertisements— those of the datacast advertiser (as in the case of an RDA) or those of his competitor or those of a completely unrelated advertiser.

Datacast advertisements can also be displayed during the display of other datacast advertisements (particularly in receivers that support large viewing panels that can be divided into multiple viewing areas). And they can also be displayed by location on such receivers, defined by such parameters as the specific area and size of that area (thus constituting a location) as well as their length to display in that location, among others. Datacast Advertisements can also be displayed during station content, such as weather and traffic announcements, as well as during datacast content elements, which is the datacast equivalent of weather and traffic announcements and described in more detail in the section entitled "Datacast Content Elements".

Once the salesperson has finalized an order, it is sent the Datacast TS, where it is stored for review by the station's appointed Traffic Manager. The Traffic Manager is able to review the order in its entirety and check for any errors or omissions. The Traffic Manager checks a variety of things, including ensuring that the correct client is on the order, that the associated datacast advertisement exists and is present in the system, that the scheduling instructions for the datacast advertisement fit the parameters set forth by the station (in most cases these parameters are set by the Traffic Manager), etc. If a problem is discovered, the Traffic Manager is able to not approve the order and notify the salesperson that there is a problem that must be corrected. If a finalized order appears to be in perfect order, then the Traffic Manager approves the order and it is processed by the system of the present invention system and prepared for insertion into the station's datacast.

The Datacast TS has another very important feature, Data Scheduling. Data Scheduling allows a Traffic Manager to 1) subscribe to a Datacast Content Package 2) choose their preferred provider for that package and 3) schedule all datacast content throughout their datacast.

Datacast Content

Datacast Content is a generic term applied to a specific category of supplemental digital data elements that the system of the present invention provides its member network stations for use with their datacasts. There are specific categories of Datacast Content as well, including weather, traffic, and news. But Datacast Content can also refer to items such as Sports News, Stock Quotes, Business Headlines. and other categories of content that may be more suitable for specific station formats.

Much like station content (as described in the section entitled "Station Content"), Datacast Content is meant to inform the "viewing" audience as well as give "listeners" a compelling reason to occasionally "interact" with their IBOC receiver screens for the benefit of datacast advertisers. Additionally, Datacast Content can also be audio data that is requested by the user for purposes of listening to that specific piece of content at their discretion. Thus, each Datacast Content category has its own "package" from which a station can choose. Within each package, there might be (when the situation permits) multiple third party providers for that Datacast Content in an effort to offer the broadcaster a choice that is most suitable for his station format and audience.

Once the station has selected the Datacast Content package(s) that it deems necessary, the Traffic Manager, Station Manager, or like person, will have to schedule those Datacast Content packages into their data broadcast. Typically, this will consist of the Traffic Manager choosing the Datacast Content package, create a new schedule, give the new schedule a referring title, and choose the provider (when applicable) that they would like to use for this Datacast Content package's schedule. Then the Traffic Manager must select the date for which this Datacast Content schedule starts. Once the Datacast Content schedule contains these parameters, the Traffic Manager can say how many times he wants that particular Datacast Content to appear in the datacast for that particular schedule's dates, as well as the specific days of the week it should appear and the specific programming events that should trigger it to appear as well.

For example, a Traffic Manager wants to display Weather Datacast Content during the morning drive times of his station's datacast and subscribes to receive the Weather Datacast Content Package from the system of the present invention on a regular basis. In order to make the Weather Datacast Content begin to appear in the datacast, the Traffic Manager creates a new Weather Datacast Content schedule. He indicates that he wants "KSWeather" (a fictitious company for purposes of this example that has contracted with the system of the present invention to provide weather data for Weather Datacast Content Packages) to be the Weather Datacast Content provider since he runs a Kansas station and they have a good reputation for local Kansas weather information. He then indicates when he would like to start running this Weather Datacast Content by entering a start date. Once that information has been entered, he can set the number of times to display that Weather Datacast Content and have it only display on the weekdays (exclude Sat and Sun) and set it to display specifically during his Morning Drive daypart. The Traffic Manager can now see Weather Datacast Content on his datacast—only Monday through Friday, from 7:00 am to 10:00 am. Each Datacast Content must have its own schedule and activation protocols. Additionally, a Traffic Manager can create multiple schedules for each Datacast Content package. All the actual data delivered as part of the Datacast Content package is provided by third party providers for that specific type of Datacast Content and is aggregated and maintained by the system of the present invention according to the methods set forth in the section entitled "Datacast Content Aggregation."

A key aspect of Data Scheduling that should be noted is that the system of the present invention does not enable the Traffic Manager to specify exactly the number of times Datacast Content displays over a specific period. Datacast Content is not associated with a station cut number ("cut"), rather it is inserted when the black box has determined that there is an opportunity to do so, thus recognizing an OCA. This process is described in detail in the section entitled "Multipurpose Internet Device" above.

The system of the present invention has been designed to complement or augment the analog audio broadcast, thus requiring cues from the broadcast and delivering specific datacast elements to the datacast when appropriate. Therefore, the analog broadcast controls the "clock" and is the only part of the broadcast that will be regularly scheduled by the station. Much of what the system provides happens during OCAs, all other data is delivered when triggered by a SCN. The only way for a Traffic Manager to guarantee the delivery of a set number of Weather Datacast Content (in the example above) during the datacast would be for him to associate all Weather Datacast Content with the cut ID for weather announcements over the analog broadcast and base it on that number of weather announcements.

Finally, it is important to discuss another aspect of the Datacast TS, and that is its ability to analyze and store all the APL generated by the station's black box. Much like in the traditional broadcast environment, APLs are necessary to ensure that everything that was scheduled to play during the datacast was actually delivered to the IBOC transmission by the Internet appliance or "black box." In accordance with the invention, (and discussed in greater detail in the section entitled "Multipurpose Internet Device", the system of the present invention has devised a way to generate APLs for the datacast, which are then uploaded to the system of the present invention's data repository and stored. They are available to the Traffic Manager through the Datacast TMA, where the APLs can be retrieved from the data repository and analyzed. The Traffic Manager is then able to determine which pieces of Datacast Content and which Datacast Advertisements (in other words, all the datacast elements) were "bumped" from the datacast and then initiate make-good actions when appropriate. This is necessary for the proper billing and accounting of sales orders involving datacast advertisements.

The system of the present invention recognizes the fact that it is common in the industry for multiple stations to share one sales force. Additionally, multiple stations may also share other familiar station resources, such as Traffic Managers and Program Directors. The Datacast SOES and Datacast TMA were designed to allow for these common station dynamics and are therefore flexible enough for one salesperson to enter datacast advertisement orders for multiple stations, or have one Traffic Manager approve datacast advertisement orders for multiple stations. By example, the system of the present invention is an extended sales force for every station in its network.

Data Aggregation and Transformation

In general a radio station is not in the business of producing content. Where as they may produce some content, or provide content via a talk format, a majority of their current audio content such as news, weather, music, traffic reporting, ads, etc. is purchased, bartered for, or contracted to play by the radio station. Additionally, this content can be delivered to a radio station in a multitude of formats, from a variety of sources, on different schedules. Some of the content has a short life span such as news, weather, or traffic information, and must continually be produced. Other content is produced once and used over and over, such as music or a particular ad.

There are many ways in which the radio station receives this content. Music generally comes once by mail in the form of a compact disc, or may be delivered by a music company representative. The radio station uses equipment to transfer this content to its electronic music library. Ads may come digitally via satellite feed or a network such as the Internet, or delivered on a media, such as a tape, by mail. News reports can come in from a wire service such as AP or Reuters. Many radio stations produce weather segments by obtaining the weather from free services such as the national weather service, or from various Internet sources. Other programs such as syndicated shows or traffic reports are fed in from other broadcast facilities. The originating formats for all of this content can vary greatly and the radio station must maintain several different systems for transferring it to their on-air systems.

Consequently, the present invention provides a process for collecting datacast content from varying sources on a continual basis and preparing it for transmission with audio such that a receiver could render the data in a complimentary fashion. The system provides a single source and a central repository for all of the content used by radio stations for datacasts by performing the tasks of aggregating and formatting the data from various sources, as well as storing and securing it. This aggregation system provides transformation processes for all types of data as described above. This includes data that is continually refreshed, produced on a one time basis, fed in from a wire or Internet source, an advertising agency, etc. The repository also reduces the amount of total content required for all radio stations since much of the content that is used by radio stations is the same (e.g., music information, traffic reports in the same city, etc.) Furthermore, the invention makes wholesale improvements on the delivery of data as compared to the delivery of audio by providing a uniform schema for understanding the data, as described above in the section titled "data."

Additionally, radio stations and advertisers have systems and tools that allow for the production of audio content for broadcast. These may be used to create station promos, jingles, ads, programming content, etc. Thus, the invention provides tools that allow radio stations and advertisers to produce their own data content that is stored in the repository in the uniform schema that is provided by the present invention. A detailed description of these tools is given in Section DAPS. All this data may be placed in the data repository used in the present invention.

Finally, the data collected by the sales order entry and trafficking systems described in the section titled "Data Trafficking and Scheduling" must be package for distribution to the individual radio stations that are responsible for fulfilling the requests for orders and content. Consequently, the system provides a process for extrapolating this data and packaging it in an appropriate manner for each station as is needed by the device described in the section titled "Data Automation" on a regular and timely basis.

Data Communication Through the Network

An aspect in the streamlining of the data acquisition process of the system is the ability to have data seamlessly transferred to a radio station after it has been aggregated and placed in the repository in a timely manner on a continual basis.

In accordance with this, the present invention provides that bi-directional data transfers are required to occur between the repository and each individual radio station. A preferred method for conducting the communication is to have a device located at the radio station that initiates a data transmission request through any wide area network connection, whether this is the Internet, a point-to-point connection, etc. to the repository. For the purposes of this document communicating in this fashion will be termed communicating on or with "the network".

The device will initiate a data transmission with the network to receive or send data. For example, the repository contains information on orders for ads that have been placed through the SOES as described in the section titled "Data Trafficking and Scheduling". On a regular basis as it deems necessary, the device will ask the repository for these orders, and any content and other radio station specific data that it requires as defined in the section titled "Data Automation". In another case, the device will initiate a data transfer to send data to the network, such as the case where the device reports activity back to the server, so that the radio station personnel can verify order and content placement in the datacast.

The determination that data needs to be retrieved depends upon the nature of the data. Orders, for example, are most efficiently retrieved on a daily or bi-daily schedule as dictated by the activity of the radio station sales force and production staff. Music data, on the other hand, can be retrieved more infrequently as the composition of a station's audio library does not change as often. In the case of more ephemeral data, such as weather, news, and traffic, etc., such data will need timely and frequent updates, up to the minute in some cases.

Multiple types of data may be sent and/or received during a single transmission. For this purpose a request mechanism (for the device) and response mechanism (for the repository) exists for each type of data. A request mechanism will have the responsibility of identifying the type of data, recipient and method of transfer to the network. Likewise the response mechanism will have the responsibility of accepting a request and responding with the appropriate data. For example, there is a specific request mechanism presiding with the device and a response mechanism presiding with the repository for the transfer of order information as given in the example above, as well as a specific request mechanism presiding with the device and a response mechanism presiding with the repository for the activity log.

In order to maintain data integrity, all transmission for a specific data type will occur under a "transaction". In this case, a transaction is a complete system process affecting the state of the data and the system that either commits or rolls back. If a transaction commits, all of its effects remain and the state of the data and the system will permanently change. If it rolls back, then all of its effects are undone and the system is returned to its previous state. A transaction always leads to a correct transformation of system state.

The invention defines an optimal placement of the burden of creating and policing transactions upon the response mechanism. In this way, the response mechanism will start a new transaction, when necessary, for a particular request. The device will process the response and send an acknowledgment to the network that indicates whether the processing completely succeeded or experienced a failure during processing of the data transmission. Upon receipt of the acknowledgment the network will close the transaction or continue onto the next step of the transaction if multiple steps are required. The data state of failed transactions must be recoverable in all situations.

Multipurpose Internet Device

In order to create a datacast as is described for the invention, the data portion must be synchronized with the audio portion of the broadcast. Synchronization is used here to indicate that the elements of the data portion and the audio portion must be timed properly in order to coincide and provide a complimentary broadcast. The invention provides all of the appropriate information in a timely manner to any device responsible for such synchronization and broadcast.

Thus, the present invention provides for a mechanism that monitors the systems in a radio station responsible for the audio portion of the broadcast. The mechanism will have the responsibility of notifying a device that interacts with the data that has been transferred via the network and the stations digital transmission systems of the state of the audio broadcast. This includes the means to uniquely identify the currently playing audio as well as the upcoming audio selection. The monitoring mechanism will have the ability to provide the length of the audio selection or selections, the genre, and other attributes associated with audio selections as defined by the audio system. The monitoring mechanism will function as a proxy between the audio system and the device that fulfills opportunistic commercial avails (OCAs) and non-commercial avails ("ONCAs") as well as the SCNs defined in Section TAO.

An opportunistic avail, whether it is commercial, in other words an ad that was sold through the SOES, or non-commercial such as a data weather report that was scheduled in the trafficking system is an opportunity to place data in the broadcasts to coincide with the audio portion at a given moment. These "avails" can be determined based upon any of the criteria as set forth by the sales order entry and trafficking systems. They are also determined by the concept of related and independent as described in the sections above entitled "Supplemental Digital Data".

The device will dynamically build a set of avails and fill them with data based upon the criteria indicated in the previous paragraph as well as time the audio space is expected to air and the length of the audio selection.

Radio Commerce or "rCommerce"

The present invention provides a network that can move data from its source through a radio station, insert it into a broadcast, and deliver it to a user. The invention also provides a communication architecture for receiving information back from the user. This communication is dependent upon the communication capabilities of the receiver. Receivers that can communicate via the Internet or some other wide area network communication architecture can return data to a central point. This return data transmission, sometimes referred to as the "return path," could also be provided by devices not working in conjunction with the receiver, such as a WAP device or PC. The data returned provides information about the user, information about the data that was being rendered and information regarding the action that the user desired to be performed. These actions are predefined by the invention and are tied to the data in the broadcast. The definitions for these data elements are encapsulated in the uniform schema that is provided by the invention as detailed in Section titled DATA.

The data returned from the receiver is delivered to a gateway provided by the invention. The delivery address for the gateway is determined by information in the uniform data schema provided by the invention (see Section titled DATA). The roll of the gateway is to listen for requests from radio receivers, validate the data received, perform the action indicated in the data on behalf of the user and return information back to the user as to the status of the request.

The gateway listens on a publicly accessible network such as the Internet. This network must be reachable by the device sending the request. The invention provides that the gateway can listen on a multiple of protocols (HTTP, WAP, etc.) as determined by the capabilities of the device sending the request.

The gateway interacts with an order fulfillment device that takes the information in a data object and conducts a predefined transaction. The concept of order does not necessarily indicate a financial transaction, but can be any action that the invention defines. The result can be a purchase of an item, a request for more information via e-mail or mail, a response back to the radio station originating the broadcast, etc.

The information provided to the gateway and the order processor represents the minimum amount of information that the user needs to send to perform the action. The system provides all of the pertinent information. A portion of this data is supplied in the broadcast, and a portion of this is provided by the system itself. The data that is returned identifies the user via a code of some sort, the action command, and all or a portion of the content that was broadcast that relates to the request. All other information already resides in the system and is provided ahead of time or after the transmission of the request by the listener. For example, listeners may provide purchasing information (credit card information, delivery address, e-mail address, preferences, etc.) to the system prior to conducting transactions. Each transaction defines the information it needs from the users as well as the information the providers need to conduct the transaction and obtains this information from the user information based upon the identity of the user.

An illustration of this is the case when the user likes, and ostensibly wants to purchase, a particular song. By interacting with the radio in some fashion, such as by pressing a button, or verbally issuing a command to a voice response system in the radio, the user can initiate an action in the receiver (or some other device as explained above) that sends a signal back to the gateway. The information is received by the gateway, validated, and handed to the order processor. The order processor uses the command in the request information to trigger an action. In this example, the action may be to send a purchase request to a contracted vendor that sells compact discs (CDs) on behalf of the broadcaster. The listener will have already indicated the mode of delivery for the item and that information is retrieved by the system to complete the commercial transaction request.

In another example, the request may simply be to have an e-mail generated to the user requesting the phone number and more information regarding an ad they heard or viewed. In either case, the level of user interaction required at the time the data is viewed of displayed is exactly the same.

The operation of the present invention will now be more particularly described in conjunction with the following FIGS. 8-20.

Figure 8:
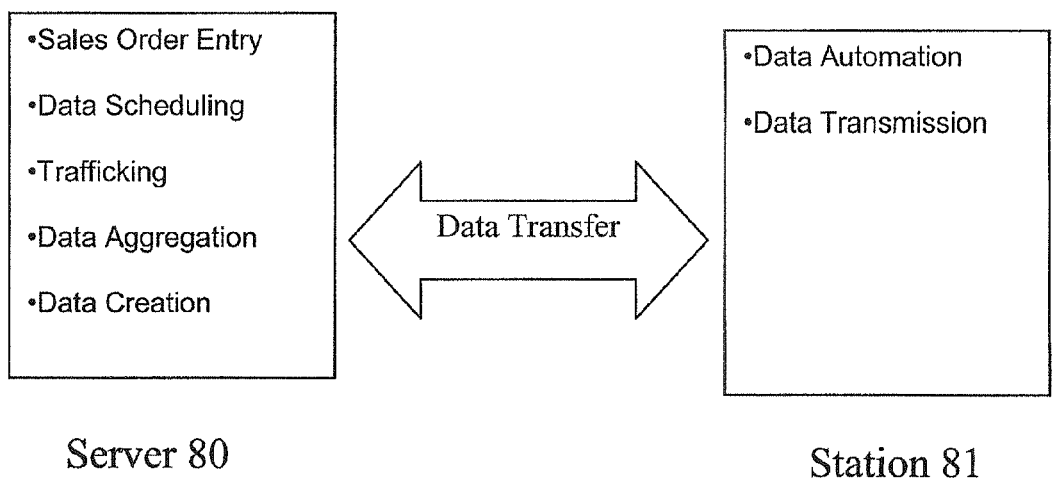
FIGS. 8 and 9 are exemplary block diagrams illustrating the hardware used in conjunction with the present invention.
Figure 9:
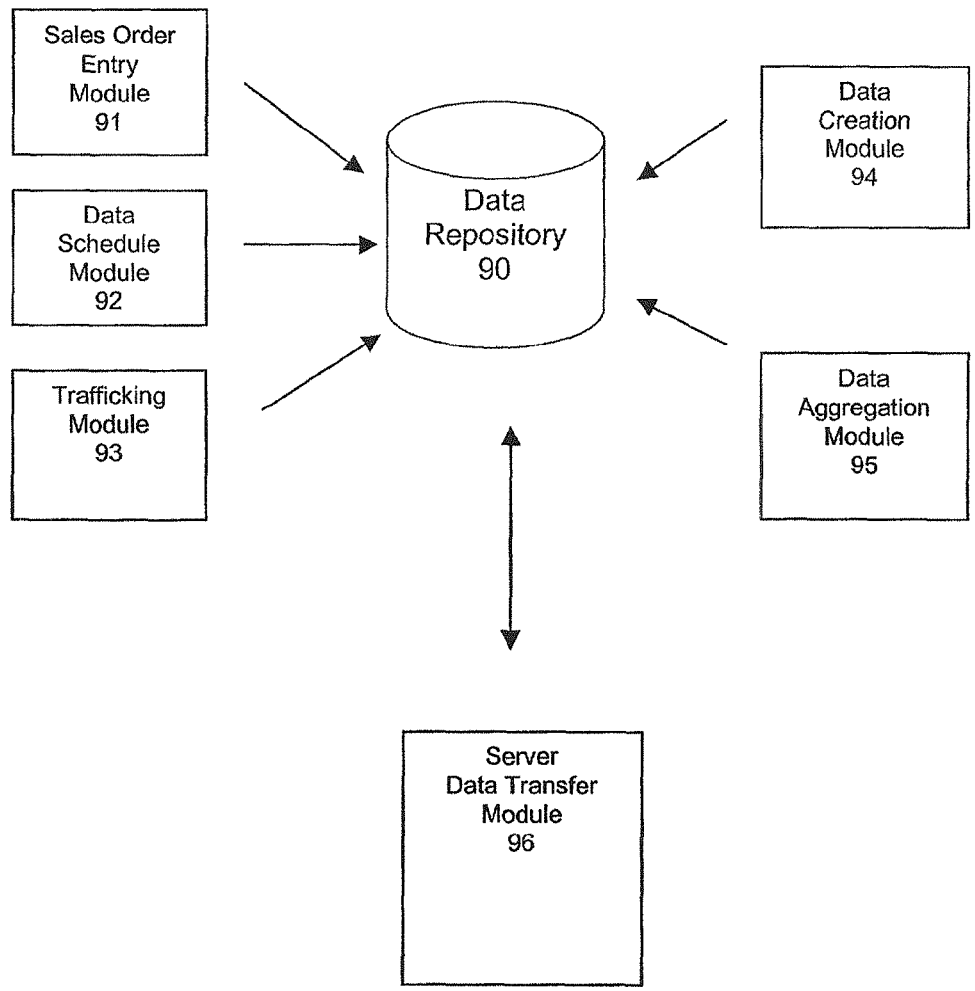

FIGS. 8 and 9 are exemplary block diagrams illustrating the hardware used in conjunction with the present invention. As shown in FIG. 8, a supplemental digital data provider may operate one or more servers 80. The servers 80 perform sales order entry, data scheduling, trafficking, data aggregation and data creation. The servers 80 may communicate with a plurality of station servers 81. The station servers 81 in turn perform data automation and data transmission as described further below.

As displayed in FIG. 9, the servers 80 may maintain a data repository 90. The data repository 90 may store a group software modules for accomplishing the present invention. The software modules include a sale order entry module 91, a data schedule module 92, a trafficking module 93, a data creation module 94, a data aggregation module 95 and a server data transfer module 96. The processes associated with each of these software modules are described below.

Figure 10A:
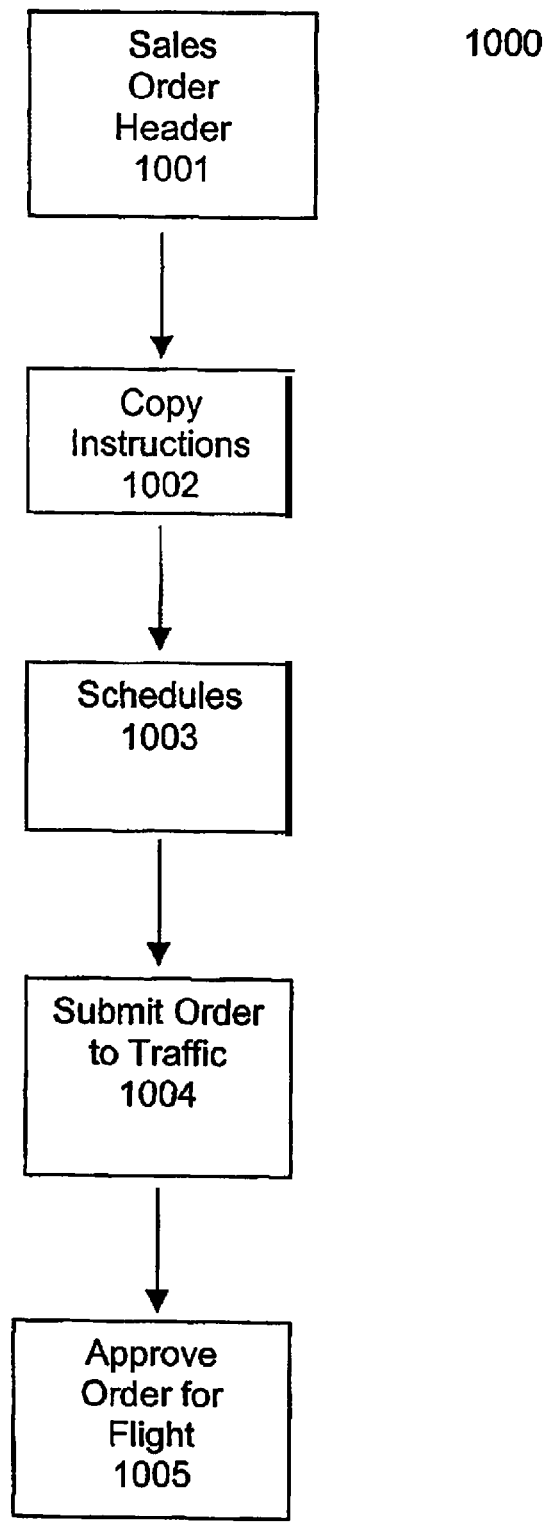
FIGS. 10A-10L illustrate the exemplary processes used for accomplishing sales order of supplemental digital data.

FIGS. 10A-10L illustrate the exemplary processes used for accomplishing sales order of supplemental digital data. Referring to FIG. 10A, there is depicted an exemplary sale order entry process 1000. The process 1000 may be performed by a broadcaster for ordering supplemental digital data. The broadcaster may assemble a sales order header (step 1001), copy instructions (step 1002) and schedules for broadcasting data (step 1003). The assembled data may than be submitted for approval (step 1004), after which the order is provided to supplemental digital data provider (step 1005).

Figure 10B:
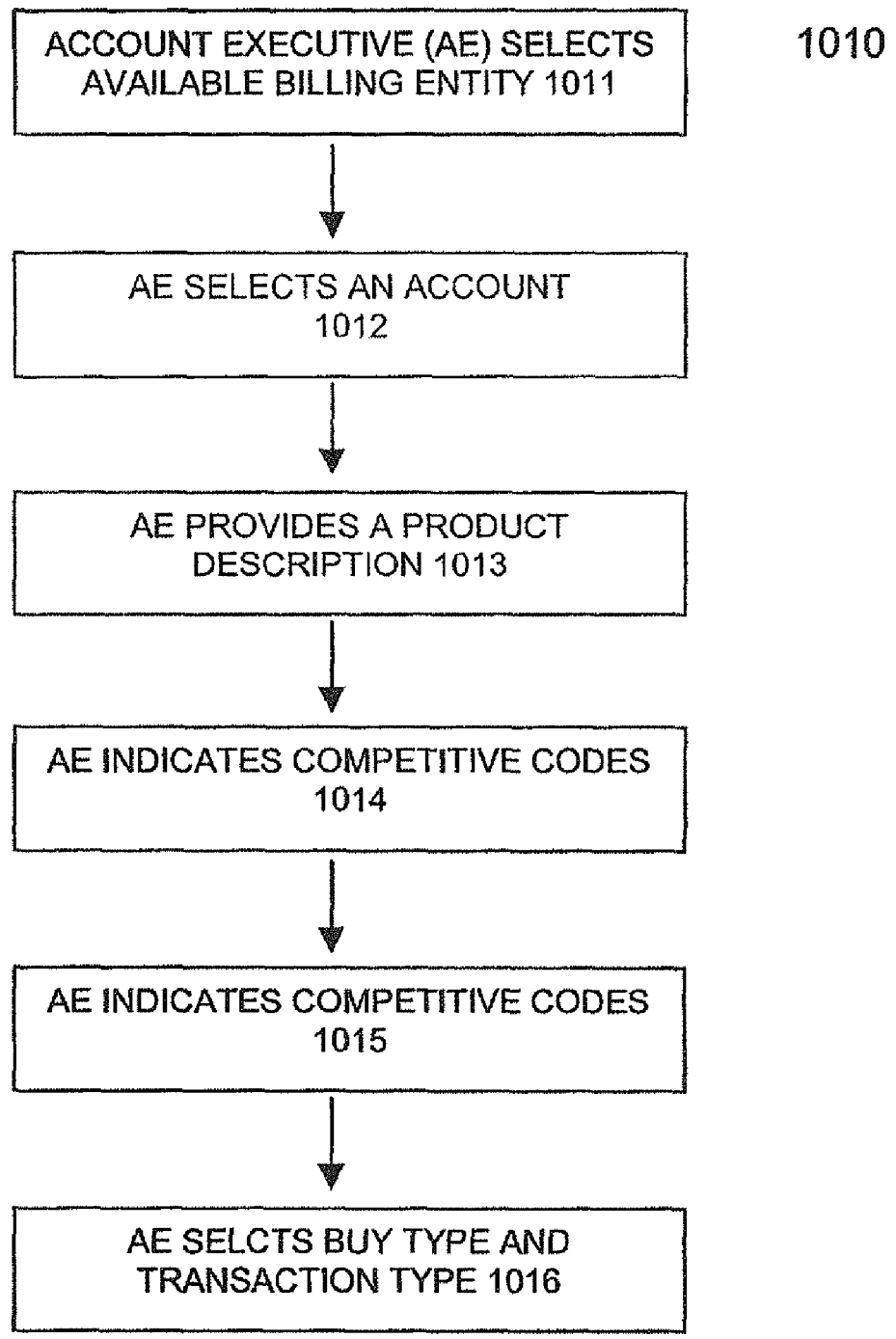

Referring now to FIG. 10B, a process 1010 is depicted for assembling a sales order header as described above with respect to step 1001. An account executive first selects an available billing entity, such as one or more radio stations or broadcasters (step 1011). The account executive than determines an account related to an advertiser (step 1012) and a product description of an item for sale by the advertiser (step 1013). Next, the account executive may assign a competitive code for the sale order header (steps 1014 and 1015). The competitive code is assigned based on the industry to which an advertiser belongs. The competitive codes are used by the broadcaster to appropriately space advertisements from competing advertisers. The account executive than selects a buy type and transaction type associated with the sales order header (step 1016), after which the process 1010 ends.

Figure 10C:
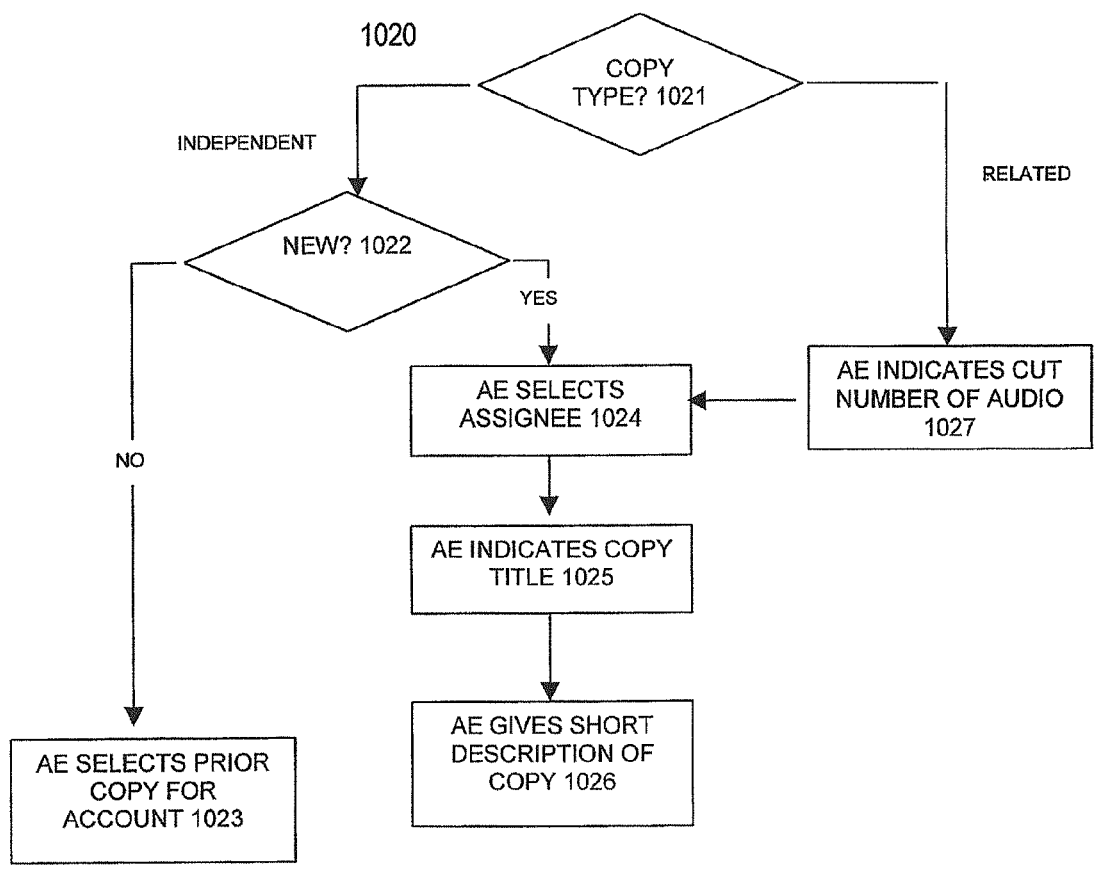

Next, in FIG. 10C, a process 1020 for creating copy instructions for sales order is shown. The process 1020 begins by selecting a copy type (step 1021) for the supplemental digital data. If the supplemental digital data to be generated is independent of broadcast data, the process 1020 continues to step 1022. If the supplemental digital data to be used in the sales order exist, the account executive may select a prior copy of the data for completing the sales order (step 1023). Otherwise, the process 1020 continues to step 1024 where the account executive selects a producer to generate a supplemental digital data. The account executive may indicate a copy title (step 1025) and may provide a short description of the copy generated (step 1026).

Returning to step 1021, if the copy type is related to broadcast content, the process 1020 continues instead to step 1027 where the account executive provides an identification of the audio track which the supplemental digital data will accompany. The process 1020 than continues to step 1024 as described above.

Figure 10D:
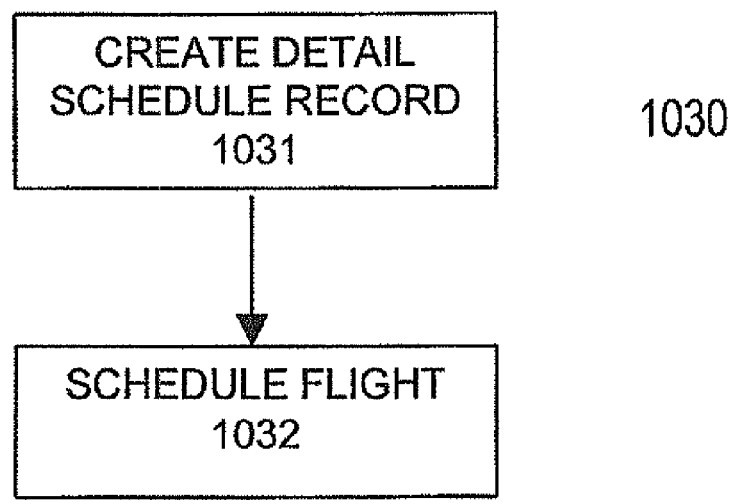

FIG. 10D depicts an exemplary process 1030 for assembling schedule information to be provided with a copy order. The process 1030 includes creating detail schedule information for the copy (step 1031) and submitting the schedule for approval (step 1032). The process 1030 then ends.

Figure 10E:
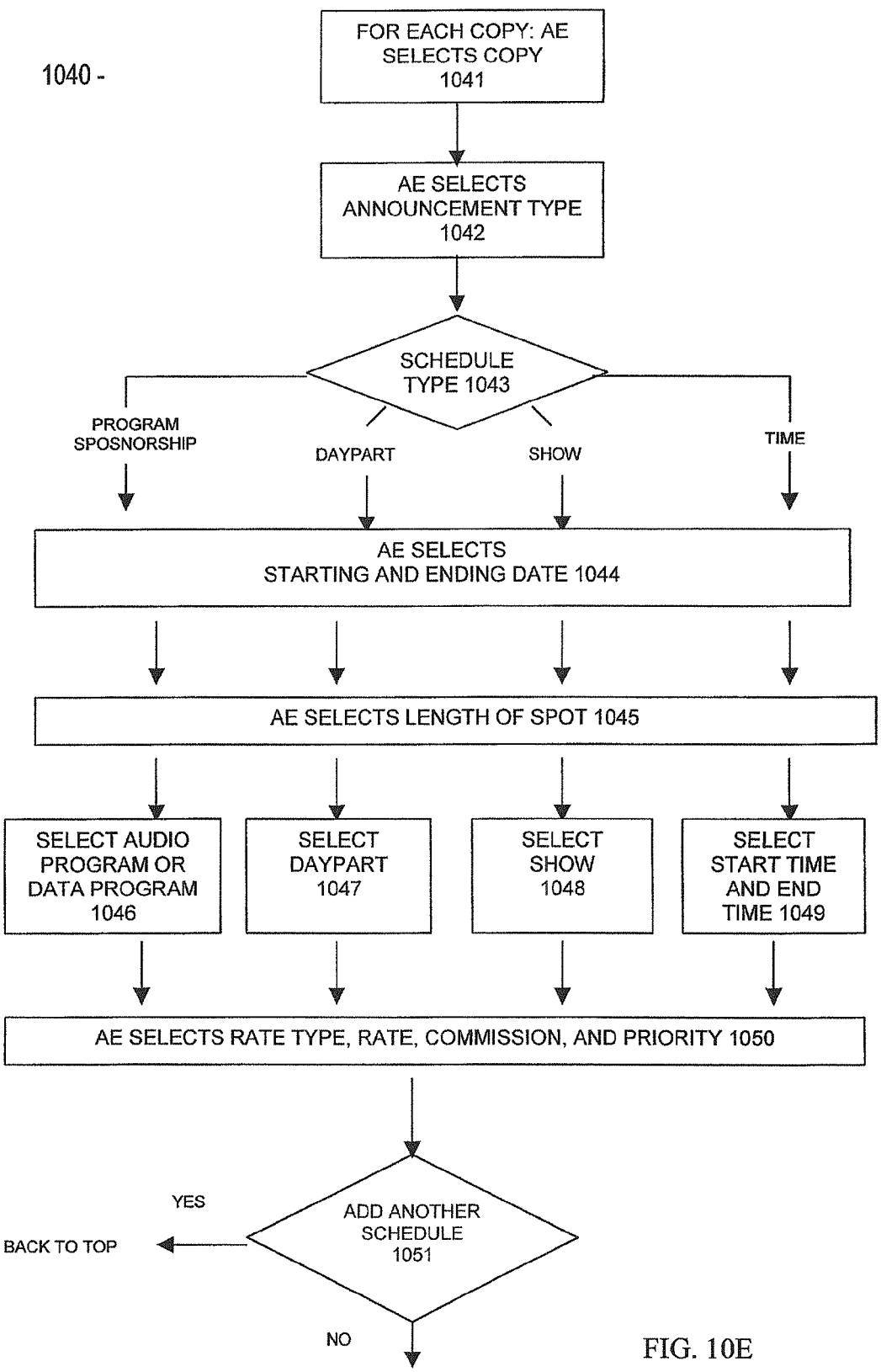
Figure 10F:
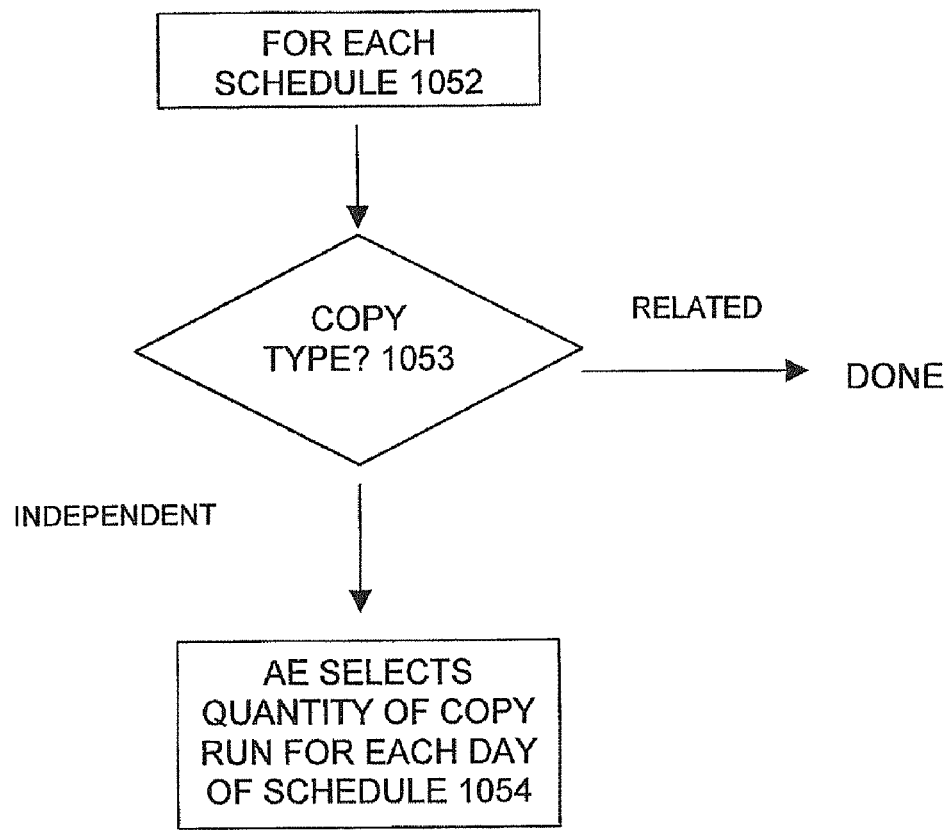

FIGS. 10E and 10F display an exemplary process 1040 for creating schedule for a copy sales order. The process 1040 begins with a selection of a copy to be produced (step 1041) and a designation of an announcement type (step 1042). The account executive next selects a schedule type (step 1043) which may include scheduling based on a broadcast program, a day part, a specific time, and specific audio track.

The account executive than specifics a starting date and ending date between which a copy will be transmitted (step 1044). The account executive may also select a length of time in which the supplemental digital data is to be displayed for a given cut (step 1045). The account executive may further select a rate type, a rate, a commission, and a priority associated with a copy sales order (step 1050).

Next, the account executive may determine whether another schedule is to be provided for the copy sales order (step 1051). If so, the process 1040 returns to step 1041 above. Otherwise, the process 1040 continues to step 1052. For each schedule created for the copy sales order, the account executive will determine the copy type is related or independent of the broadcast data (step 1053). If the copy type is independent, the process 1040 continues to step 1054 where the account executive selects a number of times the copy is to run for each day of the schedule. If however, the copy type is related to broadcast data, the copy automatically run whenever the broadcast data is transmitted.

Figure 10G:
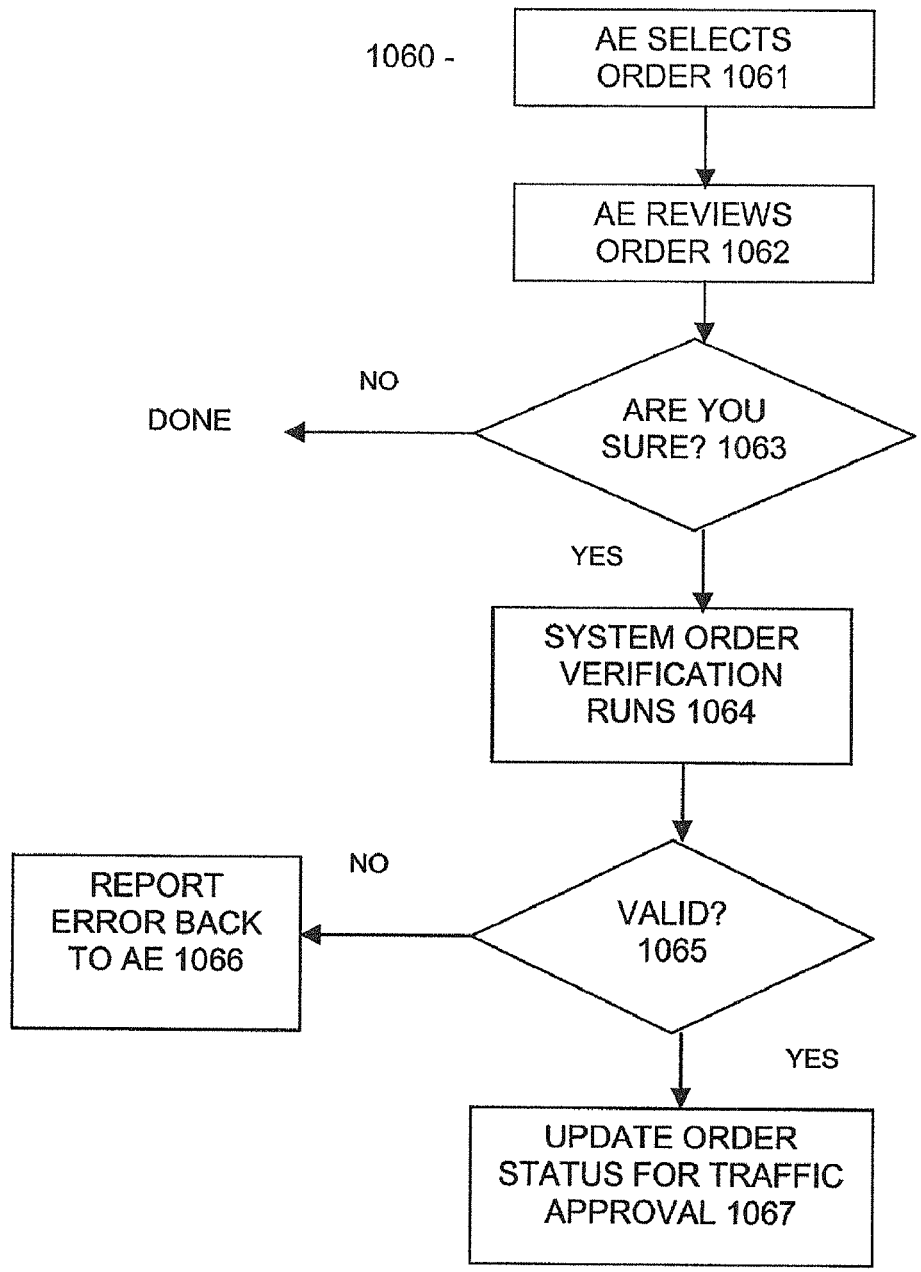

A process 1060 for submitting an order to a traffic management system is display FIG. 10G. The process 1060 begins when an account executive selects an order (step 1061) and reviews the order (step 1062) prior to submission to the traffic management system. After confirmation that the order is accurate (step 1063), an automated system order verification is performed (step 1064). If the automated system determines that the order is valid (step 1065), the order is submitted to the traffic management system (step 1067). Otherwise, the account executive is notified that the order has one or more errors (step 1066).

Figure 10H:
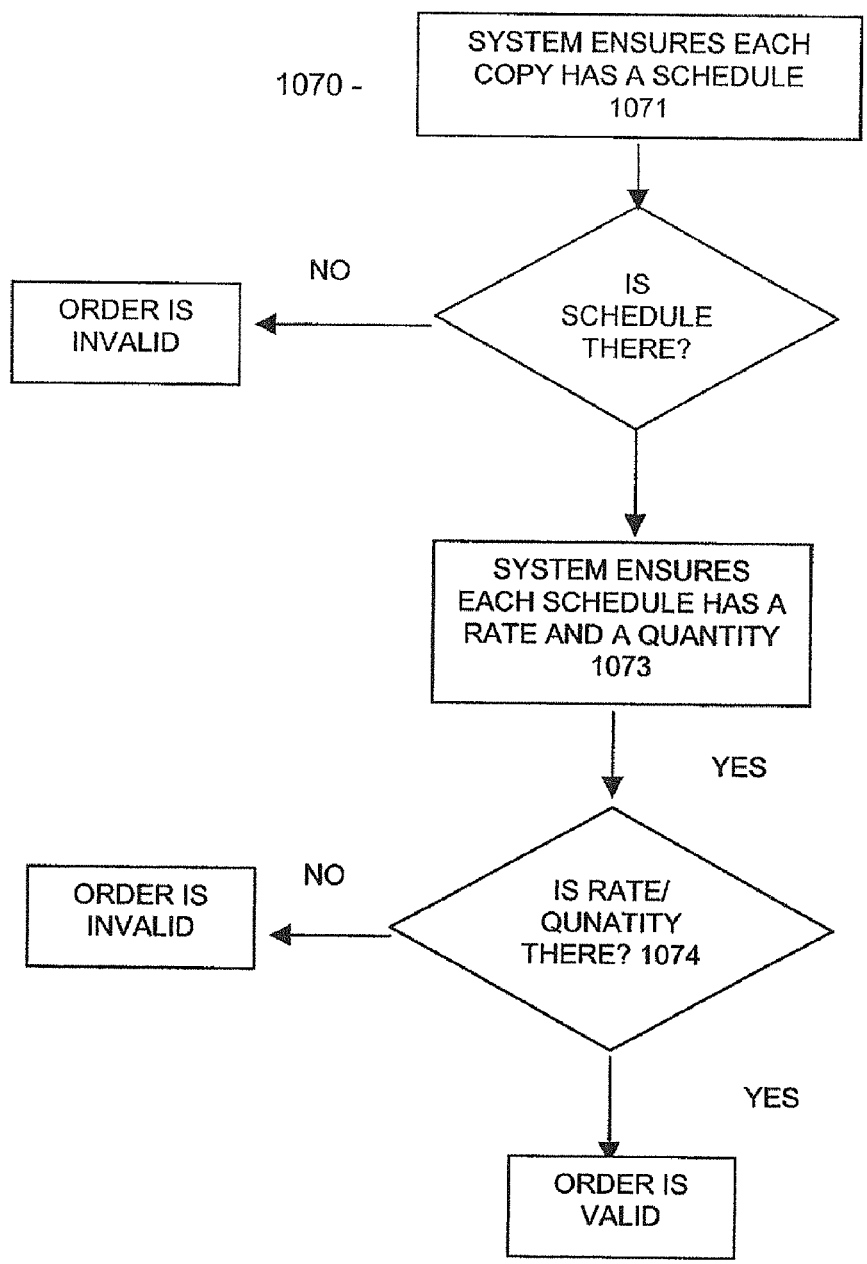

The automated system determines order validity according to the process 1070 as shown in FIG. 10H. The process 1070 begins by having the automated system confirm that the copy order has a schedule associated with it (step 1071). If the schedule exists (step 1072), the automated system insures that each schedule has a rate and quantity (step 1073). If the rate and quantity have been established (step 1074), the order is determined to be valid.

Figure 10I:
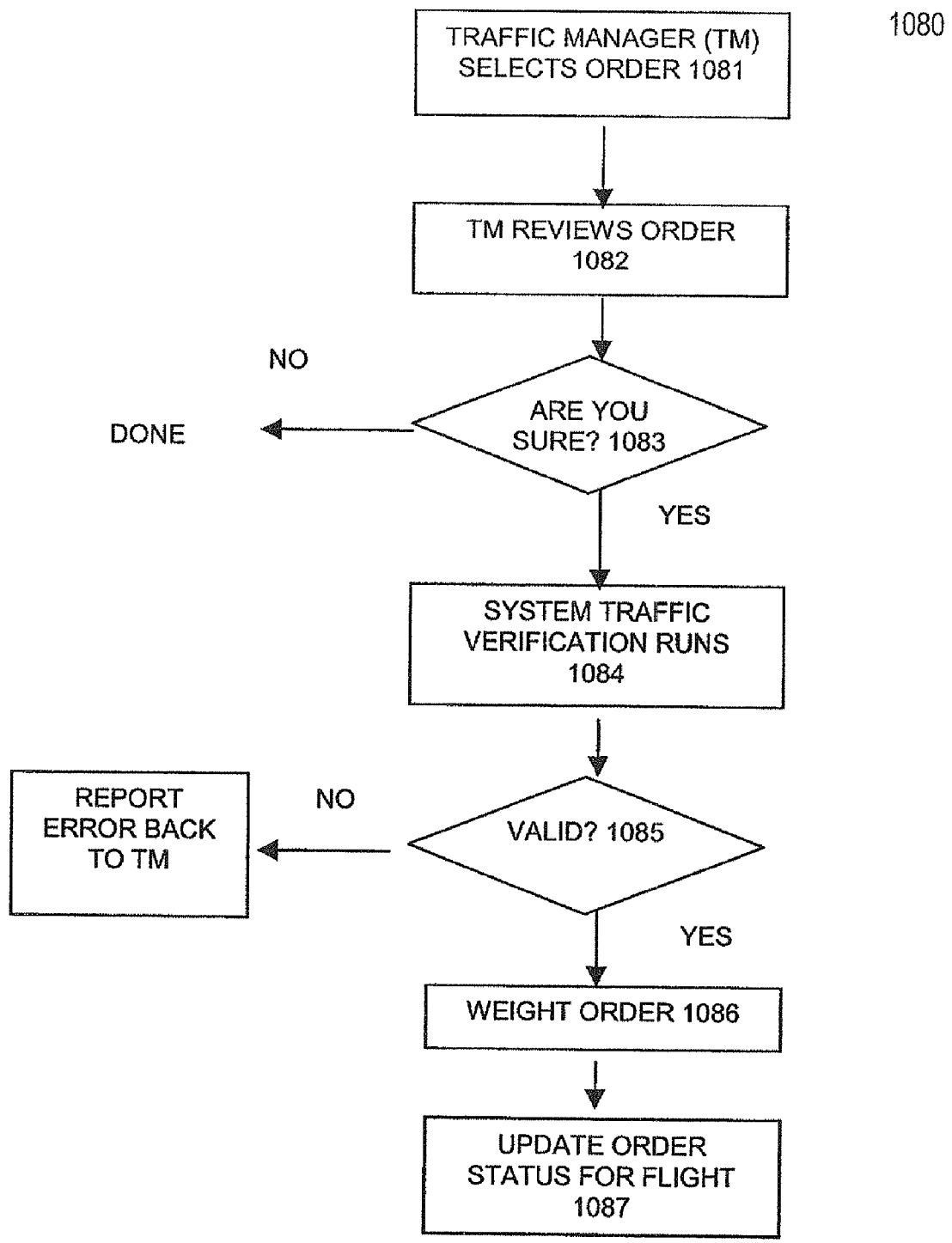

Next, a traffic management system validates an order for flight in a process 1080 as depicted in FIG. 10I. The process 1080 begins when the traffic management system selects an order (step 1081). The traffic management then reviews the order (step 1082), confirms the order (step 1083) and performs a system traffic verification (step 1084). If the order is then determined to be valid (step 1085), the order is assigned a weight (step 1086) and submitted for flight (step 1087). If the order is found to be invalid at step 1085, an error is reported back to the traffic management system.

Figure 10J:
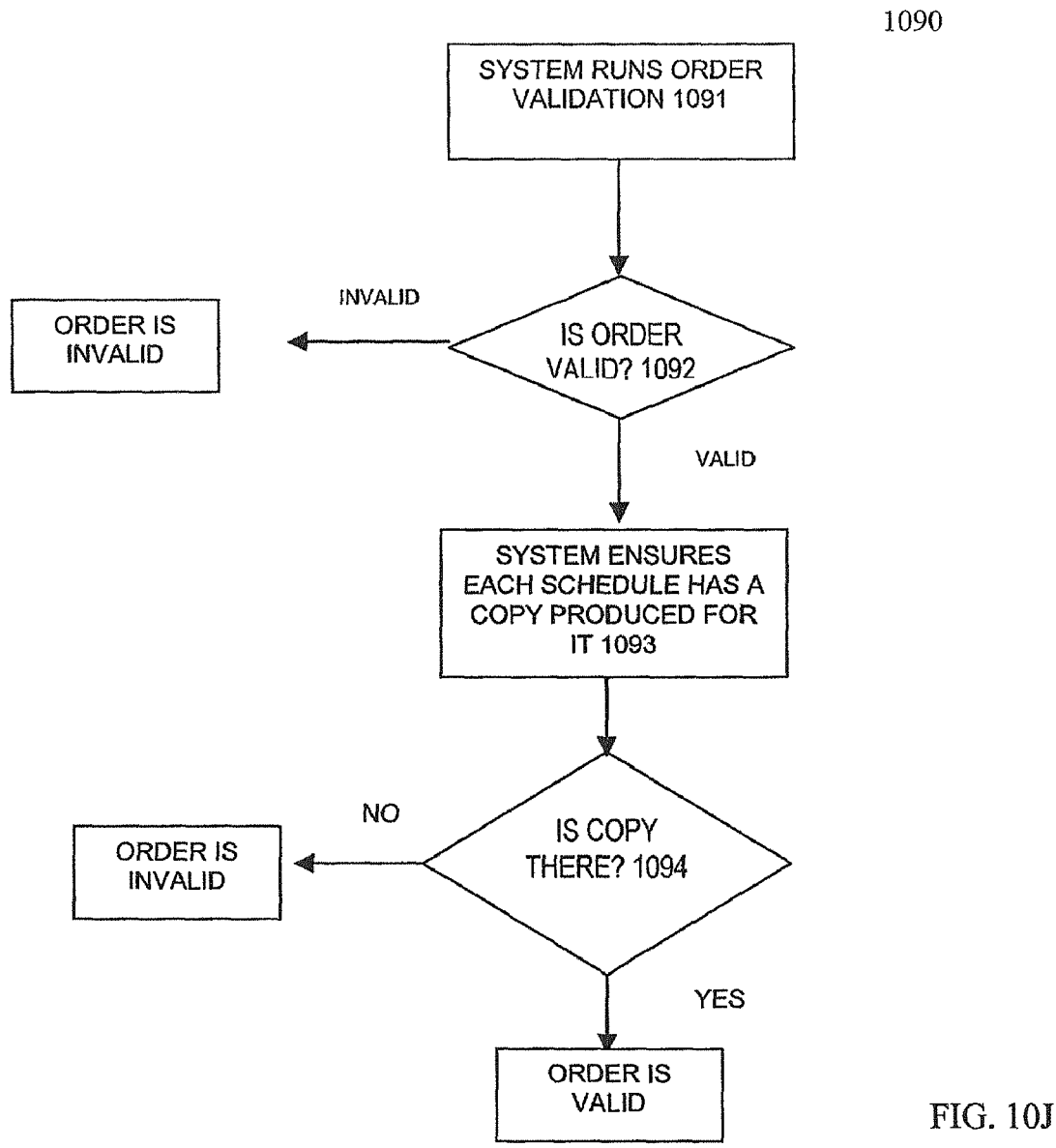

The system traffic verification process performed in step 1084 is depicted as process 1090 in FIG. 10J. According to process 1090, the system confirms the validity of a copy sales order (steps 1091 and 1092) such as may be done in conjunction with step 1064 above. If the validity is confirmed by the automated system, the traffic management system further determines whether each submitted schedule has a copy prepared for transmission (step 1093). If the copy exists, the traffic order is validated. Otherwise, an error in the schedule is noted.

Figure 10K:
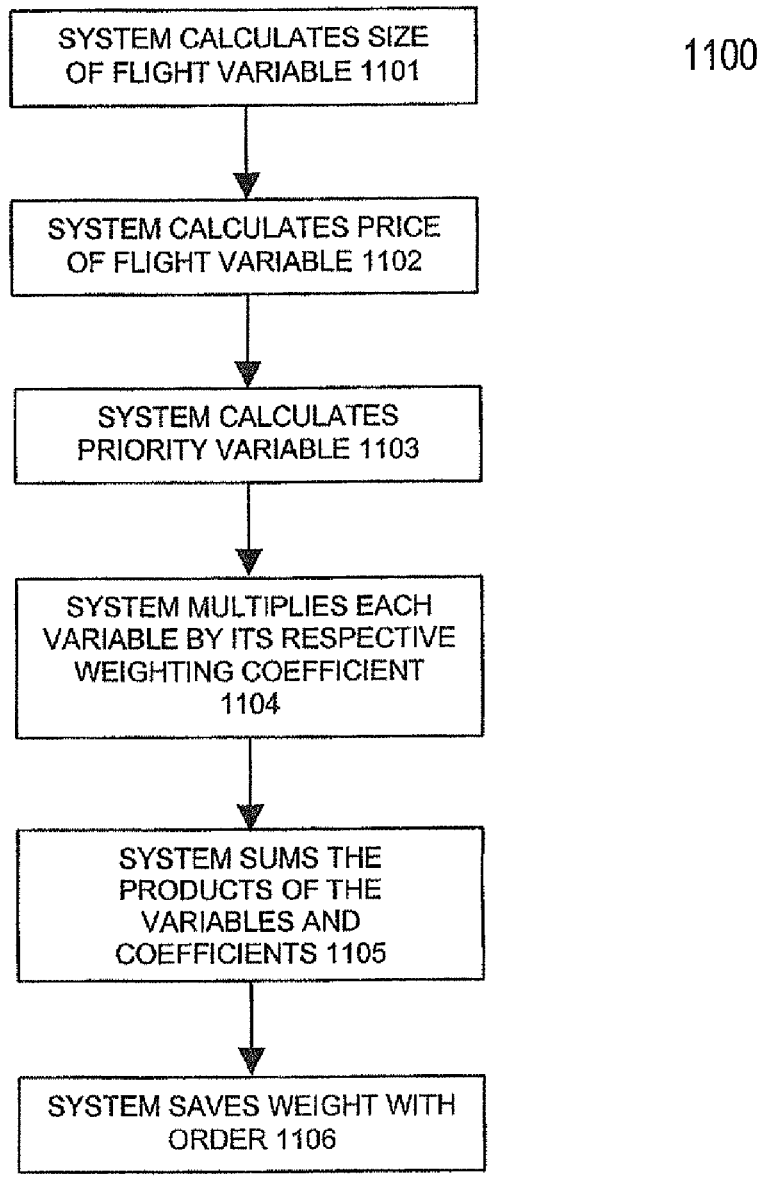

A process 1100 for weighting a copy order is depicted in FIG. 10K. First, the traffic management system calculates a size corresponding to the copy (step 1101), a price correspond to the copy (step 1102), and priority further the copy (step 1103). The traffic management system then multiplies each of these values by a weighting coefficient for that value (step 1104). The traffic management then adds the products of the variables (step 1105) and saves the determined weight with the order (step 1106).

Figure 10L:
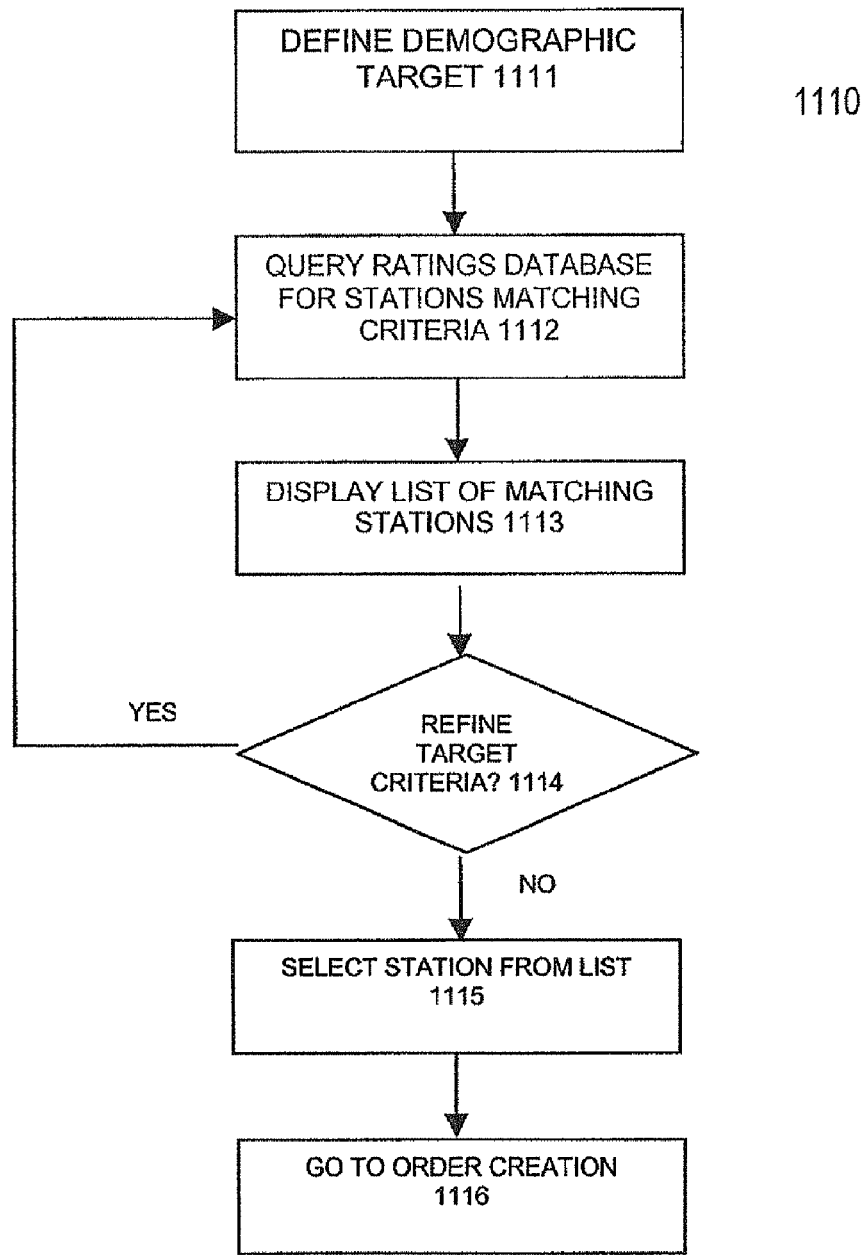

The traffic management system may then determine a target audience for the copy order in a process 1110 as shown in FIG. 10L. This system first defines a demographic target (step 1111). The system may then query a rating database, such as an ARBITRON database, for stations that matches the demographic target criteria (step 1112). A list of matching stations is generated (step 1113). The system may then refine the target criteria (step 1114) if for example, the list is too long. Next, the system may select one or more stations from the list (step 1115) and an order is placed for the station or stations to receive the copy data (step 1116). The process 1110 then ends.

Figure 11A:
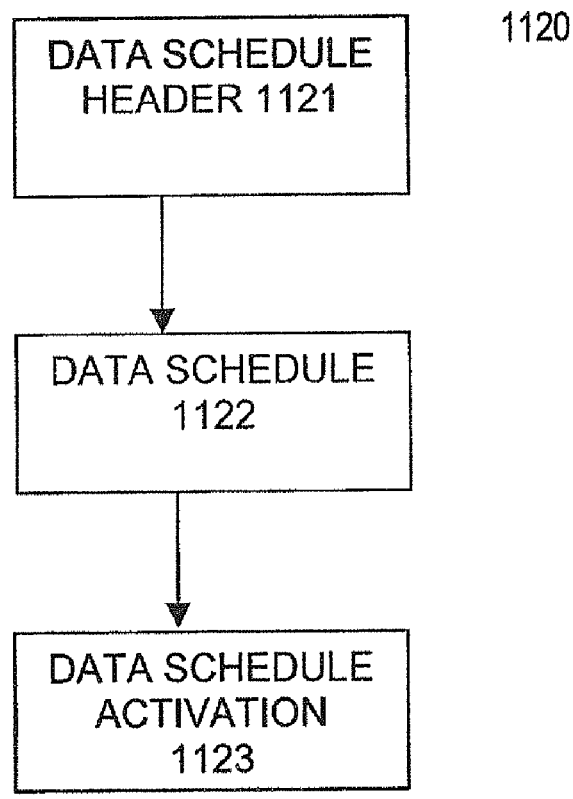

FIGS. 11A-11E illustrate the exemplary processes used for creation and distribution of schedule information in conjunction with the present invention. A process 1120 for creating a data schedule is depicted in FIG. 11A. The process 1120 includes a data schedule header (step 1121), determining a data schedule (step 1122) and activating a data schedule (step 1123).

Figure 11B:
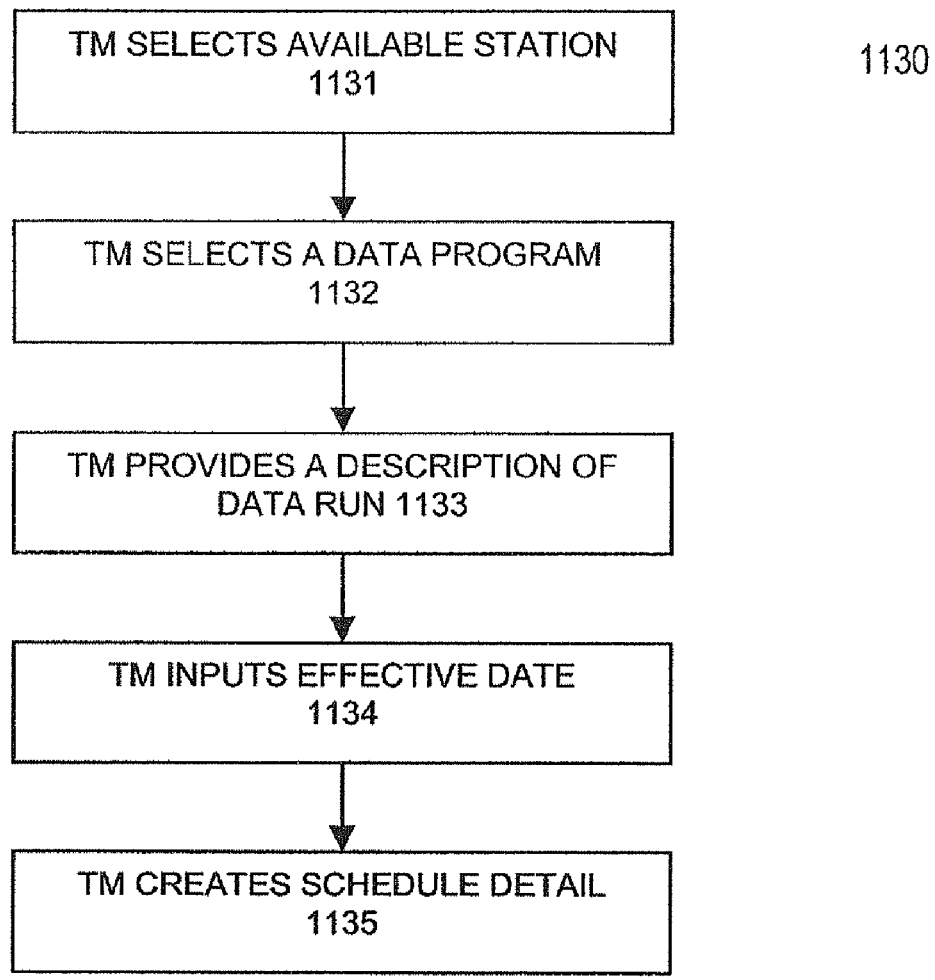

FIG. 11B displays an exemplary process 1121 for creating a data schedule header. According to process 1121, a traffic management system selects an available broadcaster or station (step 1131), selects an available broadcast program (step 1132), provides a description of data run (step 1133), inputs an effective date of the order (step 1134), and creates a schedule detail (step 1135).

Figure 11C:
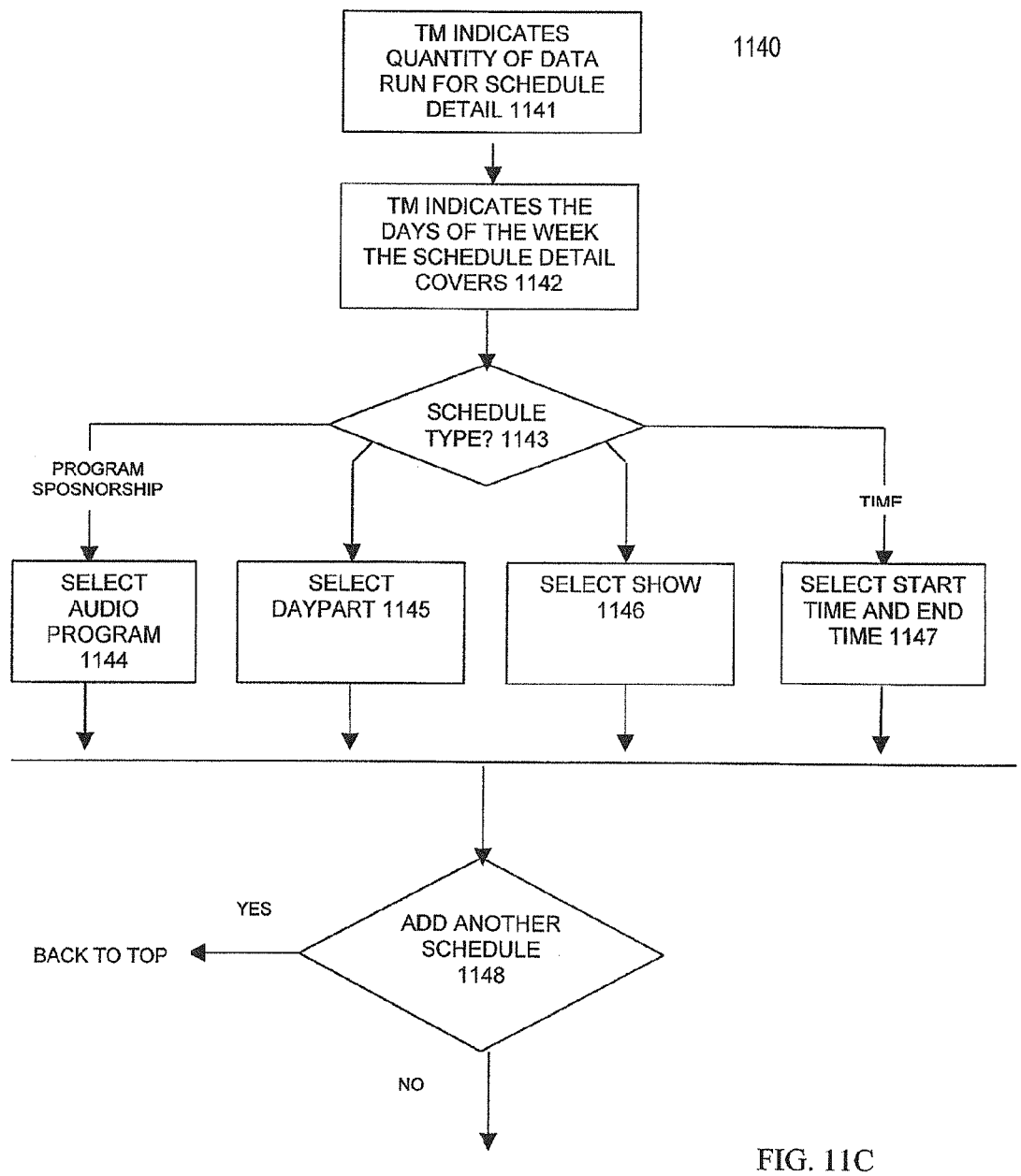
Figure 11D:
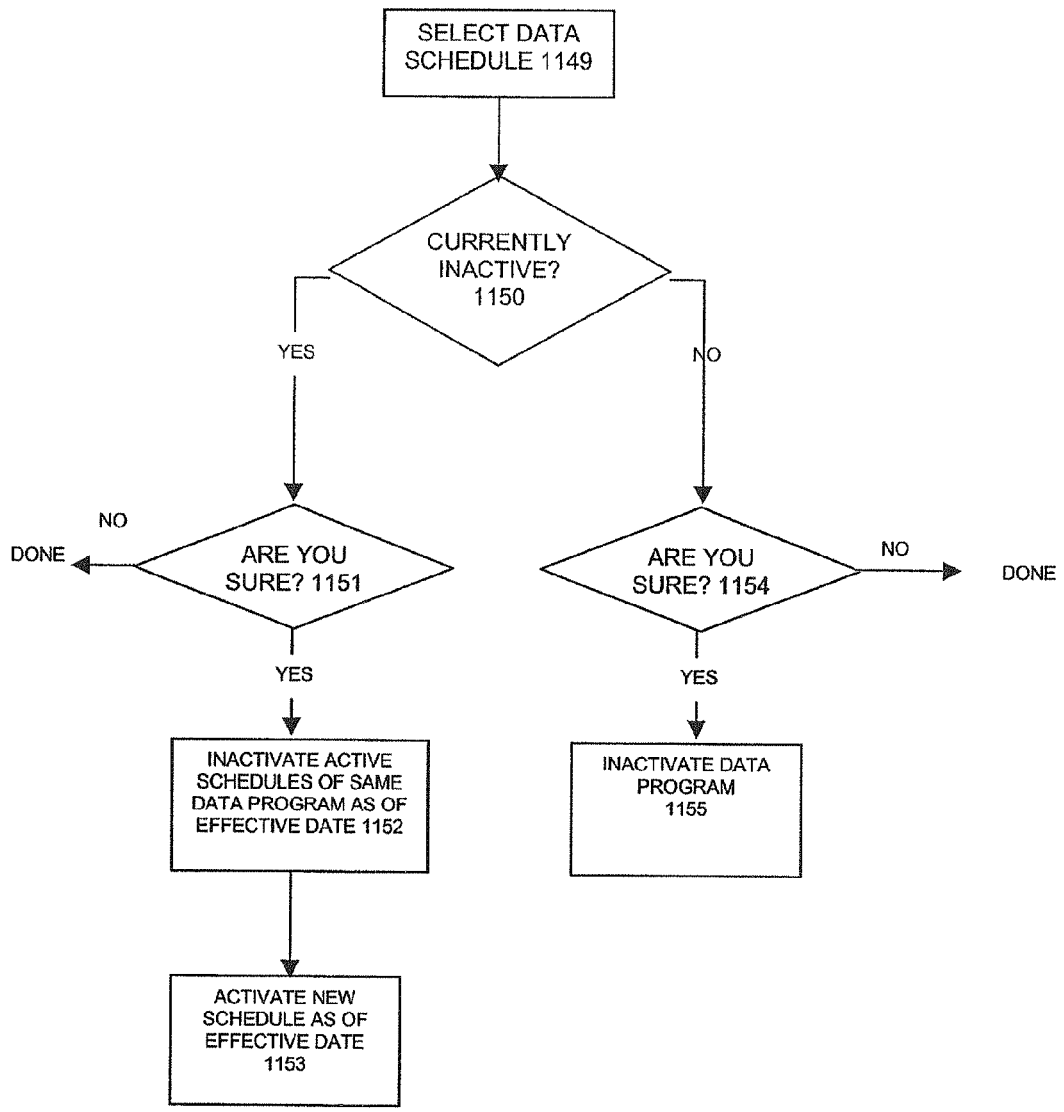

FIGS. 11C-11D display an exemplary process 1140 for creating and activating a schedule detail. According to the process 1140, the traffic management system indicates a quantity of data run for a schedule detail (step 1141) and indicates the day of the week the schedule detail covers (step 1142). The traffic management system then determines the appropriate schedule type (step 1143), which may be a particular audio program (step 1144), a particular daypart (step 1145), a particular show (step 1146), or a particular start time and end time (step 1147). The traffic management system then determines whether other schedules are to be added (step 1148). If so, the process 1140 returns to step 1141 above. Otherwise, the process continues as indicated in the following.

As shown in FIG. 11D, if there are no further schedule details to be added, the process 1140 continues as follows. The traffic management system may select a particular data schedule (step 1149). The traffic management system then determines if the schedule is currently inactive (step 1150). If so, the process 1140 continues to step 1151 where the status of the schedule is confirmed. The traffic management system then inactivates any active schedules of the same data program as of the effective date (step 1152) and activates the new schedule as of the effective date (step 1153).

If however, at step 1150, the schedule detail is not currently inactive, the process 1140 continues to step 1154 where the status of the schedule detail is confirmed and the traffic management system deactivates the data program (step 1155).

FIG. 11E depicts an exemplary audio copy pool database 1160 used by the traffic management system for maintaining order and schedule information for broadcasting of audio data. When referring to any of the databases depicted herein, it is important to note that the first row of the databases as depicted includes a field header for each field of the database and the remaining rows each correspond to one record of the database. Fields of data, are represented by each column. Further or fewer fields and records of data may be used and the type of data stored may appear in other equivalent manners. The databases presented herein may be configured into any number of relational databases with alternate fields. In addition, configurations other than database formats may be used to store the data The database 1160 may include: an Audio Copy Pool ID field 1161 for storing a unique identifier of audio data scheduled for transmission; an Order Identifier field 1162 for storing an order identifier of a copy order corresponding to particular audio data to be transmitted; an Audio Copy Pool Start Time field 1163 for storing an initial time that audio data is to be broadcast (herein measured in milliseconds since Jan. 1, 1970, though other methods for measuring the time may be used); and Audio Copy Pool End Time field 1164 for storing a time that the audio broadcast is to conclude (herein measured in milliseconds since Jan. 1, 1970, though other methods for measuring the time may be used); a Station Cut Identifier field 1165 for storing an identifier of a cut to be broadcast during the time period stored in fields 1163 and 1164; an Audio Frame Identifier field 1166 for storing a frame to which the audio data is assigned; an Audio Copy Pool Weight field 1167 for storing a weight assigned to the order; a DC Set Identifier field 1167A for storing an identifier of digital copy data with which the order is associated; an Audio Copy Pool Quantity field 1168 for storing a number of times the audio copy will play; an Audio Copy Pool Minimum Spacing field 1169 for storing a time before successive runs of the audio copy are to be played (herein measured in milliseconds, though other amounts of time may be used); an Audio Copy Comp Flag field 1170 for storing a competitive code assigned to the audio copy; and an Audio Copy Pool Comp Spacing field 1171 for storing a minimum time that should pass between the playing of the audio copy and the playing of an audio copy for a competitor, e.g. another audio copy having the same competitor code.

The database 1160 may thus be used in conjunction with the present invention to allow the traffic management system to store scheduling criteria for audio copy which, in turn, ensures that each audio copy is sufficiently played in accordance with a sales order and is sufficiently spaced from competing advertisements.

Figure 12A:
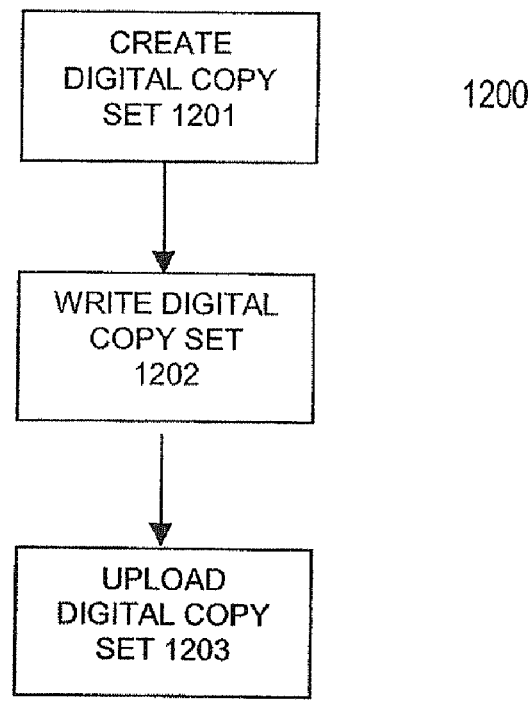
FIGS. 12A-12R illustrate the exemplary processes and data used for the creation and rendering of digital copy sets in conjunction with the present invention.

FIGS. 12A-12R illustrate the exemplary processes and data used for the creation and rendering of digital copy sets in conjunction with the present invention.

FIG. 12A depicts an exemplary general process 1200 for creating, writing and uploading digital copy sets for a broadcaster. According to the exemplary process, a supplemental digital data provider may create a digital copy set (step 1201), write the digital copy set (step 1202); upload digital copy set (step 1203) in the manner described below with respect to FIGS. 12B-12J.

Figure 12B:
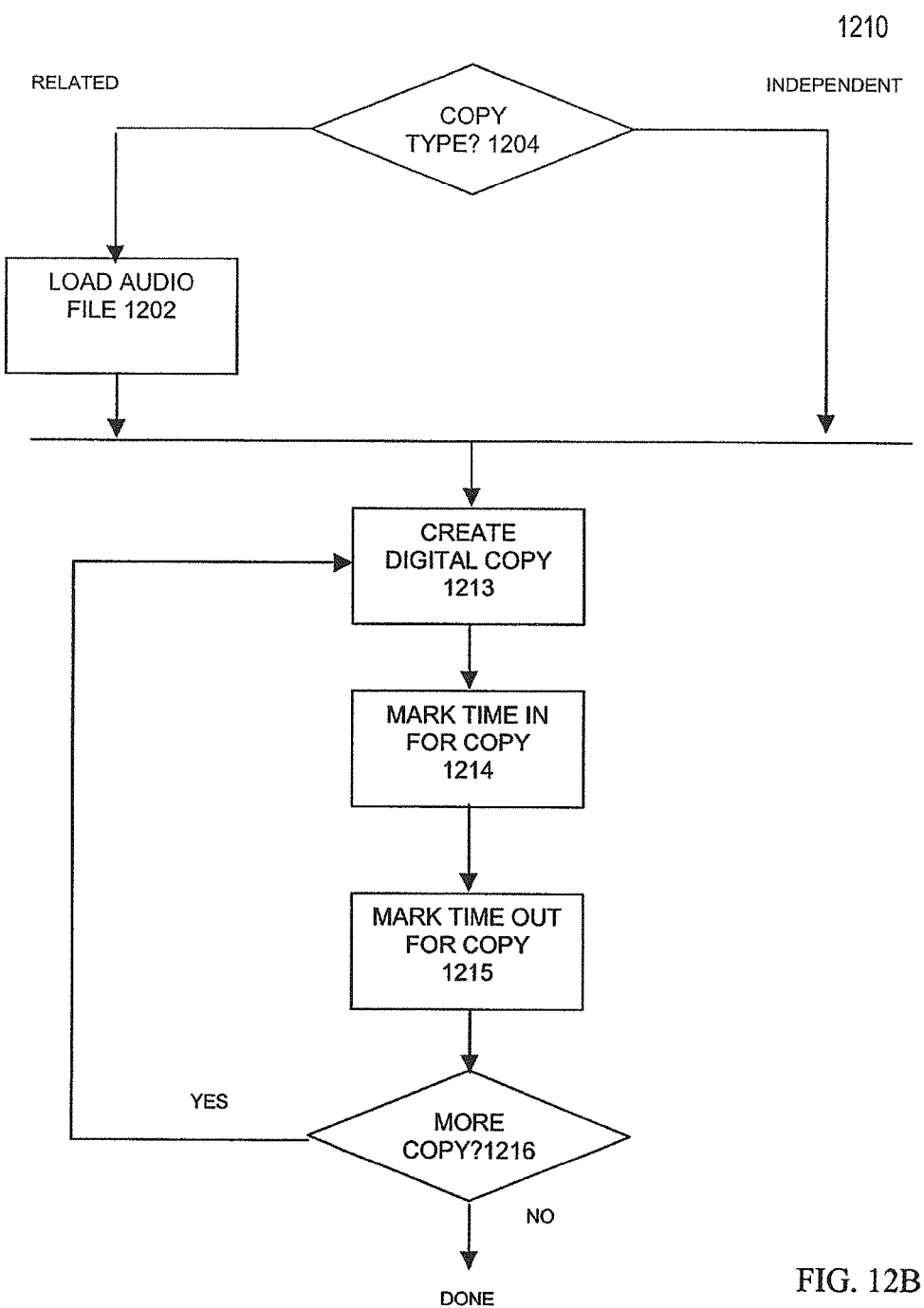
Figure 12C:
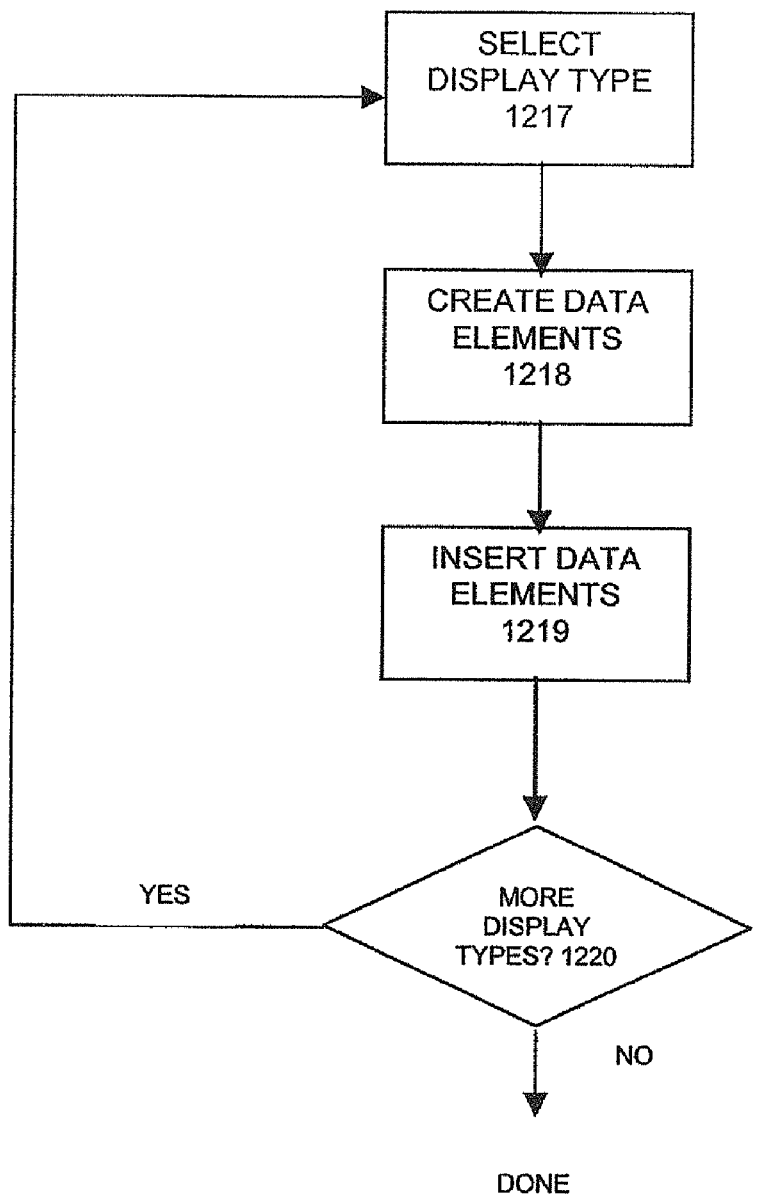

FIGS. 12B-12C depict an exemplary process 1210 for creating a digital copy set including one or more digital copies of supplemental digital data. The process 1210 begins with determining a copy type, e.g. related or independent copy data, for the digital copy set (step 1211). If the copy type is related, the supplemental digital data provider may load the audio file for which the supplemental digital data is to be presented (step 1212), after which the process continues to step 1213 below. If, on the other hand, the copy data is independent, the process 1210 continues directly from step 1211 to step 1213.

At step 1213, a first digital copy is created. A time in for the copy is marked (step 1214) and time out for copy is further designated (step 1215). At step 1216, the supplemental digital data provider determines whether more copy is needed for the digital copy set. If so, the process 1210 returns to step 1213 above. After all digital copies have been created, the process 1210 continues as shown in FIG. 12C.

Next, a display type is selected (step 1217), data elements for the digital copy set are created (step 1218) and inserted (step 1219). The supplemental digital data provider then determines whether all format types are needed (step 1220). This step may depend on the number of digital data receivers that are to be accommodated. If more display types for the copy set are needed, the process 1210 continues to step 1217 above. Otherwise, the process 1210 ends.

Figure 12D:
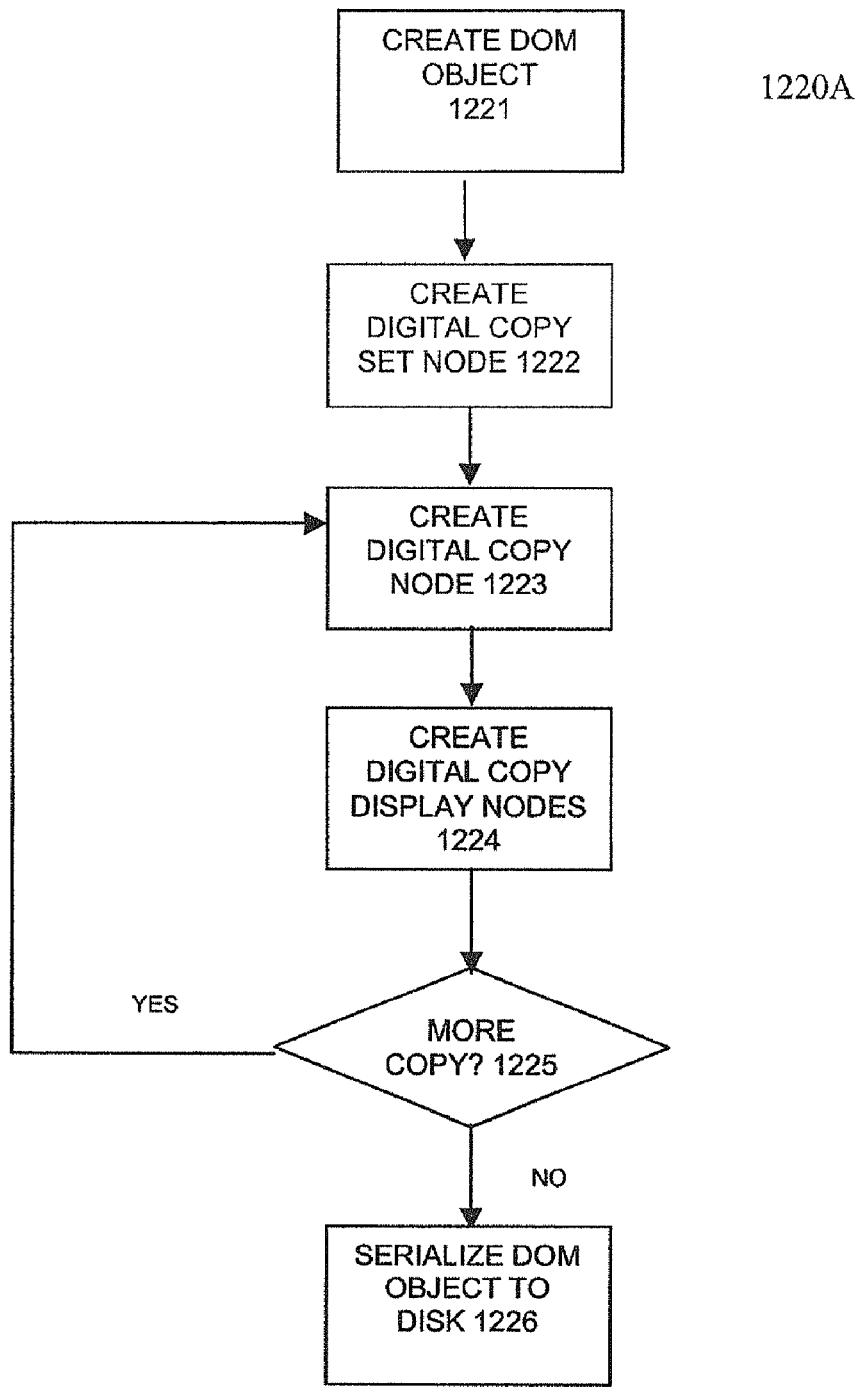

FIG. 12D depicts an exemplary process 1220A for writing a digital copy set. According to the process 1220A, the supplemental digital data provider creates a document object model (DOM) object (step 1221), a digital copy set node (step 1222), a digital copy node (step 1223) and a digital copy display node (step 1224). Next, the supplemental digital data provider determines whether more copy is to be created (step 1225). If so, the process 1220A returns to step 1223 above. Otherwise, the process 1220A continues with the supplemental digital data provider storing the DOM object to memory (step 1226). After this step, the process 1220A ends.

Figure 12E:
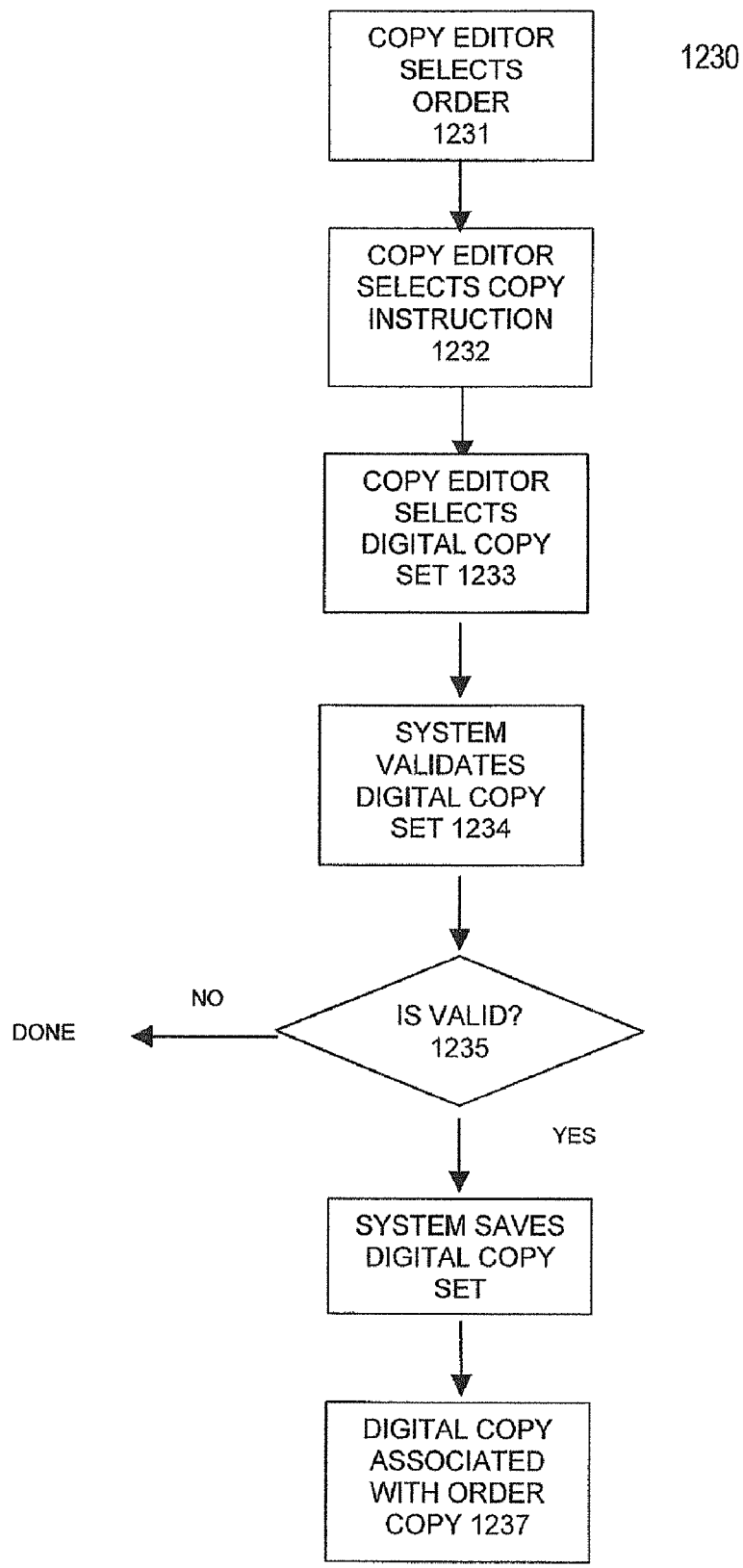

FIG. 12E depicts an exemplary process 1230 for updating a digital copy set and associating it with an order. According to the process 1230, a copy editor system for the supplemental digital data provider selects an order (step 1231), a copy instruction (step 1232) and a digital copy set (step 1233). The copy editor system then validates the digital copy set (step 1234). If the copy set is valid (step 1235), the copy editor system saves the digital copy set (step 1236) and associates it with an order for the copy (step 1237). The data may be stored in the Digital Copy Pool database 1293 described below with respect to FIG. 12N.

Figure 12F:
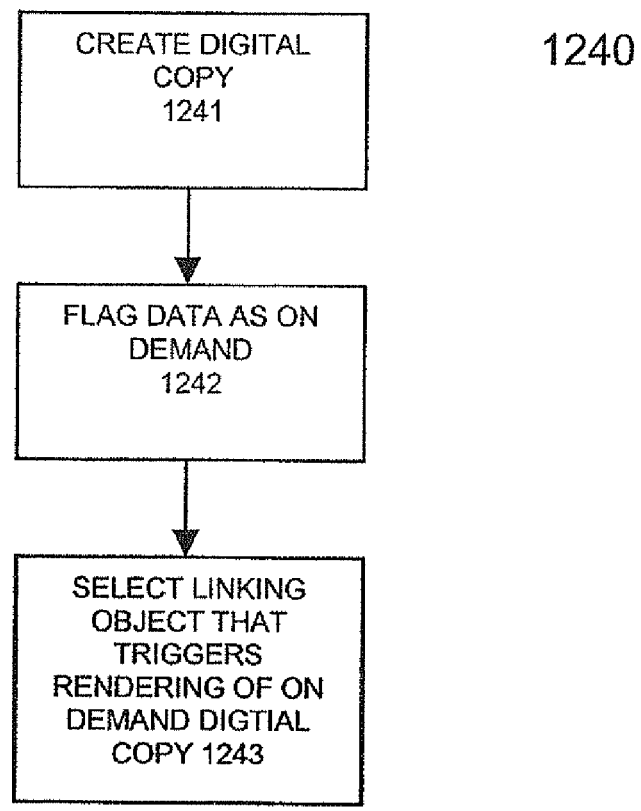

FIG. 12F depicts an exemplary process 1240 for creating on-demand digital copy. On-demand digital copy is supplemental digital data that is transmitted to a listener but may be selected by the listener for presentation at a later time. Accordingly, on-demand data may be stored in a digital data receiver until it is selected or replaced with further on-demand data.

The process 1240 begins with the creation of on-demand digital copy (step 1241). The data is then flagged as being on-demand (step 1242). A linking object is then selected which triggers rendering of on demand digital copy upon selection by a listener (step 1243).

Figure 12G:
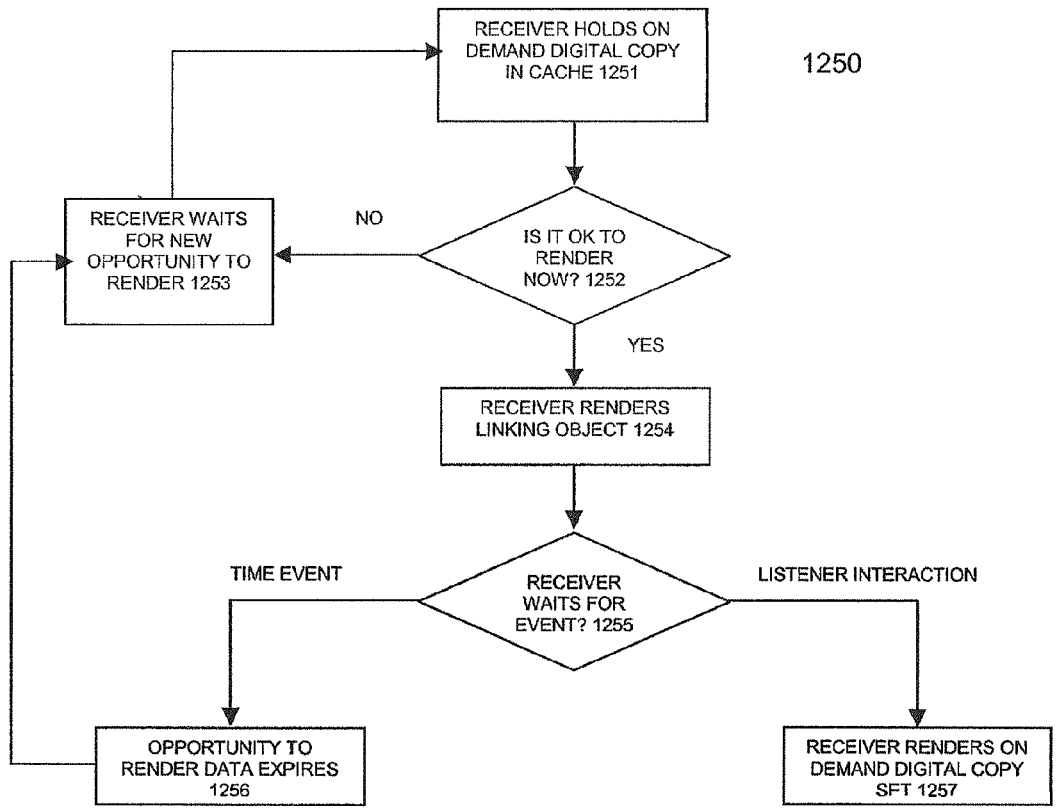

FIG. 12G presents an exemplary process 1250 performed by a digital data receiver for handling on-demand data. The process 1250 begins with the receiver storing the on-demand digital copy in cache (step 1251). The receiver then waits for an opportunity to render the on-demand copy (step 1252). If no such opportunity exists (e.g. the display is rendering other data of higher priority), the receiver waits for a new opportunity to render the on-demand data (step 1253). When an opportunity to render is detected, the receiver renders the linking object (step 1254) and waits for a display event (step 1255). The display event may be a time within which the copy is to be rendered or may be a signal from the listener to render the data. If the opportunity to render data expires (step 1256), the on-demand data is cleared from cache and the process 1250 returns to step 1253 above. If, however, the listener provides a signal before the expiration time, the receiver renders the on demand digital copy (step 1257), after which process 1250 ends.

Figure 12H:
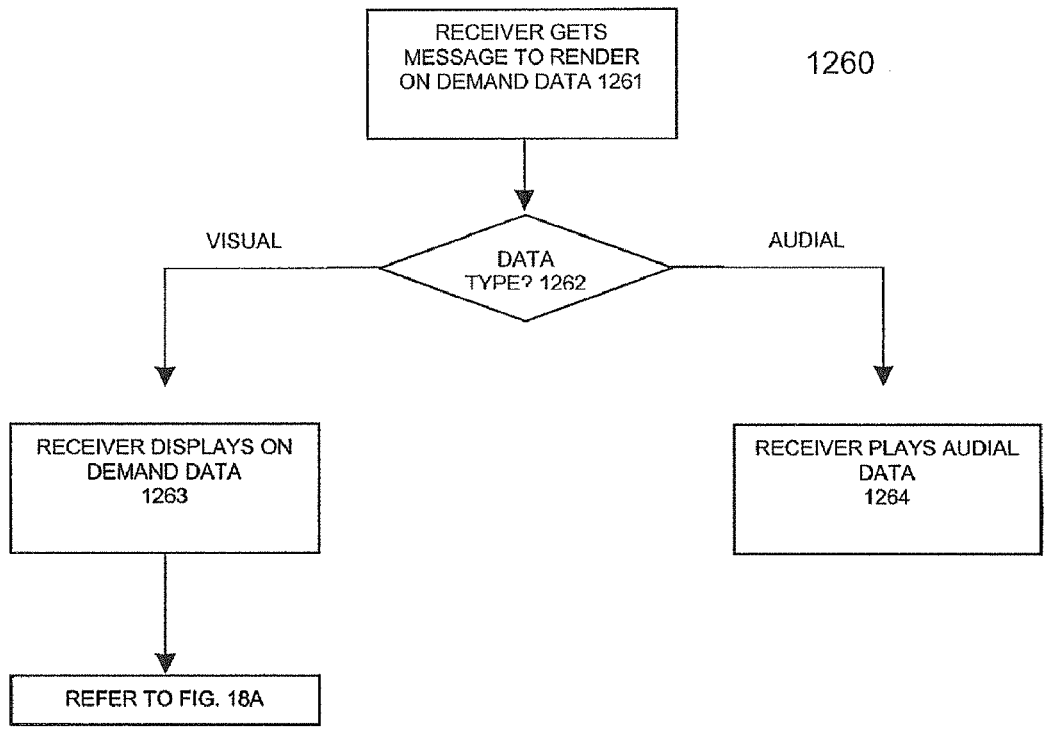

FIG. 12H depicts an exemplary process 1260 for rendering the on-demand data. Process 1260 begins when the receiver gets a message to render stored on-demand data (step 1261). The receiver determines a data type for the on-demand data (step 1262), that is, whether the data is audial or visual in nature. If the data is visual, the receiver displays the on-demand data (step 1263), after which the process 1260 continues to the process depicted in FIG. 18A below. If the on-demand data is audial, the receiver plays the audial data for the listener (step 1264), after which the process 1260 ends.

Figure 12I:
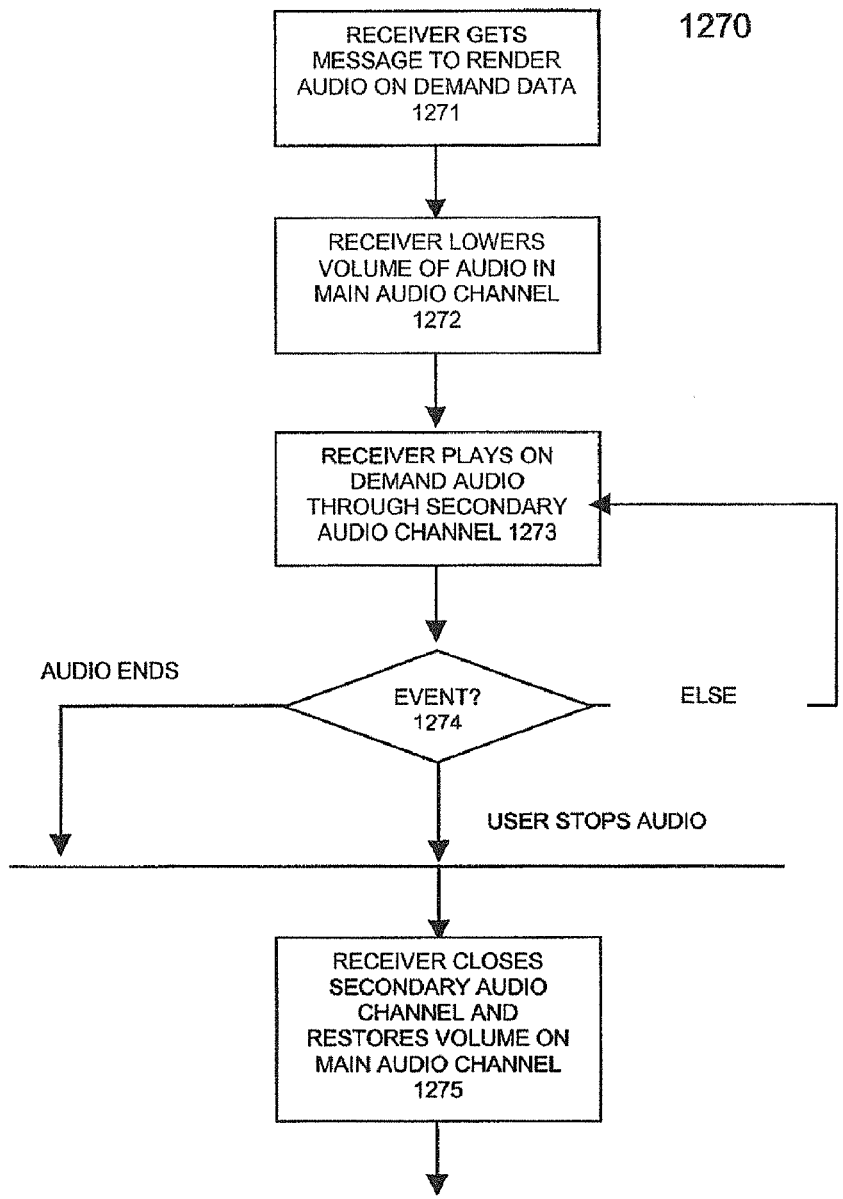
Figure 12J:
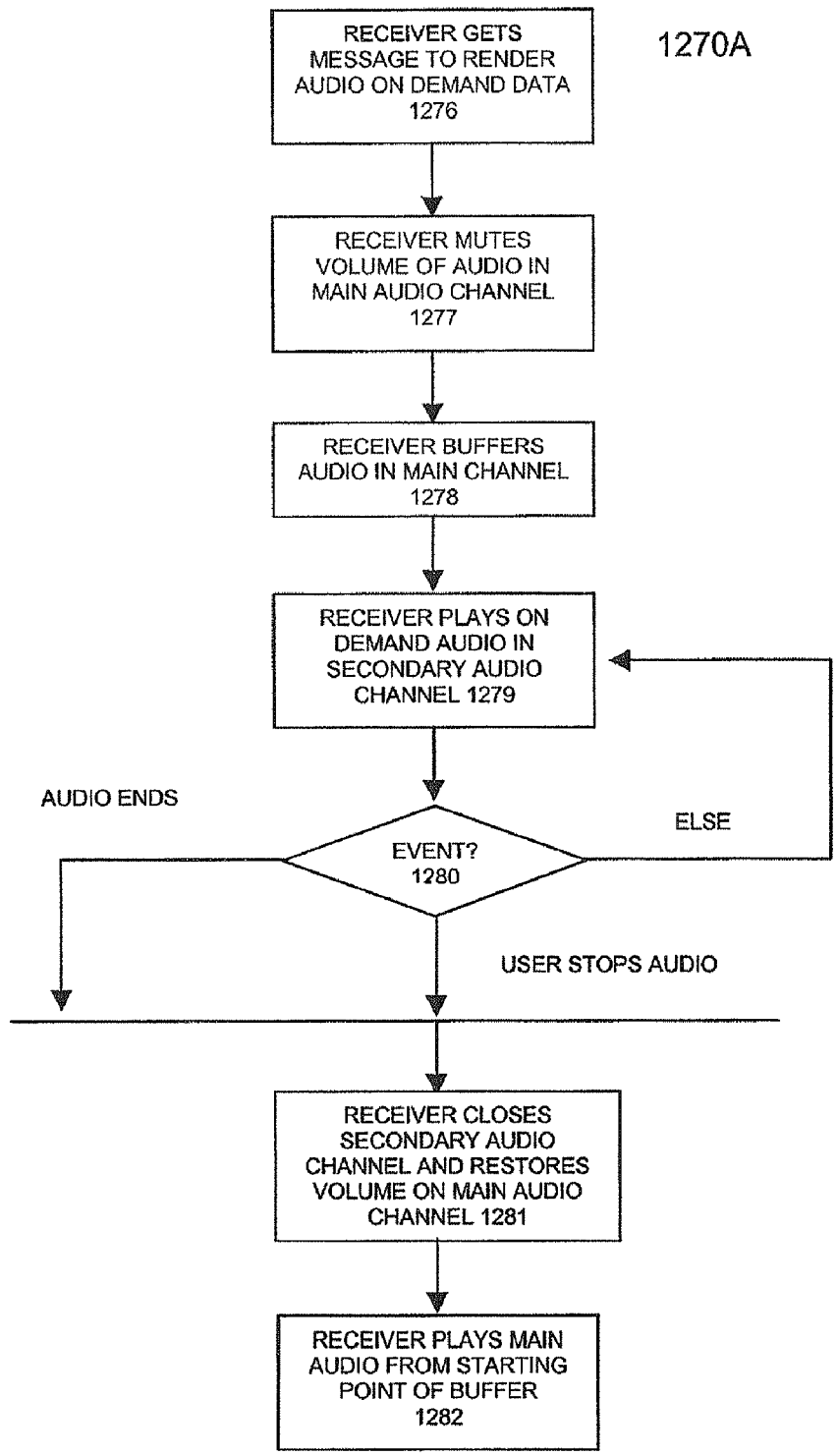

FIGS. 12I-12J depicts alternate exemplary processes 1270, 1270A for rendering on-demand audial data. According to process 1270, shown in FIG. 12I, the receiver gets a message to render audio on demand data (step 1271). The receiver lowers a volume of the main audio broadcast (step 1272) and plays the on demand audio through a secondary audio channel at a higher volume (step 1273). After step 1273, an end event may be detected (step 1274), e.g., the listener stops the on-demand playback or the on-demand data reaches an end. After the event, the receiver closes the secondary audio channel and restores the volume on the main audio channel (step 1275).

FIG. 12J depicts an alternate rendering process 1270A for on-demand audial data. The process 1270A begins when the receiver gets a message to render the on-demand audial data (step 1276). The receiver mutes the volume of audio data in the main audio channel (step 1277) and buffers the subsequent audio data from the main channel to a cache (step 1278). The receiver then plays the on-demand audio in secondary audio channel (step 1279). Upon detection of an end event (step 1280), the receiver closes the secondary audio channel and restores the volume on the main audio channel (step 1281). The receiver may play the audio data from a starting point of the data stored in the cache (step 1282).

FIGS. 12K, 12L and 12M depict exemplary XML schema for accomplishing the transmission of supplemental digital data and rendering instructions for the same according to the processes of FIGS. 12A-12J.

FIG. 12N depicts an exemplary digital copy pool database 1293 for maintaining order and schedule information for broadcasting of supplemental digital data. Accordingly, the database 1293 may include: a Digital Copy Pool ID field 1293A for storing a unique identifier of supplemental digital data scheduled for transmission; an Order Identifier field 1293B for storing an order identifier of a copy order corresponding to particular supplemental digital data to be transmitted; a Digital Copy Pool Start Time field 1293C for storing an initial time that supplemental digital data is to be broadcast (herein measured in milliseconds since Jan. 1, 1970, though other methods for measuring the time may be used); a Digital Copy Pool End Time field 1293D for storing a time that the supplemental digital data is to conclude (herein measured in milliseconds since Jan. 1, 1970, though other methods for measuring the time may be used); an Audio Copy Pool Order Identifier field 1293E for storing an identifier of a audio data to be broadcast during the time period stored in fields 1293C and 1293D, and thus, with the supplemental digital data; a Digital Frame Identifier field 1293F for storing a frame to which the supplemental digital data is assigned; a Digital Copy Pool Weight field 1293G for storing a weight assigned to the supplemental digital data; a DC Set Identifier field 1293H for storing an identifier of digital copy data with which the order is associated; a Digital Copy Pool Quantity field 1293I for storing a number of times the supplemental digital data will play in the time period defined in fields 1293C and 1293D; a Digital Copy Pool Minimum Spacing field 1293J for storing a time before successive runs of the supplemental digital data is to be played (herein measured in milliseconds, though other amounts of time may be used); a Digital Copy Comp field 1293K for storing a competitive code assigned to the supplemental digital data; and a Digital Copy Pool Comp Spacing field 1293L for storing a minimum time that should pass between the playing of the supplemental digital data and the playing of digital copy for a competitor, e.g. other supplemental digital data having the same competitor code.

The database 1293 may thus be used in conjunction with the present invention to allow the traffic management system to store scheduling criteria for digital copy which, in turn, ensures that each digital copy is sufficiently played in accordance with a sales order and is sufficiently spaced from competing advertisements.

FIG. 120 depicts an exemplary digital copy set database 1294 for storing an identification and desired placement for supplemental digital data within a digital copy set (e.g. a group of supplemental data). Accordingly, the database 1294 may include: a DC Set ID field 1294A for storing a unique identifier of a digital copy set; a DC Set Name field 1294B for storing a text description of the digital copy set; a DC Set Frame field 1294C for storing a location on a panel of a digital data receiver in which the digital copy set is to be rendered; and a DC Last Update field 1294D for storing a time since the digital copy set was updated. This last field 1294D may be used to determine when digital copy sets should be updated. Furthermore, the data displayed in field 1294D is presented in milliseconds since Jan. 1, 1970, although other methods of measuring update time may be used.

FIG. 12P depicts an exemplary digital copy database 1295 for storing an identification of individual supplemental digital data available for transmission. Accordingly, the database 1295 may include the following exemplary fields: a Digital Copy ID field 1295A for storing a unique identifier of a particular digital copy; a Digital Copy ID Tag field 1295B for storing a text description of the digital copy; a Digital Copy Minimum Length field 1295C describing a minimum length of time in which the digital copy may be rendered; and a Digital Copy Opt Length field 1295D for storing a desired time for which the digital copy should be rendered.

FIG. 12Q depicts an exemplary linking database 1296 for linking digital copy with digital copy sets that are to be broadcast. Accordingly, database 1296 may contain the following exemplary fields: a DC Set Details Identifier field 1296A for storing a unique identifier of a particular digital copy set; a DC Set ID Field 1296B which may correspond to the data stored in DC Set ID field 1293H; a DC Set Details Seq Field 1296C for storing the order in which digital copy is to appear in the digital copy set; and a Digital Copy ID field 1296D which may correspond to the data stored in field 1294A.

FIG. 12R depicts an exemplary display database 1298 for storing rendering details for a digital copy set. Accordingly, database 1298 may include the following exemplary fields: a DC Display ID field 1298A for storing a unique display code identifier for a digital copy set; a Digital Copy ID field 1296D which may correspond to the data stored in field 1294A, described above; a Display Type field 1298C for storing a format of the digital copy data that will be presented on a display (i.e. text); and a DC Data field 1298D for storing the format in which the digital copy is stored.

Figure 13A:
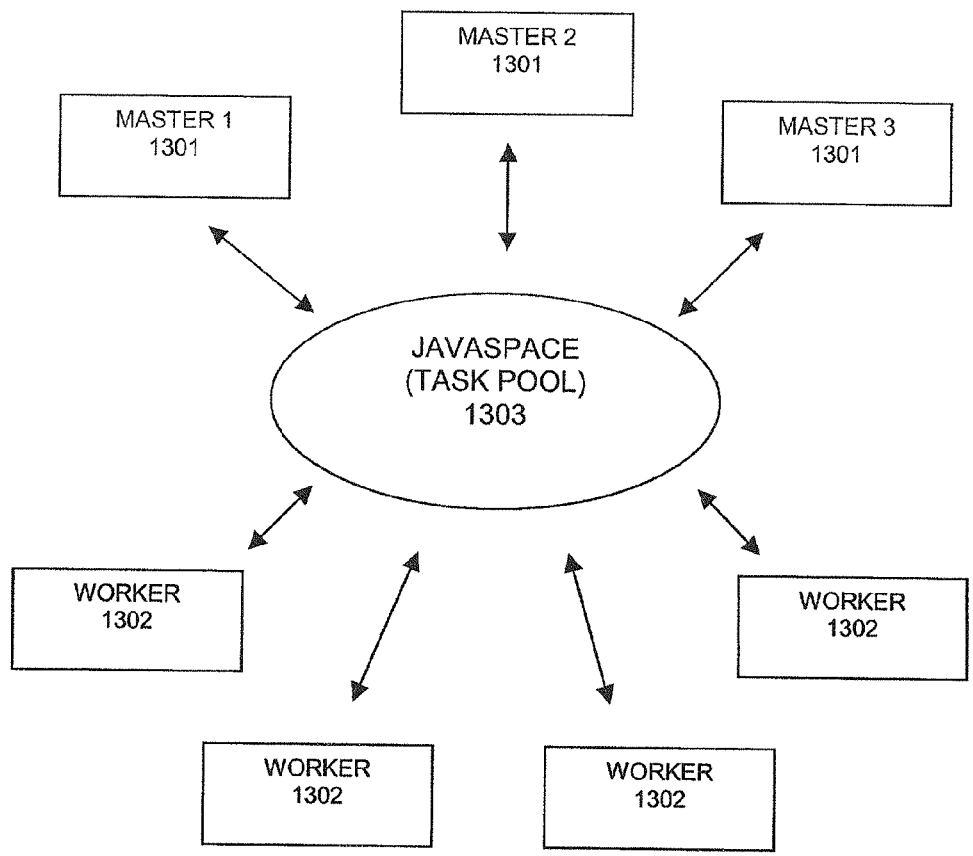
FIGS. 13A-13N illustrate the exemplary hardware and processes used to aggregate content for supplemental digital data in conjunction with the present invention.

FIGS. 13A-13N illustrate the exemplary hardware and processes which may be used by a supplemental digital data provider to aggregate content for supplemental digital data in accordance with the present invention. Referring now to FIG. 13A, therein is depicted a schematic diagram of a computing environment 1300 in which a plurality of master servers 1301 generate tasks, transmit the tasks to a javaspace task pool 1303 and confirming completion of the same, and a plurality of worker servers 1302 which retrieve and complete the tasks in the javaspace pool 1303. The master servers 1301 and the worker servers 1302 cooperate to perform the processes described below in conjunction with FIGS. 13B-13M.

Figure 13B:
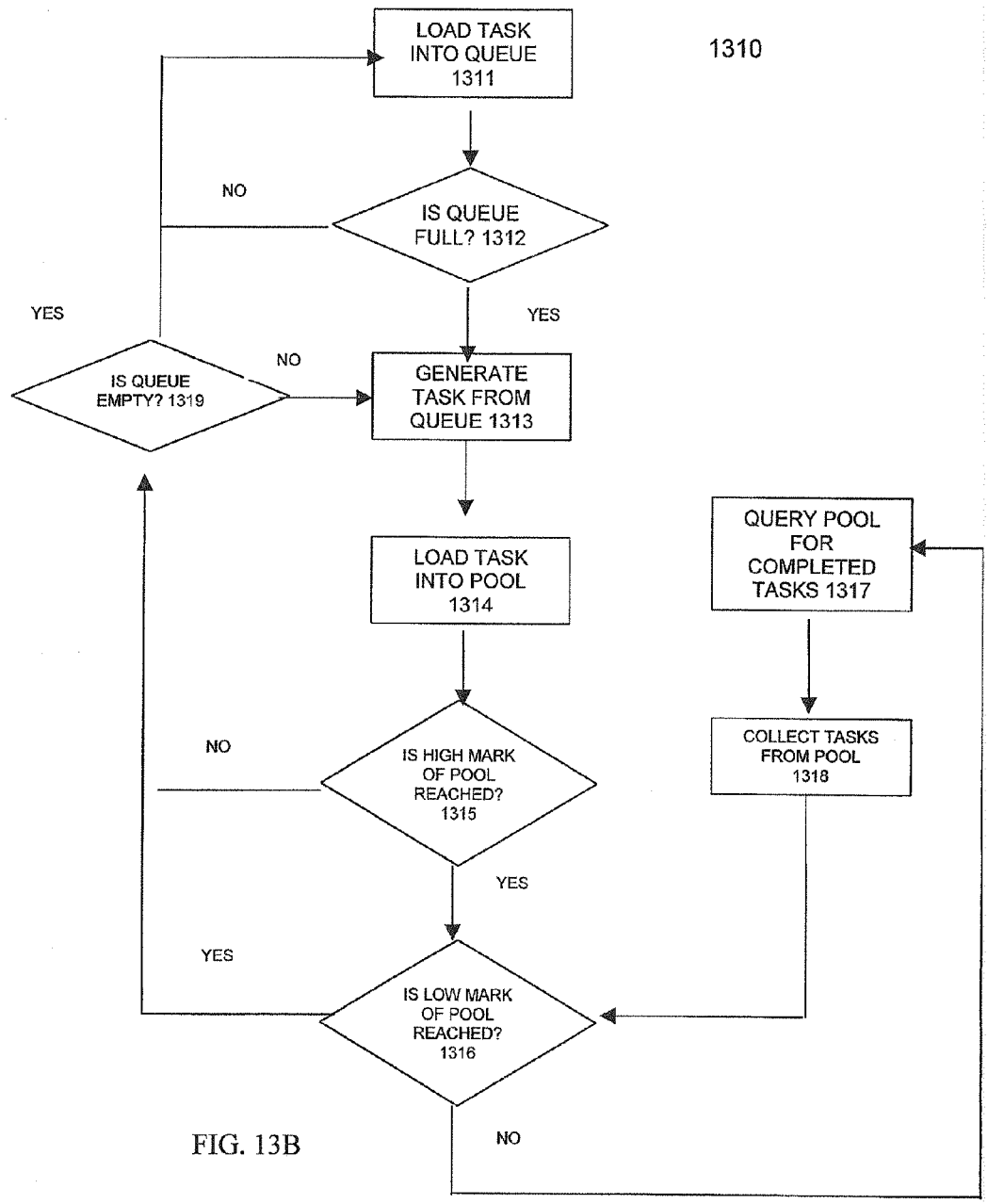

FIG. 13B depicts an exemplary process 1310 for generating tasks for the javaspace task pool 1303, as may be performed by one or more master servers 1301. Process 1310 is meant to run in a continuous manner to complete javaspace tasking for processes to be performed by the supplemental digital data provider.

The process 1310 begins when a task is loaded into a queue (step 1311). The master server 1301 then determines whether the queue is full (step 1312). If not, the process 1310 returns to step 1311 above. Otherwise, the process 1310 next continues to step 1313 where a task is generated from the queue. The task is then loaded into the javaspace pool (step 1314). It is then determined whether a high mark (e.g. an upper limit of tasks) of the pool 1303 is reached (step 1315). If so, no more tasks are loaded into the pool until a low mark of pool is reached (step 1316). In between, the query pool is checked for completed tasks (step 1317) and such completed tasks are collected from the pool (step 1318), after which, process 1310 returns to step 1316 above.

Returning to step 1315, if a high mark is not reached or a low mark is reached in the javaspace pool 1303, the process 1310 continues to step 1319, where the master server 1301 determines whether the queue is empty. If so, the process 1310 returns to step 1311 above. Otherwise, the process 1310 returns to step 1313.

Figure 13C:
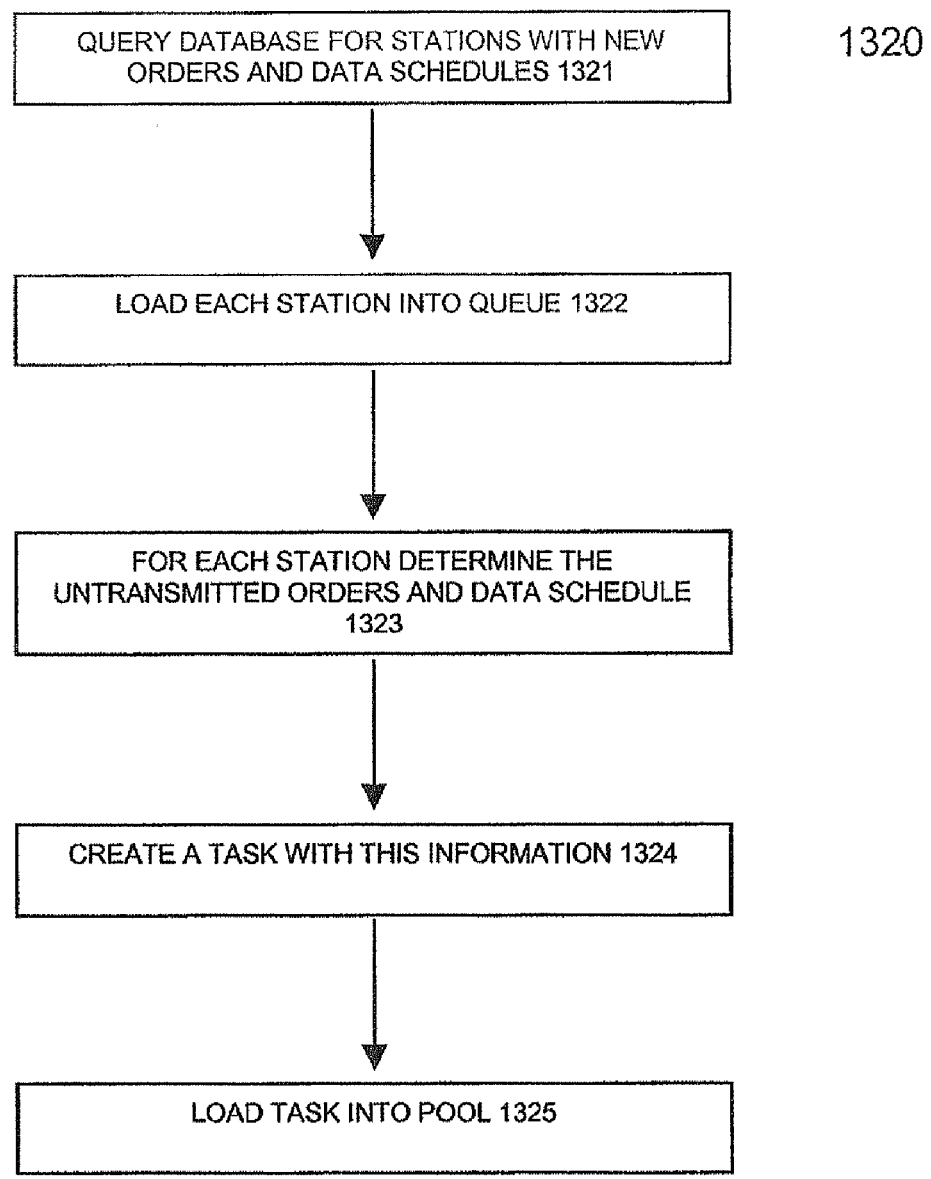

FIG. 13C depicts an exemplary process 1320 for loading a general task into the javaspace pool by a master server 1301. The process 1320 begins with a query to an order copy database for stations with new orders and data schedules (step 1321). Each station placing orders is loaded into the queue (step 1322). For each station and order, the un-transmitted order and data schedule is determined (step 1323). A task is then created with this information (step 1324) and the task is loaded into the javaspace pool (step 1325) for execution by a worker server 1302.

Figure 13D:
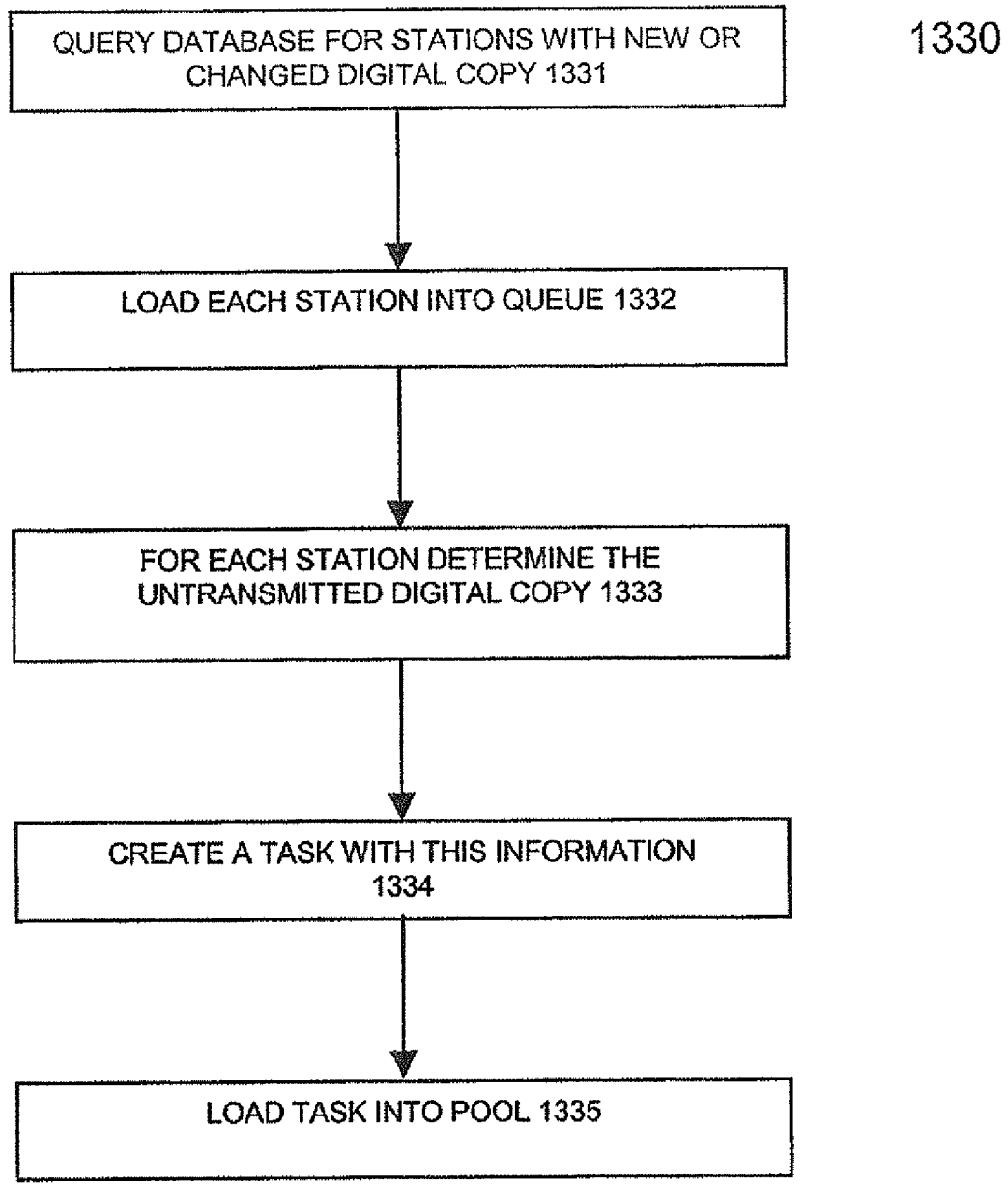

FIG. 13D depicts a second exemplary process 1330 for loading a digital copy task, including a change in schedule data from a broadcaster, into the javaspace pool 1303. The process 1330 begins with a query to a database for stations with new or changed digital copy (step 1331). An identification of each station satisfying the query is then placed in a queue (step 1332). For each station, the untransmitted digital copy is identified (step 1333). A task is then created with this information (step 1334) and the task is loaded into the javaspace pool (step 1335) for execution by a worker server 1302.

Figure 13E:
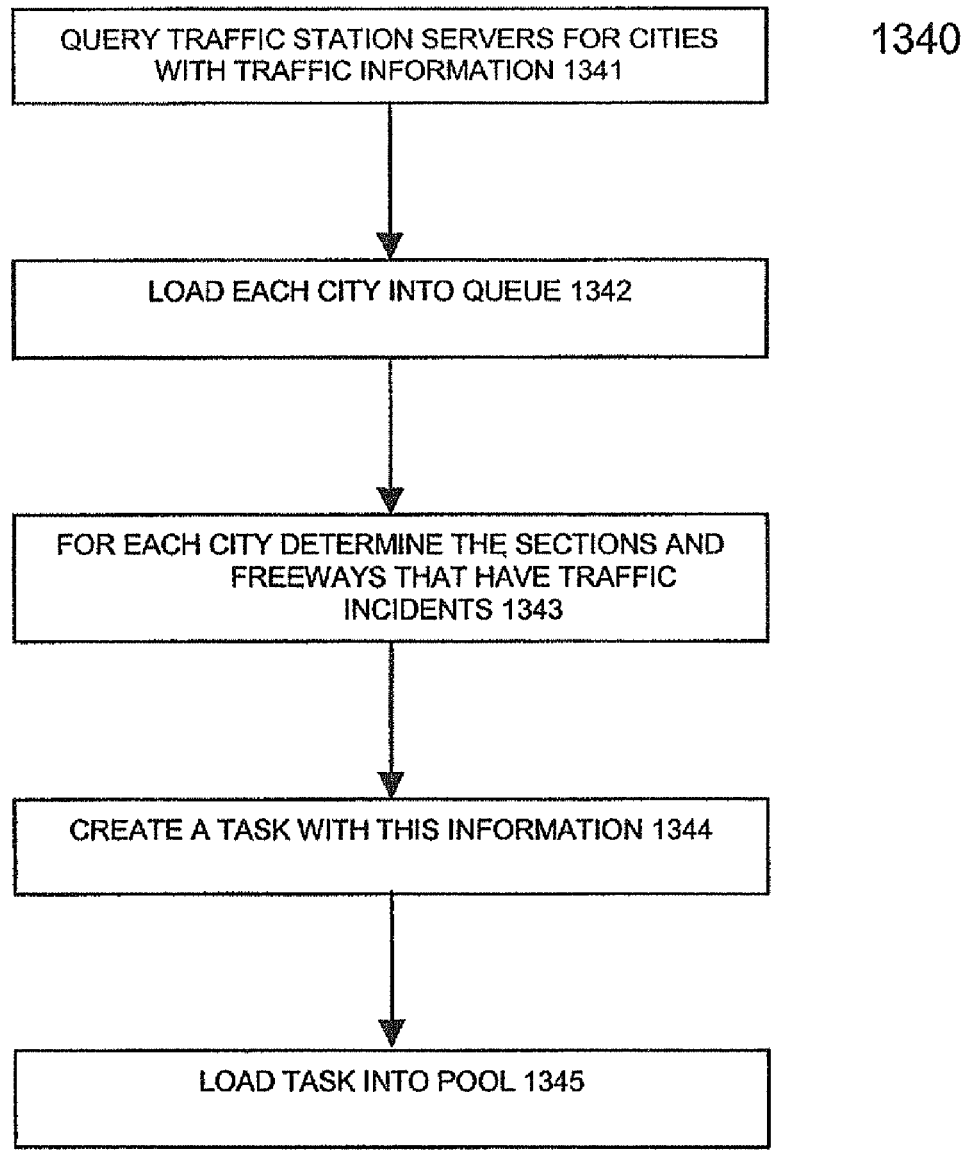

FIG. 13E depicts an exemplary process 1340 for loading a traffic data task into the javaspace pool 1303. The process 1340 begins with a query placed with traffic station servers for cities with traffic information (step 1341). An identification of each city with traffic information is loaded into the queue (step 1342). For each city, the sections and freeways that have traffic incidents are identified (step 1343). A task is then created with this information (step 1344) and loaded into the javaspace pool (step 1345).

Figure 13F:
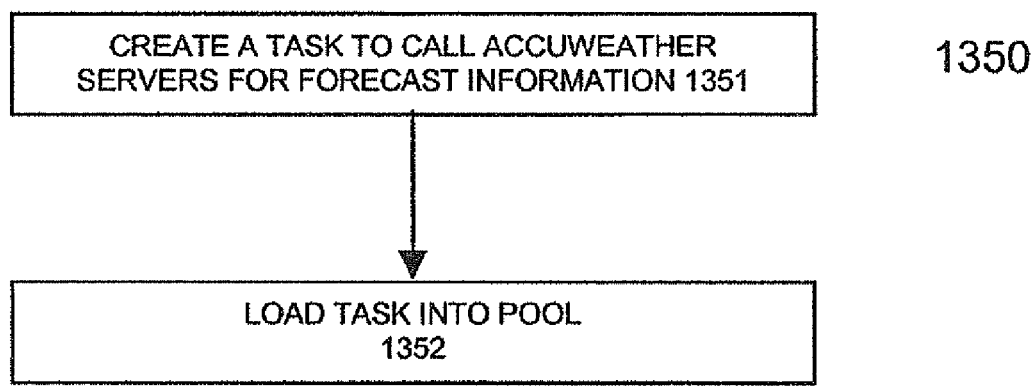

FIG. 13F depicts an exemplary process 1350 for loading an accuweather task into the javaspace pool 1303. The process 1350 includes creating a task to call one or more accuweather servers for forecast information (step 1351) and loading the task into pool (step 1352). The accuweather data may be searched by airport code or other geographic identifier.

Figure 13G:
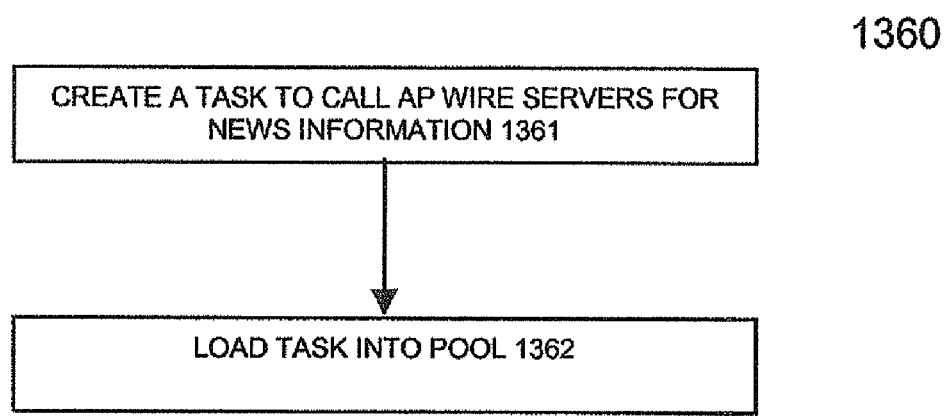

FIG. 13G depicts an exemplary process 1360 for loading news data into the javaspace pool 1303. The process 1360 includes creating a task to call one or more news wire servers (such as the Associated Press (AP)) for news information (step 1361) and loading the task into the javaspace pool 1303 (step 1362).

Figure 13H:
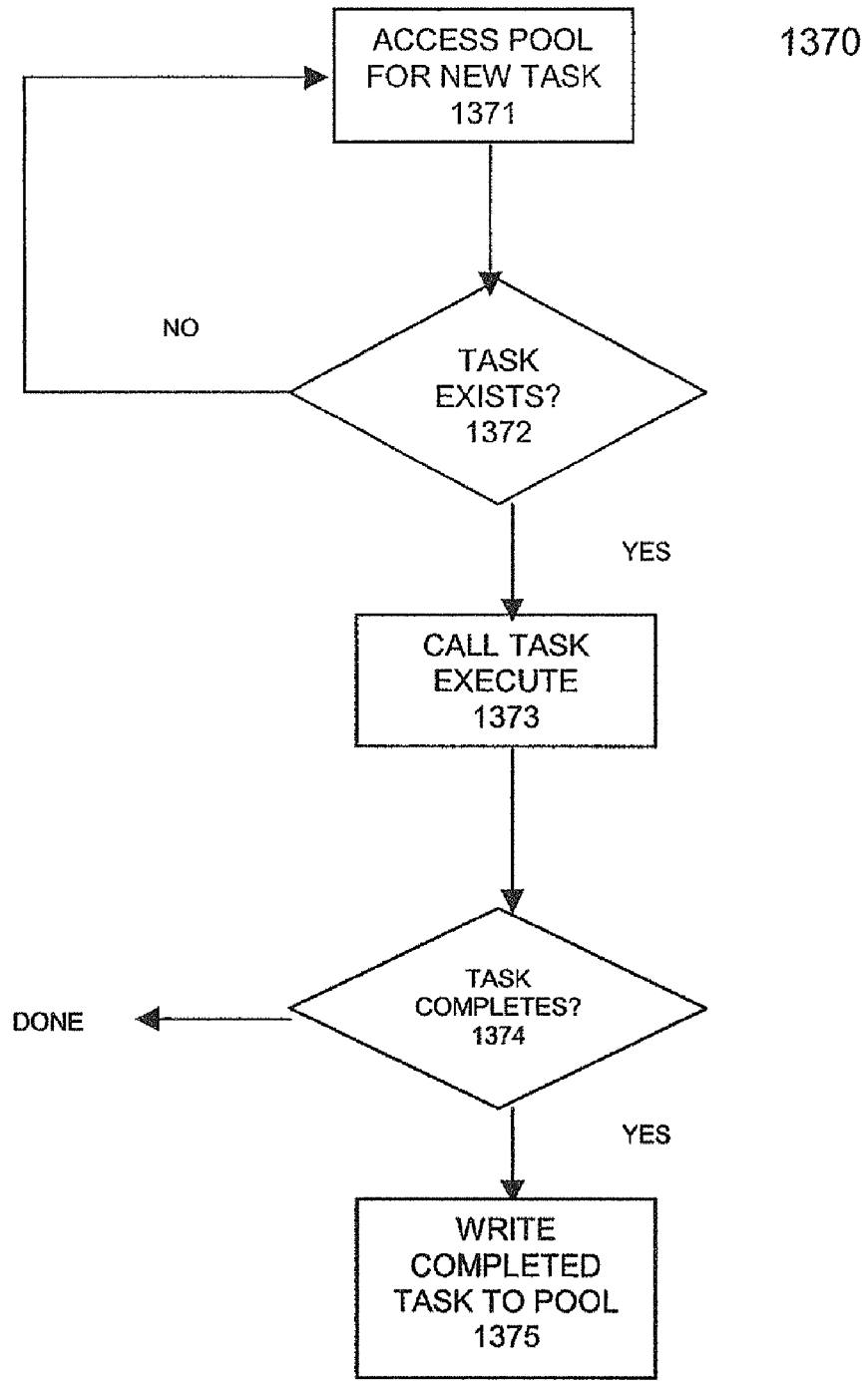

FIG. 13H depicts an exemplary process 1370 performed by a worker server 1302 for executing a task generated by a master server 1301 and placed in the javaspace pool 1303.

The process 1370 begins when a worker server 1302 accesses the javaspace pool for a new task (step 1371). If a task exists (step 1372), the task is called and executed (step 1373). If the task is complete (step 1374), the worker server writes the completed task to javaspace pool (step 1375) for confirmation by the master servers 1301.

Figure 13I:
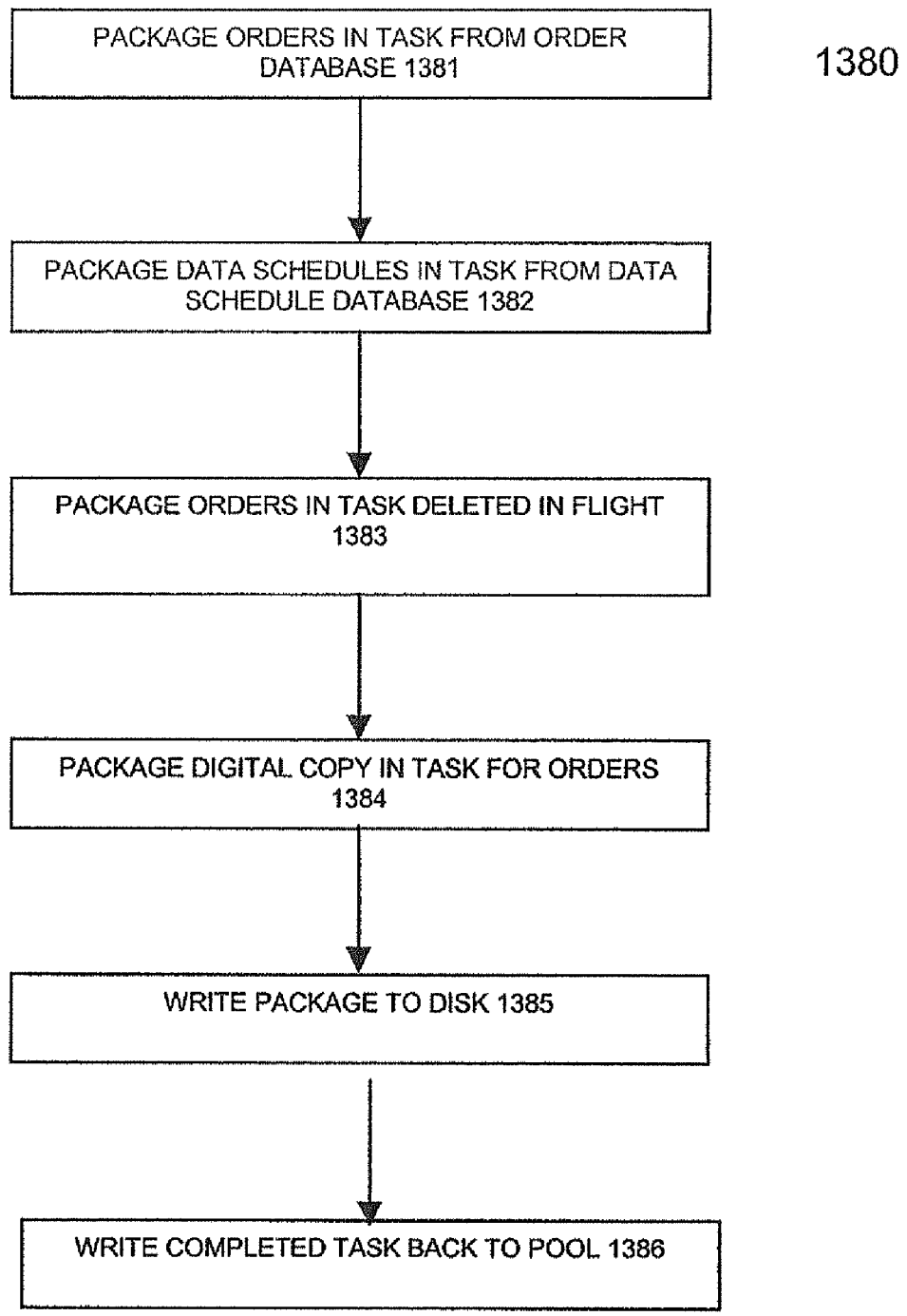

FIG. 13I depicts an exemplary process 1380 for packaging an order in response to an order task implemented by a master server 1301. The process 1380 begins when a package order is received from an order database (step 1381). The worker server 1302 packages data schedules in the task from a data schedule database (step 1382). The worker server 1302 then packages orders in a task that were deleted in flight (step 1383). The worker server then packages digital copy in task orders (step 1384) and writes the package to memory (step 1385). The completed task is then written back to the pool as completed (step 1386).

Figure 13J:
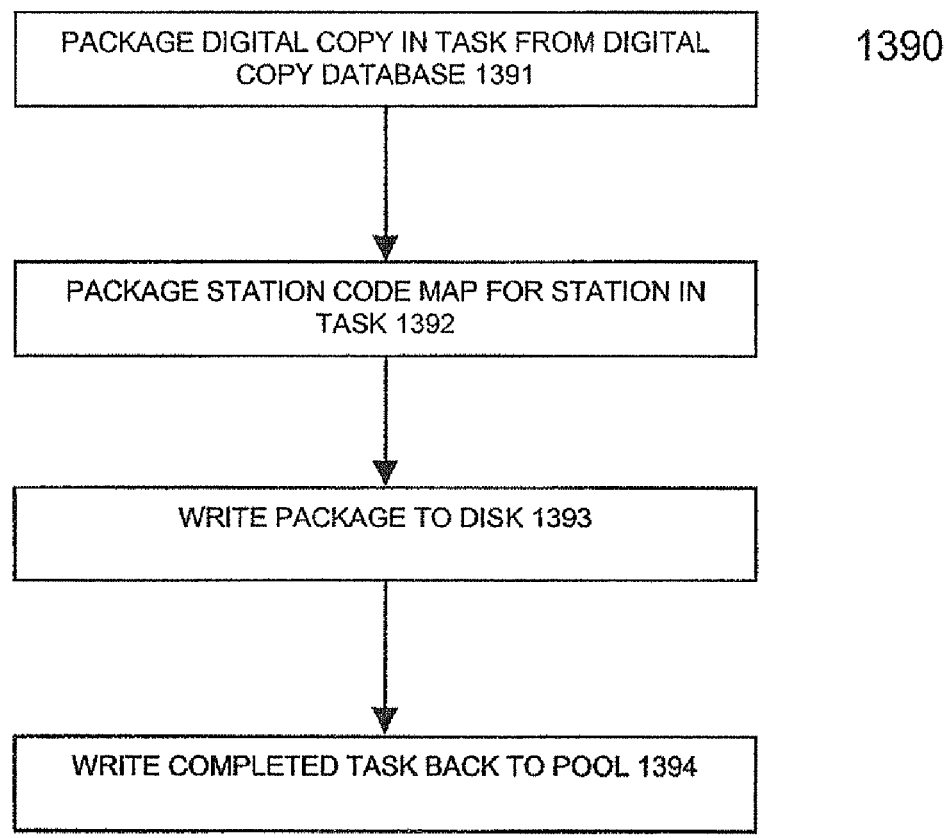

FIG. 13J depicts an exemplary process 1390 for completing a digital copy task. The process 1390 begins with a worker server 1302 packaging digital copy in a task from a digital copy database (step 1391). The worker server packages a station cut map for a station in the task (step 1392). The worker server 1302 next writes the package to memory (step 1393) and writes the completed task back to the pool (step 1394).

Figure 13K:
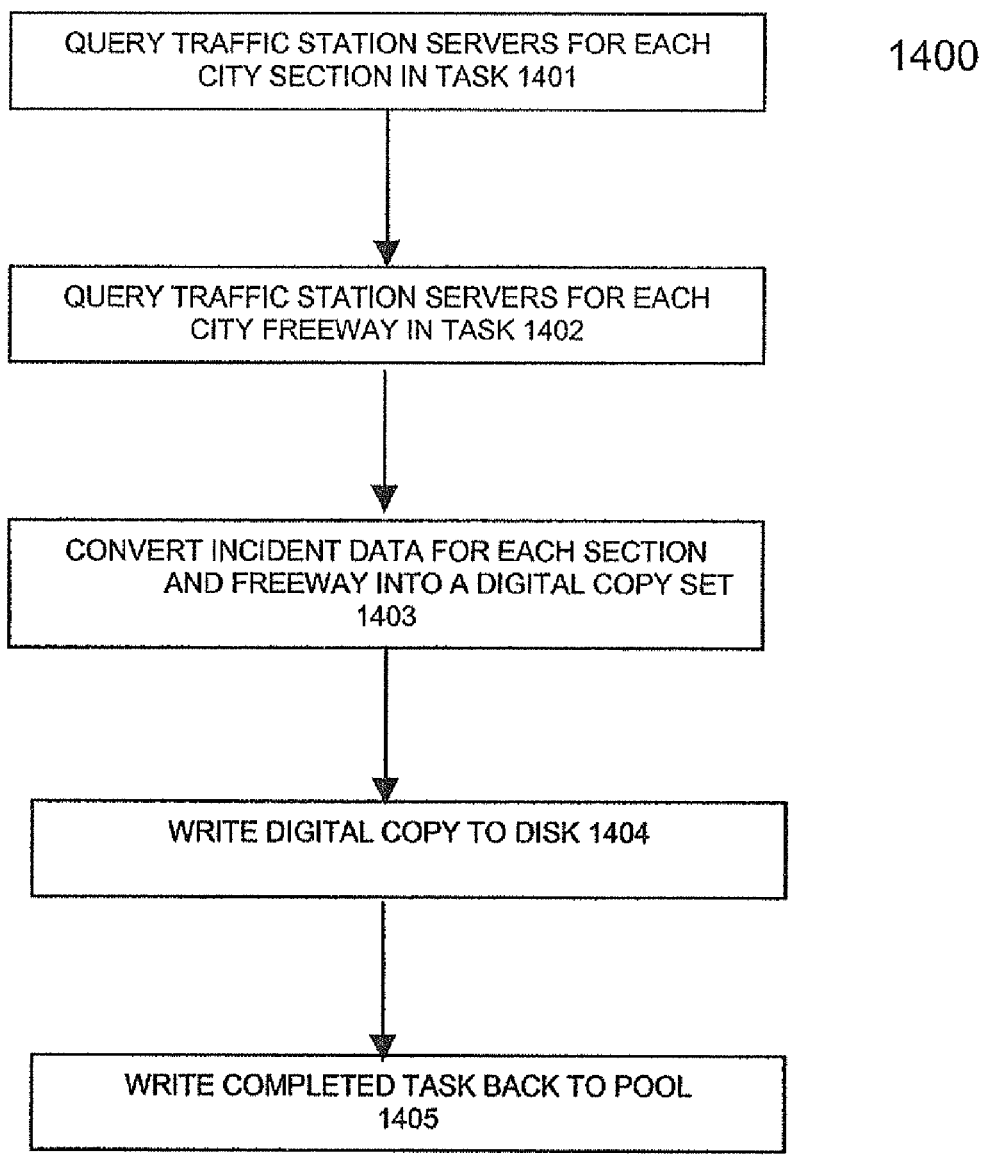

FIG. 13K depicts an exemplary process 1400 for completing a packaging of traffic data in response to a task. The process 1400 begins when a worker server 1302 queries traffic station servers for each city section in a task (step 1401). The traffic station servers are further queried each city freeway in a task (step 1402). Incident data for each section and freeway is converted into a digital copy set (step 1403) and written to memory (step 1404), The worker server 1302 then writes the completed task to the pool (step 1405).

Figure 13L:
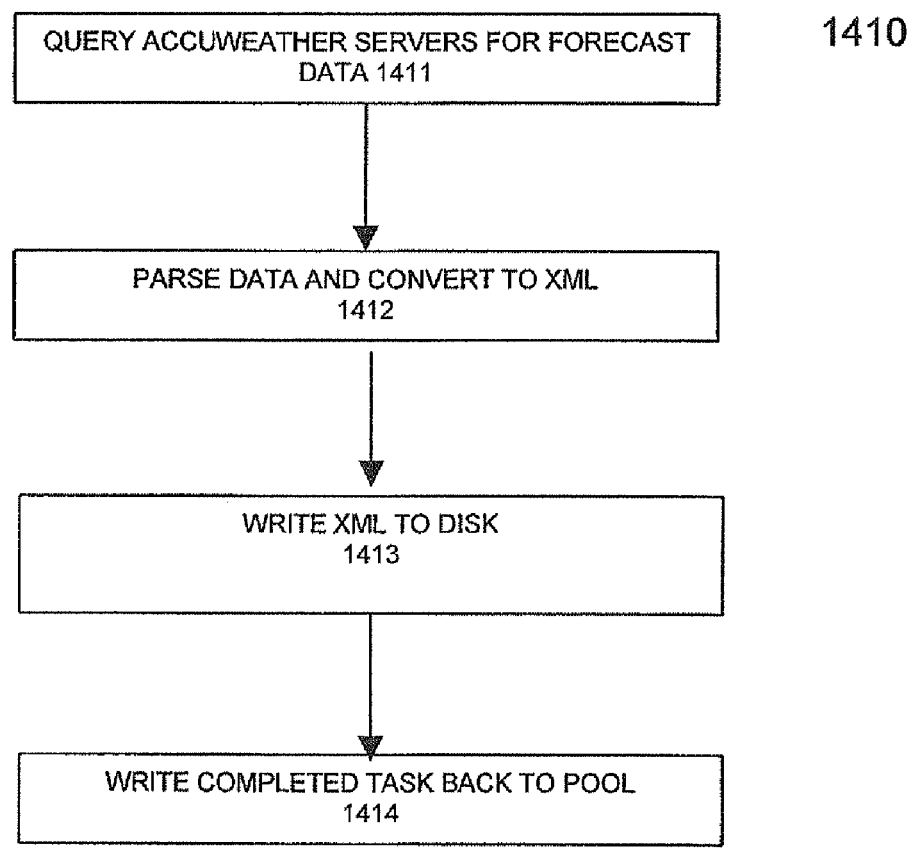

FIG. 13L depicts an exemplary process 1410 for completing a packaging of accuweather data in response to a task. The process 1410 begins when a worker server 1302 queries accuweather server for forecast data (step 1411). The retrieved data is parsed and converted, for example, to XML (step 1412). The XML data is written to memory (step 1413) and the worker server 1302 writes the completed task back to the pool (step 1414).

Figure 13M:
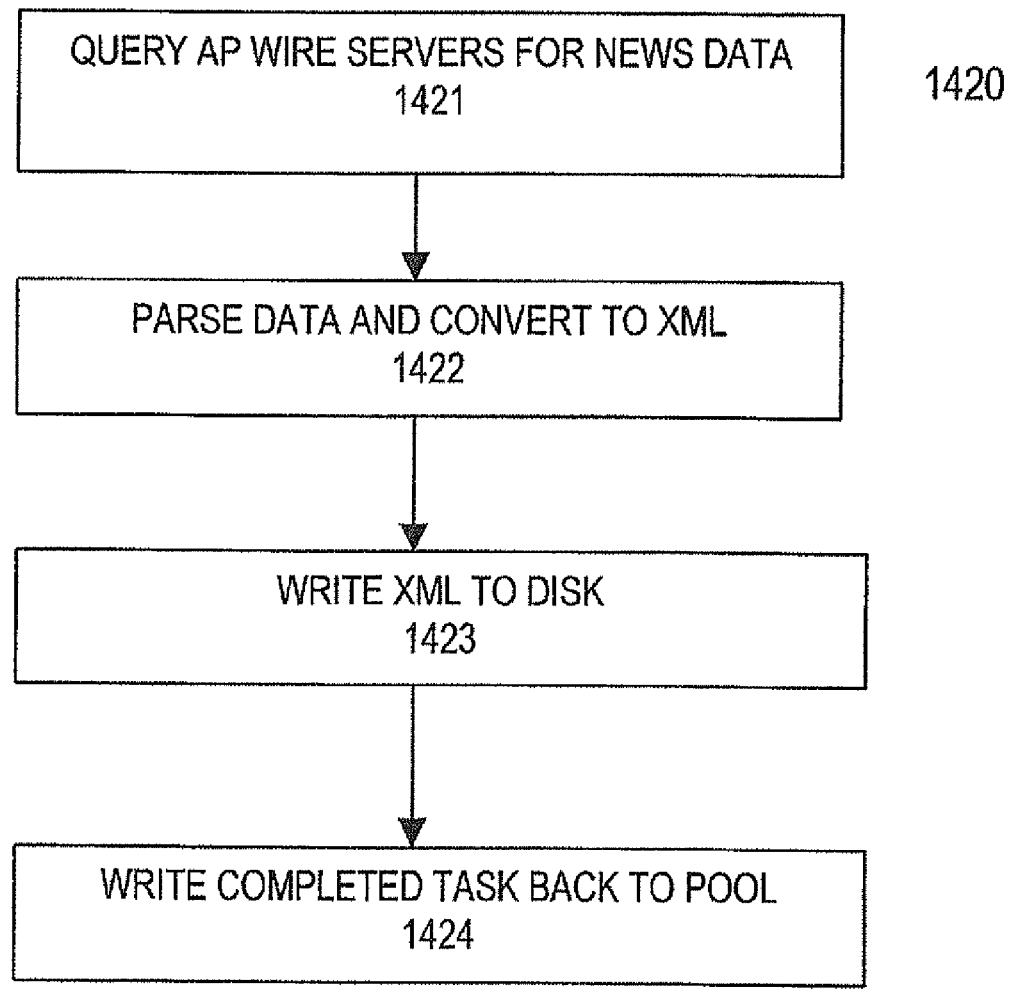

FIG. 13M depicts an exemplary process 1420 for completing a packaging of news data in response to a task. The process 1420 begins when a worker server 1302 queries, for example, an AP wire server for news data (step 1421). The received data is parsed and convert to a standard, e.g. an XML, schema (step 1422). The XML data is written to memory (step 1423) and the worker server 1302 writes the completed task back to the pool (step 1424).

FIG. 13N depicts an exemplary standard XML schema for packaging of general data, traffic data, weather data, and news data as described above. The schema may be used to format appropriate supplemental digital data for transmission to a broadcaster.

FIGS. 14A-14M illustrate the exemplary hardware and processes used for handling content received from third party content providers (e.g. news, traffic and weather data providers) in conjunction with the present invention.

Figure 14A:
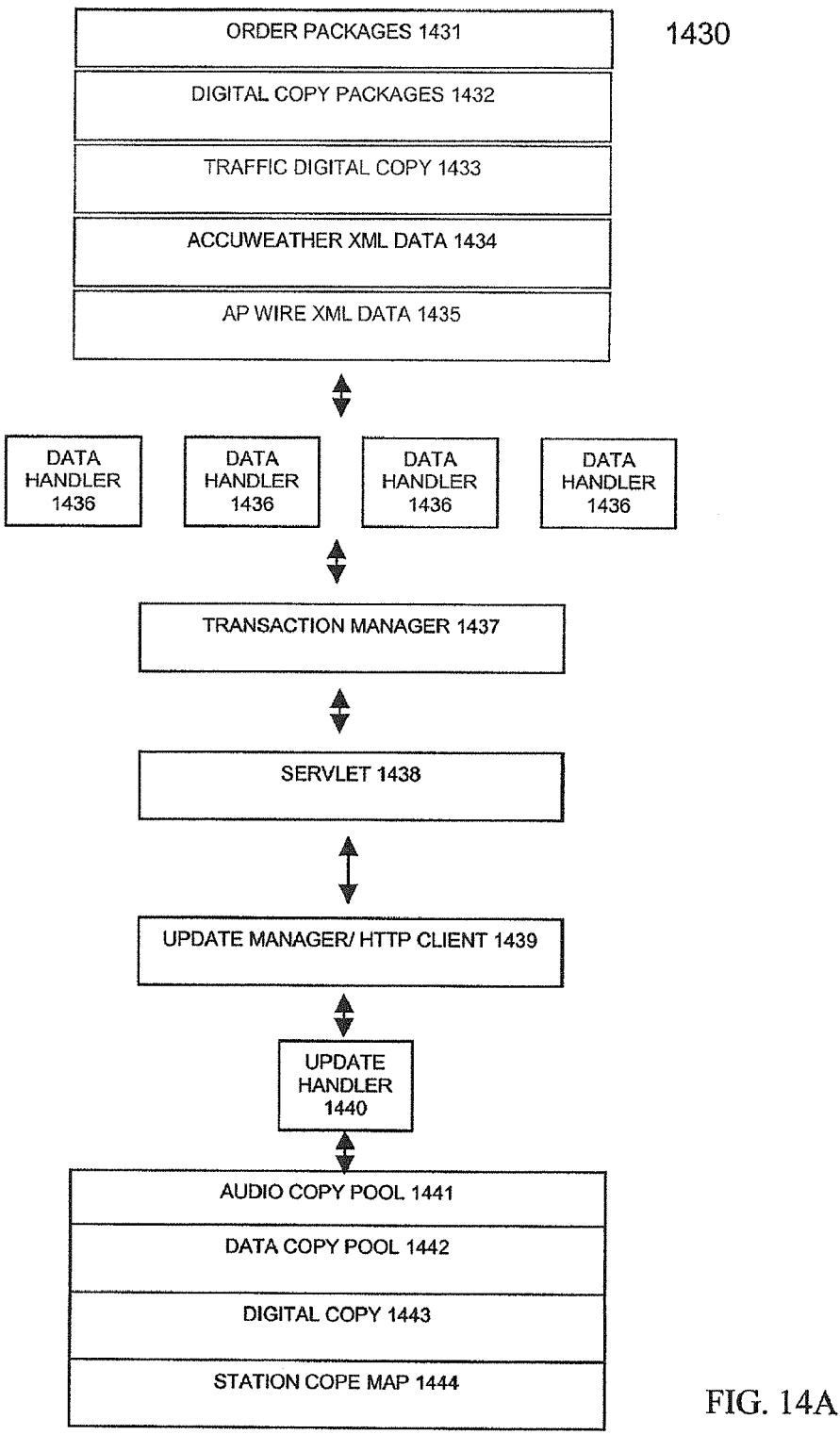

FIG. 14A shows a computing environment 1430 in which the transfer of such data from the third party provider to the supplemental digital data provider may be performed. The following data may be stored by the supplemental digital data provider: order packages 1431, digital copy packages 1432, traffic digital copy 1433, accuweather XML data 1434, AP wire XML data 1435. Such data may be retrieved and stored by one or more data handler servers 1436. A transaction manager server 1437 in conjunction with a servlet 1438 may communicate with an update manager/HTTP client 1439 and an update handler server 1440. The update handler may maintain an audio copy pool 1441, a data copy pool 1442, a digital copy 1443 and a station cut map 1444. The functions performed by each of these devices are described further with respect to FIGS. 14B-14K below.

Figure 14B:
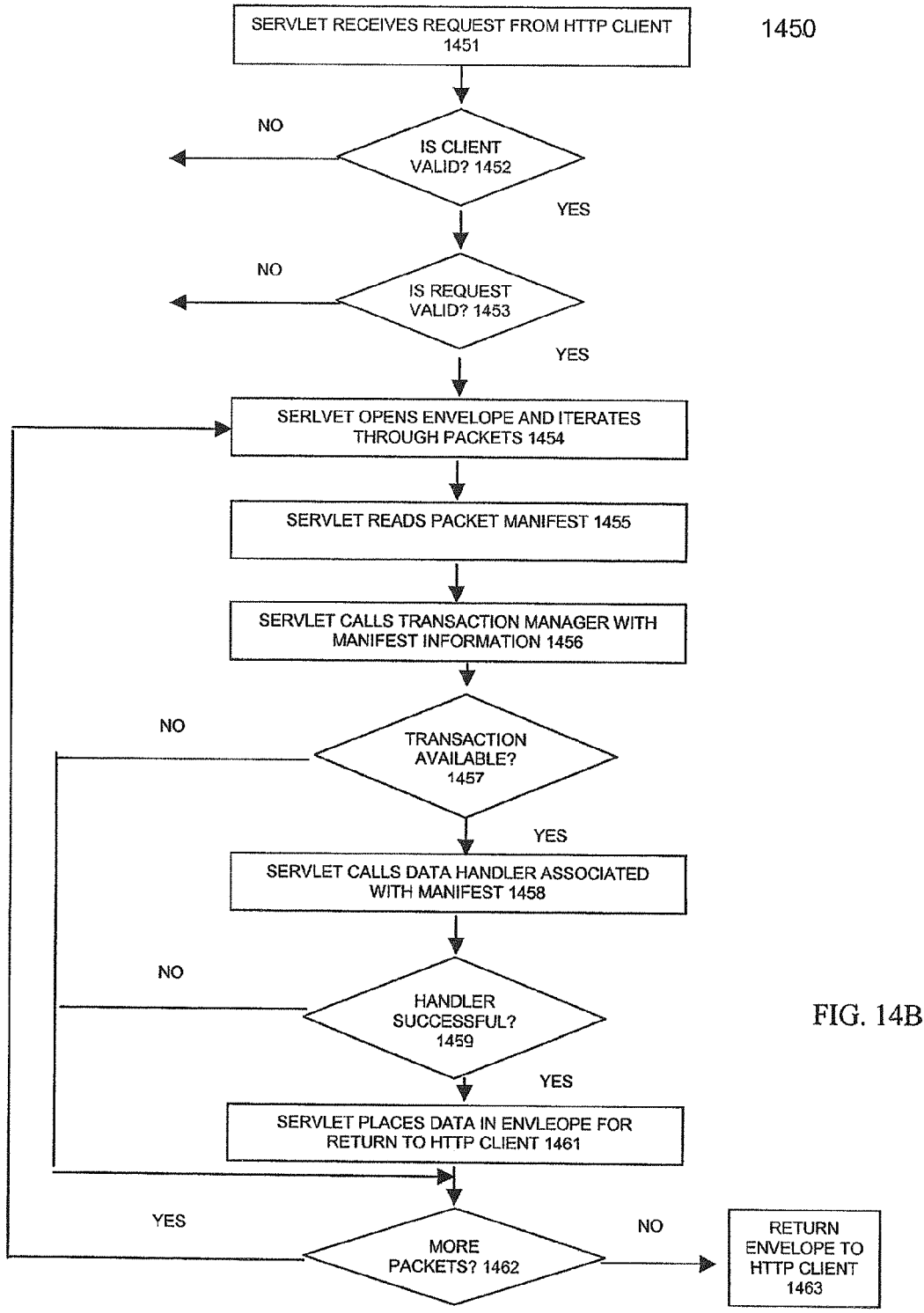

FIG. 14B depicts an exemplary process 1450 for handling envelopes and packets containing requests for supplemental digital data. The process 1450 begins when a servlet receives a request from an HTTP client (step 1451). The servlet first confirms that client is valid (step 1452) and that the request valid (step 1453). If either of these conditions are not true, the request is ignored. Otherwise, the process 1450 continues with the servlet opening the envelope and iterating through the packages containing the requests for data (step 1454). Exemplary schema for envelopes and packets are presented in FIGS. 14L and 14M. The servlet then reads each packet manifest (step 1455) and calls on the transaction manager with the manifest information (step 1456). The servlet then determines if the transaction manager 1437 is available (step 1457). If not, the packet is ignored. Otherwise, the servlet calls one of the data handlers 1436 associated with the data requested in the packet manifest (step 1458). If the handler is successful (step 1459), the servlet places the retrieved data in an envelope for return to the HTTP client (step 1461). Otherwise, the packet is ignored. The servlet then determines whether more packets are to be fulfilled (step 1462). If not, the envelope is then returned to the HTTP client (step 1463). Otherwise, the process 1450 returns to step 1454 above.

Figure 14C:
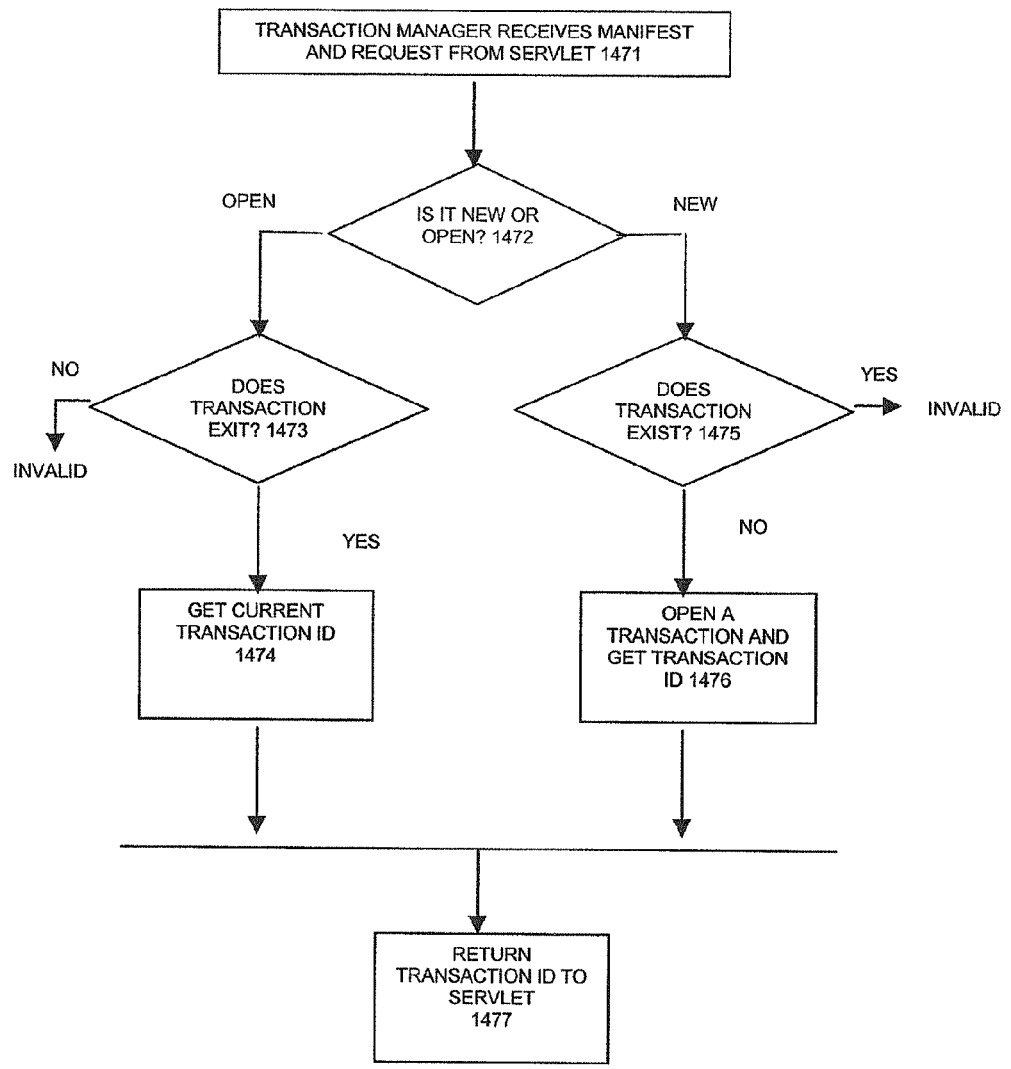

FIG. 14C depicts an exemplary process 1470 performed by the transaction manager 1437 for handling requests from the servlet 1438. The process 1470 begins with the transaction manager receiving a manifest and a request from servlet 1438 (step 1471). The transaction manager then determines whether the packet is new or previously opened and pending (step 1472). If the packet is open, the transaction manger next determines whether the requested transaction exists (step 1473). If not, the request is considered invalid and is ignored. Otherwise, the transaction manager gets a current transaction ID (step 1474) and returns the transaction ID to the servlet (step 1477), after which the process 1470 ends.

Returning to step 1472, if the packet is new, the transaction manager determines whether the requested transaction exists (step 1475). If so, the request is considered invalid and is ignored. Otherwise, the transaction manager opens a transaction and gets transaction ID (step 1476). The transaction ID is then returned to the servlet (step 1477), after which the process 1470 ends.

Figure 14D:
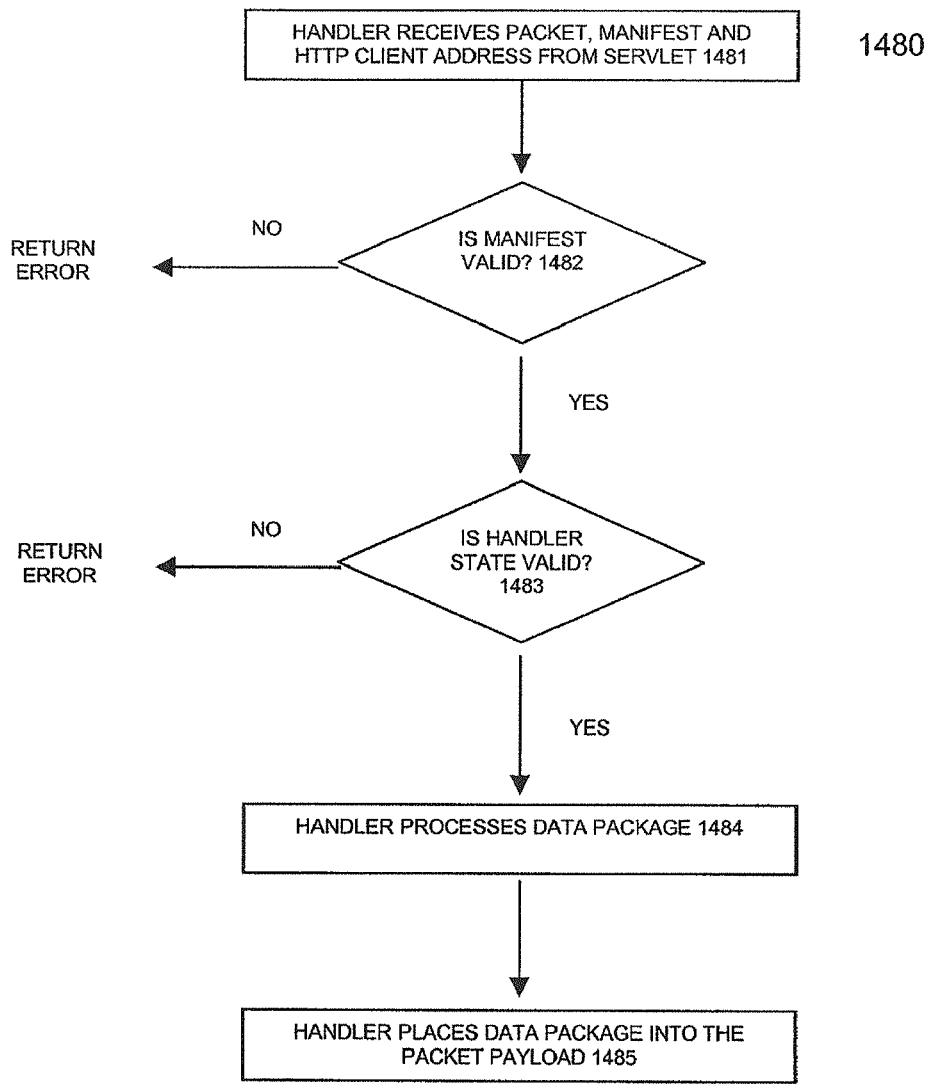

FIG. 14D depicts an exemplary process 1480 performed by the data handler 1436 to retrieve requested data. The process 1480 begins when the handler receives packet, manifest and HTTP client address from the servlet through the transaction manager (step 1481). The handler determines if the manifest is valid (step 1482) and if the handler state is valid (step 1483). If either of these conditions are not true, the request in the manifest is ignored. Otherwise, the handler processes data package (step 1484) and places data package into the package payload (step 1485), after which the process 1480 ends.

Figure 14E:
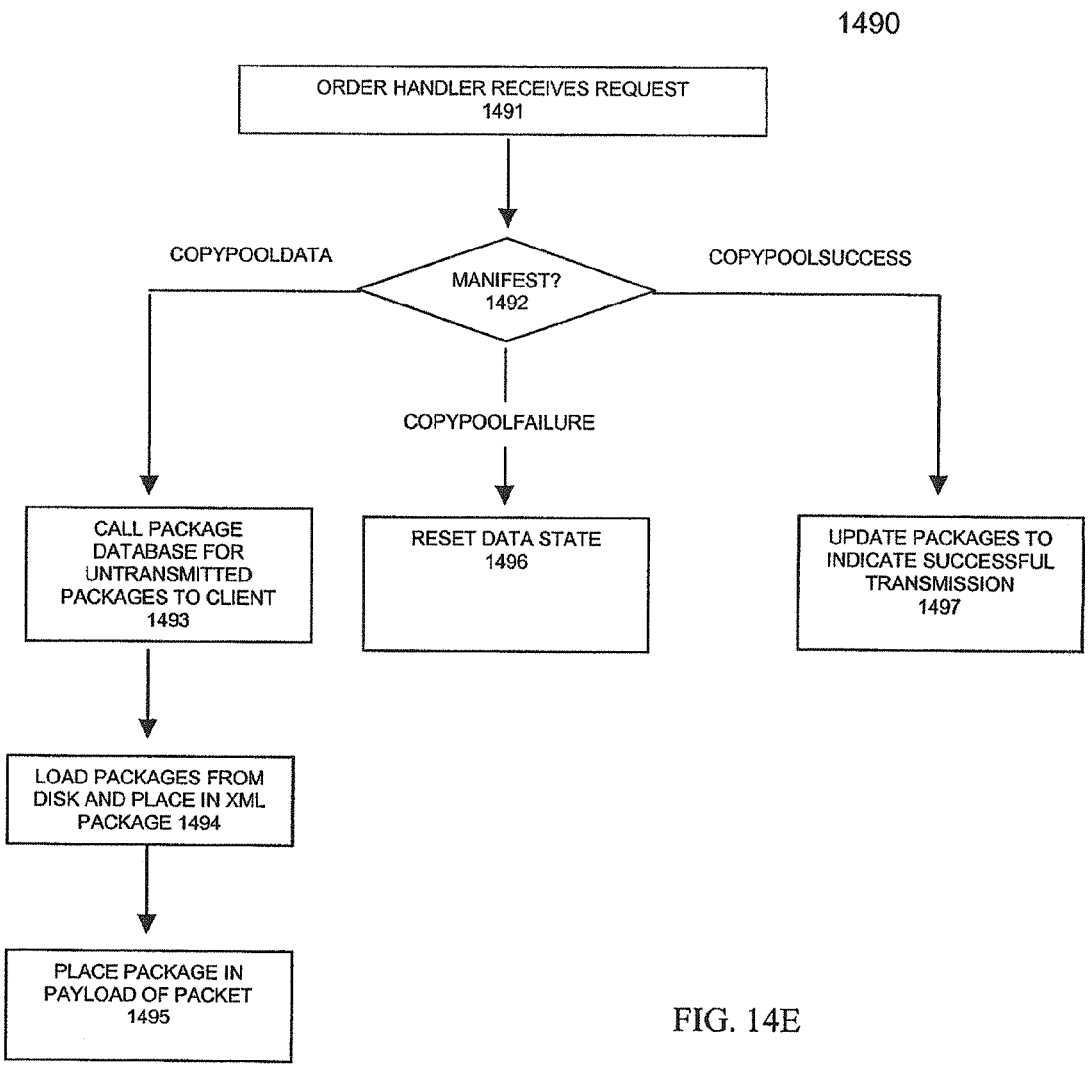

FIG. 14E depicts an exemplary process for order and data scheduling performed by a general data handler 1436. The process 1490 begins when an order handler receives a request (step 1491). The manifest associated with the request is checked to determine whether the manifest relates to a request for data, a failure of a previous request for data or a success in retrieving data (step 1492). If the manifest contains a request for data, the process 1490 continues to step 1493 where a package database is called for any untransmitted packages to the HTTP client. The packages are loaded from memory and placed in an XML package (step 1494). The XML package is then placed in a payload of packet corresponding to the manifest (step 1495), after which the process 1490 ends.

Returning to step 1492 above, if the manifest relates to a failure in retrieving data, the data state for the requested data is reset to allow for a subsequent request (step 1496), after which the process 1490 ends.

Returning again to step 1492 above, if the manifest contains an indication of a success in retrieving data, the handler updates the packages to indicate successful transmission (step 1497), after which the process 1490 ends.

Figure 14F:
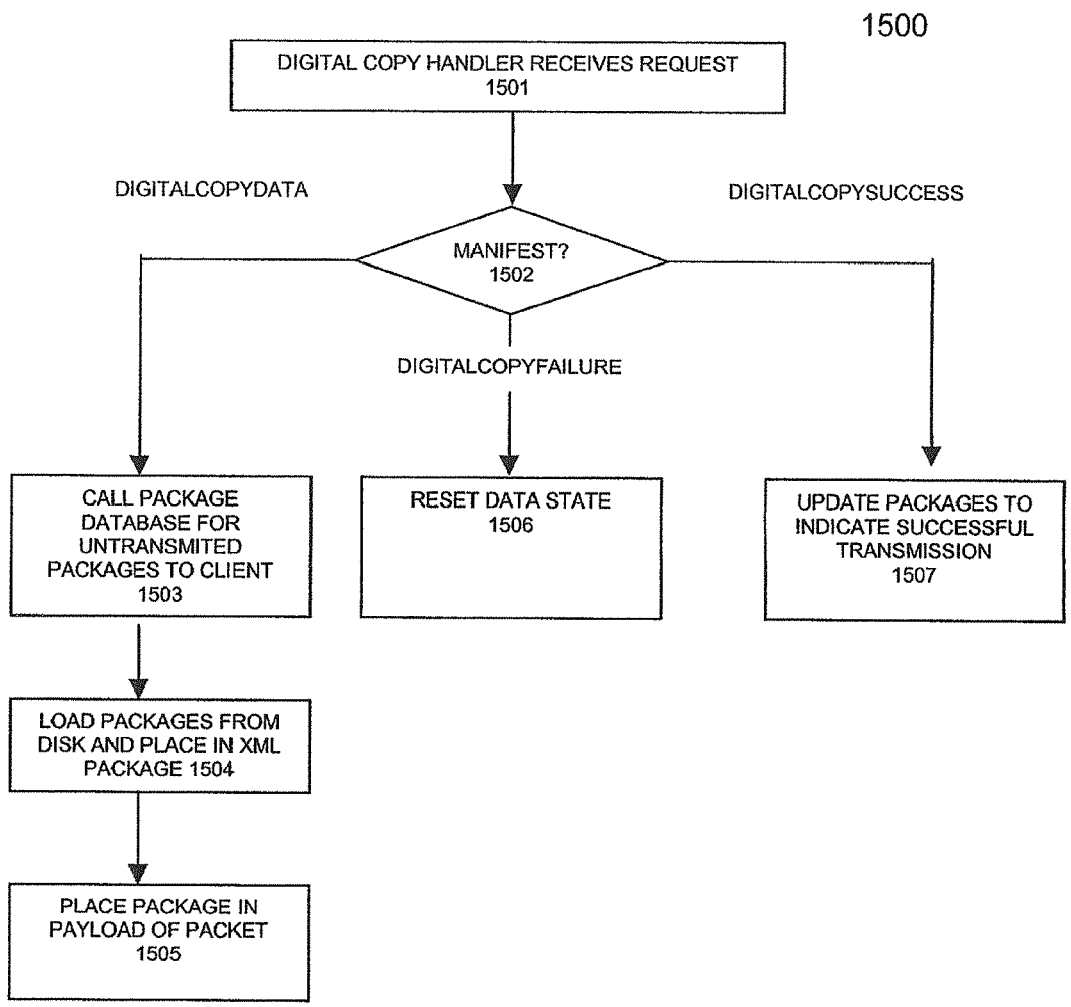

FIG. 14F depicts an exemplary process 1500 performed by a digital copy handler 1436. The process 1500 begins when a digital copy handler receives a request (step 1501). The manifest associated with the request is checked to determine whether the manifest relates to a request for data, a failure of a previous request for data or a success in retrieving data (step 1502). If the manifest contains a request for data, the process 1502 continues to step 1503 where a package database is called for any untransmitted packages to the HTTP client. The packages are loaded from memory and placed in an XML package (step 1504). The XML package is then placed in a payload of packet corresponding to the manifest (step 1505), after which the process 1500 ends.

Returning to step 1502 above, if the manifest relates to a failure in retrieving data, the data state for the requested data is reset to allow for a subsequent request (step 1506), after which the process 1500 ends.

Returning again to step 1502 above, if the manifest contains an indication of a success in retrieving data, the handler updates the packages to indicate successful transmission (step 1507), after which the process 1500 ends.

Figure 14G:
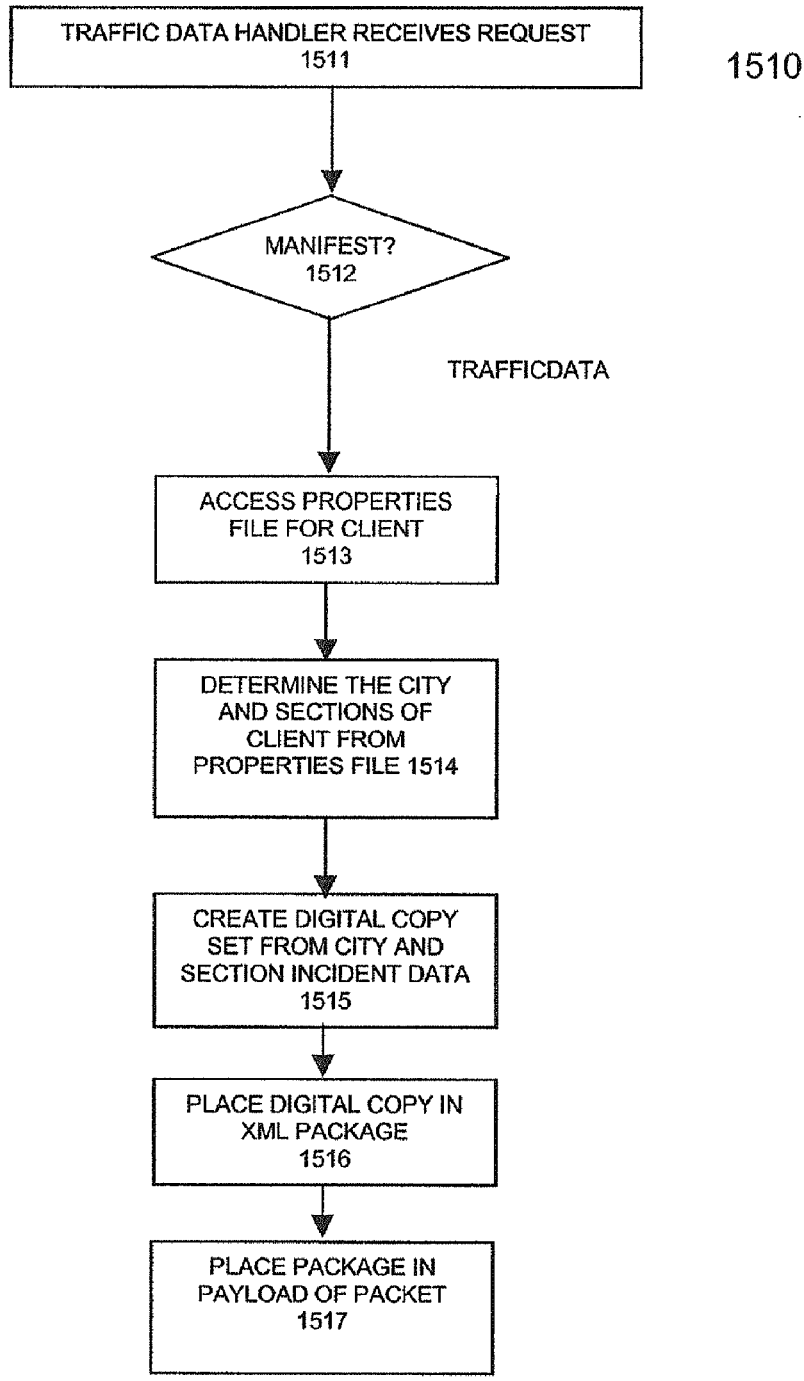

FIG. 14G describes an exemplary process 1510 performed by a traffic data handler 1436. The process 1510 begins when a traffic data handler receives a request for data (step 1511). The request is examined to determine whether a manifest exists (step 1512). The handler then accesses properties file for the requesting client (step 1513), determines the city and sections of client from properties file (step 1514), create digital copy set from retrieved city and section incident data (step 1515), places a digital copy in an XML package (step 1516) and place package in payload of packet (step 1517), after which process 1510 ends.

Figure 14H:
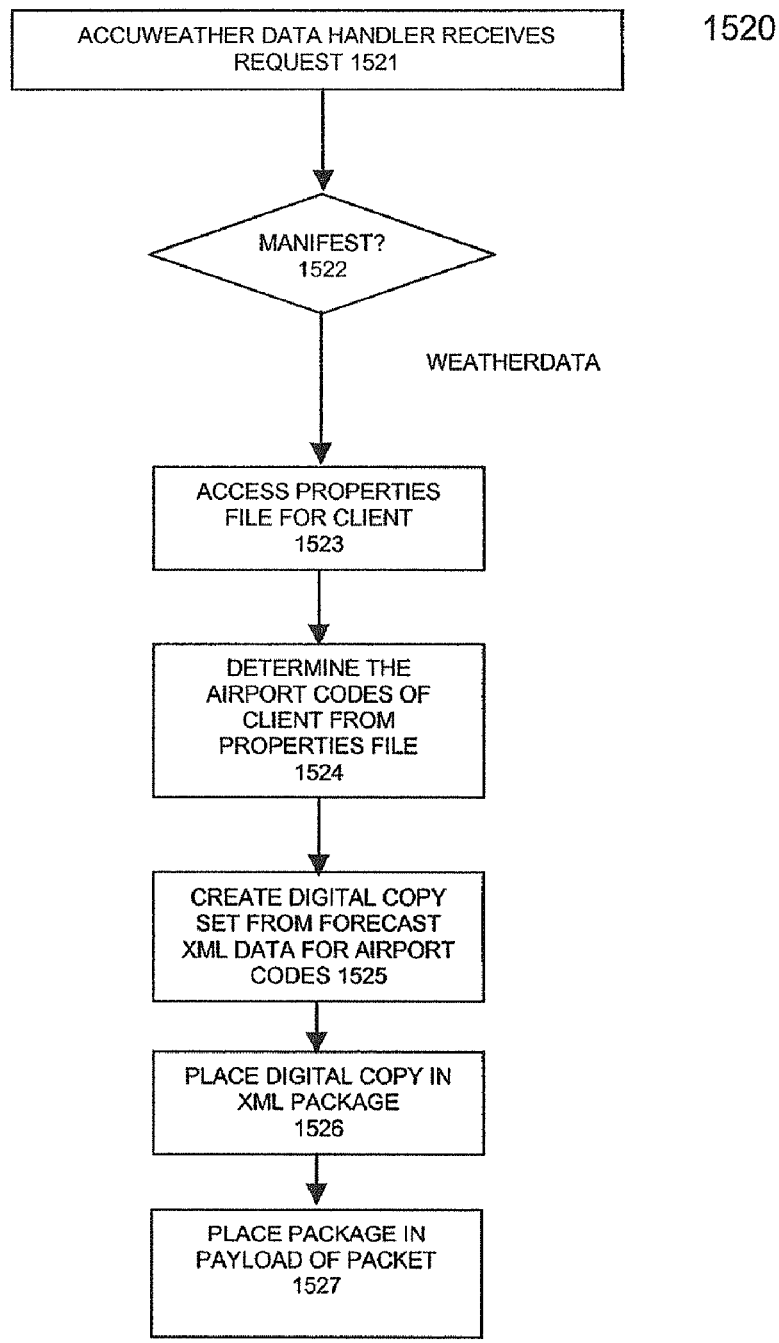

FIG. 14H depicts an exemplary process 1520 performed by a weather data handler. The process 1520 begins when the weather data handler receives a request for data from a client (step 1521). The request is examined to determine whether a manifest exists (step 1522). The handler then accesses a properties file for the requesting client (step 1523), determines the airport codes of the client from the properties file (step 1524), creates a digital copy set from forecast XML data for the respective airport codes (step 1525), places the digital copy in an XML package (step 1526) and places the package in a payload of packet (step 1527), after which the process 1520 ends.

Figure 14I:
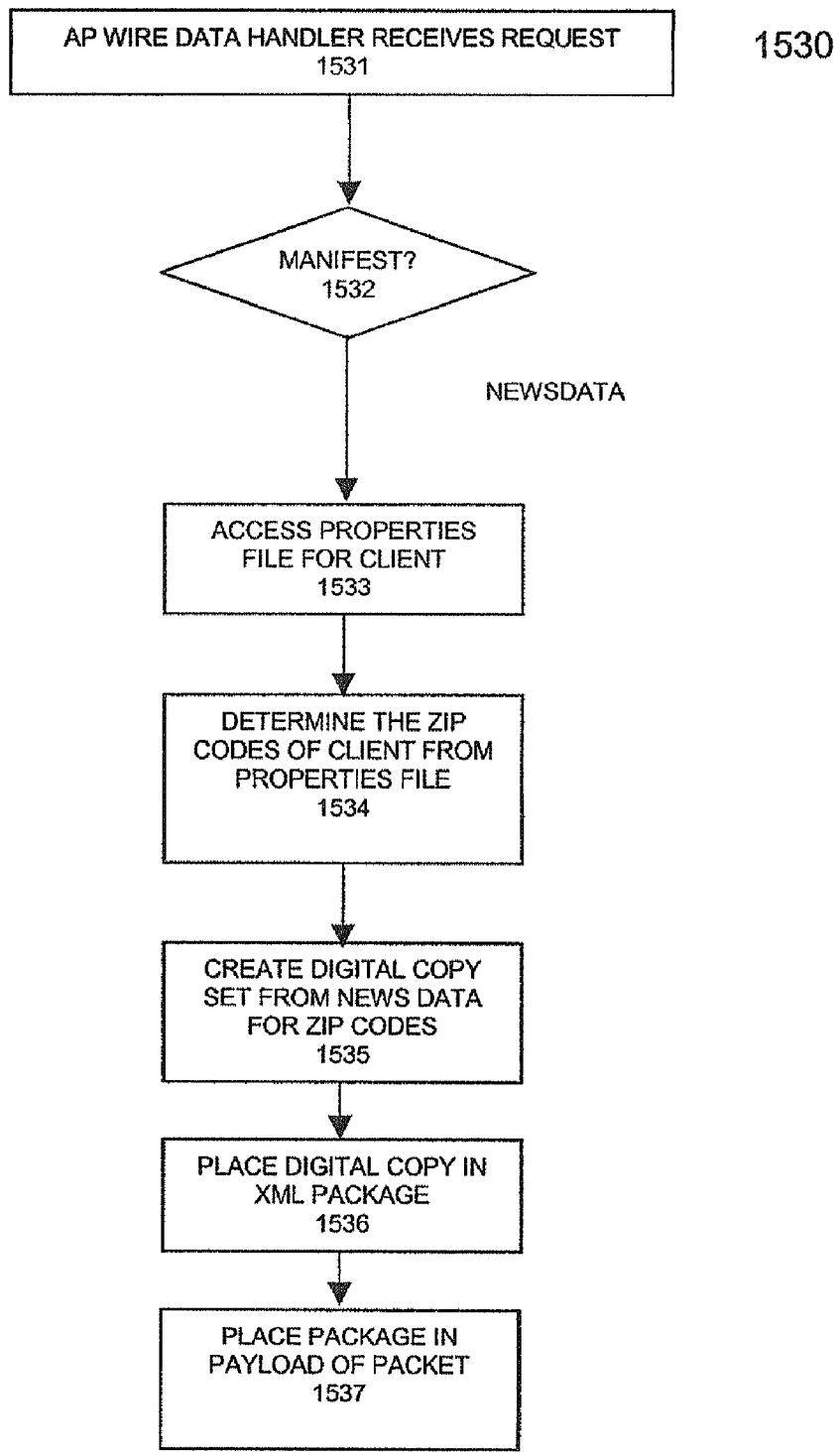

FIG. 14I depicts an exemplary process 1530 performed by a news data handler 1436. The process 1530 begins when the news data handler receives a request from a client (step 1531). The request is examined to determine whether a manifest exists (step 1532). The data handler then accesses a properties file for the requesting client (step 1533), determines the zip code of the client from the properties file (step 1534), creates a digital copy set from news data for the respective zip code (step 1535), places the digital copy in an XML package (step 1536) and places the package in a payload of the packet (step 1537), after which process 1530 ends.

Figure 14J:
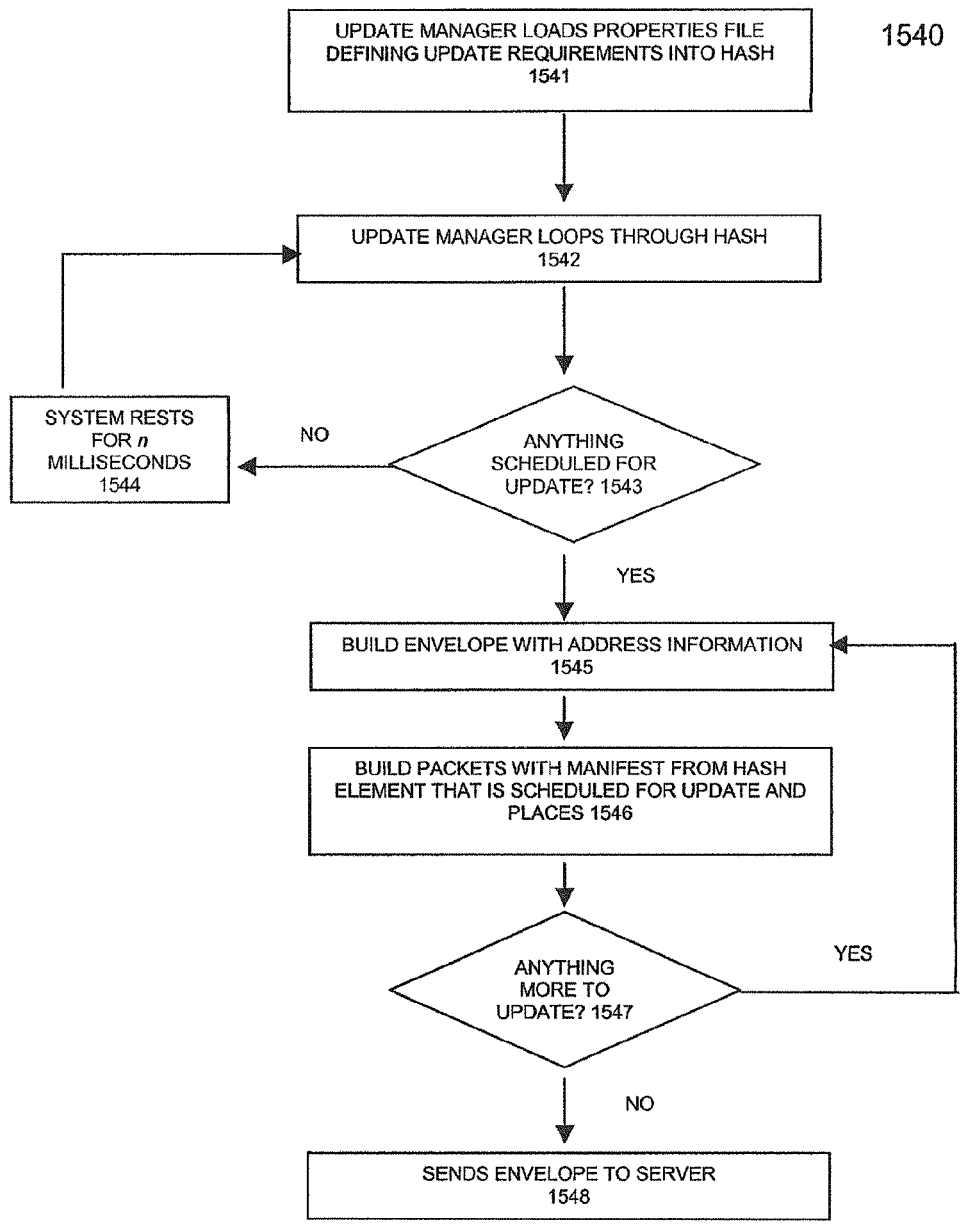

FIG. 14J depicts an exemplary process 1540 for updating stored data. The process 1540 begins when an update manager loads a properties file defining update requirements for a client into a hash (step 1541). The update manager loops through the hash (step 1542) to determine whether any information is scheduled for update (step 1543). If not, the process continues to step 1544 where the system resets for n milliseconds (step 1544) then returns to step 1542 above.

If, on the other hand, there is a scheduled update, the update manager builds an envelope with address information (step 1545), builds packets with manifest from a hash element that is scheduled for update (step 1546) and determines whether there is any more data to update for this client (step 1547). If so, the process returns to step 1545 above. Otherwise, the update manager sends the envelope to the requesting client (step 1548), after which the process 1540 ends.

FIG. 14J1 depicts an exemplary process 1550 for handling returned requests. The process 1550 begins when the update manager receives a returned request from the servlet (step 1551). The update manager reads the envelope and loops through the enclosed packets (step 1553). The update manager then calls the update handler associated with the returned request (step 1554). If the packet is still open with the update handler (step 1555), the update manager places the packet back in the envelope (step 1556) and determines whether more packets exists (step 1557). If so, the process returns to step 1553 above. Otherwise, the update manager determines if the envelope is empty (step 1558). If the envelope is not empty, it is resent to the server (step 1559). If, on the other hand, the envelope is empty, the process returns to step 1551 above.

Figure 14K:
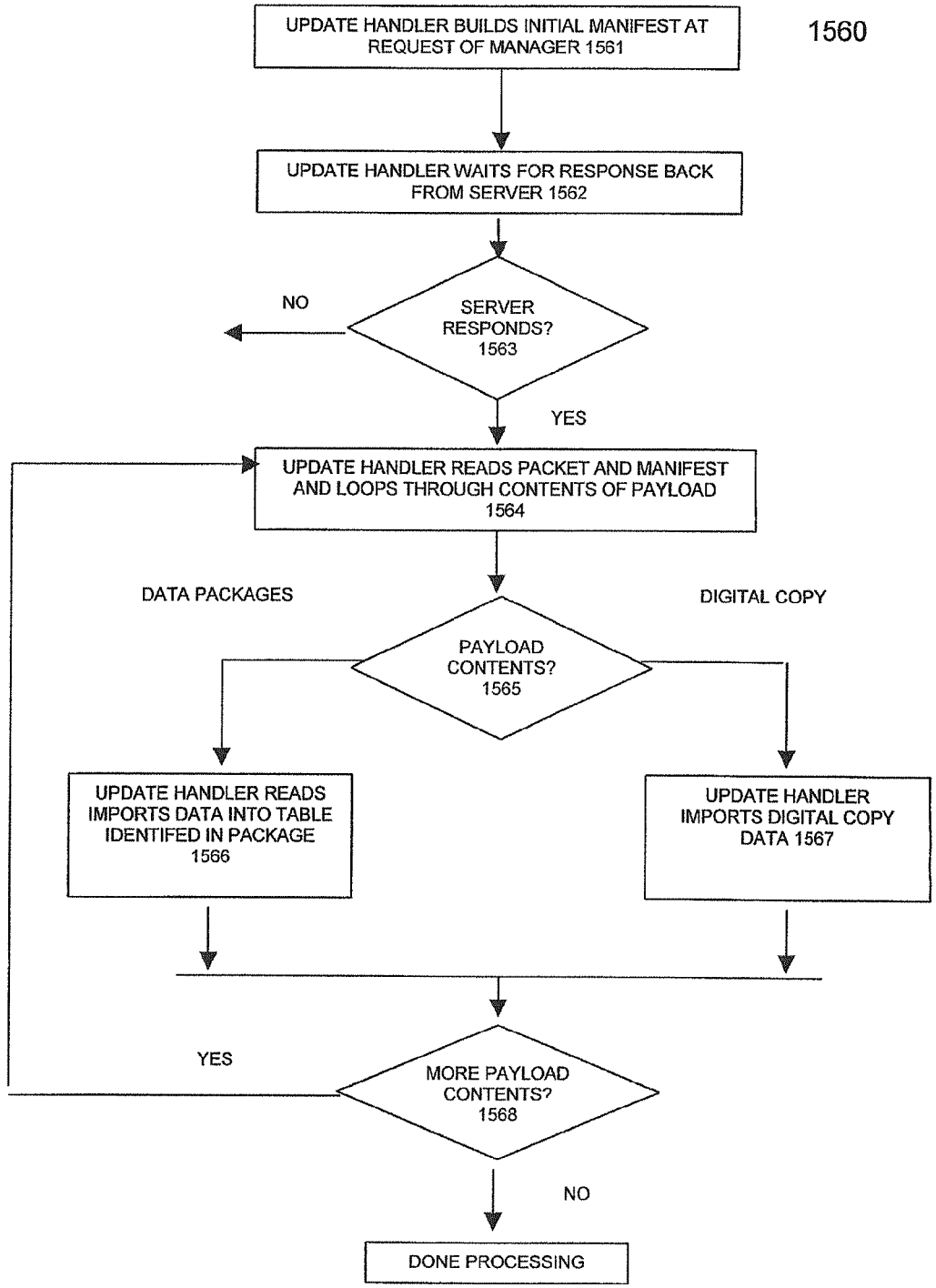

FIG. 14K depicts an exemplary process performed by an update handler 1436. The process 1560 begins when the update handler builds an initial manifest at the request of the update manager (step 1561). The update handler waits for a response back from the server (step 1562). If the server responds (step 1563), the update handler reads any packet and manifest and loops through contents of the payloads therein (step 1564). The payload content is examined to determine whether the payload contains data packages or digital copy (step 1565). If it contains data packages, the update handler imports data into the database identified in the package (step 1566). If the data contains digital copy, the update handler imports digital copy data (step 1567). The update handler then determines whether there are more payload contents (step 1568). If so, the process 1560 returns to step 1564 above. Otherwise, the process 1560 ends.

Figure 15A:
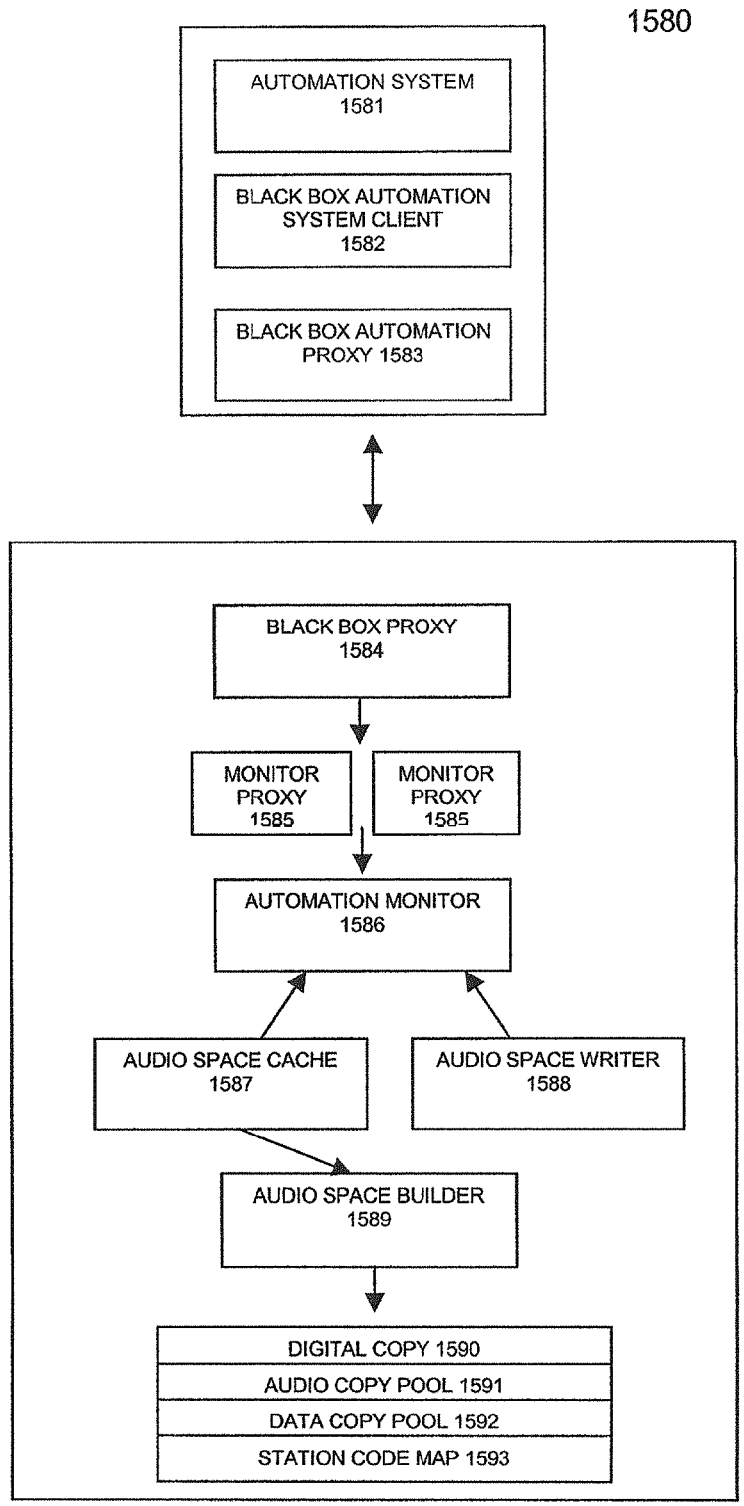
FIGS. 15A-15J illustrate the exemplary hardware and processes performed by a blackbox according to the present invention.

FIGS. 15A-15J illustrate the exemplary hardware and processes performed by a blackbox according to the present invention. Referring to FIG. 15A, a blackbox 1580 may be located at a plurality of broadcaster locations to receive supplemental digital data from a provider. The blackbox 1580 may contain the following hardware and software components: an automation system 1581, a black box automation system client 1582, a black box automation proxy 1583, a black box proxy 1584, a monitor proxy 1585, an automation monitor 1586, an audio space cache 1587, an audio space writer 1588 and an audio space builder 1589 which in turn may access and store digital copy 1590, an audio copy pool 1591 a supplemental digital data copy pool 1592 and a station cut map 1593.

Figure 15B:
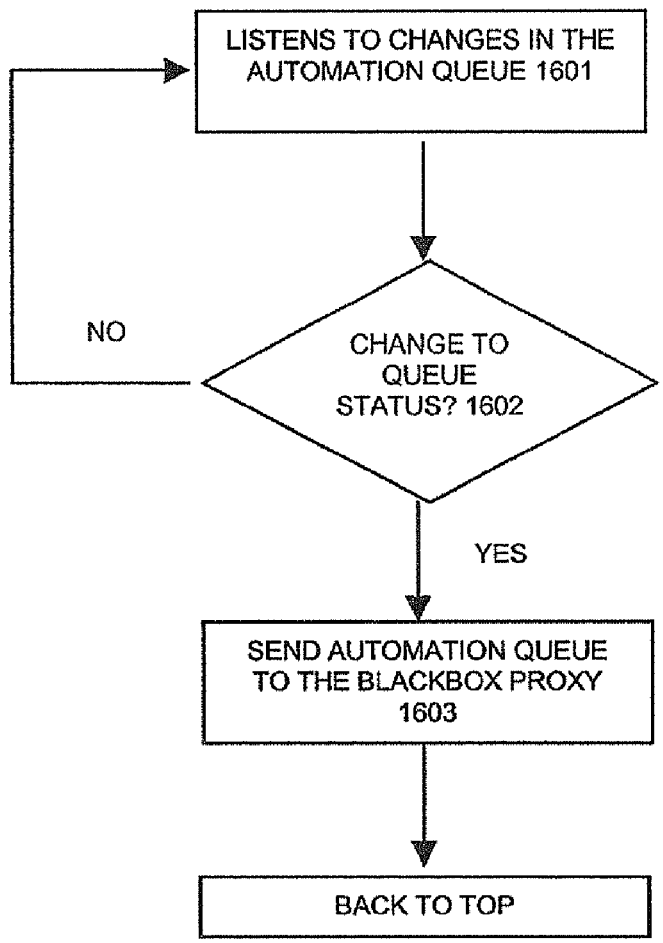

FIG. 15B depicts an exemplary process 1600 performed by the blackbox automation system client. The process 1600 includes "listening" for changes in the automation queue (step 1601). If there is a change in queue status (step 1602), the blackbox automation system client sends an automation queue to the blackbox proxy (step 1603) and returns to step 1601 above.

Figure 15C:
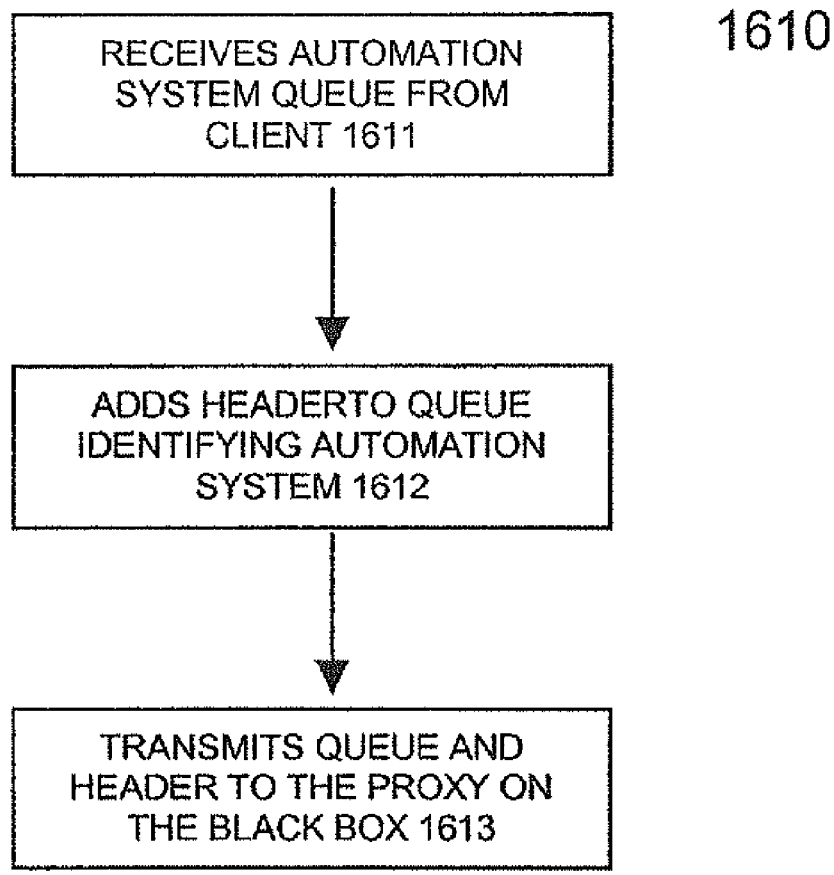

FIG. 15C depicts an exemplary process 1610 performed by the blackbox automation proxy. The process 1610 begins when the blackbox automation proxy receives an automation system queue from the client (step 1611). The blackbox automation proxy adds a header to the queue identifying the automation system (step 1612) and transmits the queue with the header to the blackbox proxy, after which the process 1610 ends.

Figure 15D:
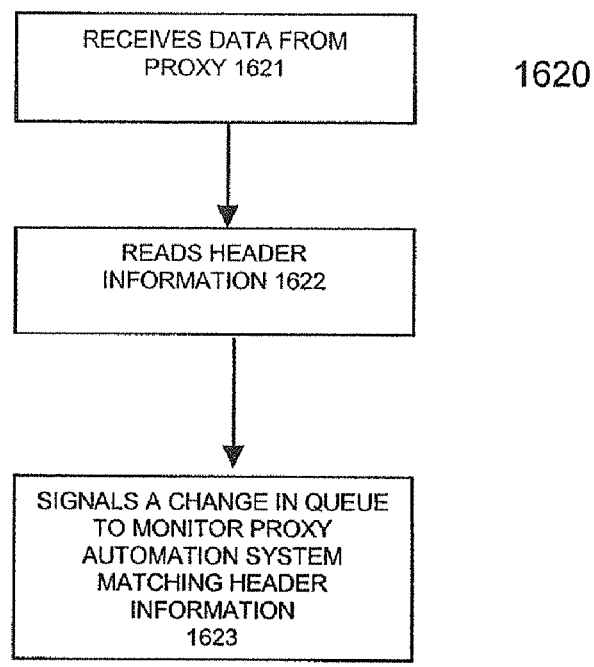

FIG. 15D depicts an exemplary process 1620 performed by the blackbox proxy. The process 1620 begins when the blackbox proxy receives data from the blackbox automation proxy (step 1621). The blackbox proxy reads header information (step 1622), signals a change in the queue to the monitor proxy automation system which matches the received header information (step 1623), after which the process 1620 ends.

Figure 15E:
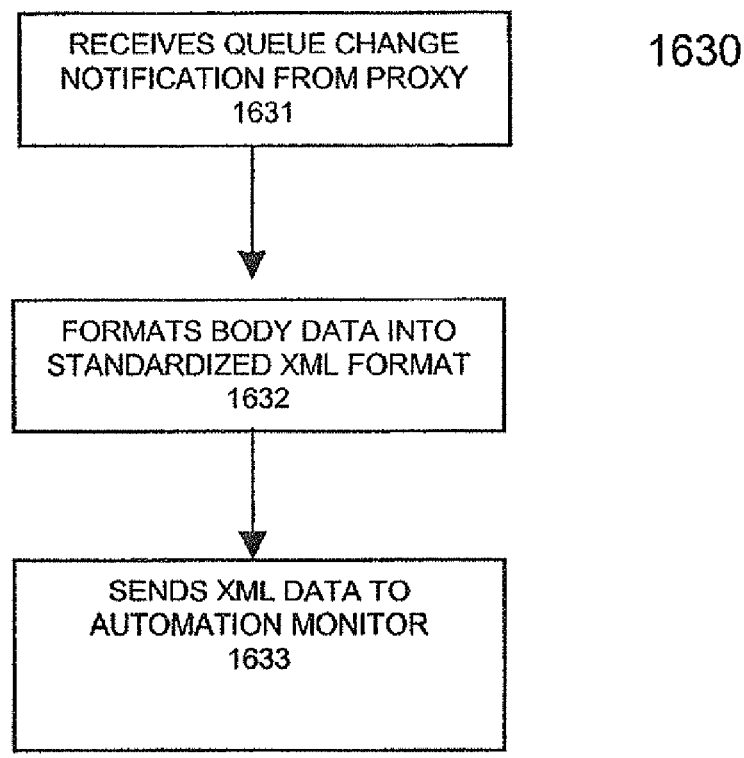

FIG. 15E depicts an exemplary process 1630 performed by the monitor proxy. The process 1630 begins when the monitor proxy receives a queue change notification from the blackbox proxy (step 1631). The monitor proxy formats body data into a standardized XML format (step 1632) and sends the XML data to the automation monitor (step 1633), after which the process 1630 ends.

Figure 15F:
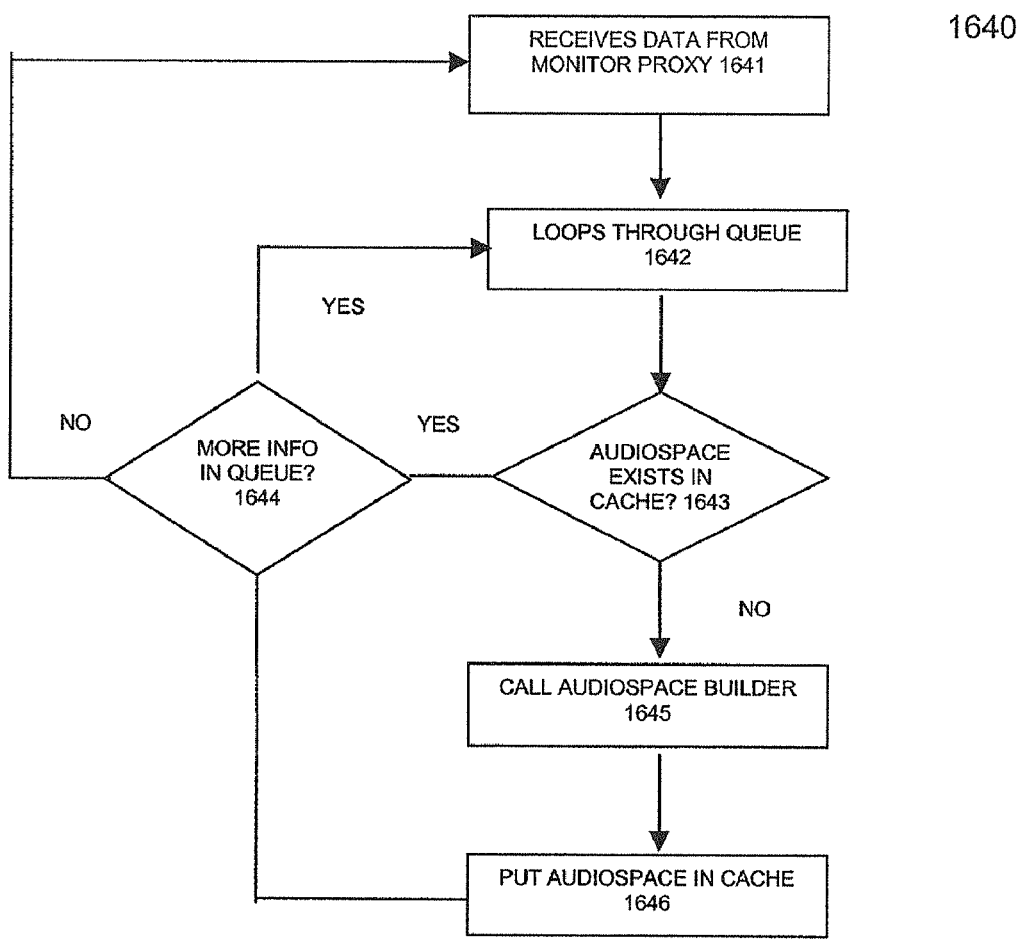

FIG. 15F depicts an exemplary process 1640 performed by the automation monitor. The automation monitor first receives data from the monitor proxy (step 1641), loops through the queue (step 1642) and determines whether an audiospace for the data exists in a cache (step 1643). If an audiospace exists, the automation monitor will determine whether there is more information in the queue (step 1644). If no more information exists in the queue, the process returns to step 1641. If there is more information, the process 1640 returns to step 1642.

Returning to step 1643, if no audiospace exists in the cache, the automation monitor calls the audiospace builder (step 1645) and thereafter puts the audiospace in cache (step 1646).

Figure 15G:
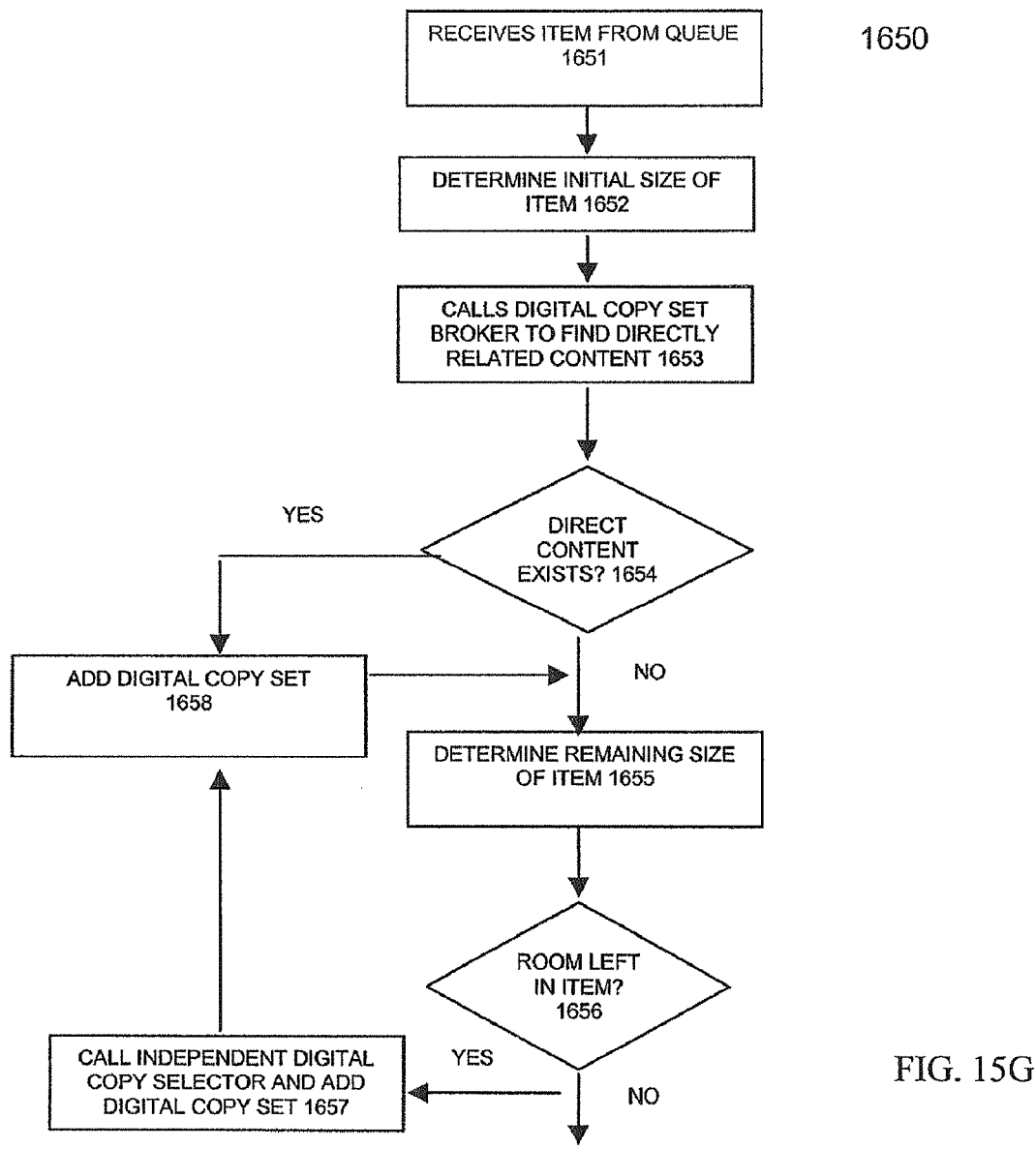

FIG. 15G depicts an exemplary process 1650 performed by the audiospace builder. The process 1650 begins when the audiospace builder receives an item from queue (step 1651). The audiospace builder determines an initial size of the item (step 1652), calls a digital copy set broker to find directly related content (step 1653) and determines whether direct content exists (step 1654). If direct content exists, it is added to the digital copy set (step 1658). Otherwise, the process 1650 continues to step 1655.

At step 1655, the audiospace builder determines a remaining size of the item (step 1655). If there is room left in the item (step 1656), it calls an independent digital copy selector and adds a digital copy set (step 1657).

Figure 15H:
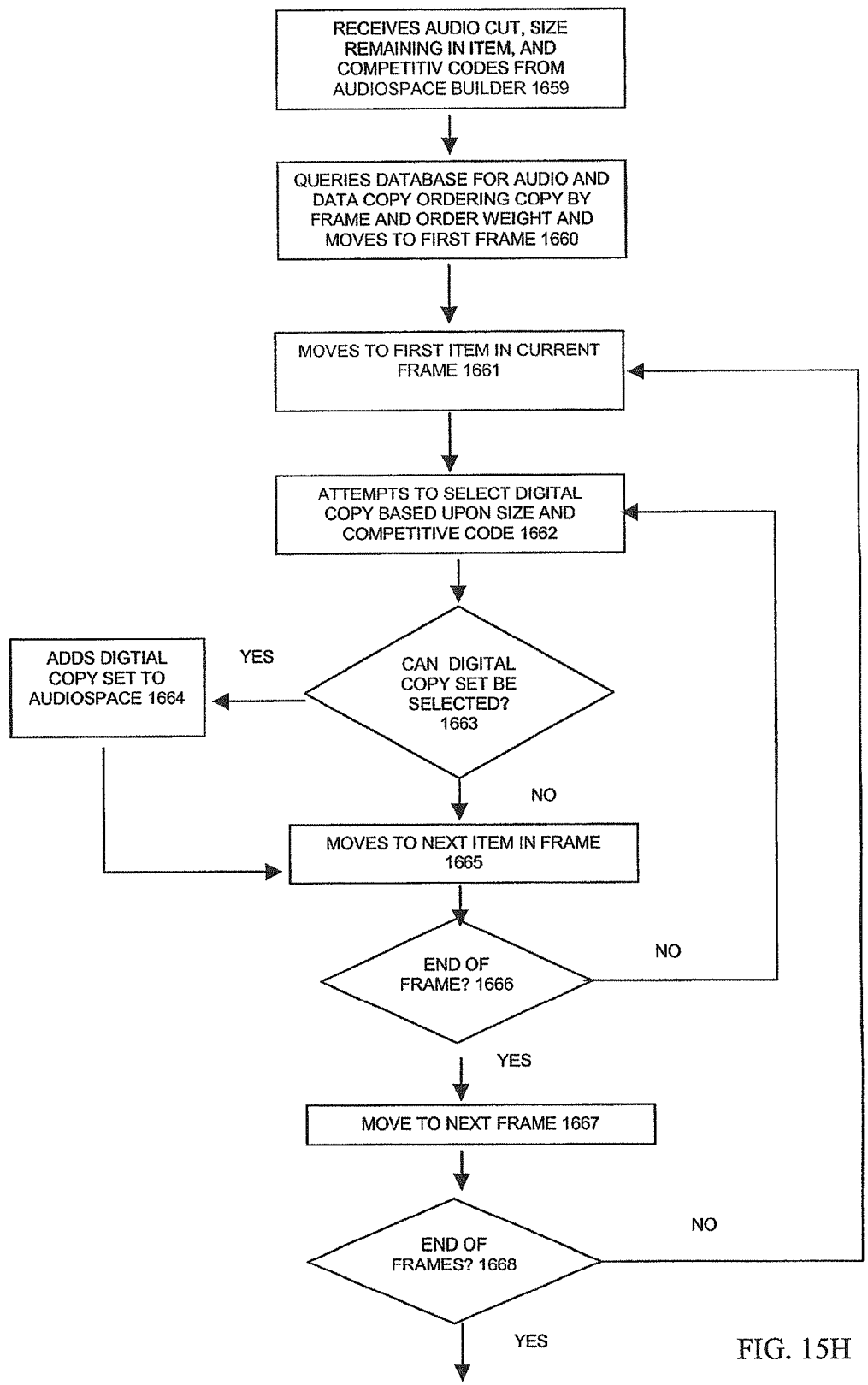

FIG. 15H depicts an exemplary process performed by the independent digital copy set selector. The process begins when the independent digital copy set selector receives an audio cut, a size remaining in an item and competitive codes from the audiospace builder (step 1659). The independent digital copy set selector then queries a database for audio and digital data copy and orders retrieved copy by frame and weight values (step 1660). The independent digital copy set selector then moves to a first item in the current frame (step 1661). The independent digital copy set selector attempts to select digital copy based upon size and competitive code (step 1662). The independent digital copy set selector then determines whether a digital copy set be selected (step 1663). If so, it adds the digital copy set to an available audiospace (step 1664). If not, it moves to a next item in the current frame (step 1665). If the end of the frame is reached, it moves on to the data in the next frame (step 1667). When no more frames exist (step 1668), the process ends.

Figure 15I:
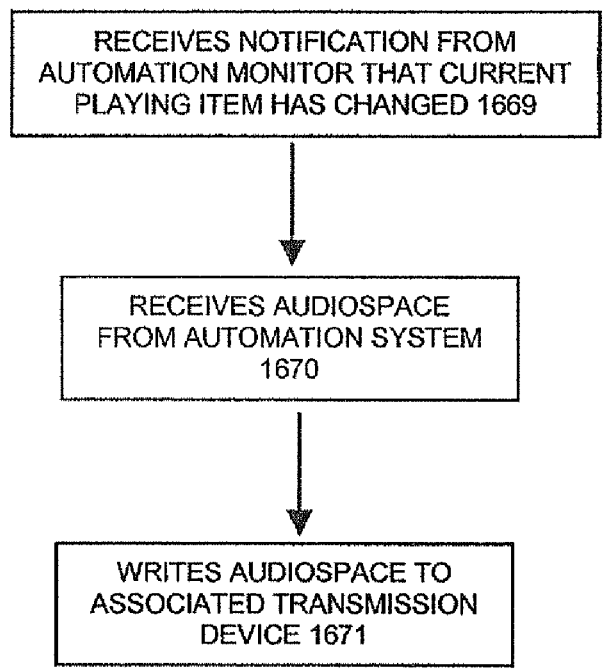

FIG. 15I depicts an exemplary process for handling a change in a broadcast schedule. The process begins when the blackbox receives a notification from the automation monitor that a current scheduled item has changed (step 1669). The audiospace writer receives new audiospace from the automation system (step 1670) and writes the new audiospace to an associated digital data transmission device (step 1671).

Figure 15J:
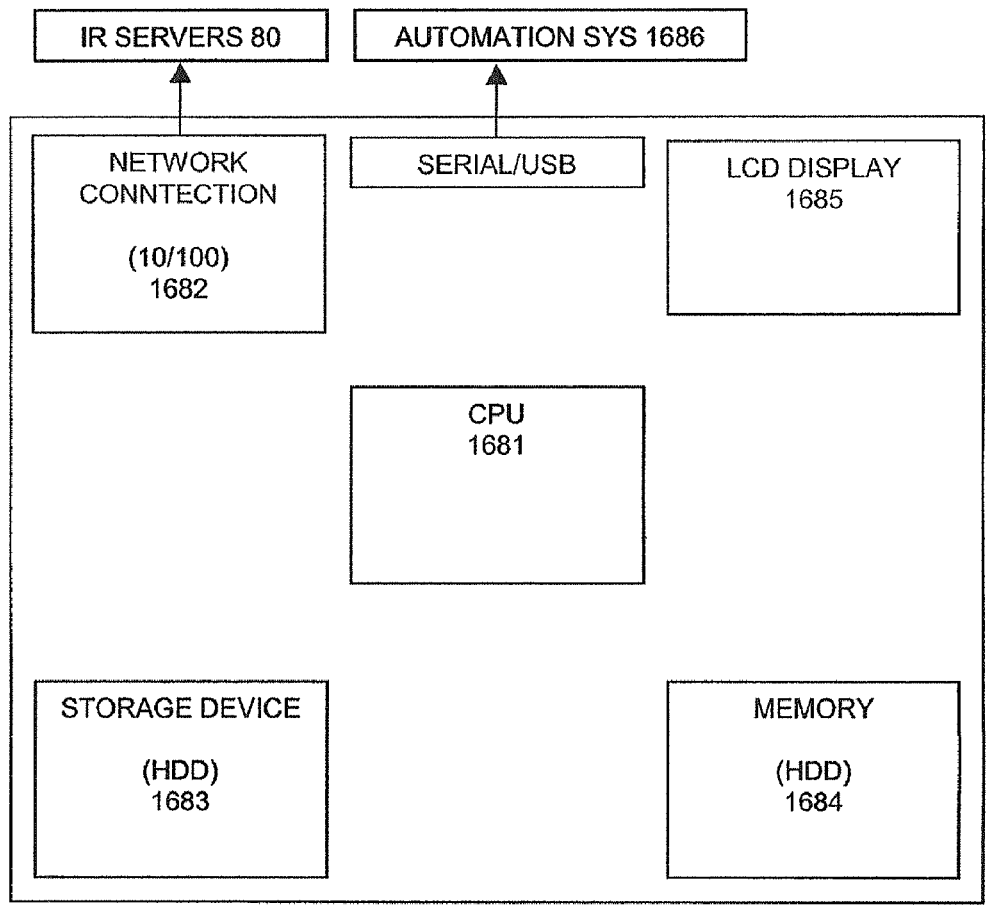

FIG. 15J displays exemplary components of the blackbox 1680. The blackbox 1680 may include a CPU 1681, such as a microprocessor; a network connection device 1682, such as a network card, a modem, and the like; a storage device 1683, such as a hard drive; further memory devices 1684, a liquid crystal display (LCD) for presenting status messages of the system; and a serial port/uniform serial bus (USB) port for communicating with the automation system 1686 maintained by a broadcaster. The blackbox may be in further communication over an Internet gateway with a supplemental digital data provider server 80.

FIGS. 16A-16K illustrate the exemplary hardware and processes used to accomplish a transaction with a listener according to the present invention.

Figure 16A:
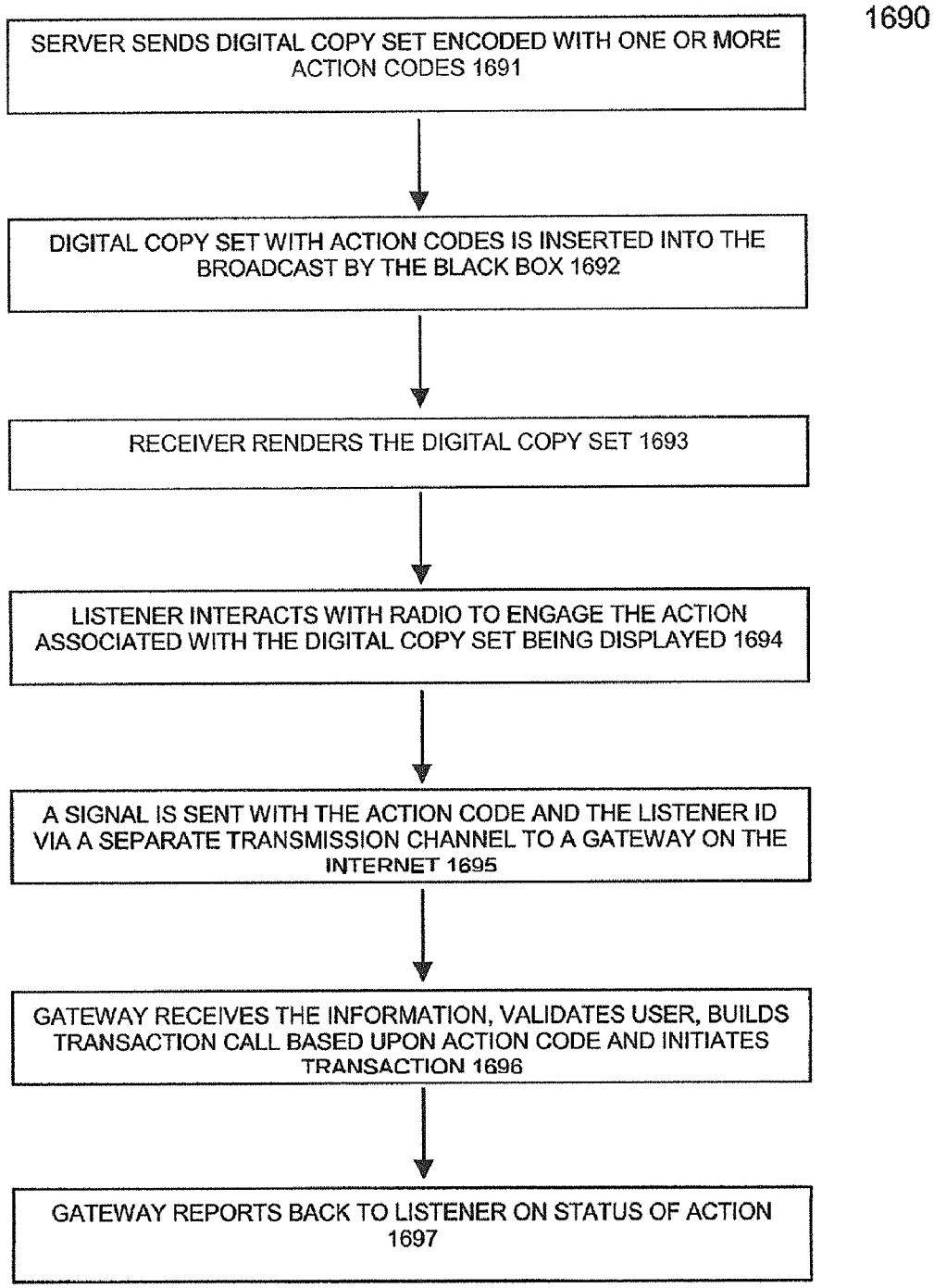
FIGS. 16A-16K illustrate the exemplary hardware and processes used to accomplish a transaction with a listener according to the present invention.

FIG. 16A depicts an exemplary process 1690 for interacting with a listener using supplemental digital data. The process 1690 begins when the provider sends a digital copy set encoded with one or more action codes to a broadcaster (step 1691). The digital copy set with the action codes are inserted into the broadcast by the black box (step 1692). A digital data receiver renders the digital copy set (step 1693). A listener then interacts with the receiver to engage the action associated with the digital copy set being displayed (step 1694). The interaction results in a signal which is sent with the action code and the listener ID via a separate transmission channel to a gateway, for example, on the Internet (step 1695). The gateway receives the information, validates the listener, and builds a transaction call based upon the action code, thereby initiating a transaction (step 1696). The gateway then reports back to the listener with a status of the action (step 1697).

Figure 16B:
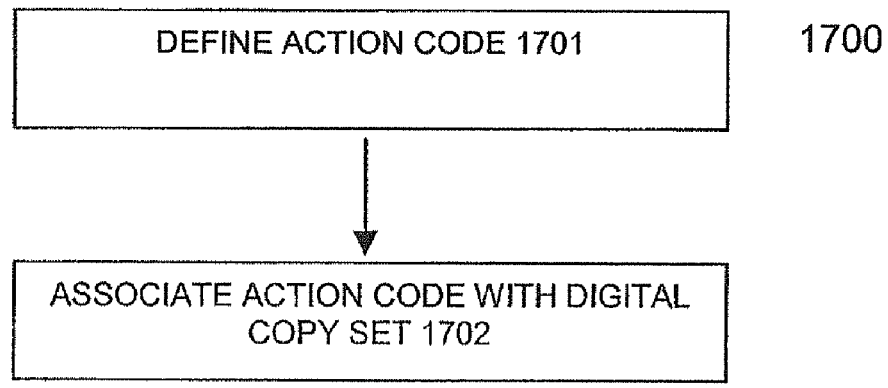

FIG. 16B depicts an exemplary process 1700 for creating an action code. The process 1700 begins when a broadcaster or supplemental digital data provider defines an action code (step 1701). The action code is then associated with a digital copy set (step 1702) such that when the supplemental digital data is rendered, the listener may understand that her response indicates a desire to enter into a transaction. The transaction may be a commercial transaction, such as a purchase of goods or services, or may be a response to a promotion by the broadcaster, such as a contest.

Figure 16C:
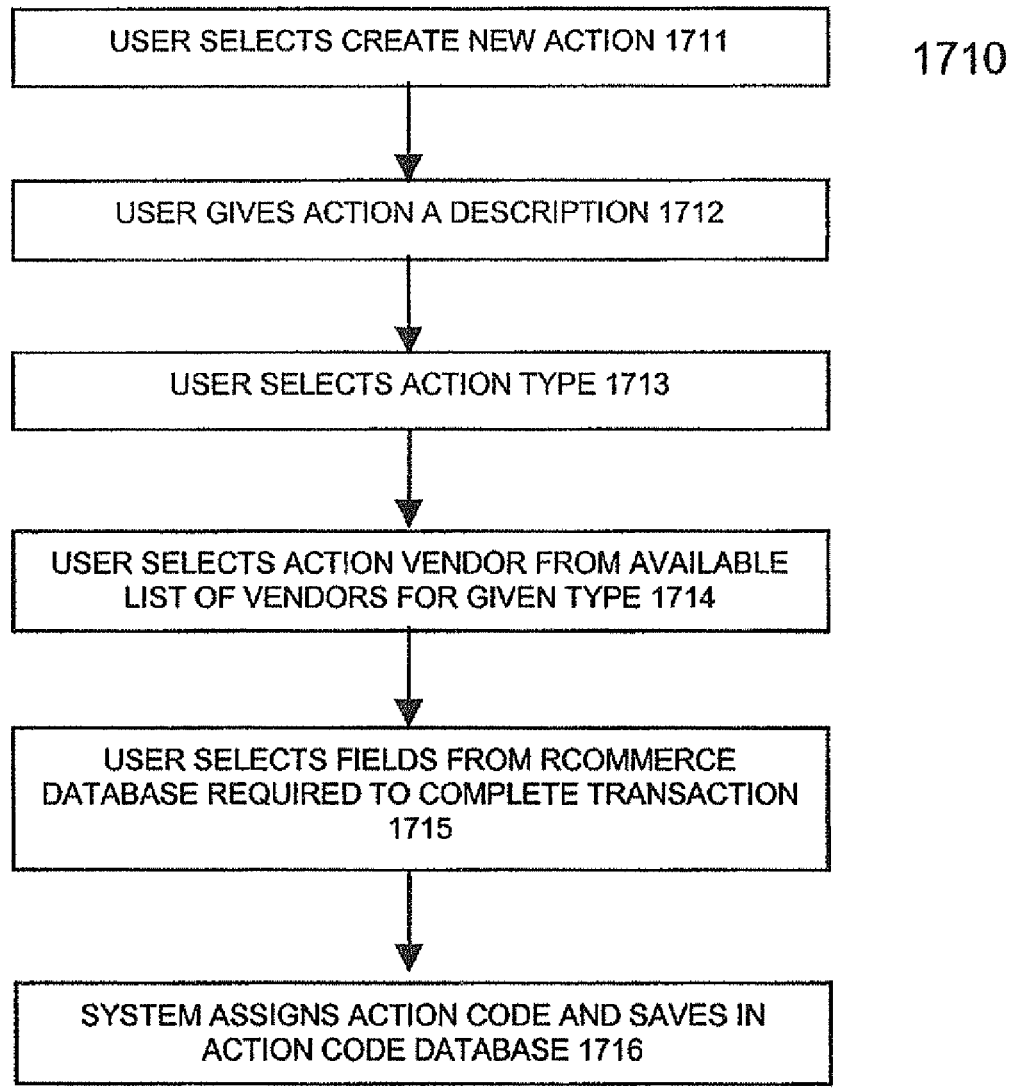

FIG. 16C depicts an exemplary process 1710 for selecting an action code. The process 1710 begins when a broadcaster selects an action that can be performed by a listener (step 1711). The broadcaster gives the action a description (such as a purchase) (step 1712). The broadcaster selects an action type (step 1713) and a vendor from an available list of vendors for the given action type (step 1714). The broadcaster selects fields from an r-commerce database stored on the Internet which may be required to complete the transaction (step 1715). The action codes assigned to the digital copy set are then saved in an action code database (step 1716).

Figure 16D:
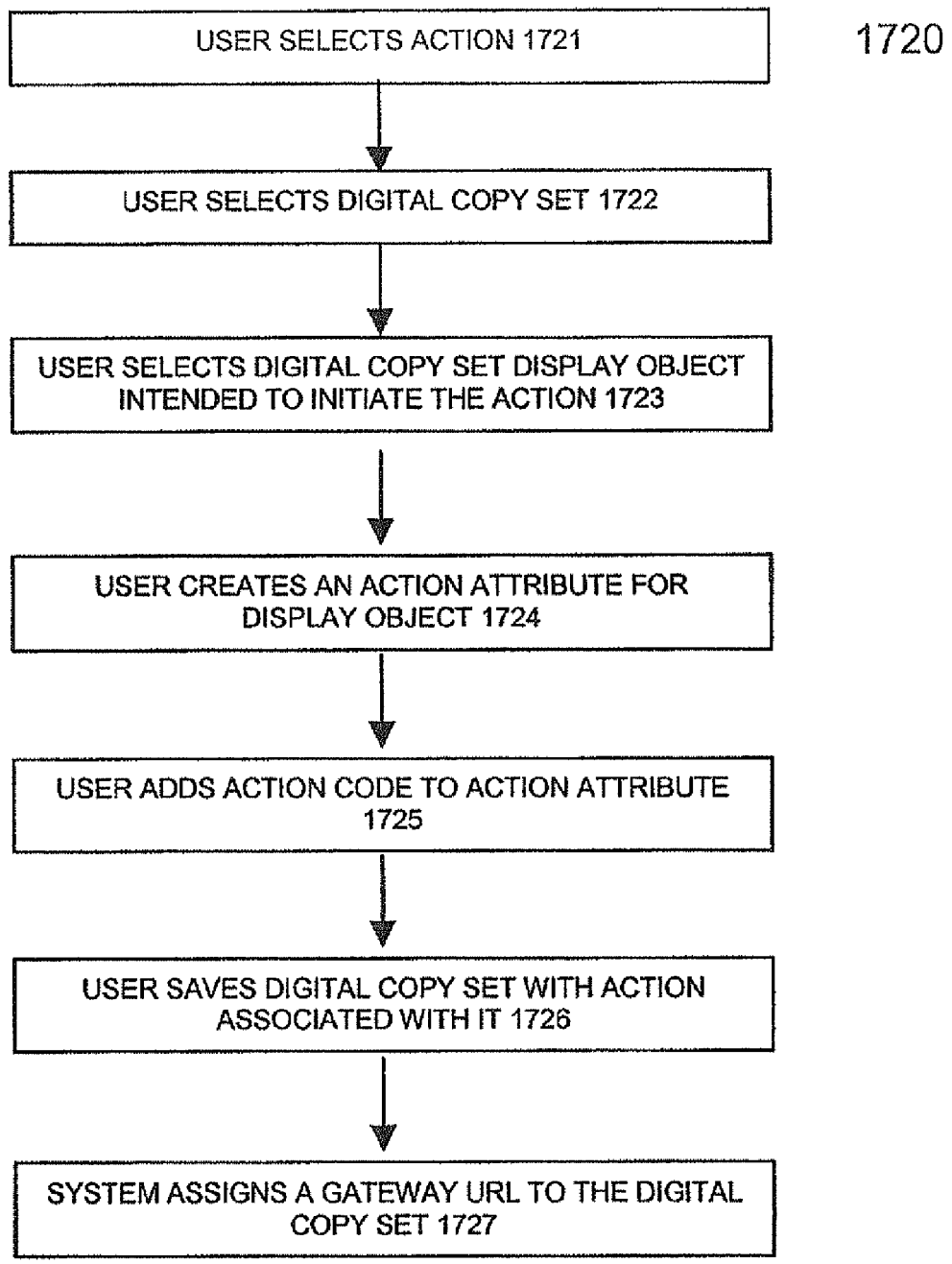

FIG. 16D depicts an exemplary process 1720 for associating an action with a digital copy set. The process 1720 begins when a broadcaster selects an action and a digital copy set corresponding thereto (step 1722). The broadcaster selects a digital copy set display object intended to initiate the action (step 1723) and creates an action attribute for the display object (step 1724). The broadcaster then adds an action code to the action attribute (step 1725). The broadcaster then saves the digital copy set with the associated action (step 1726). The provider then assigns a gateway uniform resource locator (URL) to the digital copy set (step 1727).

Figure 16E:
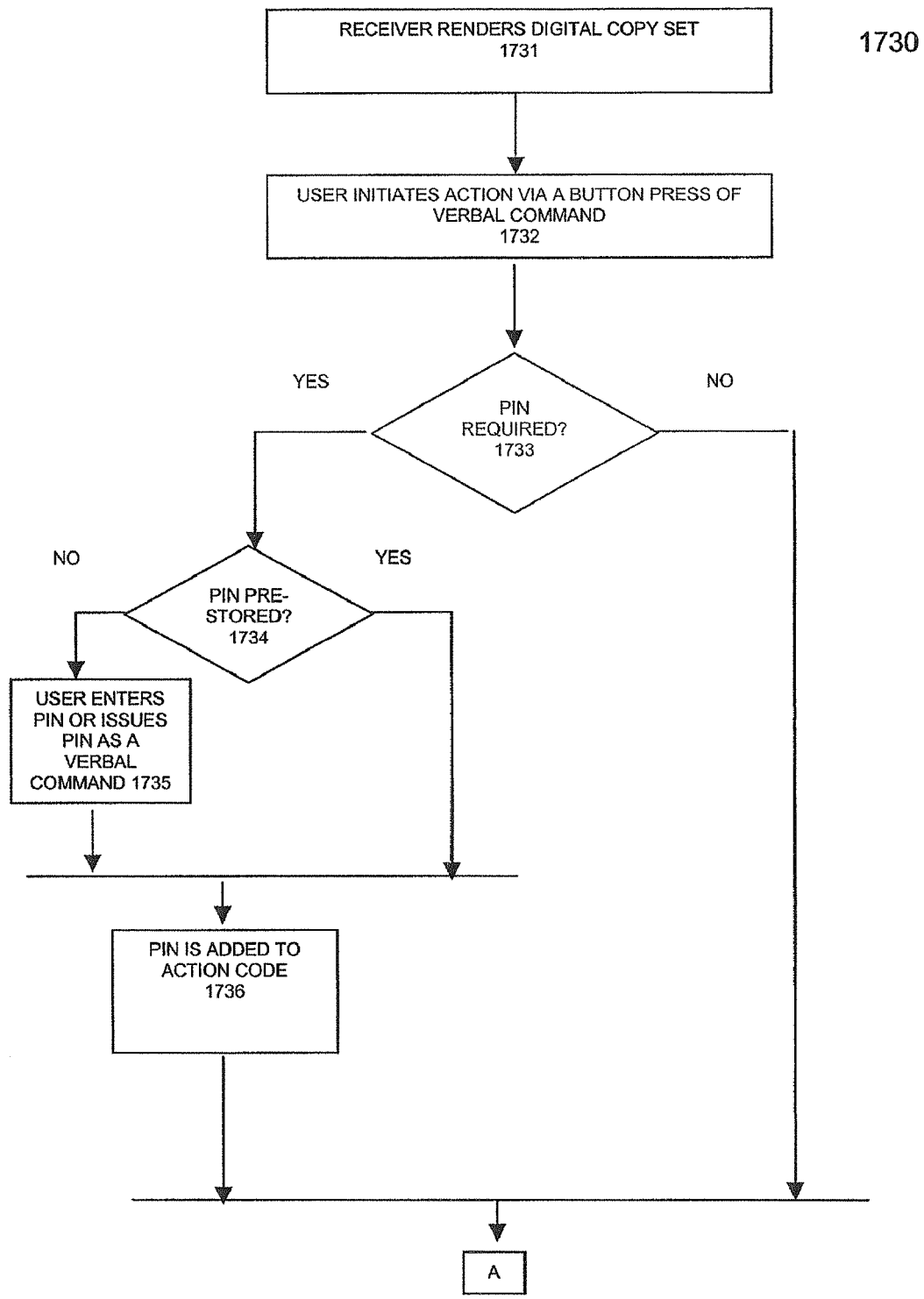

FIG. 16E depicts an exemplary process 1730 for initiating an action using a digital data receiver. The process 1730 begins when a receiver renders a digital copy set containing an action code (step 1731). The listener may initiate the action via a button or by issuing a recognizable verbal command (step 1732). If a personal identification number (PIN) is required (step 1733) it may be entered. If a PIN is not pre-stored (step 1734), the listener may enter a PIN or issue a PIN as a verbal command (step 1735). The PIN may then be added to the action code (step 1736).

In FIG. 16E1, the process 1730 continues to step 1737 where a digital data receiver ID is added to the action code (step 1737). The receiver may connect (over a wireless channel) to the Internet (step 1738). The receiver may then call a gateway URL associated with action code (step 1739), and transmit the action code, PIN and receiver ID to the gateway (step 1740). The receiver may then display any response received from the gateway to confirm the transaction (step 1741).

Figure 16F:
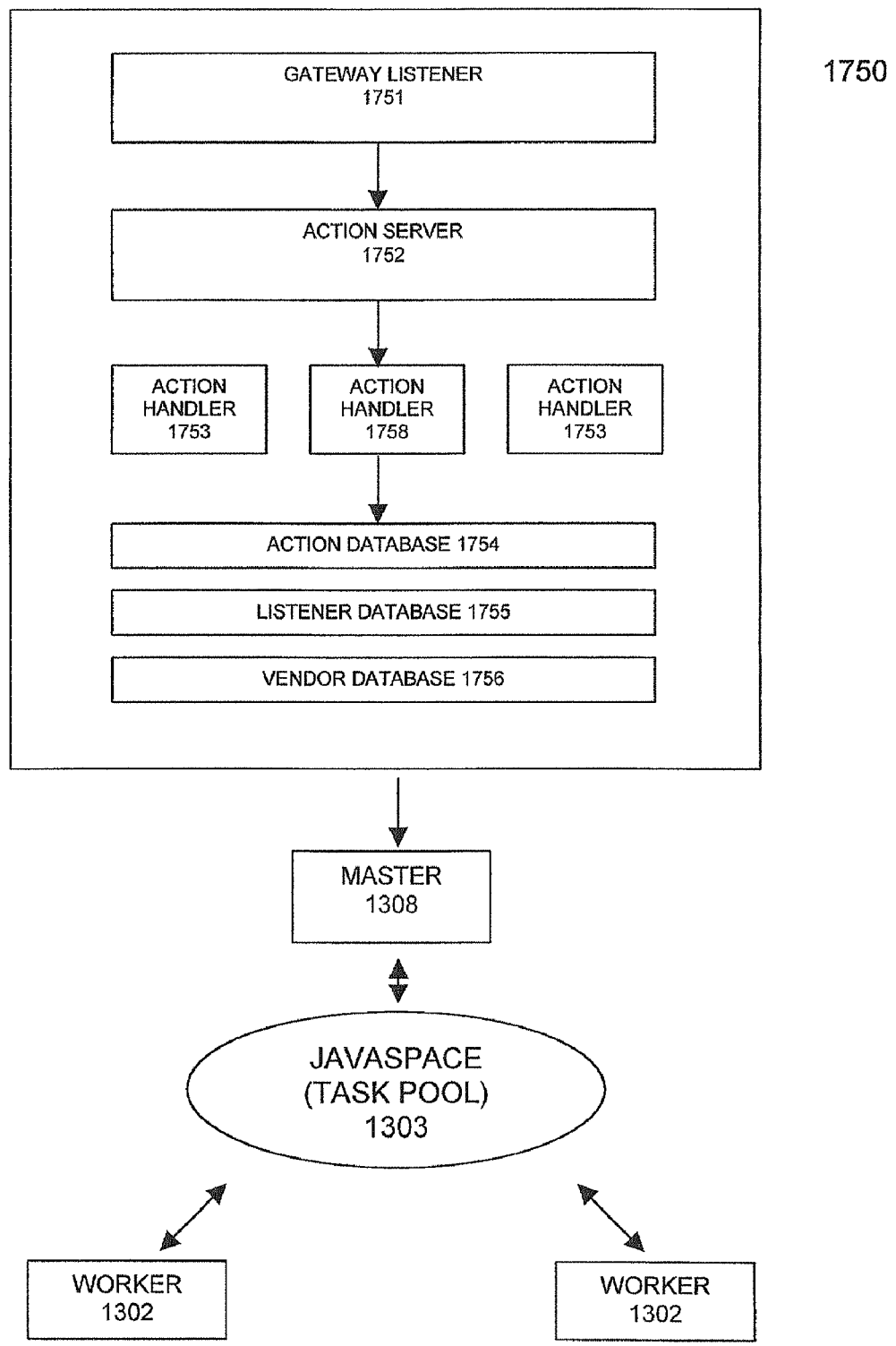

FIG. 16F depicts exemplary components of an Internet gateway device 1750 that receives transmitted action codes. The device 1750 may include a gateway listener 1751 and action server 1752, an action handler 1753, an action database 1754 (for storing transaction information received over the gateway), a listener database 1755 (for storing listener information such as receiver id, financial account number and the like for completing a transaction), and a vendor database 1756 (for storing a list of vendors who may complete the transaction). The device 1750 may further be in communication with the master server 1301 described previously.

Figure 16G:
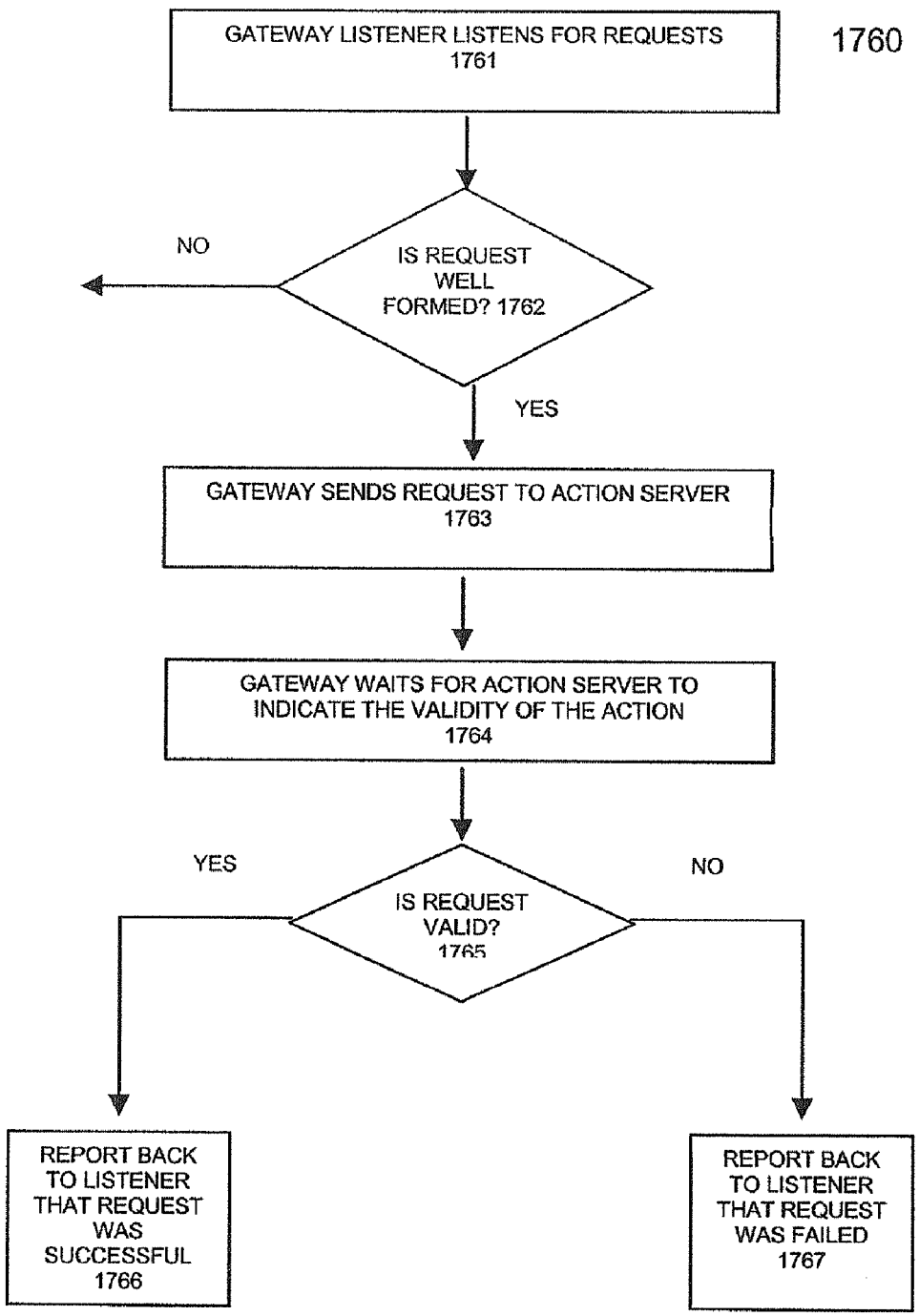

FIG. 16G depicts an exemplary process 1760 performed by the gateway listening device. The process 1760 begins with the gateway listener listening for requests (step 1761). If a request is detected (step 1762), the gateway sends the request to the action server (step 1763). The gateway listening device waits for the action server to indicate the validity of the action (step 1764). If the request is valid (step 1765), the listening device reports back to the listener that the request was successful (step 1766). If the request however is invalid, the gateway listening device may in addition report back to the listener that the request failed (step 1767).

Figure 16H:
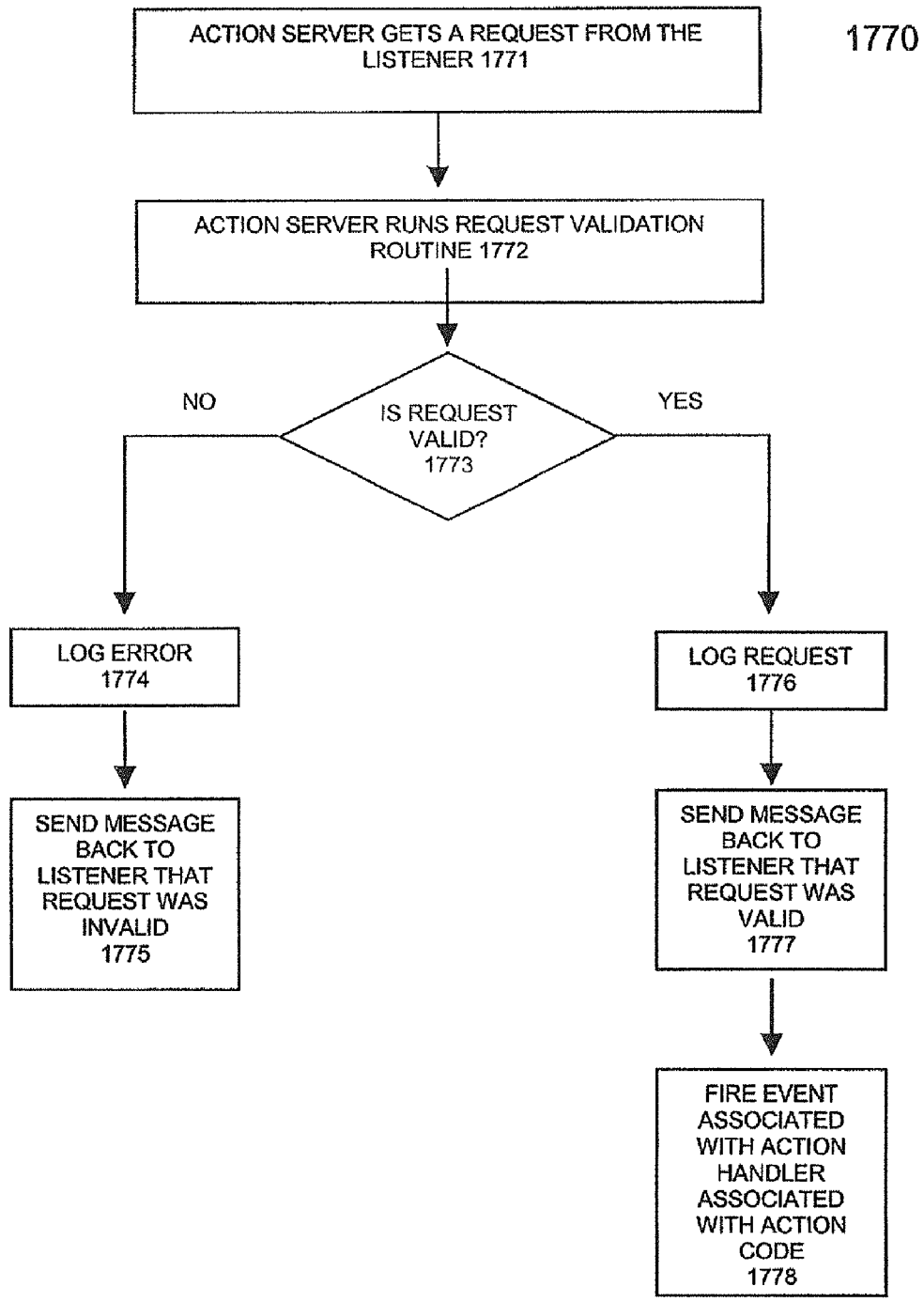

FIG. 16H depicts an exemplary process 1770 performed by an action server. The process 1770 begins when an action server gets a request from a listener (step 1771). The action server runs a request validation routine (step 1772) and determines if the request is valid (step 1773). If invalid, an error is noted (step 1774) and a message is sent back to listener that the request was invalid (step 1775) If the request is valid, the action server performs a log request (step 1776) and sends a message back to listener that request was valid (step 1777). The action server then enables the event associated with action handler and the action code (step 1778).

Figure 16I:
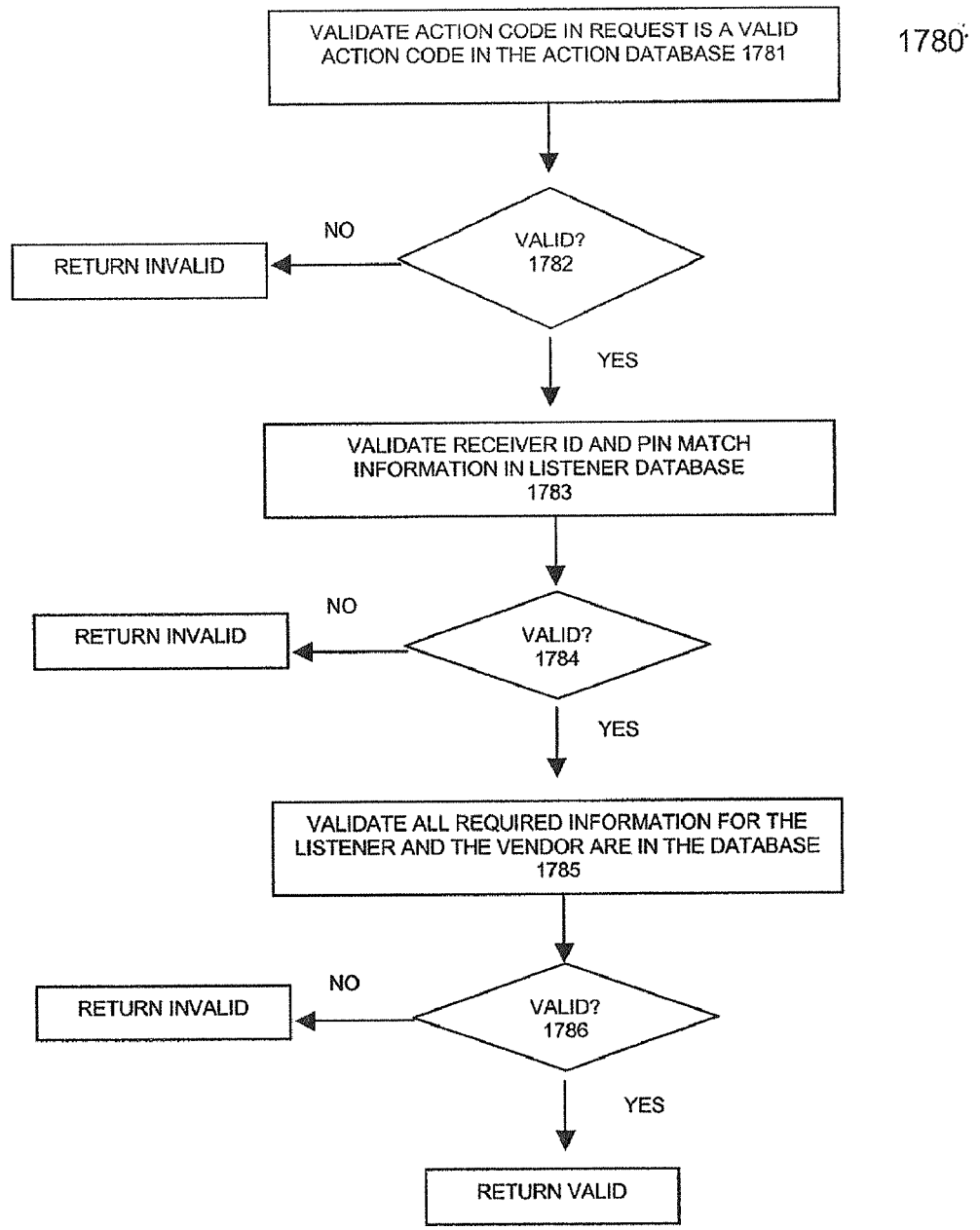

FIG. 16I depicts an exemplary process 1780 for validating a received action code performed by the action server. The process 1780 begins with the action server comparing an action code received in a request against valid action code data stored in an action database (step 1781). If the action code is valid (step 1782), the action server validates the receiver ID and PIN match information by comparison to data in a listener database (step 1783). If the receiver ID and PIN are valid (step 1784). The action server confirms that all required information for the listener and the vendor match data stored in an appropriate database (step 1785). If the required information is valid (step 1786), the listener is notified of the receipt of a valid action. If any of the foregoing information is found to be invalid, the listener is notified that the request failed.

Figure 16J:
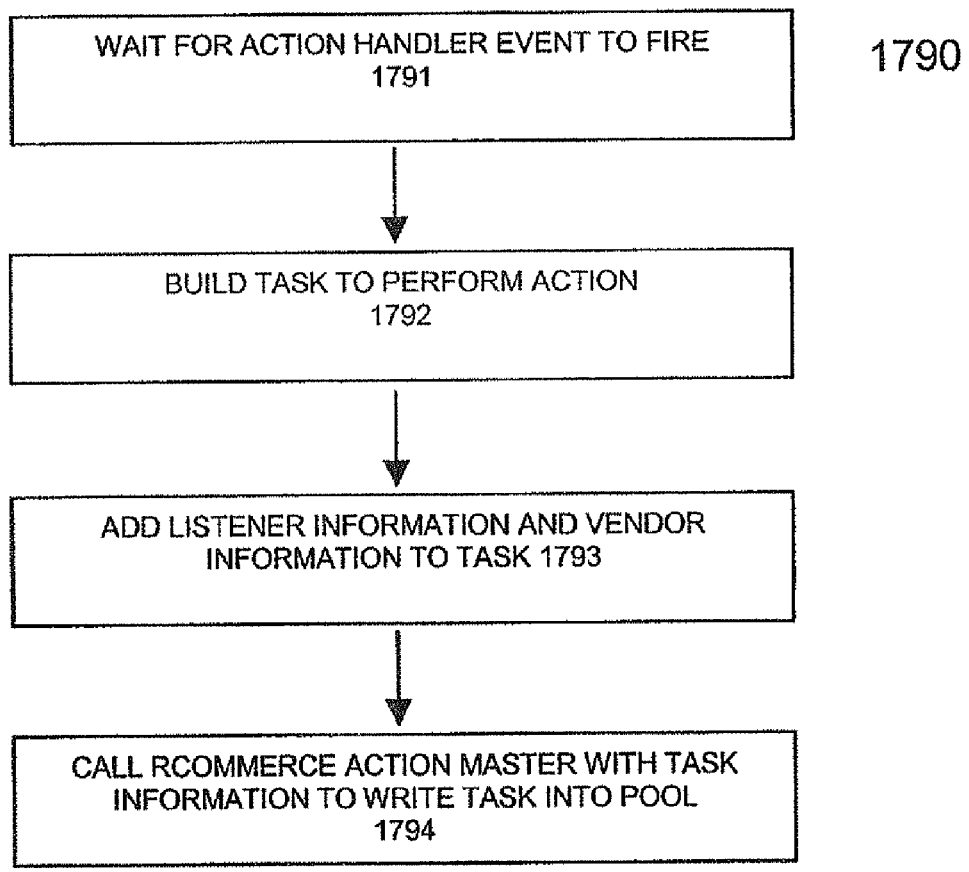

FIG. 16J depicts an exemplary process 1790 performed by an action handler. The process 1790 starts with the action handler listening for an event to occur (step 1791). The action handler builds a task with action information (step 1792), and adds listener information and vendor information to task (step 1793). The action handler then calls an r-commerce action master server with task information to write into the javaspace pool (step 1794)

Figure 16K:
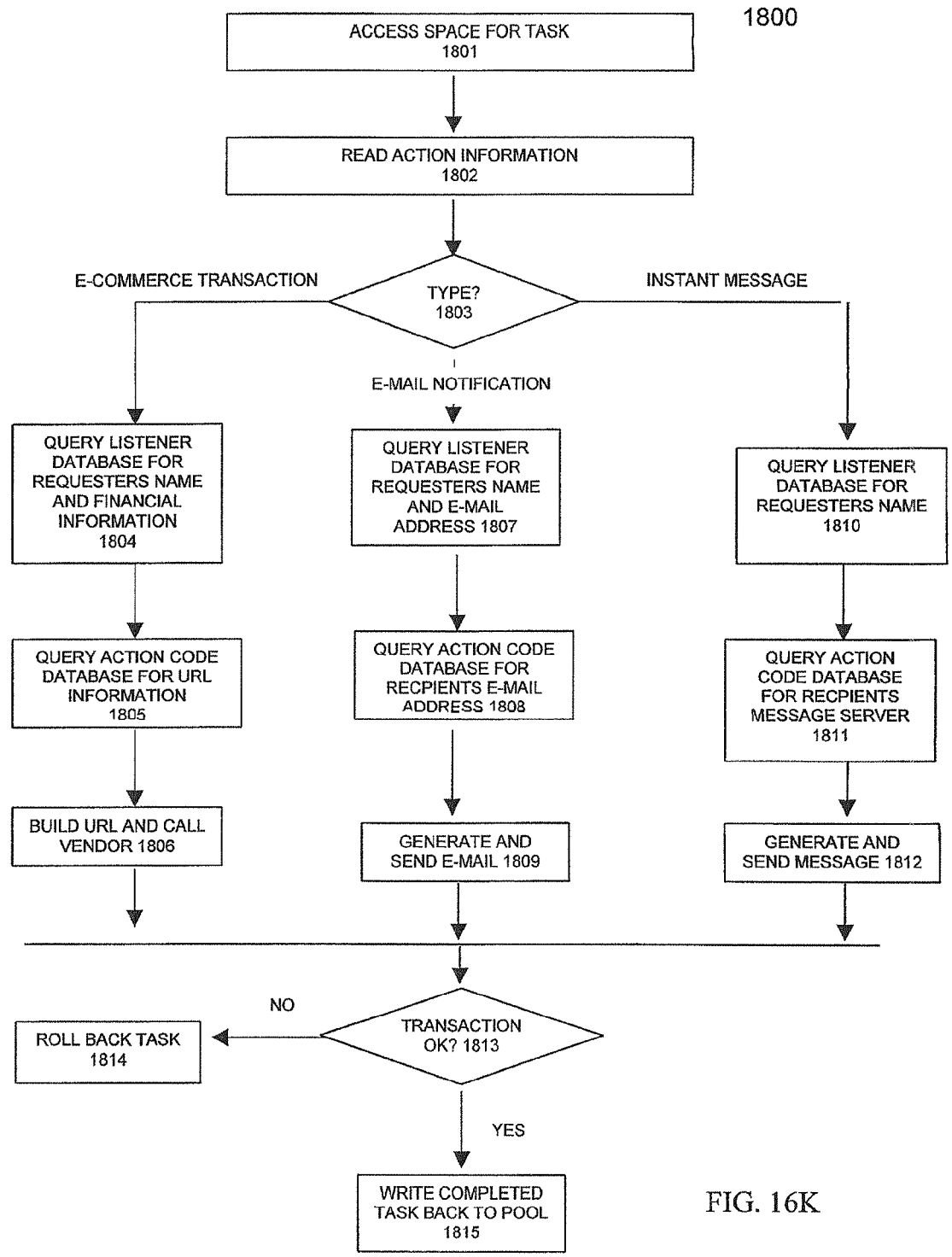

FIG. 16K depicts an exemplary process 1800 performed by an action worker server. The process 1800 begins with the worker server accessing the javaspace pool for a task (step 1801). The worker server reads action information (step 1802) and determines a type of action (step 1803), e.g. a commercial transaction an e-mail notification or an instant message. If a commercial transaction, the worker server then queries a listener database for requester's name and financial information (step 1804), queries an action code database for URL information (step 1805); builds the URL and calls a vendor associated with the action (step 1806). From step 1806, the process 1800 continues to step 1813 described further below.

If an e-mail notification action is detected at step 1803, the process 1800 continues to Step 1807 where the worker server queries a listener database for the requester's name and e-mail address (step 1807). The worker server then queries an action code database for recipients' e-mail address (step 1808). The worker server then generates and sends the requested e-mail (step 1809). The process 1800 then continues to step 1813 described further below.

If an instant message is detected at step 1803, the process 1800 continues to step 1810 where the worker server queries a listener database for the requester's name (step 1810). The worker server then queries an action code database for a recipient's message server (step 1811), and generates and sends the message (step 1812). The process 1800 then continues to step 1813 below.

At step 1813. The worker server determines whether the transaction is completed (step 1813). If not, the task is rolled back (step 1814). Otherwise, the worker server writes the completed task back to pool (step 1815).

FIGS. 17A-17G illustrate the exemplary hardware and processes used to accomplish transmission of supplemental digital data according to the present invention.

Figure 17A:
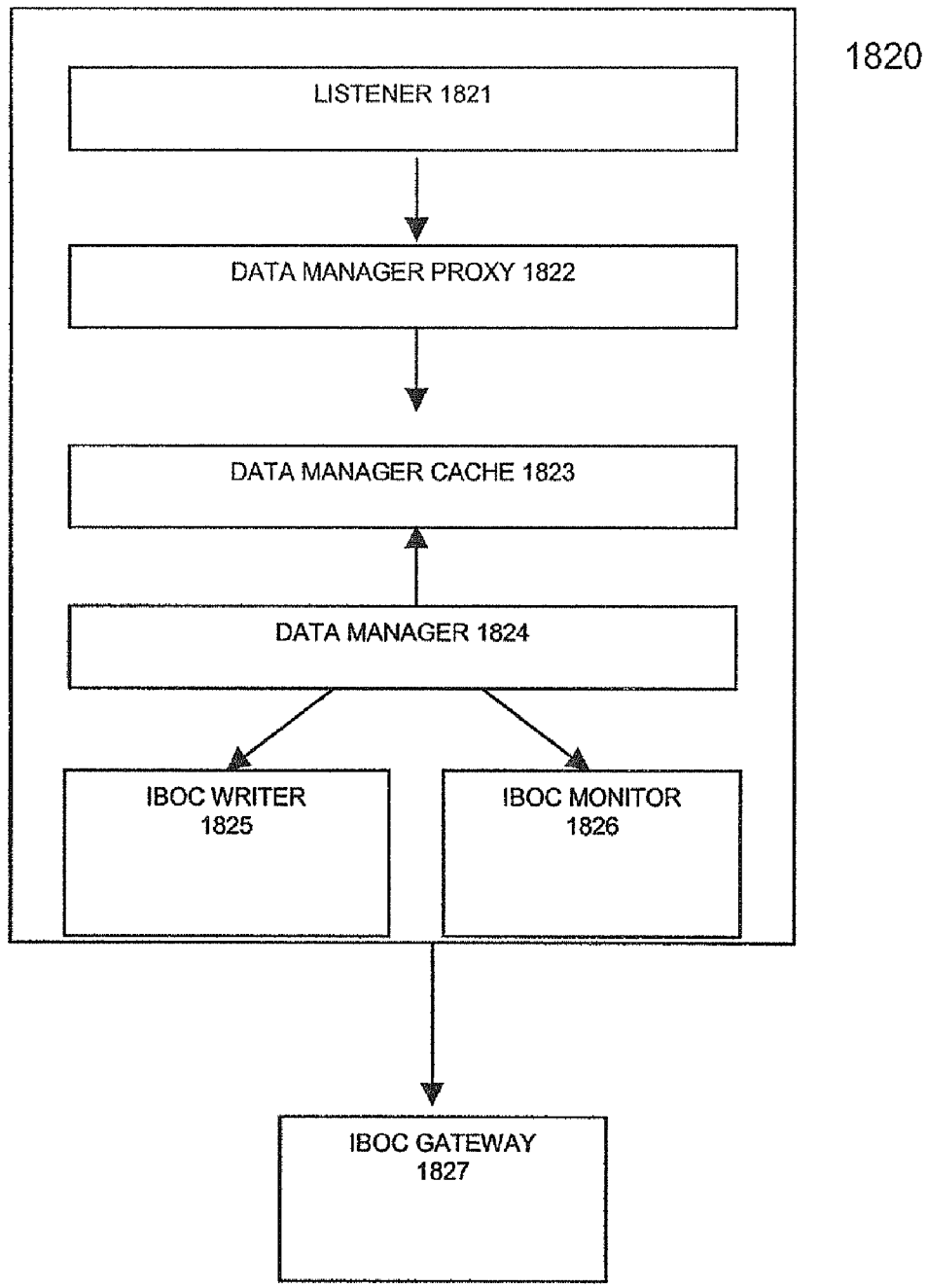
FIGS. 17A-17G illustrate the exemplary hardware and processes used to accomplish transmission of supplemental digital data according to the present invention.

FIG. 17A displays exemplary components of a data transmission manager 1820. The data transmission manager 1820 may include a listening device 1821, a data manager proxy 1822, a data manager cache 1823, a data manager module 1824, an IBOC writer 1825, an IBOC monitor 1826 and an IBOC gateway 1827.

Figure 17B:
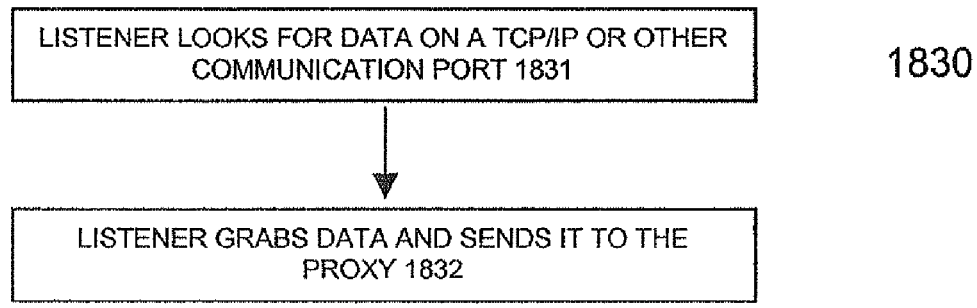

FIG. 17B depicts an exemplary process 1830 performed by the data manager listener. The process 1830 begins when the listener looks for supplemental digital data on, for example, a TCP/IP or other communication port (step 1831). When such data is transmitted to the listener, the listener grabs the data and sends it to the data manager proxy (step 1832).

Figure 17C:
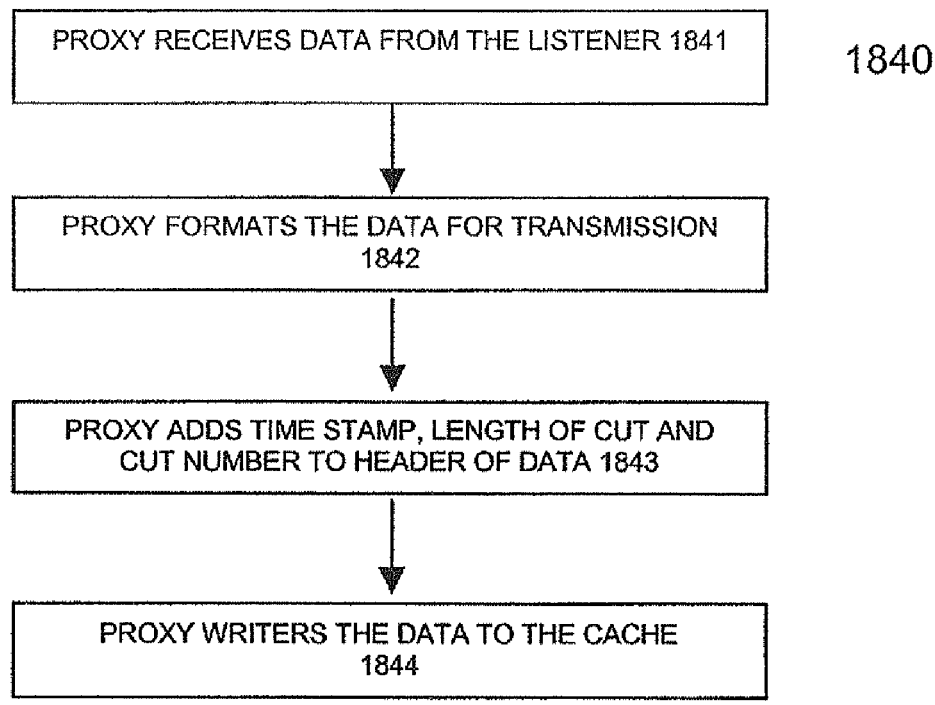

FIG. 17C depicts an exemplary process 1830 performed by the data manager proxy. The process 1840 begins when the data manager proxy receives supplemental digital data from the listener (step 1841). The data manager proxy formats the received data for transmission over a radio frequency (step 1842) and adds time stamp, length of cut and cut number to a header of the supplemental digital data (step 1843). The proxy then writes the data to the cache (step 1844).

Figure 17D:
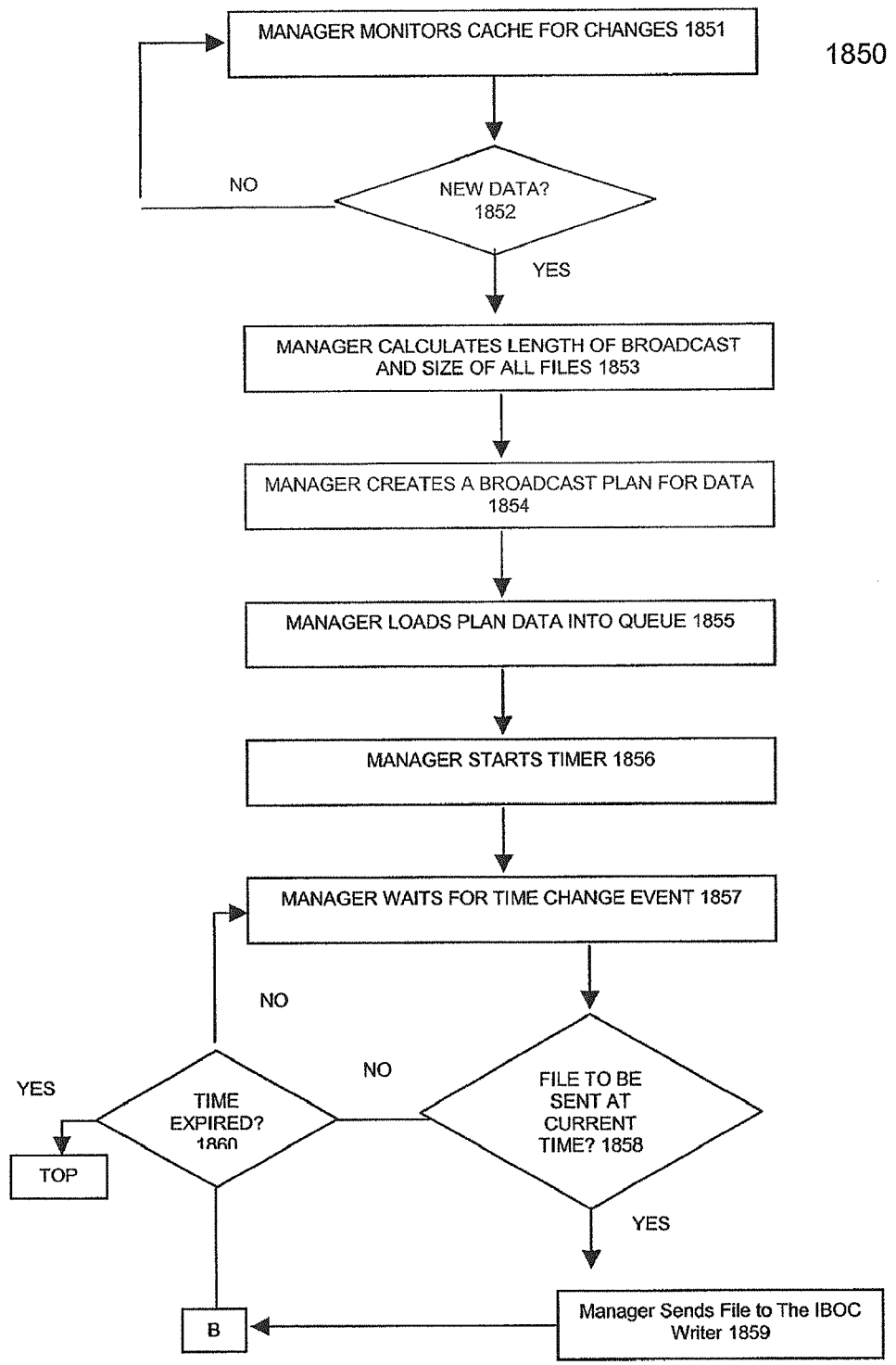
Figure 17E:
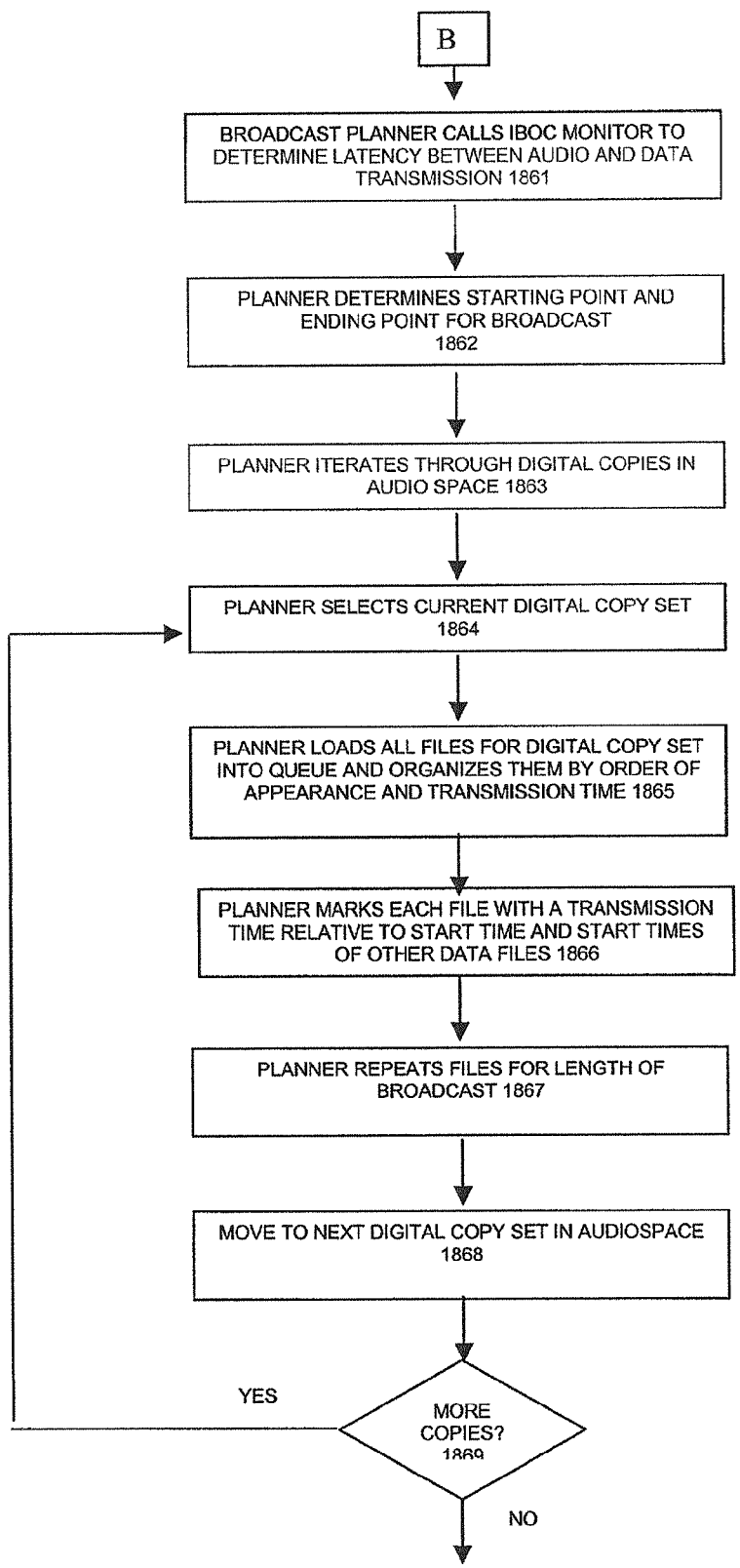
Figure 17F:
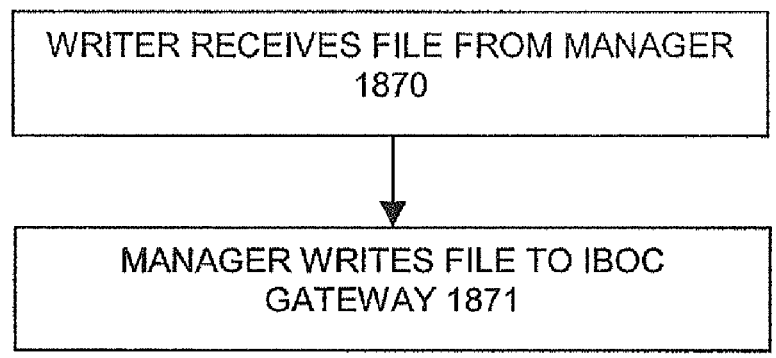

FIGS. 17D-17F depict an exemplary process 1850 performed by the data manger. The process 1850 begins with the data manager continuously monitoring the cache for new data (step 1851). When new data is detected (step 1852), the data manager calculates a length of broadcast and size of all new files (step 1853). Using this information, the data manager creates a broadcast plan for transmitting the supplemental digital data (step 1854). The data manager next loads the plan data into a queue (step 1855) and starts a timer (step 1856). The data manager waits for a time change event (step 1857). When the file is to be sent at a current time (step 1858), the data manager sends the file to the IBOC writer (step 1859). If, on the other hand, time expires for the data (step 1860), the process 1850 returns to step 1857 above.

With reference to FIG. 17E, a broadcast planner calls the IBOC monitor to determine a latency between the audio and data transmission (step 1861). The broadcast planner determines a starting point and ending point for the broadcast (step 1862), iterates through digital copies in an audio space (step 1863) and selects a current digital copy set (step 1864). The planner loads all files for the digital copy set into a queue and organizes them by order of appearance and transmission time (step 1865). The planner marks each file with a transmission time relative to start time and start times of other data files (step 1866). The broadcast planner may then repeat transmission of the file for a length of the broadcast (step 1867) in order to accommodate listeners who tuned in after the start of the broadcast data. The broadcast data then moves to the next digital copy set in the audiospace (step 1868). If more copies exist (step 1869), the process 1850 return to step 1864 above. Otherwise, the process continues to step 1870.

Referring now to FIG. 17F, the IBOC writer receives a file from the data manager (step 1870) and writes the file to an IBOC gateway (step 1871) for transmission to a plurality of listeners.

Figure 17G:
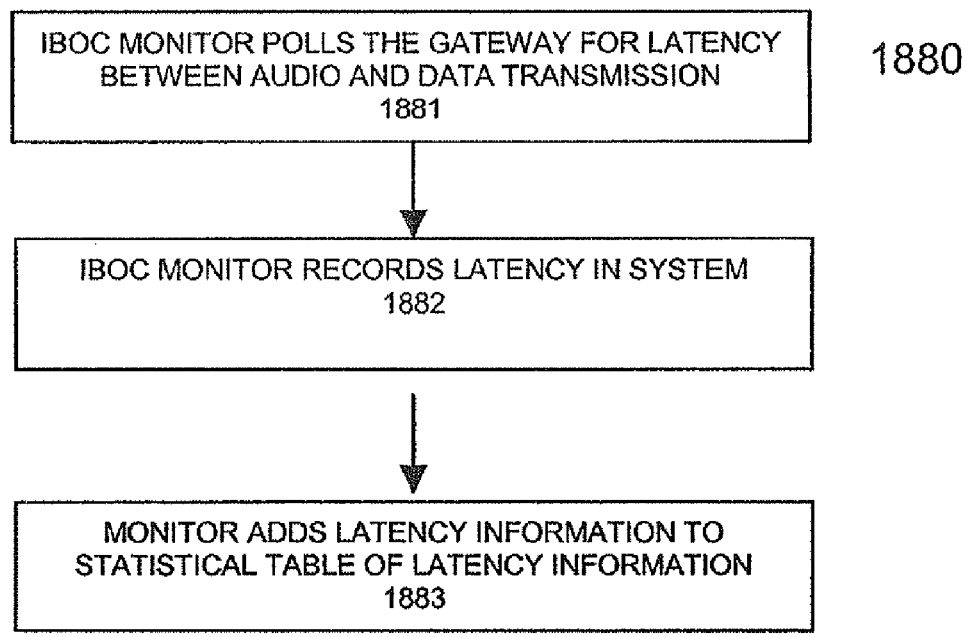

FIG. 17G depicts an exemplary process 1880 performed by an IBOC monitor. The process 1880 begins with the IBOC monitor polling the gateway for latency between audio and data transmission (step 1881). The IBOC monitor records the latency in system (step 1882) and the broadcast monitor adds the latency information to a statistical table of latency information for use in facilitating the broadcast (step 1883).

Figure 18A:
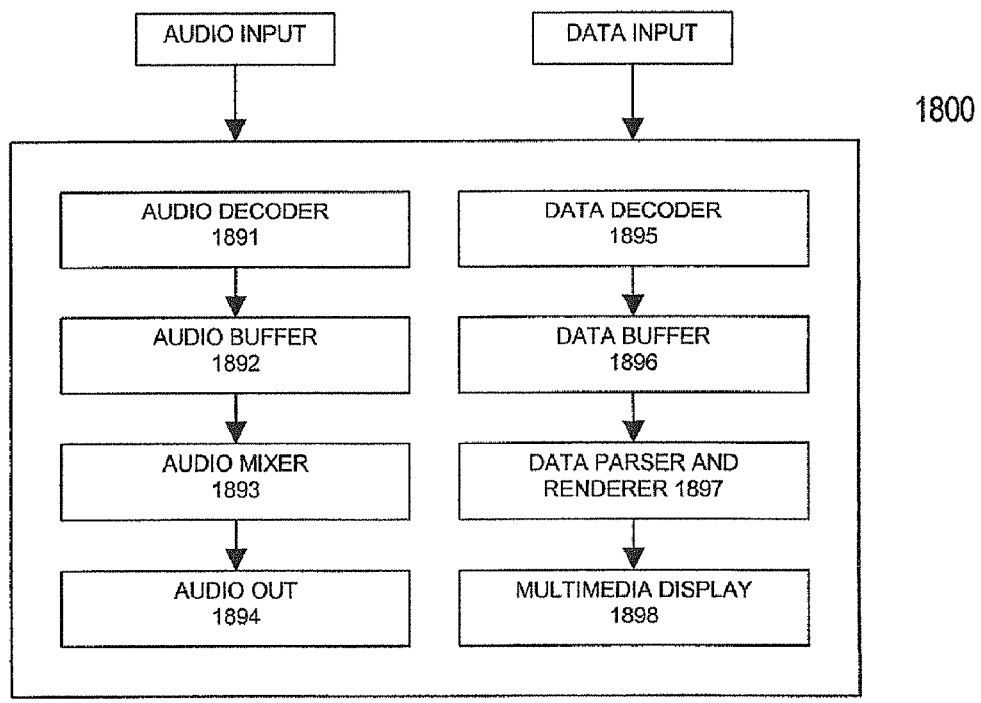
FIGS. 18A-18C illustrate the exemplary hardware and processes used to render the supplemental digital data according to the present invention.
Figure 18B:
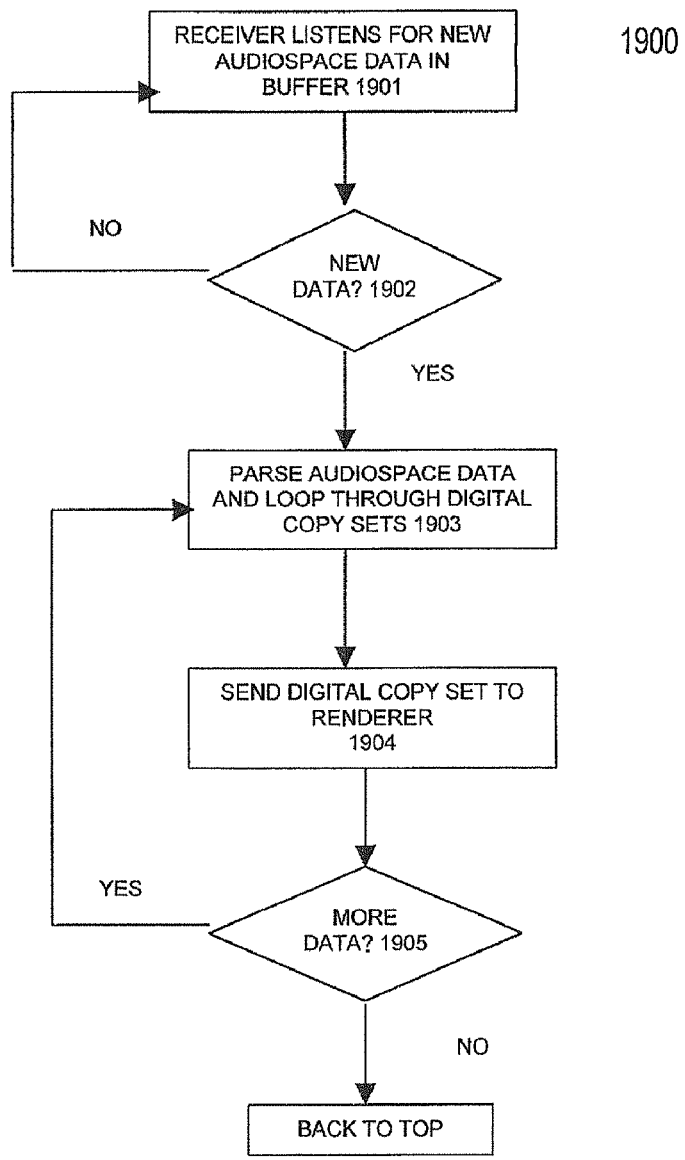
Figure 18C:
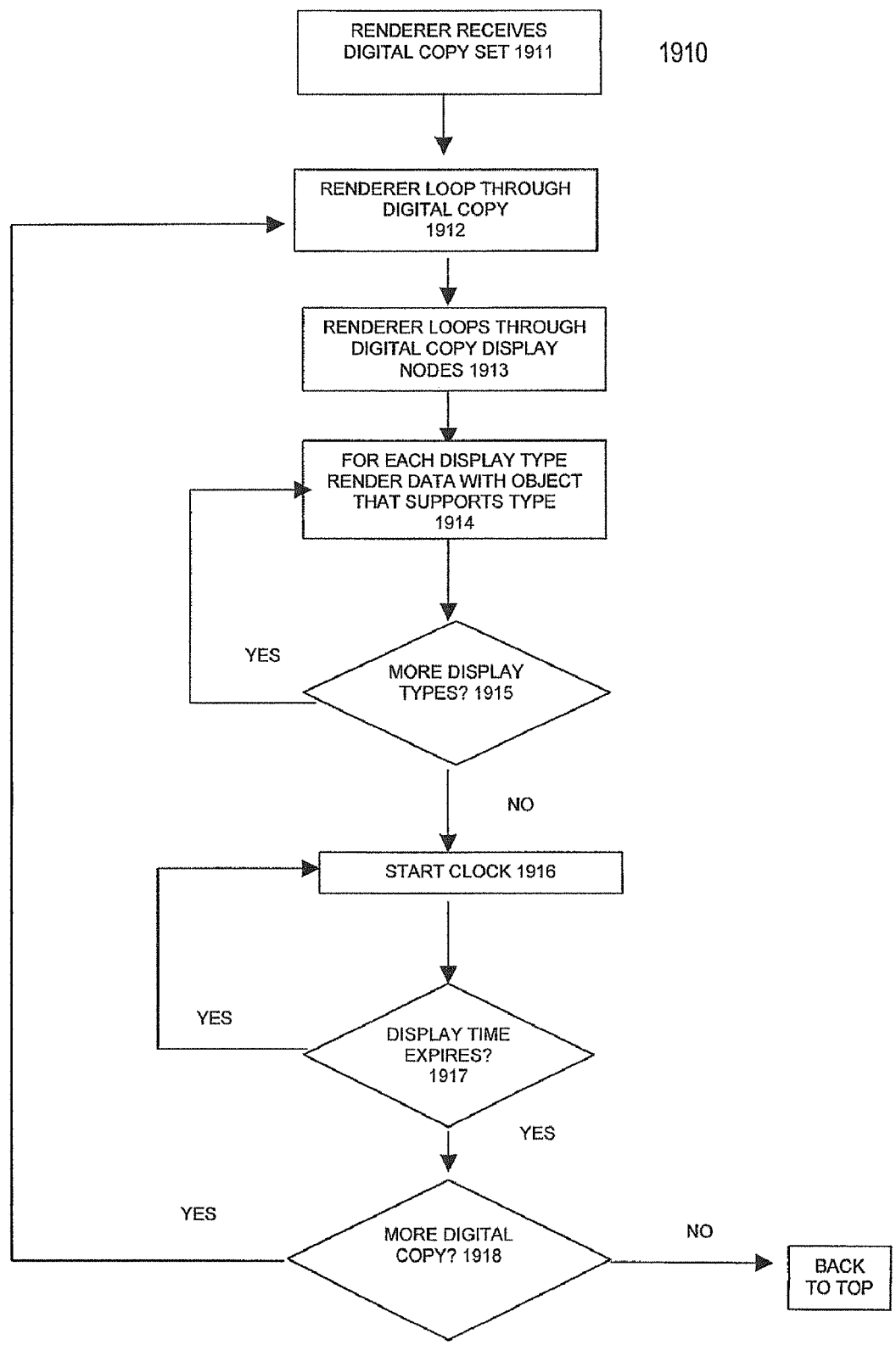

FIGS. 18A-18C illustrate the exemplary hardware and processes used to render the supplemental digital data on a digital data receiver according to the present invention.

Referring to FIG. 18A, an exemplary data receiver 1890 may include the following components: an audio decoder 1891, an audio buffer 1892, an audio mixer 1893, an audio output 1894; a data decoder 1895; a data buffer 1896; a data parser and renderer 1897 and a multimedia display 1898.

FIG. 18B depicts an exemplary process 1900 for rendering and displaying. The process 1900 begins with the receiver listening for new audiospace data in buffer (step 1901). Once new data is detected (step 1902), the audiospace data is parsed to retrieve a transmitted digital copy set (step 1903). The digital copy data is sent to a renderer (step 1904). Next the receiver determines whether more new data exists (step 1905). If so, the process 1900 returns to step 1903. Otherwise, the process returns to step 1901 above.

FIG. 18C depicts an exemplary process 1910 for rendering a received digital copy set on the receiver. The process 1910 begins when the renderer receives a digital copy set (step 1911). The renderer loops through each digital copy (step 1912) and all digital copy display nodes (step 1913). For each display type, the data is rendered with a software object that supports that type (step 1914) If more than one display type exists (step 1915) the process returns to step 1914 for each such display type. Once all display types have been rendered, a clock is started to measure display time for the rendered data (step 1916). When the display time expires (step 1917), the renderer searches for more digital copy (step 1918).

FIGS. 19A-19M illustrate the exemplary hardware and processes used to incorporate supplemental digital data into a live broadcast and to provide selectable supplemental digital data to a listener according to the present invention.

Figure 19A:
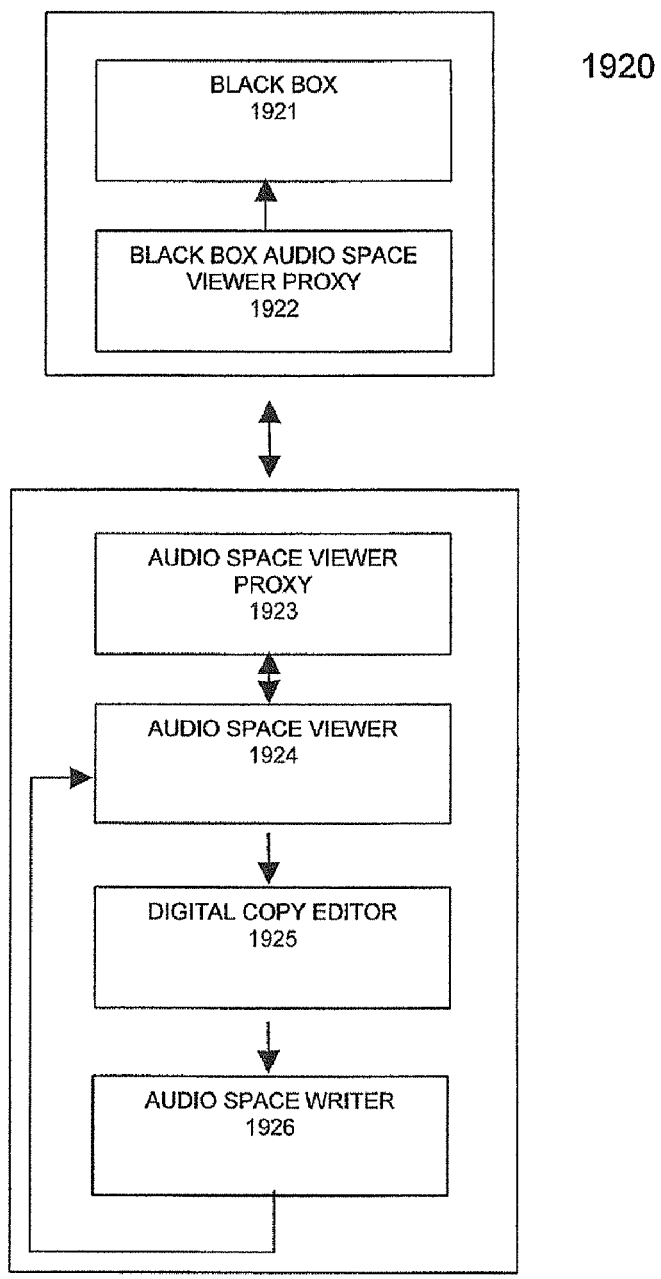
FIGS. 19A-19M illustrate the exemplary hardware and processes used to incorporate supplemental digital data into a live broadcast and to provide selectable supplemental digital data to a listener according to the present invention.

FIG. 19A displays exemplary components used for providing supplemental digital data in a live (e.g. unscheduled) broadcast. The system 1920 includes a black box 1921, a black box audio space viewer proxy 1922, an audio space viewer proxy 1923, an audio space viewer 1924, a digital copy editor 1925 and an audio space writer 1926. The functions of each of these components will be described below.

Figure 19B:
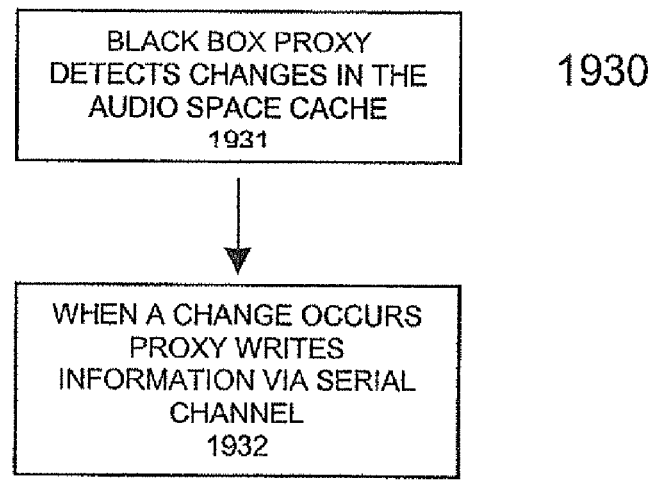

FIG. 19B depicts an exemplary process performed by a blackbox audio space viewer proxy 1922. The process 1930 begins when the black box audio space viewer proxy detects changes (e.g. new data) in the audio space cache (step 1931). When such change occurs, the black box audio space viewer proxy writes information via a serial port (step 1932) to the audio space viewer proxy.

Figure 19C:
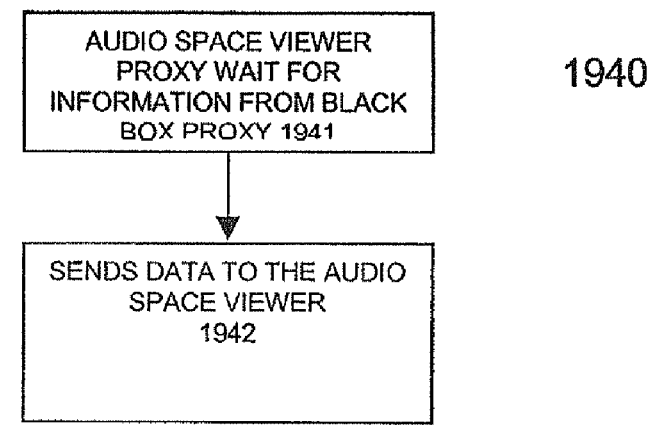

FIG. 19C depicts an exemplary process 1940 performed by the audio space viewer proxy.

The process 1940 begins with the audio space viewer proxy waiting for information from the black box audio space viewer proxy (step 1941). When new information is detected, the audio space viewer proxy sends data to the audio space viewer (step 1942).

Figure 19D:
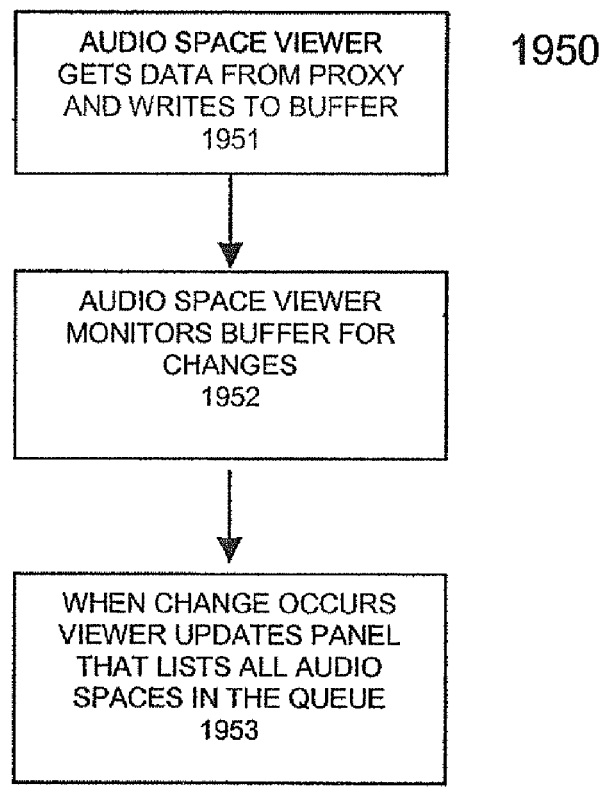

FIG. 19D depicts an exemplary process 1950 performed by the audio space viewer. The process 1950 begins when the audio space viewer receives data from the audio space viewer proxy and writes the same to a buffer (step 1951). The audio space viewer continuously monitors the buffer for changes (step 1952) and when a change occurs, the audio space viewer updates a listing of all audio spaces available in the queue (step 1953). Other components (not shown) include a display for viewing audiospace data.

Figure 19E:
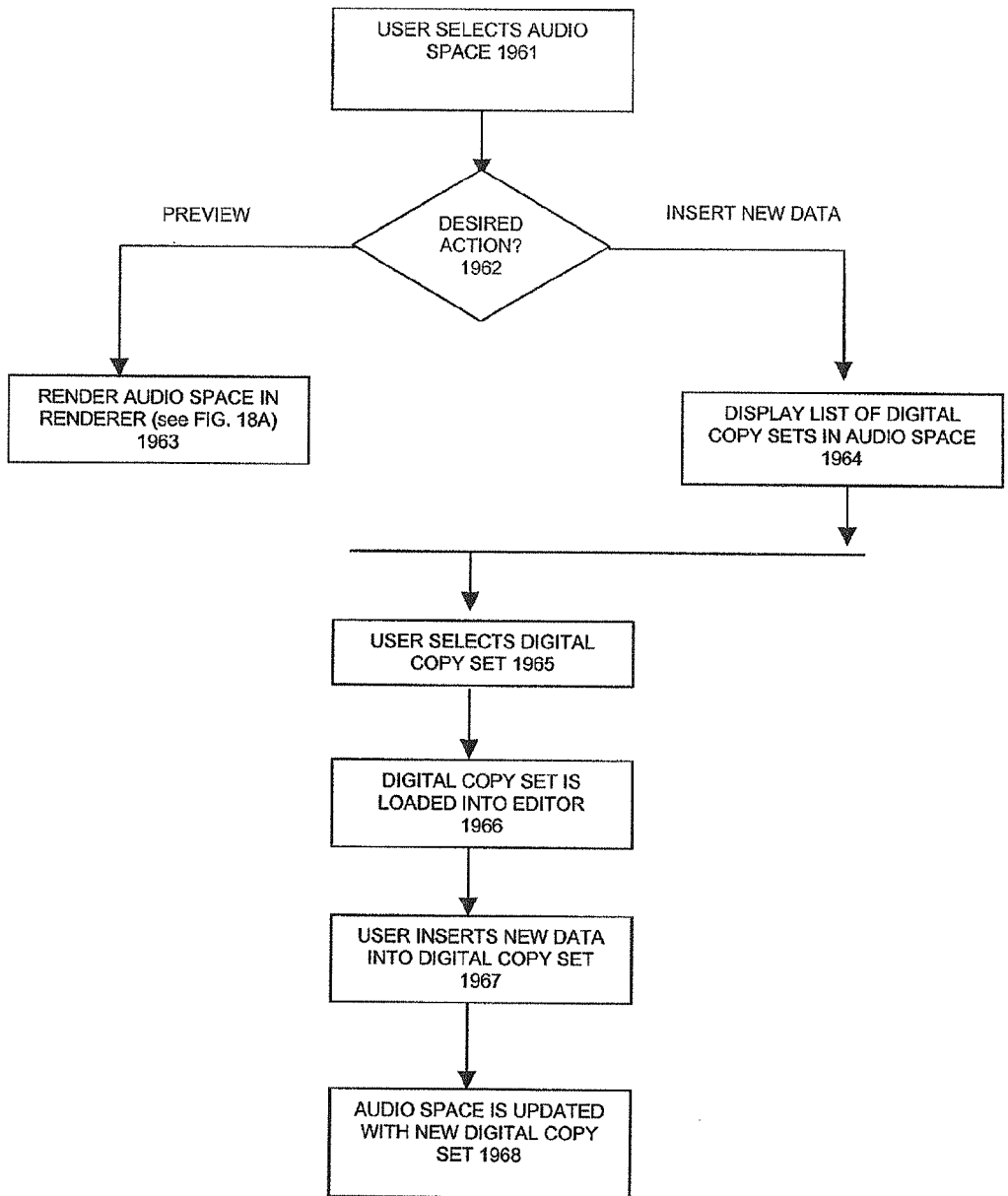

FIG. 19E depicts an exemplary process 1960 for editing and viewing digital copy sets performed through use of the audio space viewer. The process 1960 begins when a user controlling the audio space viewer selects available audio space during, for example, a live, unscheduled broadcast (step 1961). The user may select a desired action (step 1962), such as previewing supplemental digital data about to be transmitted or inserting new supplemental digital data. If the user wishes to preview, the audio space viewer renders the audio space in a manner described in conjunction with FIG. 18A (step 1963).

If instead the user wishes to insert new digital data at step 1962, the process 1960 continues to step 1964 where the audio space viewer displays a list of digital copy sets available for the audio space. The user may then select one or more of the available digital copy sets (step 1965). The selected digital copy set is loaded into the digital copy editor (step 1966) and the user inserts new data into digital copy set (step 1967). The audio space is then updated with the new digital copy set (step 1968).

Figure 19F:
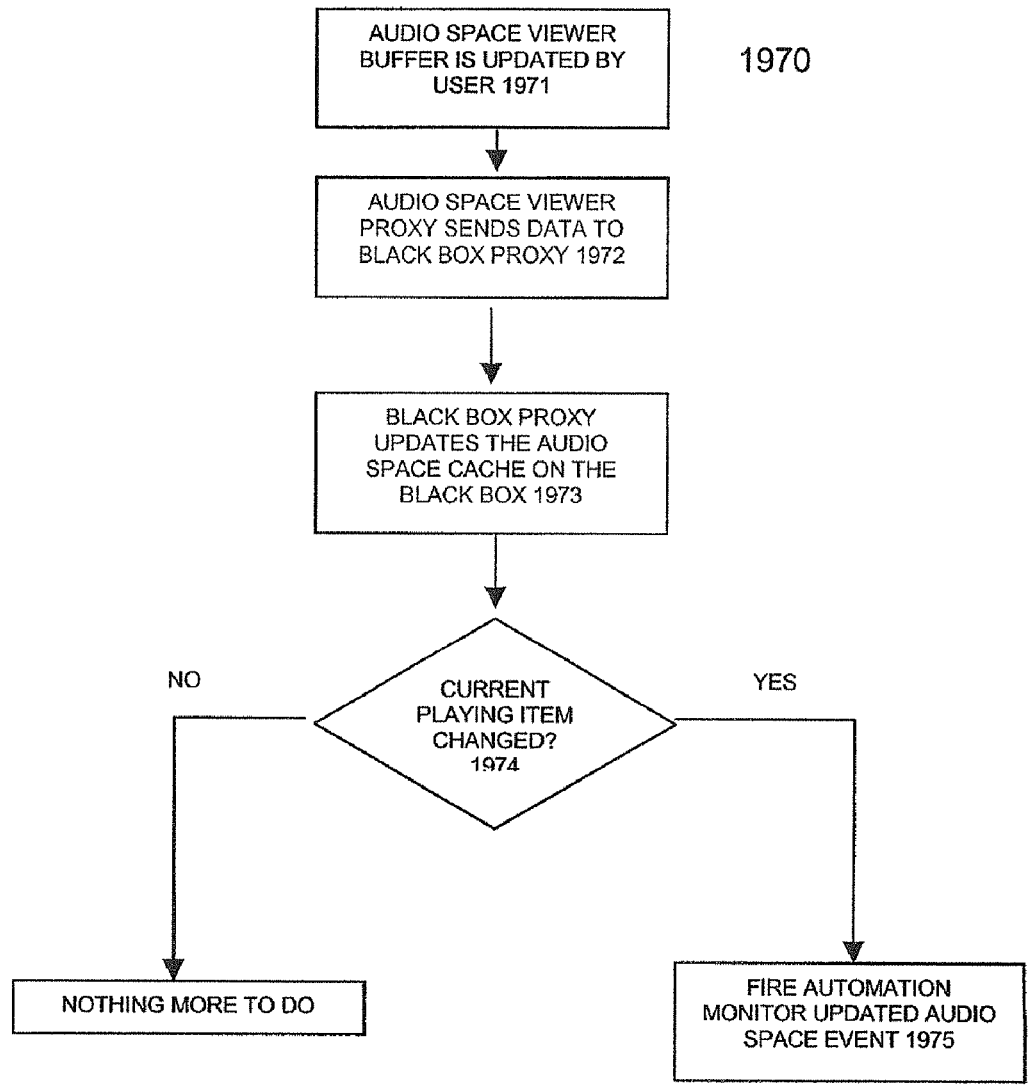

FIG. 19F depicts an exemplary process 1970 performed by the audio space writer. The exemplary process 1970 begins when the audio space viewer buffer is updated by a user with new digital data (step 1971). The audio space viewer proxy sends the data to the black box proxy (step 1972). The black box proxy updates the audio space cache on the black box (step 1973) If the current playing item is changed (step 1974), an automation monitor updated audio space event is triggered (step 1975). If, on the other hand, the current playing item is not changed, then the process 1970 ends.

Figure 19G:
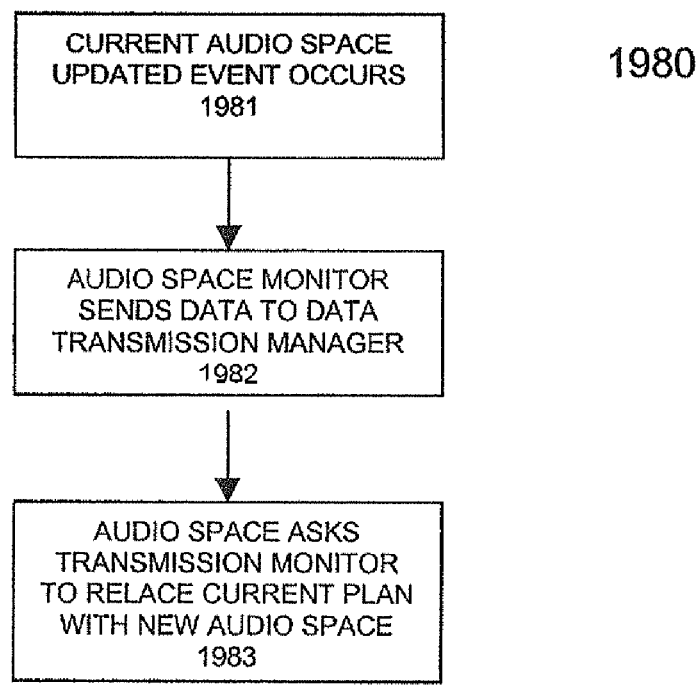

FIG. 19G depicts an exemplary process 1980 for handling a change to the schedule presented by the automation monitor. The process 1980 begins when a current audio space updated event occurs (step 1981), such as in previously described step 1975. The audio space monitor sends new data to the data transmission manager (step 1982). The audio space then asks the transmission monitor to release the current plan with new audio space (step 1983).

Figure 19H:
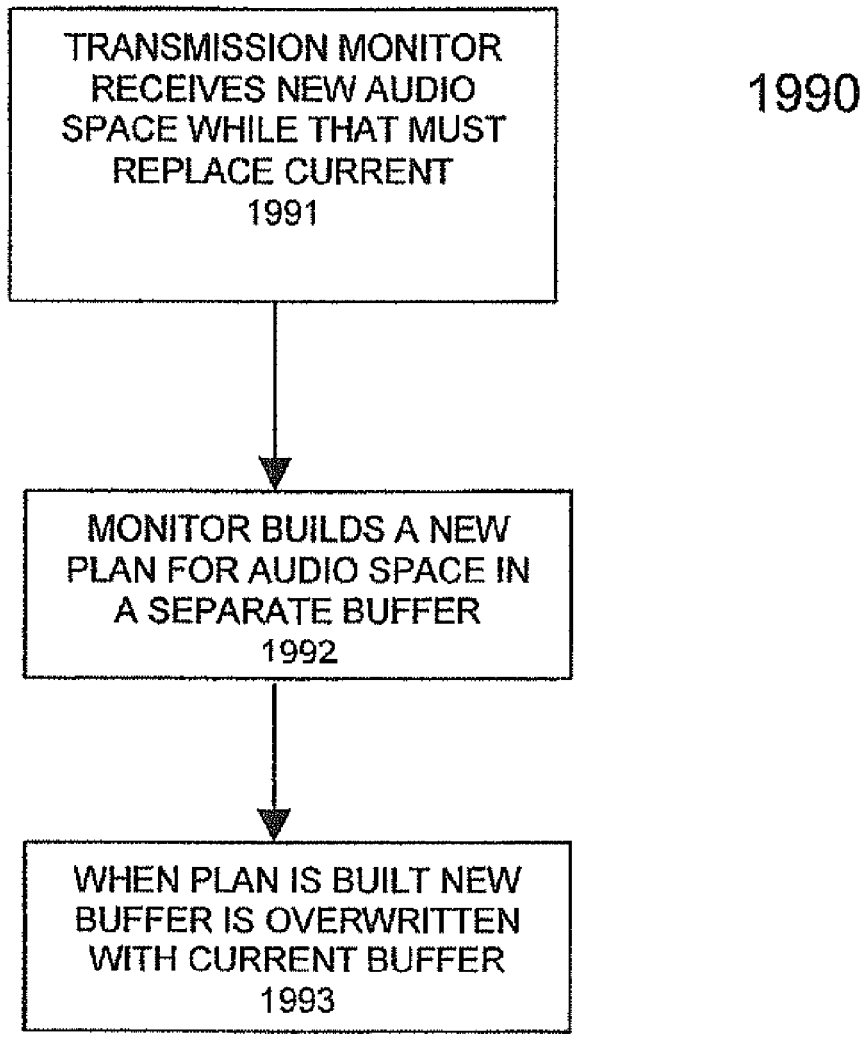

FIG. 19H depicts an exemplary process 1990 performed by the transmission monitor in response to a change in a broadcast schedule. The process 1990 begins when the transmission monitor receives new audio space which replaces current audio space (step 1991). The transmission monitor builds a new plan for the audio space in a separate buffer (step 1992). When the new plan is built, the buffer is overwritten with updated data (step 1993).

Figure 19I:
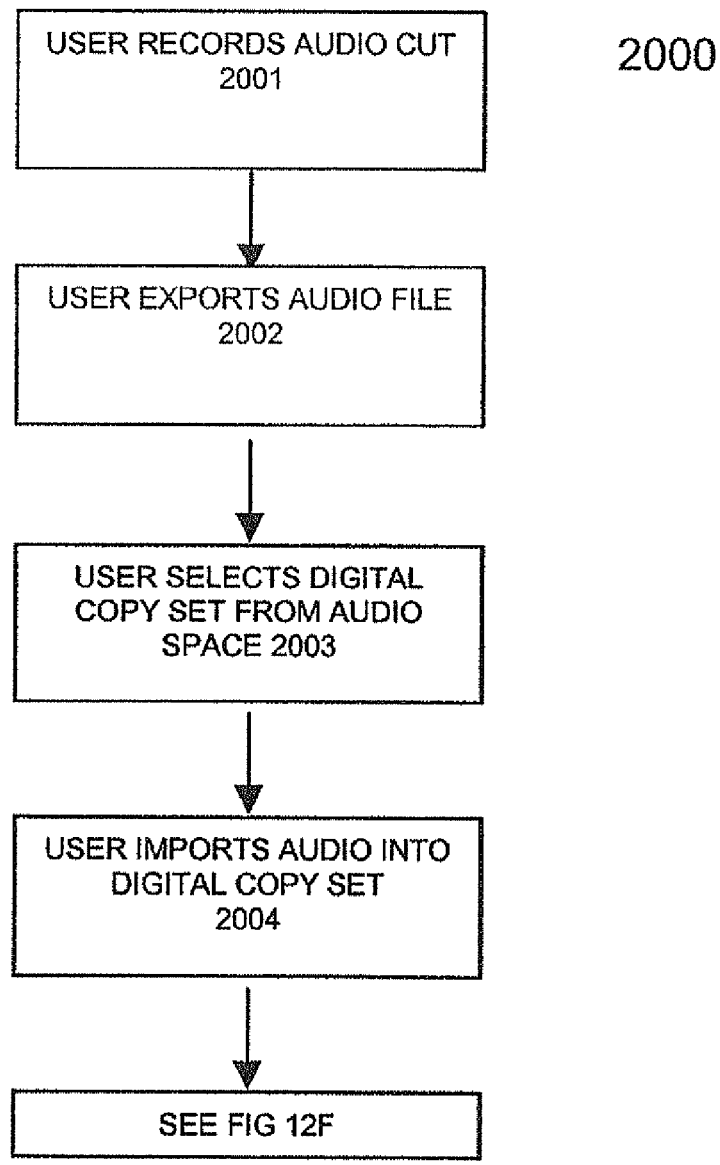

FIG. 19I depicts an exemplary process 2000 for inserting on-demand data into a live, unscheduled broadcast. The process 2000 begins when a user records an audio cut to be transmitted as on-demand supplemental digital data (step 2001). The user exports the audio file (step 2002) and selects a digital copy set from audio space (step 2003). The user then imports the audio file into the selected digital copy set (step 2004). Data may then be inserted in a manner depicted with regard to FIG. 12F.

Figure 19J:
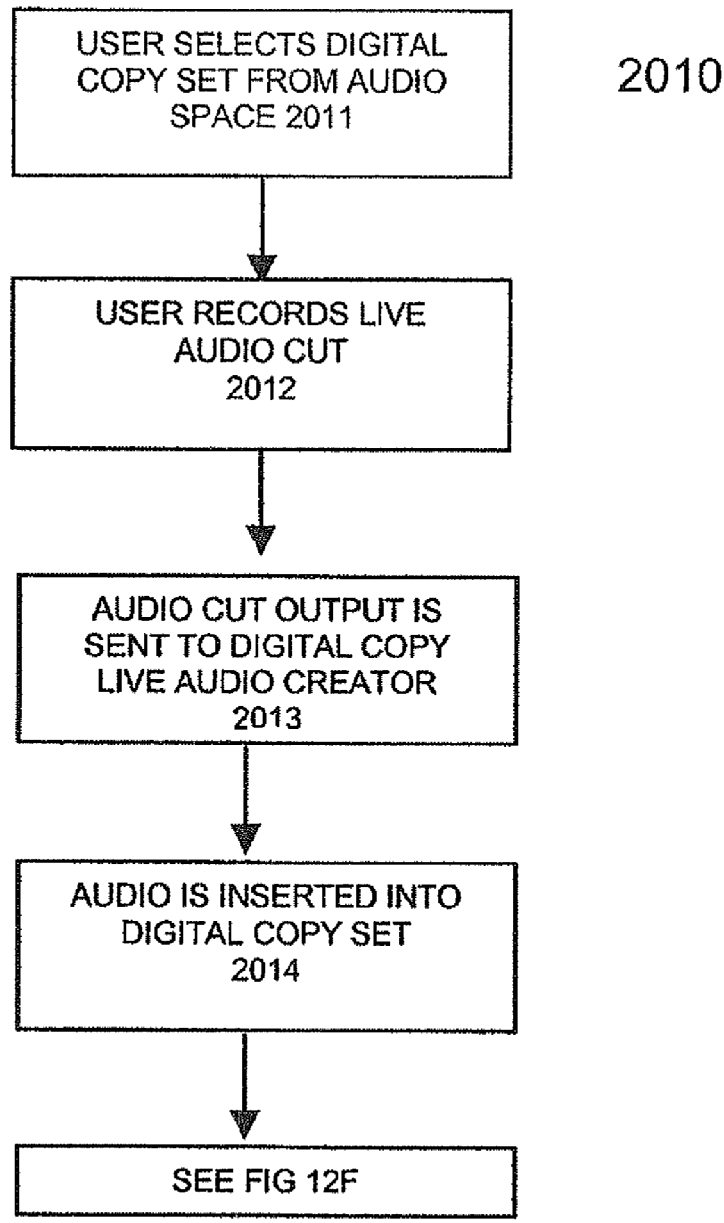

FIG. 19J depicts an alternate exemplary process 2010 for inserting on-demand data into a live, unscheduled broadcast. The process 2010 begins when a user selects a digital copy set from available audio space (step 2011). The user then records a live audio cut (step 2012). The live audio cut is sent to a digital copy live audio creator (step 2013) and the audio is inserted into the digital copy set (step 2014).

Figure 19K:
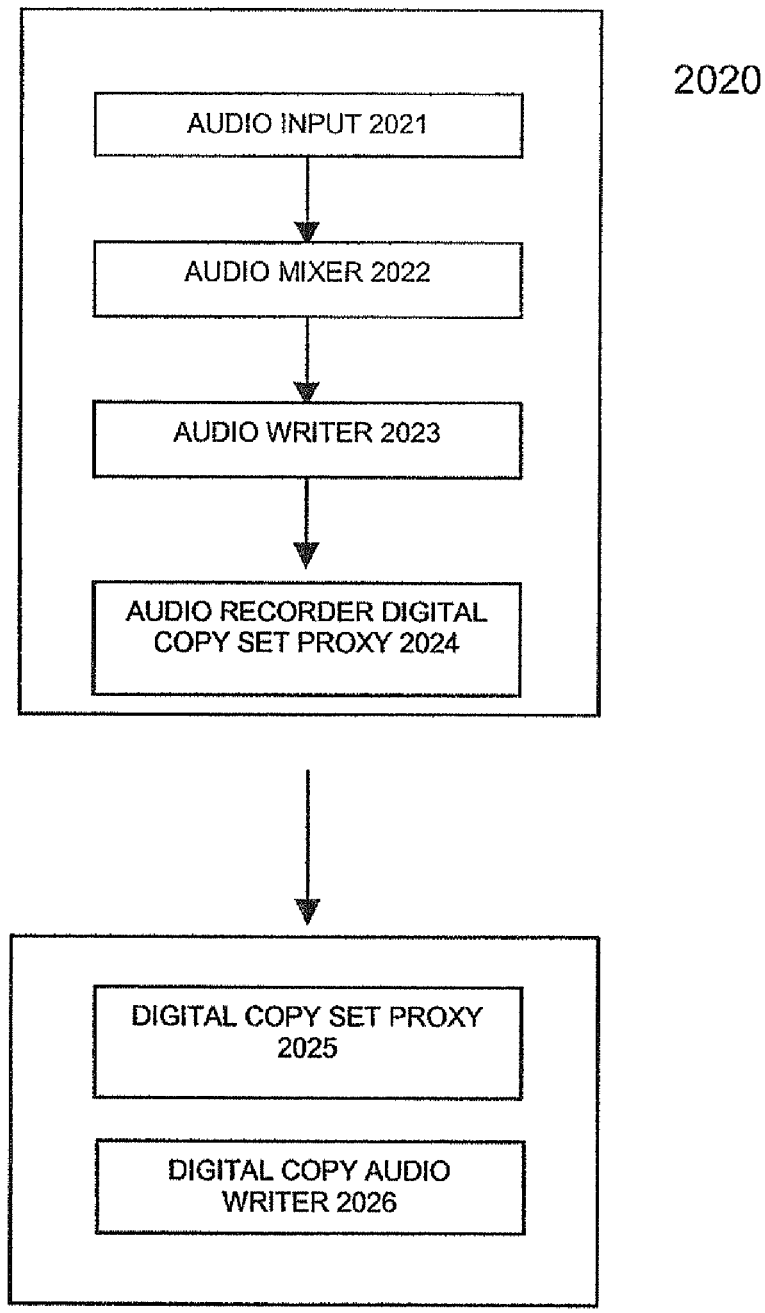

FIG. 19K depicts an exemplary array of devices 2020 for recording live audio and inserting the same into a digital copy set. The devices 2020 may include an audio input device 2021; an audio mixer 2022, an audio writer 2023, and audio recorder digital copy set proxy 2024, a digital copy set proxy 2025 and a digital copy audio writer 2026. A description of the functions performed by these devices is presented below.

Figure 19L:
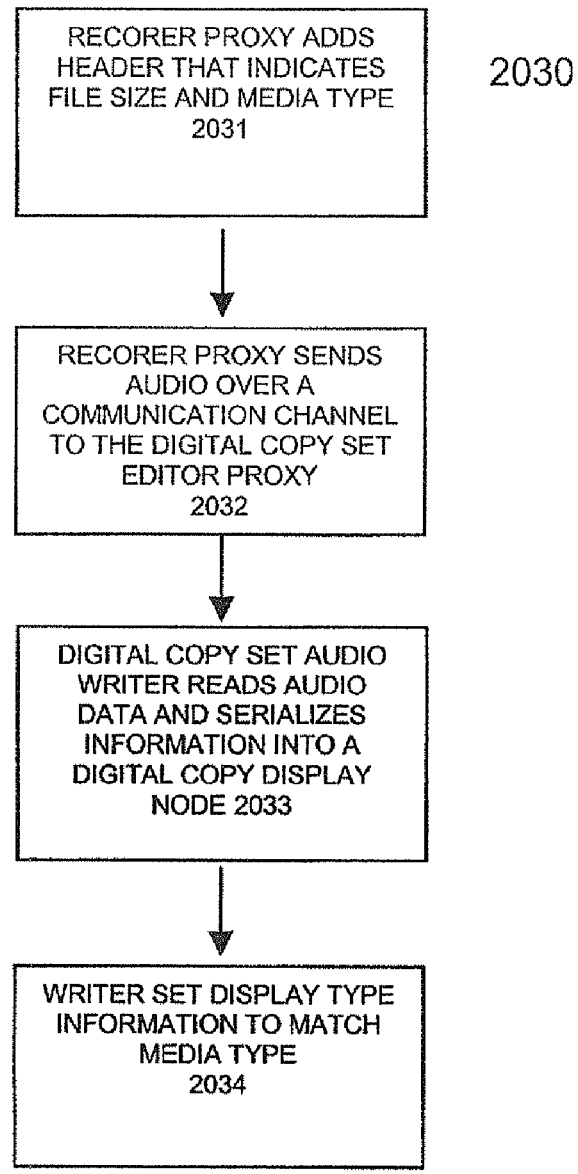

FIG. 19L depicts an exemplary process 2030 by which the audio recorder digital copy set proxy 2024, the digital copy set proxy 2025 and the audio writer 2023 interact. The process 2030 begins with the recorder proxy adding a header that indicates file size and media type to a digital copy set (step 2031). The audio recorder digital copy set proxy sends audio over a communication channel to the digital copy set editor proxy (step 2032). The digital copy set audio writer reads the received audio data and serializes the information into a digital copy display node (step 2033). The digital copy audio writer sets display type information for the audio data to match a media type (step 2034).

Figure 19M:
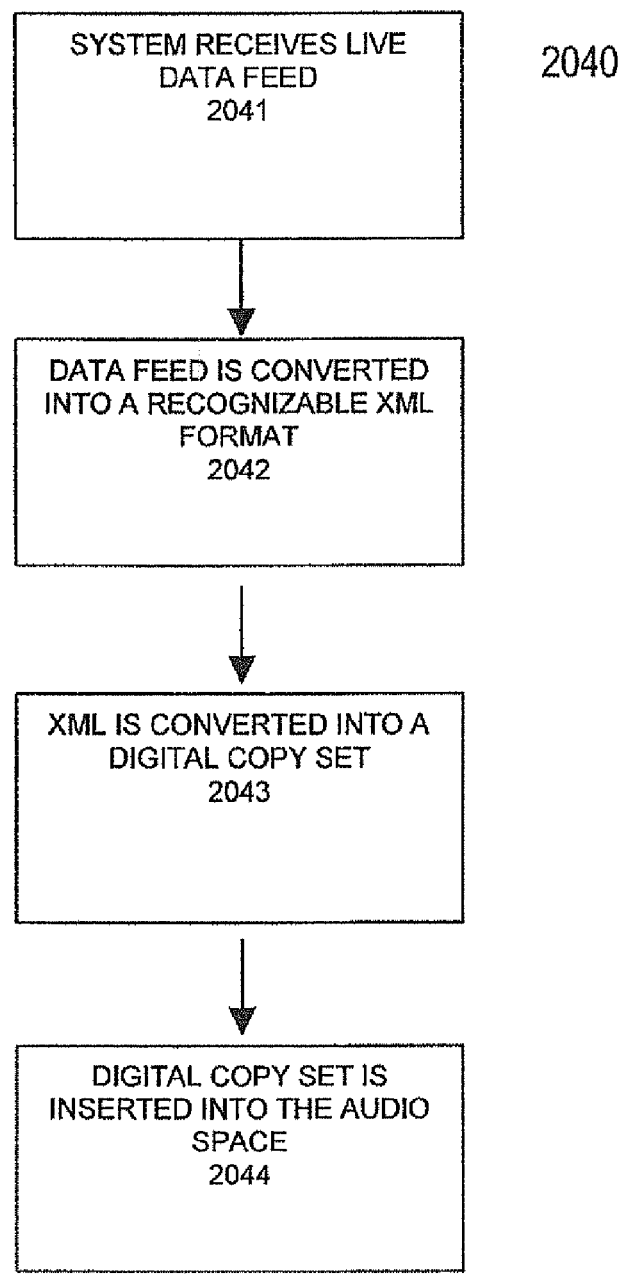

FIG. 19M depicts an exemplary process 2040 for inserting a live feed into a digital copy set for a live, unscheduled broadcast. The process 2040 begins when the system 2020 receives a live data feed (step 2041). The live data feed is converted into a recognizable XML format for transfer between devices (step 2042). The XML, in turn, is converted into a digital copy set (step 2043) which is then inserted into the audio space (step 2044).

It will be apparent that insertion of digital copy sets including a group of supplemental digital data, whether scheduled or unscheduled, may be inserted into a live data-cast by the broadcaster or the supplemental digital data provider.

Figure 20:
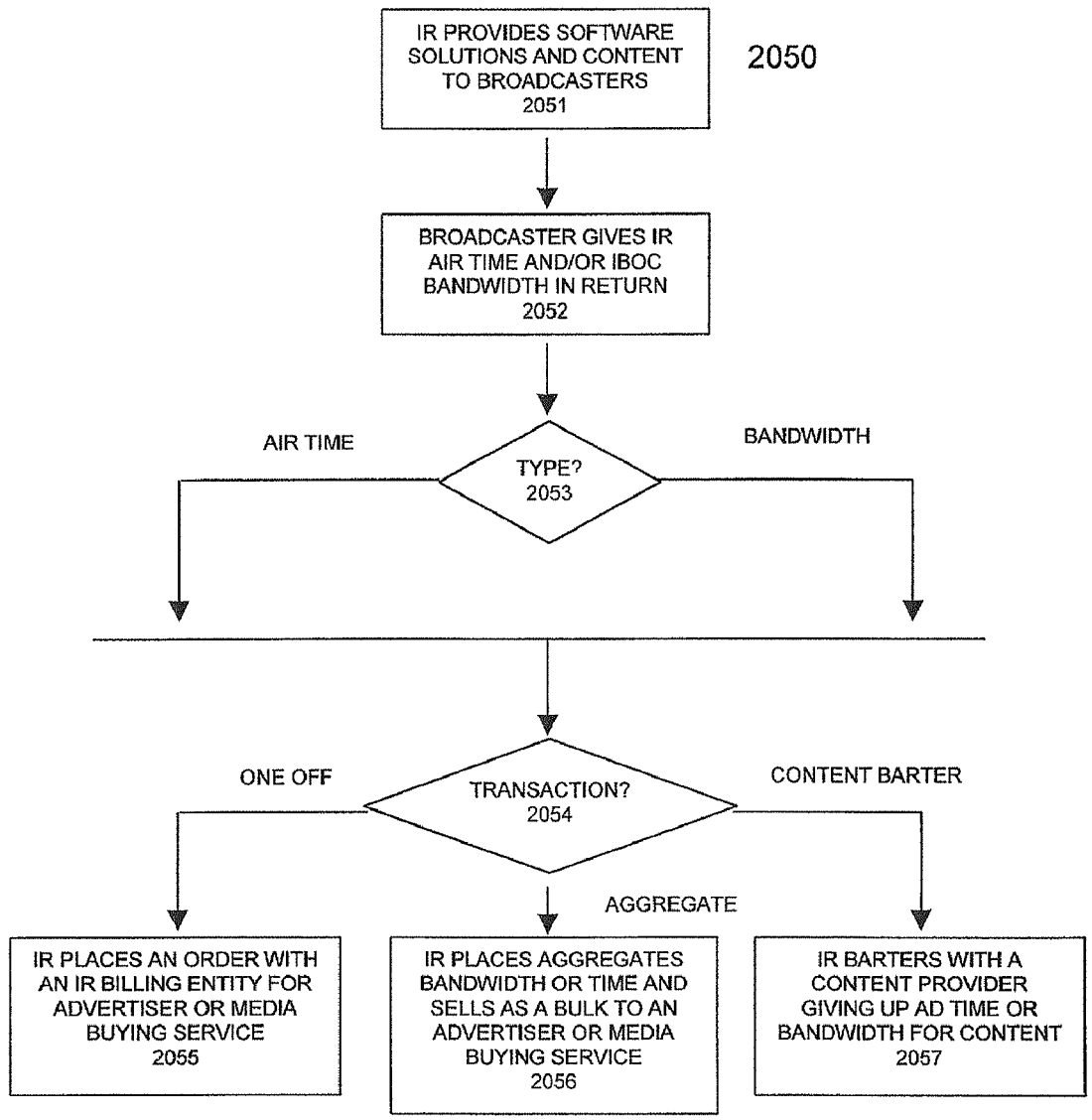
FIG. 20 illustrates an exemplary processes for bartering for airspace according to the present invention.

FIG. 20 illustrates an exemplary processes for bartering for airspace in conjunction with the present invention. According to process 2050, a supplemental digital data provider may provide software solutions, hardware, and/or content to one or more broadcasters (step 2051). The broadcasters may give the provider air time and/or IBOC bandwidth in return (step 2052). The provider may then place an order with a billing entity such as an advertiser or media buying service (step 2055). Alternatively, the provider may receive aggregated bandwidth or time and sell the same in bulk to an advertiser or media buying service (step 2056). Furthermore, the provider may barter with a content provider, giving up advertisement time with audio data or bandwidth in exchange for content (step 2057).

As described in detail in the foregoing, the present invention embodies a series of subsystems (cooperating hardware and software) that allow a broadcaster to utilize IBOC technology to broadcast supplemental digital data ("data") along with the analog audio ("audio") which, in turn, enhances the value of a radio broadcast. This process of "data-casting" or "broadcasting" and the broadcast itself can be referred to as a "data-cast". Additionally, embodiments of the present invention advantageously provide a useful and unrealized commercial utility, namely radio commerce ("rCommerce"), to an existing IBOC technology.

Certain embodiments provide a methodology and a system for creating data, managing data, associating data with audio, scheduling data for broadcast, and tracking production and sales information in regards to the data. Furthermore these embodiments provide a methodology and a system for identifying characteristics of the audio and the data that trigger the transmission of data within a broadcast as well as characteristics regarding the continuity of the data presentation, such as the timing and positioning during the broadcast.

Other embodiments of the present invention provide a methodology and a system for connecting individual broadcasters engaged in data-casting such that a single piece of data can be produced once and broadcast by all of the connected broadcasters. This is referred to from time-to-time herein as the "network" of broadcasters. Further embodiments of the invention provide a methodology and a system for centrally locating data within the network as well as a methodology and a system for moving data throughout the network.

Certain embodiments provide a methodology and a system for using the characteristics of the desired audience for a particular piece of data in combination with the identifiable characteristics regarding the audience of broadcasters within the network to schedule data throughout the network in a way that is optimal for the data. A basic example of this would be the scheduling of data designed as an advertisement to be broadcast by broadcasters within the network whose audience characteristics most closely match the desired characteristics of the advertiser.

Other embodiments of the invention provide a methodology and a system for monitoring the activity of a broadcast, identifying individual audio elements within the broadcast, matching the criteria of the audio elements against the broadcast characteristics of all of the data available for the broadcast, and selecting the appropriate pieces of data for broadcast.

Further embodiments of the invention provide a methodology and a system for packaging a set of data with audio such that the timing of the presentation of one or more parts of the data can be correlated with the timing of events in the audio and this relationship can be understood by a device that renders the audio and the data simultaneously. A simple example of this would be to have a particular phrase of a song appear on a screen connected to the receiver as the phrase was being heard audibly. Furthermore, these embodiments provide a methodology and system for repeating the data within the package of data and audio to ensure that the receiver device receives all of the data and that the data can be fully received for presentation at any point during the broadcast.

An additional embodiment of the invention provides a methodology and a system for encoding the data with instructions that allow for the transmission of the data and the instructions to a device that can perform a task identified by the instructions.

The present invention thus creates a framework and suite of tools for IBOC broadcasters to create, manage and schedule supplemental digital data for transmission over their radio broadcast. The invention enables them to generate revenue from the transmission of digital data through advertising sponsorships, direct response fees, commerce transactions, and other revenue producing methods which are herein referred to as "rCommerce" or "radio commerce." Additionally, the present invention creates a network of datacasters consisting of every radio station that uses the invention, which is used by the assignee of this application, Impulse Radio, Inc., for rCommerce revenue through the efficient and strategic distribution of Impulse Radio, Inc., clients' supplemental digital data. Finally, the present invention develops the mechanisms by which all digital data travels through, and is accounted for in, the network of datacasters, regardless of the destination, purpose, or source of the digital data.

Specifically, the present invention defines a multipurpose device discussed in greater detail above that is responsible for the 1) temporary storage and constant dissemination of digital data to a DAB radio station, 2) communication with the invention's data repository to update digital data and 3) monitoring a DAB radio station's audio broadcast system for the presence of "opportunistic avails" in which commercial and non-commercial digital data is inserted.

The present invention is important because it provides broadcasters a "turn-key" solution for the development and management of digital data broadcast to their audiences. Some broadcasters will prefer to transmit supplemental digital data that are largely visual components designed to enhance the experience of the audio broadcast. Some broadcasters will prefer to transmit digital data that are higher-quality (in relation to the analog signal) audio signals, with little or no thought to visual components. Some broadcasters will even forgo audio altogether and utilize IBOC technology to transmit digital data for other point-to-multipoint data services.

The present invention is also important because it provides a useful commercial utility, radio commerce, to an existing IBOC technology. Currently the only commercial application for IBOC is the hybrid delivery of digital audio broadcasting. Commercial initiatives to increase the sound quality of an audio broadcast are underway by transmission equipment manufacturers and iBiquity Digital. This invention enables and makes commercial use of IBOC's data transmission capabilities that are currently unrealized.

The present invention is also important because it fundamentally changes the nature of a radio broadcast by adding datacast elements to an audio medium. In addition, it fundamentally changes the entertainment value of radio for a consumer through the use of these datacast elements and allowing the consumer to interact with them by way of response—i.e., the essence of "radio commerce."

The present invention will clearly be of great importance to radio broadcasters. Currently, a radio broadcaster can derive revenue from approximately 20% of his available airtime in a best-case scenario. The present invention offers broadcasters the opportunity to transform the datacast elements into visual and adjunct audio advertisements and broadcast these datacast elements simultaneously with their traditional audio programming, in effect, tripling their current amount of advertising inventory. This increase allows a broadcaster to reach consumers with much greater frequency. Moreover, the present invention increases the value of a broadcaster's traditional audio advertising spot as it provides the ability to broadcast datacast elements that are designed as specific enhancements to the advertisement.

The present invention is likewise important to advertisers because the datacast elements offer heretofore unavailable creative opportunities for reaching consumers through the radio—including brand images, product photos, special audio messages and the like. Such datacast elements present advertisers the ability to have their brand messages displayed, not just heard, to captive radio audiences. In addition, it allows advertisers the ability to utilize the radio with much greater frequency, interactivity and creative value—another important aspect of "radio commerce."

Despite the use of IBOC technology, the present invention helps streamline the process for broadcasters while also creating the opportunity for revenue generation, specifically through the process of delivering compelling digital data to a broadcaster's audience—advertising, as well as the ability to interact with a broadcast, including the purchase of goods and services. The broadcaster's audience ("consumer") need not receive digital data through IBOC radio receivers exclusively, but will also be able to receive digital data from datacasters through other IBOC enabled devices such as handheld information devices, cellular phones, billboards and computers which have IBOC chips sets.

One embodiment of the present invention comprises a computer-based system that allows broadcasters to produce and broadcast hybrid data (herein referenced as "datacast"), both adjunct audio data and visually rendered data (herein referenced as "datacast elements"), which includes content, advertising, and interactivity. The system is designed to do the following:

(1) Manage and aggregate content from third party sources;
(2) Offer the ability for a broadcaster to create content for datacast over an IBOC signal;
(3) Offer the ability for a broadcaster to manage and sell visual advertising within the datacast
(4) When used specifically to augment and enhance an analog audio broadcast, regardless of programming format, monitor that broadcast and retrieve appropriate digital data to coincide with it;
(5) Permit consumers to respond to advertisements and purchase goods and services via a non-IBOC return path; and
(6) Package scheduled data in a format appropriate to dispense to an IBOC encoding device The present invention provides three key functions. First, it enhances the entertainment value of a radio broadcast by giving consumers datacast elements that enhance their radio "listening" experience through the distribution of visual components and adjunct, on-demand, digital audio components. Second, it gives broadcasters compelling reasons to convert to DAB because it provides them with an incremental revenue stream through the use of a system that is efficient, easy to use, inexpensive and requires little to no additional station resources or expense. Finally, the datacast technology is flexible, allowing the ability to support multiple receiver display capabilities—thus all consumers, despite the inevitable market of receivers with varying ability, will be able to enjoy the datacast and the datacast elements.

For purposes of creating the datacast, the present invention has been designed to receive content from multiple sources, assign broadcast rules and parameters (herein referenced as "broadcast instructions") to the content via web-based applications, and accept sales orders for advertisements interspersed in the datacast via web based applications. Additionally, the aggregated content, advertisements, and broadcast instructions are packaged as a datacast and distributed to the appropriate station's multipurpose Internet appliance (or "black box"). The device then monitors the station's analog audio broadcast for opportunistic commercial and noncommercial availabilities within the broadcast, queues appropriate datacast elements according to those availabilities and the datacast instructions, and then interfaces with an IBOC encoding device to produce the datacast.

Thus, one embodiment of the present invention provides a method for providing data for a digital audio broadcast comprising the steps of:

(a) selecting content for the broadcast;
(b) selling advertising time for content selected;
(c) creating data for content selected and advertising time sold;
(d) aggregating content and advertising data together;
(e) transferring aggregated content and data to a remote site; and
(f) incorporating transferred aggregate into digital audio broadcast.

Preferably this method gives the user the ability to track the selection of content, advertising time sold, and creation of advertising data. Advantageously, the method further comprises a step of receiving consumer responses to aggregate content and advertisement.

Web-based software is one preferred aspect of the present invention. For example, the selection of content may be accomplished using web-based software. Similarly, one preferred method for the selling of advertising time is accomplished using web-based software. Likewise, a preferred method for the creation of data for ad time sold is accomplished using web-based software. The tracking of selection of content, advertising time sold and the creation of content may also preferably be accomplished using web-based software. One of ordinary skill will readily recognize that implementation over the Internet is not required to accomplish this aspect of the invention.

It should be noted that supplemental digital data according to the present invention can include visual content, audio content or both. For example, in one preferred aspect of this invention the broadcast is visual in nature. In another preferred aspect of the invention the ad data is visual in nature.

More particularly, the present invention provides a method for providing data for a digital audio broadcast comprising the steps of:

(a) selecting content for the broadcast in a data repository;
(b) selling advertising time for content selected in a data repository;
(c) creating data for content selected and advertising time sold in a data repository;
(d) aggregating content and advertising data together in a data repository;
(e) transferring aggregated content and data to a remote site on a data network; and
(f) incorporating transferred aggregate into digital audio broadcast via an Internet appliance.

Advantageously, step (a) may further include the following steps:

(1) selecting the time at which the content will be broadcast;
(2) selecting the length of time the content will be broadcast;
(3) selecting the frequency of broadcast;
(4) selecting if the content will correspond to an audio portion of the digital audio broadcast;
(5) selecting the location of content on receiving device;
(6) selecting the specific station from which it will broadcast; and
(7) selecting the starting and ending dates for conducting the above steps.

Advantageously, step (b) may further include the following steps:

(1) selecting the criteria for advertisement;
(2) selecting the time at which the content will be broadcast;
(3) selecting the length of time the content will be broadcast;
(4) selecting the frequency of broadcast;
(5) selecting if the content will correspond to an audio portion of the digital audio broadcast;
(6) selecting the location of content on receiving device;
(7) selecting the specific station from which it will broadcast;
(8) selecting the unit price or cost for broadcasting data; and
(9) selecting the starting and ending dates for conducting the above steps.

Advantageously, step (c) may further include the following steps:

(1) viewing the parameters from steps (a) and (b);
(2) uploading or downloading data for creation; and
(3) complying with standards for digital audio broadcast.

Advantageously, step (f) includes the following step performed by the Internet appliance; namely, dynamically calculating Opportunistic Commercial Avails and Opportunistic Non-Commercial Avails through constant or intermittent monitoring of the audio broadcast.

Data packaging for the present invention is preferably accomplished using standardized XML schema. Transfer of aggregated content and data to a remote sight on a data network (i.e., step (e)) is preferably accomplished using HTTP/SSL communication.

Another preferred embodiment of the present invention comprises a system for providing data for a digital audio broadcast having the following integrated components:

(1) a central server where the data for the digital broadcast is compiled;
(2) a data network for transferring the compiled data; and
(3) an Internet appliance for receiving the transferred data and incorporating the data into the digital audio broadcast.

Advantageously this system provides the user with the ability to track the selection of content, advertising time sold, and creation of advertising data. In addition, this system further provides data storage for receiving consumer response to aggregate content and advertisement. Preferably, the selection of content is accomplished using web-based software. Likewise, the selling of advertising time is preferably accomplished using web-based software. In addition, the selling of creating of data for ad time sold is preferably accomplished using web-based software. Also the tracking of selection of content, advertising time sold and the creation of content is preferably accomplished using web-based software. As above, the content for the broadcast may be audio in nature, visual in nature, or both. Similarly, the advertising data may be audio in nature, visual in nature, or both.

Preferably this embodiment of the present invention further includes software and/or hardware for:

(1) selecting the time at which the content will be broadcast;
(2) selecting the length of time the content will be broadcast;
(3) selecting the frequency of the broadcast;
(4) selecting if the content will correspond to a particular audio portion of the digital audio broadcast;
(5) selecting the location of content on a receiving device;
(6) selecting the specific station from which the content will broadcast; and
(7) selecting the starting and ending dates for conducting the above steps.

More preferably, this embodiment of the invention further includes software and/or hardware for:

(1) selecting the criteria for advertisement content;
(2) selecting the time at which the content will be broadcast;
(3) selecting the length of time the content will be broadcast;
(4) selecting the frequency of the broadcast;
(5) selecting if the content will correspond to a particular audio portion of the digital audio broadcast;
(6) selecting the location of content on a receiving device;
(7) selecting the specific station from which the content will broadcast;
(8) selecting the unit price or cost for broadcasting data; and
(9) selecting the starting and ending dates for conducting the above steps.

Most preferably, this embodiment of the invention further includes software and/or hardware for:

(1) viewing the parameters from steps (a) and (b);
(2) uploading or downloading data for creation; and
(3) complying with standards for digital audio broadcast.

As above, one especially preferred embodiment of the present system is the Internet appliance or "black box," which includes both software and hardware for monitoring the audio broadcast portion of the digital audio broadcast and dynamically calculates Opportunistic Commercial Avails and Opportunistic Non-Commercial Avails through monitoring of the analog audio broadcast.

Data packaging for this embodiment of the invention is also preferably accomplished using standardized XML schema. Transfer of aggregated content and data to a remote sight on a data network is preferably accomplished using HTTP/SSL communication.

Another embodiment of the present invention is a system for providing data for use in a digital broadcast comprising the steps of:

(a) providing a central server;
(b) providing an Internet appliance;
(c) providing a data network connecting the central server and the Internet appliance;
(d) providing a device for taking orders for advertisements on broadcast on the central server;
(e) providing a device for creating data for broadcast on the central server;
(f) providing a device for aggregating data on the central server for transfer to the Internet appliance; transferring aggregated data over data network;

(g) providing a device for receiving data transferred over data network on the Internet appliance; and (h) providing a device for incorporating received data into an IBOC digital broadcast using the Internet appliance.

Preferably this embodiment of the invention further includes software and/or hardware for:

(1) selecting the time at which the content will be broadcast;

(2) selecting the length of time the content will be broadcast;

(3) selecting the frequency of broadcast;

(4) selecting if the content will correspond to a particular audio portion of the digital audio broadcast;

(5) selecting the location of content on a receiving device;

(6) selecting the specific station from which the content will broadcast; and (7) selecting the starting and ending dates for conducting the above steps.

More preferably this embodiment of the invention further includes software and/or hardware for:

(1) selecting the criteria for advertisement;

(2) selecting the time at which the content will be broadcast;

(3) selecting the length of time the content will be broadcast;

(4) selecting the frequency of broadcast;

(5) selecting if the content will correspond to a particular audio portion of the digital audio broadcast;

(6) selecting the location of content on a receiving device;

(7) selecting the specific station from which the content will broadcast;

(8) selecting the unit price or cost for broadcasting data; and (9) selecting the starting and ending dates for conducting the above steps.

Most preferably this embodiment of the invention further includes software and/or hardware for:

(1) viewing the parameters from steps (a) and (b);

(2) uploading or downloading data for creation; and (3) complying with standards for digital audio broadcast.

As above, one especially preferred embodiment of the present system is the Internet appliance or "black box," which includes both software and hardware for monitoring the audio broadcast portion of the digital audio broadcast and dynamically calculates Opportunistic Commercial Avails and Opportunistic Non-Commercial Avails through monitoring of the analog audio broadcast.

Data packaging for this embodiment of the invention is preferably accomplished using standardized XML schema. Transfer of aggregated content and data to a remote sight on a data network is preferably accomplished using HTTP/SSL communication.

Another embodiment of the present invention entails a system for providing data on an in-band, on-channel (IBOC) FM digital audio broadcast comprising:

(a) hardware and/or software under control of a client system and providing:

(1) means for requesting content;

(2) means for requesting advertising;

(3) means for creating data; and (4) means for monitoring the requests and data creation;

(b) hardware and/or software under control of a server system and providing:

(1) means for receiving requests;

(2) means for storing data;

(3) means for aggregating data for transfer;

(c) hardware and/or software under control of an Internet appliance in communication with parts (a) and (b) defined above, and further providing:

(1) means for receiving transferred aggregate data, and (2) means for incorporating data into broadcast.

Preferably this embodiment of the invention provides the user with the ability to track the selection of content, advertising time sold, and creation of advertising data.

Preferably this embodiment of the invention further includes data storage for receiving consumer response to aggregate content and advertisement.

Preferably this embodiment of the invention uses web-based software for selection of content. Preferably this embodiment of the invention uses web-based software for the selling of advertising time. Preferably this embodiment of the invention uses web-based software for the selling of creating of data for ad time sold. Preferably this embodiment of the invention uses web-based software for the tracking of selection of content, advertising time sold and the creation of content.

This embodiment of the invention can include either visual content or audio content or both. For example, in one preferred aspect of this invention the broadcast is visual in nature. In another preferred aspect of the invention the ad data is visual in nature.

Preferably, this embodiment of the invention further includes software and/or hardware for:

(1) selecting the time at which the content will be broadcast;

(2) selecting the length of time the content will be broadcast;

(3) selecting the frequency of broadcast;

(4) selecting if the content will correspond to an particular audio portion of the digital audio broadcast;

(5) selecting the location of the content on a receiving device;

(6) selecting the specific station from which the content will broadcast; and (7) selecting the starting and ending dates for conducting the above steps.

More preferably, this embodiment of the invention further includes software and/or hardware for:

(1) selecting the criteria for advertisement;

(2) selecting the time at which the content will be broadcast;

(3) selecting the length of time the content will be broadcast;

(4) selecting the frequency of the broadcast;

(5) selecting if the content will correspond to a particular audio portion of the digital audio broadcast;

(6) selecting the location of the content on a receiving device;

(7) selecting the specific station from which the content will broadcast;

(8) selecting the unit price or cost for broadcasting data; and (9) selecting the starting and ending dates for conducting the above steps.

Most preferably, this embodiment of the invention further includes software and/or hardware for:

(1) viewing the parameters from steps (a) and (b);

(2) uploading or downloading data for creation; and (3) complying with standards for digital audio broadcast.

As above, one especially preferred embodiment of the present system is the Internet appliance or "black box," which includes both software and hardware for monitoring the audio broadcast portion of the digital audio broadcast and dynamically calculates Opportunistic Commercial Avails and Opportunistic Non-Commercial Avails through monitoring of the analog audio broadcast.

Data packaging for this embodiment of the invention is preferably accomplished using standardized XML schema. Transfer of aggregated content and data to a remote sight on a data network is preferably accomplished using HTTP/SSL communication.

Another preferred embodiment of the present invention comprises a system for datacast advertisement strategic placement. This system uses hardware and software to utilize market research to enable the user to efficiently and effectively target specific demographic audiences with their datacast advertisements within the Impulse Radio network of datacasters. Users will select specific target audiences based upon standard market research and the system will be programmed to send datacast advertisements to targeted audiences.

Another preferred embodiment of the present invention comprises the process by which the Internet appliance calculates opportunistic commercial avails and opportunistic non-commercial avails for the purposes of inserting appropriate datacast elements into the datacast. This process comprises the steps of:

(a) dynamically monitoring of the audio broadcast by the Internet appliance;

(b) calculating the presence of one or more opportunistic commercial avails and one or more opportunistic non-commercial avails; and (c) inserting appropriate datacast elements into the datacast based upon said calculations.

Another preferred embodiment of the present invention is a method for the processing of transactions between the datacast consumer and the data displayed or heard on the IBOC receiver device, comprising the following steps:

(1) maintaining inventory codes that can be applied to and later identify all transactionable datacast elements;

(2) defining actions that can be performed for all transactionable datacast elements;

(3) assigning actions to every transactionable datacast element;

(4) providing a transaction gateway that listens for a consumer's transaction request from any return path;

(5) providing one or more transaction engines that perform the appropriate action for that datacast element and confirms completion of the action for the consumer; and (6) providing a consumer-centric commerce web site where consumers can setup accounts, gathering all necessary information for the completion of the transaction.

Completion of the transaction by the consumer would normally include the consumer providing specific information, including the following; Name, E-mail address, physical address, credit card information and any other important information.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method for entering into a commercial transaction using a digital data receiver presenting supplemental data, the method comprising:

receiving broadcast data including a song over a radio frequency on a digital data receiver;

outputting the song through a speaker associated with the digital data receiver;

receiving, with the broadcast data, supplemental digital data including a song title, artist information, and action code and wherein the supplemental digital data is synchronized with the broadcast data, wherein the supplemental digital data is received using an in-band, on-channel technique;

displaying at least one of the song title and artist information on the digital data receiver while outputting the song;

receiving an indication that a user desires to purchase the song wherein the indication comprises a verbal command or activation of at least a button;

connecting the digital data receiver to a network; and transmitting a request to purchase the song accompanied by the action code.

2. The method of claim 1, wherein said transmitting comprises transmitting a wireless signal to an Internet gateway, the wireless signal indicative of the advertising data and an identification of the purchaser of the item.

3. The method of claim 1, further comprising: providing an identification of at least one of a financial account and a mailing address to an Internet web site for completing the purchase.

4. The method of claim 3, wherein said providing is performed prior to said transmitting.

5. The method of claim 3, wherein said providing is performed after said transmitting.

6. The method of claim 1, wherein said identification of the purchaser corresponds to a signal indicative of a particular digital data receiver associated with the purchaser.

7. The method of claim 1, wherein said transmitting comprises transmitting to a broadcaster responsible for sending the broadcast data.

8. The method of claim 1, wherein the broadcast data comprises analog data transmitted over the radio frequency.

9. The method of claim 1, wherein said receiving broadcast data comprises receiving on at least one of an amplitude-modulated radio frequency and a frequency-modulated radio frequency.

10. The method of claim 1, wherein the supplemental digital data further comprises a plurality of multimedia presentations to be simultaneously displayed on the receiver of the broadcast data.

11. The method of claim 1, wherein a time for presentation of the supplemental digital data is selected by the user.

12. The method of claim 1, wherein the supplemental data is presented during at least a portion of a length of the broadcast data.

13. The method of claim 1, wherein said synchronization is accomplished by packaging the supplemental data to be transmitted in conjunction with the broadcast data.

14. The method of claim 1, wherein said synchronization is accomplished by transmitting the supplemental data on a separate channel from the broadcast data, and then making the supplemental data available to the user when the broadcast data is received.

15. A physically embodied computer readable medium comprising software for:

receiving broadcast data including a song over a radio frequency on a digital data receiver;

outputting the song through a speaker associated with the digital data receiver;

receiving, with the broadcast data, supplemental digital data including a song title, artist information, and action code and wherein the supplemental digital data is synchronized with the broadcast data, wherein the supplemental digital data is received using an in-band, on-channel technique;

displaying at least one of the song title and artist information on the digital data receiver while outputting the song;

receiving an indication that a user desires to purchase the song wherein the indication comprises a verbal command or activation of at least a button;

connecting the digital data receiver to a network; and transmitting a request to purchase the song accompanied by the action code.

16. An apparatus for entering into a commercial transaction using a digital data receiver presenting supplemental data, the apparatus comprising:

a processor; and a memory in communication with the processor, the memory for storing a plurality of processing instructions enabling the processor to:

receive broadcast data including a song over a radio frequency on a digital data receiver;

output the song through a speaker associated with the digital data receiver;

receive, with the broadcast data, supplemental digital data including a song title, artist information, and action code and wherein the supplemental digital data is received on the digital data receiver synchronized with the broadcast data, wherein the supplemental digital data is received using an in-band, on-channel technique;

display at least one of the song title and artist information on the digital data receiver while outputting the song;

receive an indication that a user desires to purchase the song wherein the indication comprises a verbal command or activation of at least a button;

connect the digital data receiver to a network; and transmit a request to purchase the song accompanied by the action code.

* * * * *